United States Patent
Grubbs et al.

(10) Patent No.: US 10,608,280 B2
(45) Date of Patent: *Mar. 31, 2020

(54) BRUSH BLOCK COPOLYMER ELECTROLYTES AND ELECTROCATALYST COMPOSITIONS

(71) Applicant: CALIFORNIA INSTITUTE OF TECHNOLOGY, Pasadena, CA (US)

(72) Inventors: Robert H. Grubbs, South Pasadena, CA (US); Christopher M. Bates, Monrovia, CA (US); Alice Chang, Pasadena, CA (US); Brendon McNicholas, Los Angeles, CA (US); Simon C. Jones, Whittier, CA (US)

(73) Assignee: California Institute of Technology, Pasadena, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 15/065,317

(22) Filed: Mar. 9, 2016

(65) Prior Publication Data

US 2017/0018801 A1    Jan. 19, 2017

Related U.S. Application Data

(60) Provisional application No. 62/130,385, filed on Mar. 9, 2015.

(51) Int. Cl.
*H01M 10/0565* (2010.01)
*C08G 81/00* (2006.01)
(Continued)

(52) U.S. Cl.
CPC ........ *H01M 10/0565* (2013.01); *C08G 61/02* (2013.01); *C08G 61/08* (2013.01);
(Continued)

(58) Field of Classification Search
CPC ......... H01M 10/0565; H01M 10/0525; H01M 2300/0082; H01M 14/005;
(Continued)

(56) References Cited

U.S. PATENT DOCUMENTS

| | | |
|---|---|---|
| 4,052,539 A | 10/1977 | Shropshire et al. |
| 5,462,990 A | 10/1995 | Hubbell et al. |

(Continued)

FOREIGN PATENT DOCUMENTS

| | | |
|---|---|---|
| JP | 2006-052326 | 2/2006 |
| WO | WO 2013/138494 | 9/2013 |

OTHER PUBLICATIONS

Agarwal et al. (Feb. 23, 2012) "Mechanisms for CO Production from CO2 Using Reduced Rhenium Tricarbonyl Catalysts," J. Am. Chem. Soc. 134:5180-5186.

(Continued)

*Primary Examiner* — Gary D Harris
(74) *Attorney, Agent, or Firm* — Leydig, Voit & Mayer, Ltd.

(57) ABSTRACT

Provided herein are copolymer electrolytes and electrocatalyst platforms, including brush block copolymers, triblock brush copolymers and pentablock brush copolymers. The copolymers described have beneficial chemical, physical and electrical properties including high ionic conductivity and mechanical strength. In embodiments, for example, the provided copolymer electrolytes and electrocatalyst platforms are doped with lithium salts or mixed with ionic liquids to form ion gels. In some embodiments, the copolymers provided herein self-assemble into physically cross-linked polymer networks with additional useful properties. The provided copolymers have low dispersity in the polymer side chains and do not require post-polymerization modifications.

29 Claims, 71 Drawing Sheets

(51) Int. Cl.

| | |
|---|---|
| C08L 87/00 | (2006.01) |
| C08G 61/08 | (2006.01) |
| C08L 65/00 | (2006.01) |
| C08G 61/02 | (2006.01) |
| H01M 10/0525 | (2010.01) |
| H01M 14/00 | (2006.01) |
| H01M 8/1018 | (2016.01) |

(52) U.S. Cl.
CPC ............... *C08G 81/00* (2013.01); *C08L 65/00* (2013.01); *C08L 87/005* (2013.01); *H01M 10/0525* (2013.01); *H01M 14/005* (2013.01); *C08G 2261/126* (2013.01); *C08G 2261/143* (2013.01); *C08G 2261/148* (2013.01); *C08G 2261/149* (2013.01); *C08G 2261/1426* (2013.01); *C08G 2261/3324* (2013.01); *C08G 2261/3325* (2013.01); *C08G 2261/418* (2013.01); *C08G 2261/516* (2013.01); *C08G 2261/792* (2013.01); *H01M 2008/1095* (2013.01); *H01M 2300/0082* (2013.01)

(58) Field of Classification Search
CPC ........... H01M 2008/1095; C08G 61/08; C08G 81/00; C08G 2261/126; C08G 2261/148; C08G 2261/149; C08G 2261/516; C08G 2261/3325; C08G 2261/1426; C08G 61/02; C08G 2261/3324; C08G 2261/792; C08G 2261/418; C08G 2261/143; C08L 65/00; C08L 87/005
See application file for complete search history.

(56) References Cited

U.S. PATENT DOCUMENTS

| | | | |
|---|---|---|---|
| 6,007,845 | A | 12/1999 | Domb et al. |
| 6,306,540 | B1 | 10/2001 | Hiroi et al. |
| 6,383,500 | B1 | 5/2002 | Wooley et al. |
| 6,407,187 | B1 | 6/2002 | Matyjaszewski et al. |
| 6,433,931 | B1 | 8/2002 | Fink et al. |
| 6,489,055 | B1 | 12/2002 | Ichihashi et al. |
| 6,627,314 | B2 | 9/2003 | Matyjaszewski et al. |
| 6,671,097 | B2 | 12/2003 | Fink et al. |
| 6,692,914 | B1 | 2/2004 | Klaerner et al. |
| 7,101,937 | B1 | 9/2006 | Frechet et al. |
| 7,795,355 | B2 | 9/2010 | Matyjaszewski et al. |
| 7,960,479 | B2 | 6/2011 | Cheng et al. |
| 8,415,436 | B2 | 4/2013 | Han et al. |
| 8,419,792 | B2 | 4/2013 | Vanderbilt et al. |
| 8,454,689 | B2 | 6/2013 | Vanderbilt et al. |
| 9,045,579 | B2 | 6/2015 | Xia et al. |
| 9,142,835 | B2 | 9/2015 | Vicari et al. |
| 9,382,387 | B2 | 7/2016 | Xia et al. |
| 9,453,943 | B2 | 9/2016 | Miyake et al. |
| 2002/0135880 | A1 | 9/2002 | Fink et al. |
| 2005/0192409 | A1 | 9/2005 | Rhodes et al. |
| 2007/0099791 | A1 | 5/2007 | Wan et al. |
| 2009/0146604 | A1* | 6/2009 | Choi .................. H01G 9/2031 320/101 |
| 2010/0305368 | A1 | 12/2010 | Grubbs et al. |
| 2013/0324666 | A1* | 12/2013 | Xia ...................... C08G 81/027 525/182 |
| 2014/0011958 | A1 | 1/2014 | Miyake et al. |
| 2016/0024244 | A1 | 1/2016 | Xia et al. |
| 2016/0024250 | A1 | 1/2016 | Yang et al. |
| 2016/0087306 | A1* | 3/2016 | Lee .................. H01M 10/0565 429/317 |
| 2016/0289392 | A1 | 10/2016 | Grubbs et al. |
| 2016/0356923 | A1 | 12/2016 | Miyake et al. |
| 2017/0057908 | A1 | 3/2017 | Jones et al. |
| 2017/0062874 | A1 | 3/2017 | Jones et al. |

OTHER PUBLICATIONS

Agarwal et al. (May 13, 2015) "Design of a Catalytic Active Site for Electrochemical CO2 Reduction with Mn(I)-Tricarbonyl Species," Inorg. Chem. 54:5285-5294.

Aguirre et al. (2010) "Tunable Colors in Opals and Inverse Opal Photonic Crystals," Adv. Funct. Mater. 20:2565-2578.

Aharoni (1979), "Rigid Backbone Polymers. 2. Polyisocyanates and Their Liquid-Crystal Behavior," Macromolecules, 12, 94-103.

Akbari et al. (2001) "Cool Surfaces and Shade Trees to Reduce Energy Use and Improve Air Quality in Urban Areas", Solar Energy, vol. 70 No. 3, pp. 295-310.

Alberico et al. (Feb. 16, 2015) "Towards a methanol economy based on homogeneous catalysis: methanol to H2 and CO2 to methanol," Chem. Commun. 51:6714-6725.

Albert et al. (2010) "Self-Assembly of Block Copolymer Thin Films," Materials Today. 13:24-33.

Alvarez-Guerra et al. (Jun. 16, 2015) "Ionic liquids in the electrochemical valorisation of CO2," Energy Environ. Sci. 8:2574-2599.

Appel et al. (Jun. 14, 2013) "Frontiers, Opportunities, and Challenges in Biochemical and Chemical Catalysis of CO2 Fixation," Chem. Rev. 113:6621-6658.

Armand et al. (2009) "Ionic-liquid materials for the electrochemical challenges of the future," Nat. Mater. 8:621-629.

Atwater et al. (2010) "Plasmonics for Improved Photovoltaic Devices", Nature Material, vol. 9, pp. 205-214.

Azzaroni et al. (2012), "Polymer Brushes Here, There, and Everywhere: Recent Advances in Their Practical Applications and Emerging Opportunities in Multiple Research Fields," Journal of Polymer Science Part A: Polymer Chemistry. 50:3225-3258.

Babarao et al. (2011) "Understanding the high solubility of CO2 in an ionic liquid with the tetracyanoborate anion," J. Phys. Chem. B. 115:9789-9794.

Bae et al. (2005), "Organization of Rigid Wedge-Flexible Coil Block Copolymers into Liquid Crystalline Assembly", Macromolecules, vol. 38, No. 10, pp. 4226-4230.

Bajpai et al. (2008), "Responsive polymers in controlled drug delivery", Progress in Polymer Science 33 (2008) 1088-1118.

Bang et al. (2009) "Block Copolymer Nanolithography: Translation of Molecular Level Control to Nanoscale Patterns," Adv. Mater. 21:4769-4792.

Bang et al. (2009) "Dual Templating Synthesis of Mesoporous Titanium Nitride Microspheres," Adv. Mater. 21:3186-3190.

Barosse-Antle et al. (2010) "Voltammetry in Room Temperature Ionic Liquids: Comparisons and Contrasts with Conventional Electrochemical Solvents," Chem. Asian J. 5:202-230.

Bates et al. (1990) "Block Copolymer Thermodynamics: Theory and Experiment," Ann. Rev. Phys. Chem. 41:525-557.

Bates et al. (1999) "Block Co-polymers—Designer Soft Materials," Physics Today. 52:32-38.

Bates et al. (Apr. 27, 2012) "Multiblock Polymers: Panacea or Pandora's Box?" Science. 336:434-440.

Bates et al. (Jul. 7, 2015) "ABA Triblock Brush Polymers: Synthesis, Self-Assembly, Conductivity, and Rheological Properties," Macromolecules. 48:4967-4973.

Bates et al. (Oct. 7, 2015) "Brush polymer ion gels," J. Polym. Sci. B Polym. Phys. 54:292-300.

Bennett et al. (1982) "Modelling of the urban heat island and of its interaction with pollutant dispersal," Atmospheric Environment. 16:1797-1822.

Benson et al. (2009) "Electrocatalytic and homogeneous approaches to conversion of CO2 to liquid fuels," Chem. Soc. Rev. 38:89-99.

Benson et al. (Jun. 20, 2012) "Structural investigations into the deactivation pathway of the CO2 reduction electrocatalyst Re(bpy)(CO)3Cl," Chem. Commun. 48:7374-7376.

Bertone et al. (1999) "Thickness Dependence of the Optical Properties of Ordered Silica-Air and Air-Polymer Photonic Crystals," Phys. Rev. Lett. 83:300-303.

(56) References Cited

OTHER PUBLICATIONS

Bielawski et al. (2007) "Living ring-opening metathesis polymerization," Prog. Polym. Sci. 32:1-29.
Bielawski et al. (2009) "Living Ring-Opening Metathesis Polymerization," In; Ch. 6 Controlled and Living Polymerizations. Eds.: Mier, A. H. E.; Matyjaszewski, K. Wiley-VCH. Weinheim, Germany. pp. 297-342.
Black (2005) "Self-Aligned Self Assembly of Multi-Nanowire Silicon Field Effect Transistors," Appl. Phys. Lett. 87:163116-163118.
Black et al. (2001) "Integration of Self-Assembled Diblock Copolymers for Semiconductor Capacitor Fabrication," Appl. Phys. Lett. 79:409-411.
Blakemore et al. (Nov. 18, 2013) "Noncovalent Immobilization of Electrocatalysts on Carbon Electrodes for Fuel Production," J. Am. Chem. Soc. 135:18288-18291.
Bockstaller et al. (2005) "Block Copolymer Nanocomposites: Perspectives for Tailored Functional Materials," Adv. Mater. 17:1331-1349.
Bolton et al. (Apr. 15, 2014) "Synthesis and Melt Self-Assembly of PS—PMMA—PLA Triblock Bottlebrush Copolymers," Macromolecules. 47:2864-2874.
Bouchet et al. (Apr. 10, 2014) "Charge Transport in Nanostructured PS-PEO-PS Triblock Copolymer Electrolytes," Macromolecules. 47:2659-2665.
Bourrez et al. (2011) "[Mn(bipyridyl)(CO)3Br]: an abundant metal carbonyl complex as efficient electrocatalyst for $CO_2$ reduction," Angew. Chem. Int. Ed. 50:9903-9906.
Braun et al. (1999) "Microporous materials: Electrochemically grown photonic crystals," Nature. 402:603-604.
Cabral et al. (Oct. 20, 2015) "Electrochemistry of tris(2,2'-bipyridyl) cobalt(II) in ionic liquids and aprotic molecular solvents on glassy carbon and platinum," Electrochim. Acta. 180:419-426.
Campbell et al. (2000) "Fabrication of photonic crystals for the visible spectrum by holographic lithography," Nature. 404:53-56.
Carmesin et al. (1990) "Static and Dynamic Properties of Two-Dimensional Polymer Melts," J. Phys. (Paris). 51:915-932.
Carney et al. (2008), "Intramolecular Hydroamination of Aminoalkynes with Silver-Phenanthroline Catalysts," Org. Lett. 2008, 10, 3903-3906.
Chan et al. (Mar. 10, 2015) "A robust and efficient cobalt molecular catalyst for $CO_2$ reduction," Chem. Commun. 51:7799-7801.
Chen et al. (Aug. 12, 2015) "Molecular Catalysis of the Electrochemical and Photochemical Reduction of $CO_2$ with Earth-Abundant Metal Complexes. Selective Production of CO vs HCOOH by Switching of the Metal Center," J. Am. Chem. Soc. 137:10918-10921.
Chen et al. (Jun. 8, 2012) "Splitting $CO_2$ into CO and $O_2$ by a single catalyst," Proc. Natl. Acad. Sci. USA. 109:15606-15611.
Cheng et al. (2001) "Formation of a Cobalt Magnetic Dot Array via Block Copolymer Lithography," Adv. Mater. 13:1174-1178.
Cheng et al. (2006) "Templated Self-Assembly of Block Copolymers: Top-Down Helps Bottom-Up," Adv. Mater. 18:2505-2521.
Cheng et al. (2007) "Synthesis of Core-Crosslinked Nanoparticles with Controlled Cylindrical Shape and Narrowly-Dispersed Size via Core-Shell Brush Block Copolymer Templates," Adv. Mater. 19:2830-2835.
Chintapalli et al. (Jul. 23, 2014) "Effect of Grain Size on the Ionic Conductivity of a Block Copolymer Electrolyte," Macromolecules. 47(15):5424-5431.
Cho et al. (2008) "Printable ion-gel gate dielectrics for low-voltage polymer thin-film transistors on plastic," Nat. Mater. 7:900-906.
Connelly et al. (1996) "Chemical Redox Agents for Organometallic Chemistry," Chem. Rev. 96:877-910.
Costentin et al. (Apr. 21, 2015) "Benchmarking of homogeneous electrocatalysts: overpotential, turnover frequency, limiting turnover number," J. Am. Chem. Soc. 137:5461-5467.
Costentin et al. (Dec. 11, 2012) "Catalysis of the electrochemical reduction of carbon dioxide," Chem. Soc. Rev. 42:2423-2436.
Costentin et al. (Oct. 5, 2012) "A local proton source enhances $CO_2$ electroreduction to CO by a molecular Fe catalyst," Science. 338:90-94.
Cowie et al. (1990) "Effect of side chain length and crosslinking on the ac conductivity of oligo (ethyleneoxide) comb-branch polymer-salt mixtures," Solid State Ionics. 42:243-249.
Crutzen (2004) "New Directions: The Growing Urban Heat and Pollution "Island" Effect—Impact on Chemistry and Climate," Atmospheric Environment 38, 3539-3540.
Cushen et al. (2012) "Oligosaccharide/Silicon-Containing Block Copolymers with 5 nm Features for Lithographic Applications," ACS Nano. 6:3424-3433.
Daeffler (2013), "Ring-Opening Metathesis of Bulky Norbornene Monomers and Radical-Mediated Hydrophosphonation of Olefins" Ph.D. Thesis, California Institute of Technology, Pasadena, California.
Daigle et al. (Mar. 6, 2015) "Lithium battery with solid polymer electrolyte based on comb-like copolymers," Journal of Power Sources. 279:372-383.
Dalsin et al. (Apr. 15, 2014) "Molecular Weight Dependence of Zero-Shear Viscosity in Atactic Polypropylene Bottlebrush Polymers," ACS Macro Letters. 3(5):423-427.
Dalsin et al. (Jun. 30, 2015) "Linear Rheology of Polyolefin-Based Bottlebrush Polymers," Macromolecules. 48:4680-4691.
del Valle et al. (Mar. 10, 2015) "Empirical Parameters for Solvent Acidity, Basicity, Dipolarity, and Polarizability of the Ionic Liquids [BMIM][BF4] and [BMIM][PF6]," J. Phys. Chem. B. 119:4683-4692.
Deshmukh et al. (May 1, 2014) "Molecular Design of Liquid Crystalline Brush-Like Block Copolymers for Magnetic Field Directed Self-Assembly: A Platform for Functional Materials," ACS Macro Letters. 3(5):462-466.
Deutsch et al. (1991) "Interdiffusion and Self-Diffusion in Polymer Mixtures: A Monte Carlo Study," J. Chem. Phys. 94:2294-2304.
Eberhardt et al. (2005) "Synthesis of Active Ester Polymers and Block Copolymers via Controlled Radical Polymerization," Polymer Preprints. 41(1):100-101.
Eddaoudi et al. (2015) "$CO_2$ separation, capture and reuse: A web themed issue," Chem. Commun. 51:5554-5555.
Edrington et al. (2001) "Polymer-Based Photonic Crystals," Adv. Mater. 13:421-425.
Evans et al. (2005) "A Comparative Electrochemical Study of Diffusion in Room Temperature Ionic Liquid Solvents versus Acetonitrile," ChemPhysChem. 6:526-533.
Fabry et al. (Mar. 27, 2015) "Immobilization and Continuous Recycling of Photoredox Catalysts in Ionic Liquids for Applications in Batch Reactions and Flow Systems: Catalytic Alkene Isomerization by Using Visible Light," Chem. Eur. J. 21:5350-5354.
Fenyves et al. (May 12, 2014) "Aqueous Self-Assembly of Giant Bottlebrush Block Copolymer Surfactants as Shape-Tunable Building Blocks," J. Am. Chem. Soc. 136(21):7762-7770.
Ferry et al. (2010), "Design Considerations for Plasmonic Photovoltaics," Adv. Mater, vol. 22, pp. 4794-4808.
Fetters et al. (1994) "Connection between Polymer Molecular Weight, Density, Chain Dimensions, and Melt Viscoelastic Properties," Macromolecules. 27(17):4639-4647.
Fink et al. (1999) "Block Copolymers as Photonic Bandgap Materials," Journal of Lightwave Technology, vol. 17, No. 11, pp. 1963-1969.
Finn et al. (Nov. 24, 2011) "Molecular approaches to the electrochemical reduction of carbon dioxide," Chem. Commun. 48:1392-1399.
Fiset et al. (2009) "Synthesis, characterization and modification of azide-containing dendronized diblock copolymers," Polymer. 50:1369-1377.
Franco et al. (Oct. 7, 2014) "A local proton source in a [Mn(bpy-R)(CO)3Br]-type redox catalyst enables $CO_2$ reduction even in the absence of Brønsted acids," Chem. Commun. 50:14670-14673.
Fredrickson et al. (1996) "Dynamics of Block Copolymers: Theory and Experiment," Annu. Rev. Mater. Sci. 26: 501-550.
Fu et al. (2011) "Volatilisation of ferrocene from ionic liquids: kinetics and mechanism," Chem. Commun. 47:7083-7085.

(56) References Cited

OTHER PUBLICATIONS

Fuller et al. (1997) "Ionic Liquid-Polymer Gel Electrolytes," J. Electrochem. Soc. 144:L67-L70.
Fullerton-Shirey et al. (2009) "Effect of LiClO4 on the Structure and Mobility of PEO-Based Solid Polymer Electrolytes," Macromolecules. 42:2142-2156.
Galiński et al. (2006) "Ionic liquids as electrolytes," Electrochim. Acta. 51:5567-5580.
Galisteo-Lopez et al. (2011) "Self-Assembled Photonic Structures," Adv. Mater, vol. 23, 30-69.
Ganesan et al. (Mar. 30, 2012) "Mechanisms Underlying Ion Transport in Lamellar Block Copolymer Membranes," ACS Macro Letters. 1(4):513-518.
Gao et al. (2007) "Synthesis of Molecular Brushes by "Grafting Onto" Method: Combination of ATRP and Click Reactions," J. Am. Chem. Soc. 129:6633.
Gavelin et al. (2001) "Amphiphilic polymer gel electrolytes. I. preparation of gels based on poly(ethylene oxide) graft copolymers containing different ionophobic groups," Journal of Polymer Science Part A: Polymer Chemistry. 39(13):2223-2232.
Ge et al. (Jan. 20, 2011) "Responsive Photonic Crystals," Angew. Chem. Int. Ed. 50:1492-1522.
Gomez et al. (2009) "Effect of Ion Distribution on Conductivity of Block Copolymer Electrolytes," Nano Letters. 9(3):1212-1216.
Grason (2006) "The Packing of Soft Materials: Molecular Asymmetry, Geometric Frustration and Optimal Lattices in Block Copolymer Melts," Phys. Rep. 433:1-64.
Green et al. (1989) "Macromolecular stereochemistry: the out-of-proportion influence of optically active comonomers on the conformational characteristics of polyisocyanates. The sergeants and soldiers experiment," J. Am. Chem. Soc. 111:6452-6454.
Green et al. (1999) "The Macromolecular Route to Chiral Amplification," Angew. Chem. Int. Ed. 38:3138-3154.
Grice et al. (2014) "Recent Studies of Rhenium and Manganese Bipyridine Carbonyl Catalysts for the Electrochemical Reduction of CO2," Ch. 5 In; Advances in Inorganic Chemistry. Elsevier. Volume 66. pp. 163-189.
Grills et al. (2010) "New Directions for the Photocatalytic Reduction of CO2: Supramolecular, scCO2 or Biphasic Ionic Liquid-scCO2 Systems," J. Phys. Chem. Lett. 1:2709-2718.
Grills et al. (Mar. 28, 2014) "Mechanism of the Formation of a Mn-Based CO2 Reduction Catalyst Revealed by Pulse Radiolysis with Time-Resolved Infrared Detection," J. Am. Chem. Soc. 136:5563-5566.
Grills et al. (May 15, 2014) "Electrocatalytic CO2 Reduction with a Homogeneous Catalyst in Ionic Liquid: High Catalytic Activity at Low Overpotential," J. Phys. Chem. Lett. 5:2033-2038.
Grimm et al. (2008) "Global Change and the Ecology of Cities," Science. 319:756-760.
Gu et al. (Dec. 15, 2012) "ABA-triblock copolymer ion gels for CO2 separation applications," J. Membr. Sci. 423-424:20-26.
Gu et al. (Jun. 18, 2013) "High Toughness, High Conductivity Ion Gels by Sequential Triblock Copolymer Self-Assembly and Chemical Cross-Linking," J. Am. Chem. Soc. 135(26):9652-9655.
Gu et al. (Published online Jan. 31, 2013) "Self-Assembly of Symmetric Brush Diblock Copolymers," ACS Nano. 7:2551-2558.
Hadjichristidis et al. (2001) "Polymers with Complex Architecture by Living Anionic Polymerization," Chem. Rev. 101:3747-3792.
Hadjichristidis et al. (2003) "The Strength of the Macromonomer Strategy for Complex Macromolecular Architecture: Molecular Characterization, Properties and Applications of Polymacromonomers," Macromol. Rapid Commun. 24:979-1013.
Hallinan et al. (Jul. 2013) "Polymer Electrolytes," Annual Review of Materials Research. 43(1):503-525.
Hamley (2003) "Nanostructure Fabrication Using Block Copolymers," Nanotechnology. 14:R39.
Hammouda (Fall 2016) "Structure Factors for Particulate Systems," Ch. 32 In; NIST Distance Learning. Accessible on the Internet at URL: http://www.ncnr.nist.gov/staff/hammouda/distance_learning/chapter_32.pdf.
Hapiot et al. (2008) "Electrochemical Reactivity in Room-Temperature Ionic Liquids," Chem. Rev. 108:2238-2264.
Hashimoto et al. (1993) "Ordered structure in blends of block copolymers. 1. Miscibility criterion for lamellar block copolymers," Macromolecules. 26:2895-2904.
Hashimoto et al. (Mar. 13, 2015) "Gelation Mechanism of Tetra-armed Poly(ethylene glycol) in Aprotic Ionic Liquid Containing Nonvolatile Proton Source, Protic Ionic Liquid," J. Phys. Chem. B. 119:4795-4801.
Hatakeyama et al. (2007) "Coarse-grained simulations of ABA amphiphilic triblock copolymer solutions in thin films," Phys. Chem. Chem. Phys. 9:4662-4672.
Hawecker et al. (1984) "Electrocatalytic reduction of carbon dioxide mediated by Re(bipy)(CO)3Cl (bipy=2,2'-bipyridine)," J. Chem. Soc. Chem. Commun. 6:328-330.
Hawecker et al. (1986) "Photochemical and Electrochemical Reduction of Carbon Dioxide to Carbon Monoxide Mediated by (2,2'-Bipyridine)tricarbonylchlororhenium(I) and Related Complexes as Homogeneous Catalysts," Helvetica Chimica Acta. 69:1990-2012.
Hawker et al. (2005) "Block Copolymer Lithography: Merging 'Bottom-Up' with 'Top-Down' Processes," MRS Bull. 30:952-966.
Hayashi et al. (2003) "Involvement of a Binuclear Species with the Re—C(O)O—Re Moiety in CO2 Reduction Catalyzed by Tricarbonyl Rhenium(I) Complexes with Diimine Ligands: Strikingly Slow Formation of the Re—Re and Re—C(O)O—Re Species from Re(dmb)(CO)3S (dmb=4,4'-Dimethyl-2,2'-bipyridine, S=Solvent)," J. Am. Chem. Soc. 125:11976-11987.
Hayes et al. (Jun. 1, 2015) "Structure and Nanostructure in Ionic Liquids," Chemical Reviews. 115(13):6357-6426.
He et al. (2007) "Ion Gels by Self-Assembly of a Triblock Copolymer in an Ionic Liquid," J. Phys. Chem. B. 111:4645-4652.
Hepp et al. (Feb. 4-5, 1997) "A Chemical Approach to Carbon Dioxide Utilization on Mars," In; The Proceedings of the In Situ Resource Utilization (ISRU) Technical Interchange Meeting 1997. p. 27.
Heroguez et al. (1996) "Synthesis of α-Norbornenylpoly(ethylene oxide) Macromonomers and Their Ring-Opening Metathesis Polymerization," Macromolecules. 29:4459-4464.
Hogan et al. (2004) "Facile Analysis of EC Cyclic Voltammograms," Anal. Chem. 76:2256-2260.
Hong et al. (2010) "Large deformation and electrochemistry of polyelectrolyte gels," J. Mechan. Phys. Solids. 58:558-577.
Hong et al. (Dec. 20, 2012) "Photocatalytic reduction of CO2: a brief review on product analysis and systematic methods," Anal. Methods. 5:1086-1097.
Hong et al. (Oct. 24, 2013) "On the Self-Assembly of Brush Block Copolymers in Thin Films," ACS Nano. 7(11):9684-9692.
Hou et al. (2003) "The effect of different lithium salts on conductivity of comb-like polymer electrolyte with chelating functional group," Electrochimica Acta. 48(6):679-690.
Hsu et al. (May 24, 2013) "Highly conductive, crosslinked ionomers based on poly(styrene-co-maleic anhydride) for water electrolysis," Journal of Materials Chemistry A. 1:8093-8096.
Hu et al. (Apr. 27, 2015) "Transformation of atmospheric CO2 catalyzed by protic ionic liquids: efficient synthesis of 2-oxazolidinones," Angew. Chem., Int. Ed. 54:5399-5403.
Hu et al. (Aug. 4, 2011) "Linear Rheological Response of a Series of Densely Branched Brush Polymers," Macromolecules. 44:6935-6943.
Hultgren et al. (2002) "Reference potential calibration and voltammetry at macrodisk electrodes of metallocene derivatives in the ionic liquid [bmim][PF6]," Anal. Chem. 74:3151-3156.
Hustad et al. (2009) "Photonic Polyethylene from Self-Assembled Mesophases of Polydisperse Olefin Block Copolymers," Macromolecules. 42:3788-3794.
Imaizumi et al. (Apr. 10, 2012) "Driving Mechanisms of Ionic Polymer Actuators Having Electric Double Layer Capacitor Structures," The Journal of Physical Chemistry B. 116:5080-5089.
Inglis et al. (Nov. 2012) "Electrocatalytic pathways towards sustainable fuel production from water and CO2," Coord. Chem. Rev. 256:2571-2600.

(56) References Cited

OTHER PUBLICATIONS

Izgorodina et al. (Aug. 12, 2015) "Physical Absorption of CO2 in Protic and Aprotic Ionic Liquids: An Interaction Perspective," J. Phys. Chem. B. 119:11748-11759.
Izuhara et al. (2009) "Electroactive Block Copolymer Brushes on MWCNTs," Macromolecules. 42:5416-5418.
Jeon et al. (1999) "Patterned Polymer Growth on Silicon Surfaces Using Microcontact Printing and Surface-Initiated Polymerization," Applied Physics Letters 75(26):4201-4203.
Jeon et al. (2004) "Fabricating Complex Three-Dimensional Nanostructures with High-Resolution Conformable Phase Masks," Proc. Natl. Acad. Sci. USA 101:12428-12433.
Johnson et al. (1996) "Electrocatalytic Reduction of CO2 Using the Complexes [Re(bpy)(CO)3L]n (n=+1, L=P(OEt)3, CH3CN; n=0, L=Cl-, Otf-; bpy=2,2'- Bipyridine; Otf-=CF3S03) as Catalyst Precursors: Infrared Spectroelectrochemical Investigation," Organometallics. 15:3374-3387.
Johnson et al. (2010) "Drug-loaded, bivalent-bottle-brush polymers by graft-through ROMP," Macromolecules. 43:10326-10335.
Johnson et al. (Dec. 13, 2011) "Core-Clickable PEG-Branch-Azide Bivalent-Bottle- Brush Polymers by ROMP: Grafting-Through and Clicking-To," J. Am. Chem. Soc. 133:559-566.
Jordan et al. (Aug. 4, 2015) "Biodegradation of ionic liquids—a critical review," Chem. Soc. Rev. 44:8200-8237.
Juris et al. (1988) "Synthesis and photophysical and electrochemical properties of new halotricarbonyl(polypyridine)rhenium(I) complexes," Inorg. Chem. 27:4007-4011.
Kalnay et al. (2003) "Impact of Urban and Land-Use Change on Climate," Nature, vol. 423, 523-531.
Kane et al. (1996) "Phase Behavior and Morphological Characteristics of Compositionally Symmetric Diblock Copolymer Blends," Macromolecules. 29:8862-8870.
Kang et al. (2007) "Broad-Wavelength-Range Chemically Tunable Block-Copolymer Photonic Gels," Nat. Mater. 6:957-960.
Kang et al. (2009) "Full Color Stop Bands in Hybrid Organic/ Inorganic Block Copolymer Photonic Gels by Swelling-Freezing," J. Am. Chem. Soc. 131:7538-7539.
Kang et al. (2011) "Ultrafast Cyclopolymerization for Polyene Synthesis: Living Polymerization to Dendronized Polymers," J. Am. Chem. Soc. 133:11904-11907.
Karl et al. (2003) "Modern Global Climate Change," Science. 302:1719-1723.
Keith et al. (Sep. 20, 2013) "Elucidation of the Selectivity of Proton-Dependent Electrocatalytic CO2 Reduction by fac-Re(bpy)(CO)3Cl," J. Am. Chem. Soc. 135:15823-15829.
Kikuchi et al. (2008) "Conformational Properties of Cylindrical Rod Brushes Consisting of a Polystyrene Main Chain and Poly(n-hexyl isocyanate) Side Chains," Macromolecules. 41:6564-6572.
Kim et al. (2001) "A Route to Nanoscopic SiO2 Posts via Block Copolymer Templates," Adv. Mater. 13:795-797.
Kim et al. (Jan. 15, 2015) "Artificial Photosynthesis for Sustainable Fuel and Chemical Production," Angew. Chem., Int. Ed. 54:3259-3266.
Kim et al. (Jul. 20, 2015) "From Self-Assembled Monolayers to Coatings: Advances in the Synthesis and Nanobio Applications of Polymer Brushes," Polymers. 7:1346-1378.
Kinning et al. (1984) "Hard-sphere interactions between spherical domains in diblock copolymers," Macromolecules. 17(9):1712-1718.
Klahn et al. (Jul. 13, 2015) "What Determines CO2 Solubility in Ionic Liquids? A Molecular Simulation Study," J. Phys. Chem. B. 119:10066-10078.
Kobayashi et al. (1985) "Ionically high conductive solid electrolytes composed of graft copolymer-lithium salt hybrids," The Journal of Physical Chemistry. 89:987-991.
Kortlever et al. (Sep. 24, 2015) "Catalysts and Reaction Pathways for the Electrochemical Reduction of Carbon Dioxide," J. Phys. Chem. Lett. 6:4073-4082.
Krause et al. (2003), "Simple Synthesis of Poly(acetylene) Latex Particles in Aqueous Media," Angew. Chem. Int. Ed. 2003, 42, 5965-5969.
Kuan et al. (Jan. 23, 2015) "Controlled ionic conductivity via tapered block polymer electrolytes," RSC Advances 5(17):12597-12604.
Kumar et al. (2009), "Factors Relevant for the Regioselective Cyclopolymerization of 1,6-Heptadiynes, N,N-Dipropargylamines, N,N-Dipropargylammonium Salts, and Dipropargyl Ethers by RuIV-Alkylidene-Based Metathesis Initiators", J. Am. Chem. Soc., 131, 387-395.
Lam et al. (2015) "A Mn Bipyrimidine Catalyst Predicted to Reduce CO2 at Lower Overpotential," ACS Catal. 5:2521-2528.
Lanson et al. (2007) "Poly(styrene)comb-b-Poly(ethylene oxide)comb Copolymers: Synthesis and AFM Investigation of Intra- and Supramolecular Organization as Thin Deposits," Macromolecules. 40:9503-9509.
Lanson et al. (2007) "Synthesis of (Poly(chloroethyl vinyl ether)-g-polystyrene)comb-b-(poly(chloropyran ethoxy vinyl ether)-g-polyisoprene)comb Copolymers and Study of Hyper-Branched Micelle Formation in Dilute Solutions," Macromolecules. 40:5559-5565.
Lascaud et al. (1994) "Phase Diagrams and Conductivity Behavior of Poly(ethylene oxide)-Molten Salt Rubbery Electrolytes," Macromolecules. 27(25):7469-7477.
Lee et al. (2007) "Ion Gel Gated Polymer Thin-Film Transistors," J. Am. Chem. Soc. 129(15):4532-4533.
Lee et al. (2008) "Hetero-Grafted Block Brushes with PCL and PBA Side Chains," Macromolecules. 41:6073-6080.
Lee et al. (2010) "Quasi-Amorphous Colloidal Structures for Electrically Tunable Full-Color Photonic Pixels with Angle-Independency," Adv. Mater. 22:4973-4977.
Lee et al. (2011) "Electrical Impedance of Spin-Coatable Ion Gel Films," J. Phys. Chem. B. 115:3315-3321.
Lei et al. (Nov. 6, 2013) "Gas Solubility in Ionic Liquids," Chem. Rev. 114:1289-1326.
Leibler (1980) "Theory of Microphase Separation in Block Copolymers," Macromolecules. 13:1602-1617.
Leitgeb et al. (2010) "The ROMP toolbox upgraded," Polymer. 51:2927-2946.
Li et al. (2000) "Dense Arrays of Ordered GaAs Nanostructures by Selective Area Growth on Substrates Patterned by Block Copolymer Lithography," Appl. Phys. Lett. 76:1689-1691.
Li et al. (2001) "The Internal Pressure and New Solubility Parameter of Polymeric Liquids," J. Chem. Eng. Chin. Univ. 3:206-212.—English Abstract Only.
Li et al. (2011) "Dynamic Cylindrical Assembly of Triblock Copolymers by a Hierarchical Process of Covalent and Supramolecular Interactions," J. Am. Chem. Soc. 133(5):1228-1231.
Lim et al. (Sep. 15, 2014) "A review on the electrochemical reduction of CO2 in fuel cells, metal electrodes and molecular catalysts," Catal. Today. 233:169-180.
Lin et al. (1998) "A three-dimensional photonic crystal operating at infrared wavelengths," Nature. 394:251-253.
Lin et al. (Jan. 11, 2013) "Ionic Liquid Co-catalyzed Artificial Photosynthesis of CO," Sci. Rep. 3:1056. pp. 1-5.
Lindquist et al. (2008) "Plasmonic Nanocavity Arrays for Enhanced Efficiency in Organic Photovoltaic Cells," Applied Physics Letters. 93:123308.
Lodge (2008) "A Unique Platform for Materials Design," Science. 321(5885):50-51.
Lopes et al. (2001) "Hierarchical Self-Assembly of Metal Nanostructures on Diblock Copolymer Scaffolds," Nature. 414:735-738.
Love et al. (2002) "A Practical and Highly Active Ruthenium-Based Catalyst that Effects the Cross Metathesis of Acrylonitrile," Angew. Chem. Int. Ed. 41:4035-4037.
Lu et al. (2006) "Synthesis and characterization of a novel ABA triblock copolymer via 4,4'-bis(trifluorovinyloxy)biphenyl and methyl methacrylate," Journal of Polymer Science Part A: Polymer Chemistry. 44:5438-5444.
Lu et al. (2009) "Advanced applications of ionic liquids in polymer science," Prog. Polym. Sci. 34(5):431-448.

(56) References Cited

OTHER PUBLICATIONS

Luca et al. (Apr. 14, 2015) "The Selective Electrochemical Conversion of Preactivated CO2 to Methane," J. Electrochem. Soc. 162:H473-H476.

Luttge (2009) "Massively Parallel Fabrication of Repetitive Nanostructures: Nanolithography for Nanoarrays," J. Phys. D: Appl. Phys. 42:123001.

MacFarlan et al. (Aug. 15, 2013) "Energy applications of ionic liquids," Energy & Environmental Science. 7(1):232-250.

Machan et al. (Aug. 19, 2015) "Electrocatalytic Reduction of Carbon Dioxide by Mn(CN)(2,2'-bipyridine)(CO)3: CN Coordination Alters Mechanism," J. Inorg. Chem. 54:8849-8856.

Machan et al. (Sep. 16, 2014) "Supramolecular Assembly Promotes the Electrocatalytic Reduction of Carbon Dioxide by Re(I) Bipyridine Catalysts at a Lower Overpotential," J. Am. Chem. Soc. 136:14598-14607.

Maeda et al. (2012), "Helical polymer brushes with a preferred-handed helix-sense triggered by a terminal optically active group in the pendant," Chem. Commun, 48, 3342-3344.

Mahurin et al. (Oct. 2, 2012) "High CO2 solubility, permeability and selectivity in ionic liquids with the tetracyanoborate anion," RSC Adv. 2:11813-11819.

Manbeck et al. (Feb. 19, 2015) "Push or Pull? Proton Responsive Ligand Effects in Rhenium Tricarbonyl CO2 Reduction Catalysts," J. Phys. Chem. B. 119:7457-7466.

Marencic et al. (2010) "Controlling Order in Block Copolymer Thin Films for Nanopatterning Applications," Annu. Rev. Chem. Bimol. Eng. 1:277-297.

Masuda et al. (1999) "Photonic Crystal Using Anodic Porous Alumina," Jpn. J. Appl. Phys. 38:L1403-L1405.

Matsen et al. (1997) "Conformationally asymmetric block copolymers," J. Poly. Sci. Part B: Polym. Phys. 35:945-952.

Matson et al. (2008) "Synthesis of Fluorine-18 Functionalized Nanoparticles for use as in vivo Molecular Imaging Agents," J. Am. Chem. Soc. 130:6731-6733.

Matsubara et al. (Nov. 6, 2013) "Reactivity of a fac-ReCl($\alpha$-diimine)(CO)3 complex with an NAD+ model ligand toward CO2 reduction," Chem. Commun. 50:728-730.

Matsubara et al. (Sep. 17, 2015) "Thermodynamic Aspects of Electrocatalytic CO2 Reduction in Acetonitrile and with an Ionic Liquid as Solvent or Electrolyte," ACS Catal. 5:6440-6452.

Maxein et al. (1998), "Opalescent Cholesteric Networks from Chiral Polyisocyanates in Polystyrene," Adv. Mater., 10, 341-345.

Maxein et al. (1999) "Structure-Property Relations in Cholesteric Networks from Chiral Polyisocyanates," Macromolecules. 32:5747-5754.

Mayer et al. (2001) "Chiral polyisocyanates, a special class of helical polymers," Prog. Polym. Sci. 26:1973-2013.

Mayershofer et al. (2006), Bi- and Trinuclear Ruthenium Alkylidene Triggered Cyclopolymerization of 1,6-Heptadiynes: Access to An-X-An Block and (An)3X Tristar Copolymers, Macromolecules, 39, 3484-3493.

McIntosh et al. (Feb. 27, 2015) "Evolution of Morphology, Modulus, and Conductivity in Polymer Electrolytes Prepared via Polymerization-Induced Phase Separation," Macromolecules. 48(5):1418-1428.

Meyer (1998) "Polymer Electrolytes for Lithium-Ion Batteries," Advanced Materials. 10(6):439-448.

Milner et al. (1988), "Theory of the Grafted Polymer Brush," Mecromolecules, 21(8):2610-2619.

Miranda et al. (Nov. 26, 2013) "Cross-Linked Block Copolymer/Ionic Liquid Self-Assembled Blends for Polymer Gel Electrolytes with High Ionic Conductivity and Mechanical Strength," Macromolecules. 46(23):9313-9323.

Miyake et al. (2010) "Stereospecific Polymerization of Chiral Oxazolidinone-Functionalized Alkenes," Macromolecules. 43:7504-7514.

Miyake et al. (Published online Aug. 14, 2012) "Synthesis of Isocyanate-Based Brush Block Copolymers and Their Rapid Self Assembly to Infrared Reflecting Photonic Crystals," J. Am. Chem. Soc. 134:14249-14254.

Miyake et al. (Published online Sep. 13, 2012) "Precisely Tunable Photonic Crystals From Rapidly Self-Assembling Brush Block Copolymer Blends," Angew. Chem. Int. Ed. 51:11246-11248.

Moon et al. (2010) "Chemical Aspects of Three-Dimensional Photonic Crystals," Chem. Rev. 110:547-574.

Moon et al. (Feb. 11, 2014) "Solution-Processable Electrochemiluminescent Ion Gels for Flexible, Low-Voltage, Emissive Displays on Plastic," J. Am. Chem. Soc. 136(9):3705-3712.

Mortensen et al. (1993) "Structural study on the micelle formation of poly(ethylene oxide)-poly(propylene oxide)-poly(ethylene oxide) triblock copolymer in aqueous solution," Macromolecules. 26(4):805-812.

Muftuoglu et al. (2004) "Photoinitiated Crosslinking and Grafting of Methylmethacrylate Using N,N-Dimethyl Amino Functional Polystyrene Block Copolymers," Turk. J. Chem. 28:469-476.

Neiser et al. (2003) "Polymerization of Macromonomers to Cylindrical Brushes Initiated by Organolanthanides," Macromolecules. 36:5437-5439.

Neugebauer et al. (2004) "How Dense Are Cylindrical Brushes Grafted from a Multifunctional Macroinitiator?" Polymer. 45:8173-8179.

Nguyen et al. (May 28, 2015) "Nanocomposite hydrogels based on liquid crystalline brush-like block copolymer-Au nanorods and their application in H2O2 detection," Chem. Commun. 51:12174-12177.

Nguyen et al. (Sep. 29, 2014) "Nanostructured ion gels from liquid crystalline block copolymers and gold nanoparticles in ionic liquids: manifestation of mechanical and electrochemical properties," Journal of Materials Chemistry C. 3:399-408.

Nicholson et al. (1964) "Theory of Stationary Electrode Polarography. Single Scan and Cyclic Methods Applied to Reversible, Irreversible, and Kinetic Systems," Anal. Chem. 36:706-723.

Niitani et al. (2005) "Characteristics of new-type solid polymer electrolyte controlling nano-structure," Journal of Power Sources. 146(1-2):386-390.

Niitani et al. (2005) "Synthesis of Li+ Ion Conductive PEO-PSt Block Copolymer Electrolyte with Microphase Separation Structure," Electrochem. Solid-State Lett. 8:A385-A388.

Niitani et al. (2009) "Star-Shaped Polymer Electrolyte with Microphase Separation Structure for All-Solid-State Lithium Batteries," Journal of the Electrochemical Society. 156(7):A577-A583.

O'Toole et al. (1985) "Electrocatalytic reduction of CO2 at a chemically modified electrode," J. Chem. Soc. Chem. Commun. 20:1416-1417.

Oh et al. (Jul. 21, 2015) "Ionic liquids enhance the electrochemical CO2 reduction catalyzed by MoO2," Chem. Commun. 51:13698-13701.

Ong et al. (2011) "Electrochemical Windows of Room-Temperature Ionic Liquids from Molecular Dynamics and Density Functional Theory Calculations," Chem. Mater. 23:2979-2986.

Oono et al. (1988) "⅔-Power Law for Copolymer Lamellar Thickness Implies a ⅓-Power Law for Spinodal Decomposition," Phys. Rev. Lett. 61:1109-1111.

Orfanidis (Retrieved May 2012) Electromagnetic Waves and Antennas. Online book. Accessible on the Internet at URL: http:// http://www.ece.rutgers.edu/~orfanidi/ewa.

Pakula et al. (2006) "Molecular brushes as super-soft elastomers," Polymer. 47(20):7198-7206.

Panday et al. (2009) "Effect of Molecular Weight and Salt Concentration on Conductivity of Block Copolymer Electrolytes," Macromolecules. 42(13):4632-4637.

Pangborn et al. (1996) "Safe and Convenient Procedure for Solvent Purification," Organometallics. 15:1518-1520.

Paquet et al. (2008) "Nanostructured polymers for photonics," Materials Today. 2008, 11, 48-56.

Park et al. (1997) "Block Copolymer Lithography: Periodic Arrays of ~1011 Holes in 1 Square Centimeter," Science. 276:1401-1404.

Park et al. (2003) "Enabling Nanotechnology with Self Assembled Block Copolymer Patterns," Polymer. 44:6725-6760.

(56) References Cited

OTHER PUBLICATIONS

Park et al. (2009) "Macroscopic 10-Terabit-per-Square-Inch Arrays from Block Copolymers with Lateral Order," Science. 323:1030-1033.
Parnell et al. (Feb. 4, 2011) "Continuously Tuneable Optical Filters from Self-Assembled Block Copolymer Blends," Soft Matter. 7:3721-3725.
Patten et al. (1991) "'Living' titanium(IV) catalyzed coordination polymerizations of isocyanates," J. Am. Chem. Soc. 113:5065-5066.
Patten et al. (1996) "Living Organotitanium(IV)-Catalyzed Polymerizations of Isocyanates," J. Am. Chem. Soc. 118:1906-1916.
Patz et al. (2005) "Impact of regional climate change on human health," Nature. 438:310-317.
Pedersen (1994) "Determination of size distribution from small-angle scattering data for systems with effective hard-sphere interactions," Journal of Applied Crystallography. 27(4):595-608.
Pelletier et al. (2006) "Aluminum nanowire polarizing grids: Fabrication and analysis," Appl. Phys. Lett. 88:211114.
Peng et al. (2011) "Surface Urban Heat Island Across 419 Global Big Cities," Environ. Sci. Technol. 2012, 46, 696-703.
Ping et al. (Nov. 24, 2015) "Microphase Separation and High Ionic Conductivity at High Temperatures of Lithium Salt-Doped Amphiphilic Alternating Copolymer Brush with Rigid Side Chains," Macromolecules. 48(23):8557-8564.
Poelma et al. (2012) "Cyclic Block Copolymers for Controlling Feature Sizes in Block Copolymer Lithography," ACS Nano. 6:10845-10854.
Pusey et al. (1986) "Phase behaviour of concentrated suspensions of nearly hard colloidal spheres," Nature. 320(6060):340-342.
Qiao et al. (Nov. 1, 2013) "A review of catalysts for the electroreduction of carbon dioxide to produce low-carbon fuels," J. Chem. Soc. Rev. 43:631-675.
Quartarone et al. (2011) "Electrolytes for solid-state lithium rechargeable batteries: recent advances and perspectives," Chem. Soc. Rev. 40:2525-2540.
Quezada et al. (May 20, 2014) "Electrocatalytic reduction of carbon dioxide on a cobalt tetrakis(4-aminophenyl)porphyrin modified electrode in BMImBF4," New J. Chem. 38:3606-3612.
Quinn et al. (2002) "Novel Electrochemical Studies of Ionic Liquids," Langmuir. 18:1734-1742.
Rey et al. (Jul. 14, 2015) "Structural Transition in an Ionic Liquid Controls $CO_2$ Electrochemical Reduction," J. Phys. Chem. C. 119:20892-20899.
Rizwan et al. (2008) "A review on the generation, determination and mitigation of Urban Heat Island," Journal of Environmental Sciences. 20:120-128.
Rogers et al. (2008) "Voltammetric Characterization of the Ferrocene|Ferrocenium and Cobaltocenium|Cobaltocene Redox Couples in RTILs," J. Phys. Chem. C. 112:2729-2735.
Runge et al. (2007) "Synthesis of High Molecular Weight Comb Block Copolymers and Their Assembly into Ordered Morphologies in the Solid State," J. Am. Chem. Soc. 129:10551-10560.
Runge et al. (2008) "Investigation of the Assembly of Comb Block Copolymers in the Solid State," Macromolecules. 41:7687-7694.
Rutenburg (2004) "Synthesis of Polymer Dielectric Layers for Organic Thin Film Transistors via Surface-Initiated Ring-Opening Metathesis Polymerization," J. Am. Chem. Soc. 2004, 126,4062-4063.
Rzayev (2009) "Synthesis of Polystyrene—Polylactide Bottlebrush Block Copolymers and Their Melt Self-Assembly into Large Domain Nanostructures," Macromolecules. 42:2135-2141.
Rzayev (Sep. 10, 2012) "Molecular Bottlebrushes: New Opportunities in Nanomaterials Fabrication," J. ACS Macro. Lett. 1:1146-1149.
Sahara et al. (Jan. 28, 2015) "Efficient Photocatalysts for $CO_2$ Reduction," Inorg. Chem. 54:5096-5104.

Sampson et al. (Mar. 18, 2014) "Manganese Catalysts with Bulky Bipyridine Ligands for the Electrocatalytic Reduction of Carbon Dioxide: Eliminating Dimerization and Altering Catalysis," J. Am. Chem. Soc. 136:5460-5471.
Sampson et al. (Oct. 22, 2013) "Direct observation of the reduction of carbon dioxide by rhenium bipyridine catalysts," Energy Environ. Sci. 6:3748-3755.
Savéant (2008) "Molecular Catalysis of Electrochemical Reactions. Mechanistic Aspects," Chem. Rev. 108:2348-2378.
Schappacher et al. (2005) "From Combs to Comb-g-Comb Centipedes," Macromolecules. 38:7209-7213.
Schulze et al. (Dec. 13, 2013) "High-Modulus, High-Conductivity Nanostructured Polymer Electrolyte Membranes via Polymerization-Induced Phase Separation," Nano Lett. 14(1):122-126.
Seel et al. (2000) "Electrochemical Intercalation of PF 6 into Graphite," J. Electrochem. Soc. 147(3):892-898.
Segalman (2005) "Patterning with Block Copolymer Thin Films," Materials Science and Engineering. R48:191-226.
Seitz et al. (2007) "Self-Assembly and Stress Relaxation in Acrylic Triblock Copolymer Gels," Macromolecules. 40(4):1218-1226.
Seki et al. (2005) "Distinct Difference in Ionic Transport Behavior in Polymer Electrolytes Depending on the Matrix Polymers and Incorporated Salts," The Journal of Physical Chemistry B. 109(9):3886-3892.
Seo et al. (Aug. 12, 2015) "Effect of Cation on Physical Properties and $CO_2$ Solubility for Phosphonium-Based Ionic Liquids with 2-Cyanopyrrolide Anions," J. Phys. Chem. B. 119:11807-11814.
Shah et al. (2011), "Chiroptical Properties of Graft Copolymers Containing Chiral Poly(n-hexyl isocyanate) as a Side Chain," Macromolecules. 44:7917-7925.
Sheiko et al. (2001) "Visualization of Macromolecules—A First Step to Manipulation and Controlled Response," Chem. Rev. 101:4099-4123.
Singh et al. (2007) "Effect of Molecular Weight on the Mechanical and Electrical Properties of Block Copolymer Electrolytes," Macromolecules. 40(13):4578-4585.
Slugovc (2004) "The Ring Opening Metathesis Polymerisation Toolbox," Macromol. Rapid Commun. 25:1283-1297.
Smieja et al. (2010) "Re(bipy-tBu)(CO)3Cl-improved Catalytic Activity for Reduction of Carbon Dioxide: IR-Spectroelectrochemical and Mechanistic Studies," Inorg. Chem. 49:9283-9289.
Smieja et al. (Feb. 18, 2013) "Manganese as a Substitute for Rhenium in $CO_2$ Reduction Catalysts: The Importance of Acids," J. Am. Chem. Soc. 52:2484-2491.
Song et al. (1999) "Review of gel-type polymer electrolytes for lithium-ion batteries," J. Power Sources 77:183-197.
Soo et al. (2004) "Preparation of Block Copolymer in Solution," J. Polym. Sci. Part B.: Polym. Phy. 42(6):923-938.
South et al. (2007), "Modular and Dynamic Functionalization of Polymeric Scaffolds," Accounts of Chemical Research. 40(1):63-74.
Stephan et al. (2006) "Review on composite polymer electrolytes for lithium batteries," Polymer. 47(16):5952-5964.
Stoykovich et al. (2006) "Block Copolymers and Conventional Lithography," Materials Today. 9:20.
Sullivan et al. (1985) "One- and two-electron pathways in the electrocatalytic reduction of $CO_2$ by fac-Re(bpy)(CO)3Cl (bpy=2,2'-bipyridine)," J. Chem. Soc. Chem. Commun. 20:1414-1416.
Sumerlin et al. (2007) "Initiation Efficiency in the Synthesis of Molecular Brushes by Grafting from via Atom Transfer Radical Polymerization," Macromolecules. 38:702-708.
Sun et al. (Jun. 8, 2012) "Structure-Conductivity Relationship for Peptoid-Based PEO-Mimetic Polymer Electrolytes," Macromolecules. 45(12):5151-5156.
Sun et al. (May 13, 2014) "Switching the Reaction Course of Electrochemical $CO_2$ Reduction with Ionic Liquids," Langmuir. 30:6302-6308.
Susan et al. (2005) "Ion Gels Prepared by in Situ Radical Polymerization of Vinyl Monomers in an Ionic Liquid and Their Characterization as Polymer Electrolytes," J. Am. Chem. Soc. 127(13):4976-4983.

(56) References Cited

OTHER PUBLICATIONS

Sveinbjörnsson et al. (Jul. 30, 2012) "Rapid Self-Assembly of Brush Block Copolymers to Photonic Crystals," Proc. Natl. Acad. Sci. USA. 109(36):14332-14336.
Taheri et al. (Oct. 27, 2015) "An Iron Electrocatalyst for Selective Reduction of CO2 to Formate in Water: Including Thermochemical Insights," ACS Catal. 5:7140-7151.
Tan et al. (2009) "Gels of ionic liquid [C4mim]PF6 formed by self-assembly of gelators and their electrochemical properties," Electrochem. Commun. 11:933-936.
Tang et al. (2007) "Synthesis and Morphology of Molecular Brushes with Polyacrylonitrile Block Copolymer Side Chains and Their Conversion into Nanostructured Carbons," Macromolecules 40:6199-6205.
Tang et al. (Jul. 7, 2015) "Synergistic Increase in Ionic Conductivity and Modulus of Triblock Copolymer Ion Gels," Macromolecules. 48(14):4942-4950.
Teran et al. (Jan. 25, 2012) "Discontinuous Changes in Ionic Conductivity of a Block Copolymer Electrolyte through an Order-Disorder Transition," ACS Macro Letters. 1(2):305-309.
Teran et al. (Jan. 9, 2014) "Thermodynamics of Block Copolymers with and without Salt," The Journal of Physical Chemistry B. 118(1):4-17.
Thompson et al. (2005) "Solvent Accelerated Polymer Diffusion in Thin Films," Macromolecules. 38:4339-4344.
Thurn-Albrecht et al. (2000) "High-Density Nanowire Arrays Grown in Self-Assembled Diblock Copolymer Templates," Science. 290:2126-2129.
Trapa et al. (2005) "Rubbery Graft Copolymer Electrolytes for Solid-State, Thin-Film Lithium Batteries," Journal of the Electrochemical Society. 152(1):A1-A5.
Trapa et al. (2005) "Synthesis and Characterization of Single-Ion Graft Copolymer Electrolytes," Journal of the Electrochemical Society. 152(12):A2281-A2284.
Troparevsky et al. (2010) "Transfer-matrix formalism for the calculation of optical response in multilayer systems: from coherent to incoherent interference," Optics Express. 18:24715-24721.
Tseng et al. (2010) "Block Copolymer Nanostructures for Technology," Polymers. 2:470-489.
Tsurumaki et al. (2011) "Properties of polymer electrolytes composed of poly(ethylene oxide) and ionic liquids according to hard and soft acids and bases theory," Polym. Adv. Technol. 22:1223-1228.
Ueki et al. (2008) "Macromolecules in Ionic Liquids: Progress, Challenges, and Opportunities," Macromolecules. 41(11):3739-3749.
Ueki et al. (Jan. 22, 2015) "Photoreversible Gelation of a Triblock Copolymer in an Ionic Liquid," Angew. Chem., Int. Ed. 54:3018-3022.
Underwood (1940) "Industrial Synthesis of Hydrocarbons from Hydrogen and Carbon Monoxide," Ind. Eng. Chem. 32:449-454.
Urbas et al. (1999) "One-Dimensionally Periodic Dielectric Reflectors from Self-Assembled Block Copolymers—Homopolymer Blends," Macromolecules. 32:4748-4750.
Urbas et al. (2000) "Tunable Block Copolymer/Homopolymer Photonic Crystals," Adv. Mater. 12:812-814.
Valkama et al. (2004) "Self-Assembled Polymeric Solid Films with Temperature-Induced Large and Reversible Photonic-Bandgap Switching," Nature Mater. 3:872-876.
Van Gurp et al. (1998) "Time-Temperature Superposition for Polymer Blends," Rheol. Bull. 67:5-8.
Vayer et al. (2010) "Perpendicular Orientation of Cylindrical Domains Upon Solvent Annealing Thin Films of Polystyrene-B-Polylactide,"Thin Solid Films. 518:3710-3715.
Verduzco et al. (Feb. 17, 2015) "Structure, function, self-assembly, and applications of bottlebrush copolymers," Chem. Soc. Rev. 44:2405-2420.
Vougioukalakis et al. (2010) "Ruthenium-Based Heterocyclic Carbene-Coordinated Olefin Metathesis Catalysts," Chem. Rev. 110:1746-1787.
Vygodskii et al. (2008), "Cyclopolymerization of N,N-Dipropargylamines and N,N-Dipropargyl Ammonium Salts," Macromolecules 2008, 41, 1919-1928.
Walsh et al. (Sep. 3, 2014) "Electrocatalytic CO2 reduction with a membrane supported manganese catalyst in aqueous solution," Chem. Commun. 50:12698-12701.
Wanakule et al. (2010) "Thermodynamic Properties of Block Copolymer Electrolytes Containing Imidazolium and Lithium Salts," Macromolecules. 43:8282-8289.
Wang et al. (2003) "All Solid-State Lithium-Polymer Battery Using a Self-Cross-Linking Polymer Electrolyte," Journal of the Electrochemical Society. 150(9):A1166-A1170.
Wang et al. (Mar. 14, 2011) "Bioinspired Colloidal Photonic Crystals with Controllable Wettability," Acc. Chem. Res. 44:405-415.
Watanabe et al. (1999) "High ionic conductivity and electrode interface properties of polymer electrolytes based on high molecular weight branched polyether," J. Power Sources. 81-82:786-789.
Welton (1999) "Room-Temperature Ionic Liquids. Solvents for Synthesis and Catalysis," Chem. Rev. 99:2071-2084.
Welton (2004) "Ionic liquids in catalysis," Coord. Chem. Rev. 248:2459-2477.
Westphalen et al. (1999) "Metal Cluster Enhanced Organic Solar Cells," Solar Energy Materials & Solar Cells. 61:97-105.
Xia et al. (1984) "Conductivities of solid polymer electrolyte complexes of alkali salts with polymers of methoxypolyethyleneglycol methacrylates," Solid State Ionics. 14:221-224.
Xia et al. (2009) "Efficient synthesis of narrowly dispersed brush copolymers and study of their assemblies: the importance of side chain arrangement," J. Am. Chem. Soc. 131:18525-18532.
Xia et al. (2009) "Efficient Synthesis of Narrowly Dispersed Brush Polymers via Living Ring-Opening Metathesis Polymerization of Macromonomers," Macromolecules. 42:3761-3766.
Xiong et al. (Apr. 29, 2015) "Reversible Hydrophobic-Hydrophilic Transition of Ionic Liquids Driven by Carbon Dioxide," Angew. Chem., Int. Ed. 54:7265-7269.
Xu et al. (Apr. 10, 2015) "ABC Triblock Copolymer Particles with Tunable Shape and Internal Structure through 3D Confined Assembly," Macromolecules. 48:2628-2636.
Xu et al. (Nov. 24, 2011) "Fabrication of Silicon Oxide Nanodots with an Areal Density Beyond 1 Teradots Inch-2," Adv. Mater. 22:5755.
Yamaguchi et al. (2001) "A Phase Diagram for the Binary Blends of Nearly Symmetric Diblock Copolymers. 1. Parameter Space of Molecular Weight Ratio and Blend Composition," Macromolecules. 34:6495-6505.
Yang et al. (2010), "Supramolecular ABC Triblock Copolymers via One-Pot, Orthogonal Self-Assembly," J. Am. Chem Soc.. 132:1637-1645.
Yashima et al. (2009) "Helical Polymers: Synthesis, Structures, and Functions," Chem. Rev. 109:6102-6211.
Ye et al. (Nov. 13, 2012) "Ionic liquid polymer electrolytes," J. Mater. Chem. A. 1:2719-2743.
Yoon et al. (2005) "Self-Assembly of Block Copolymers for Photonic-Bandgap Materials," MRS Bull. 2005, 30, 721-726.
Yoon et al. (2006) "Optically Transparent and High Molecular Weight Polyolefin Block Copolymers toward Self-Assembled Photonic Band Gap Materials," Macromolecules. 39:1913-1919.
Yoon et al. (2008) "Thermochromic Block Copolymer Photonic Gel," Macromolecules. 41:4582-4584.
Young et al. (2011) "Mixed-Salt Effects on the Ionic Conductivity of Lithium-Doped PEO-Containing Block Copolymers," Macromolecules. 44(20):8116-8123.
Young et al. (Nov. 4, 2013) "Block copolymer electrolytes for rechargeable lithium batteries," Journal of Polymer Science Part B: Polymer Physics. 52(1):1-16.
Young et al. (Sep. 2014) "Investigating polypropylene-poly(ethylene oxide)-polypropylene triblock copolymers as solid polymer electrolytes for lithium batteries," Solid State Ionics 263:87-94.
Yuan et al. (2013) "Ionic Conductivity of Low Molecular Weight Block Copolymer Electrolytes," Macromolecules. 46(3):914-921.

(56) References Cited

OTHER PUBLICATIONS

Zalusky et al. (2002) "Ordered Nanoporous Polymers from Polystyrene-Polylactide Block Copolymers," J. Am. Chem. Soc. 124:12761-12773.

Zhang (2012) "Block Copolymer-Based Ion Gels as Solid Polymer Electrolytes," Dissertation (Ph.D.). University of Minnesota.

Zhang et al. (2004) "Super soft elastomers as ionic conductors," Polymer. 45(18):6333-6339.

Zhang et al. (2005) "Cylindrical Polymer Brushes," J. Polym. Sci. Part A: Polym. Chem. 43:3461-3481.

Zhang et al. (2006) "Physical Properties of Ionic Liquids: Database and Evaluation," J. Phys. Chem. Ref. Data. 35:1475-1517.

Zhang et al. (2007) "Electrochemical behaviors and spectral studies of ionic liquid (1-butyl-3-methylimidazolium tetrafluoroborate) based sol-gel electrode," J. Electroanal. Chem. 603:243-248.

Zhang et al. (2011) "Ionic Conductivity, Capacitance, and Viscoelastic Properties of Block Copolymer-Based Ion Gels," Macromolecules. 44(4):940-949.

Zhang et al. (2011) "Viscoelastic Properties, Ionic Conductivity, and Materials Design Considerations for Poly(styrene-b-ethylene oxide-b-styrene)-Based Ion Gel Electrolytes," Macromolecules. 44(22):8981-8989.

Zhao et al. (2002) "Ionic liquids: applications in catalysis," Catal. Today. 74:157-189.

Zhao et al. (2008) "Crystallization and thermal properties of PLLA comb polymer," Journal of Polymer Science Part B: Polymer Physics. 46(6):589-598.

Zhao et al. (2008) "Electrochemistry of Room Temperature Protic Ionic Liquids," J. Phys. Chem. B. 112:6923-6936.

Zheng et al. (1995) "Morphology of ABC triblock copolymers," Macromolecules. 28:7215-7223.

Zhulina (2008) "Polymer brushes: Simple Views on Polymers at Surfaces and Interfaces: Simposium Honoring P.-G. de Gennes", APS meeting, Mar. 13, 2008, New Orleans USA, Institute of Macromolecular Compounds, Russian Academy of Sciences, St. Petersburg, Russia.

Zhulina (Jul. 30-Aug. 1, 2012) "Polymer brushes: Polymers in Soft and Biological Matter" Jul. 30-Aug. 1, 2012, Boulder CO, USA, Institute of Macromolecular Compounds, Russian Academy of Sciences, St. Petersburg, Russia.

Zigon et al: Eds. (Apr. 3-5, 2013) The Proceedings of the Austrian-Slovenian Polymer Meeting 2013. Centre of Excellence PoliMaT. Bled, Slovenia. pp. 1-303.

International Search Report with Written Opinion corresponding to International Application No. PCT/US2013/030978, dated Jul. 18, 2013.

* cited by examiner

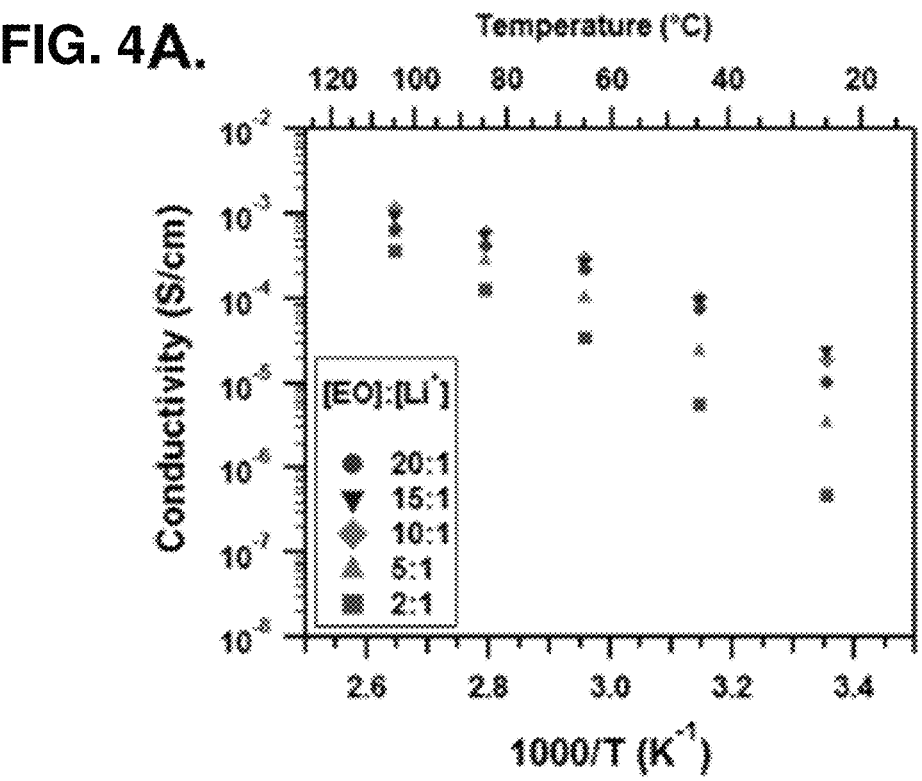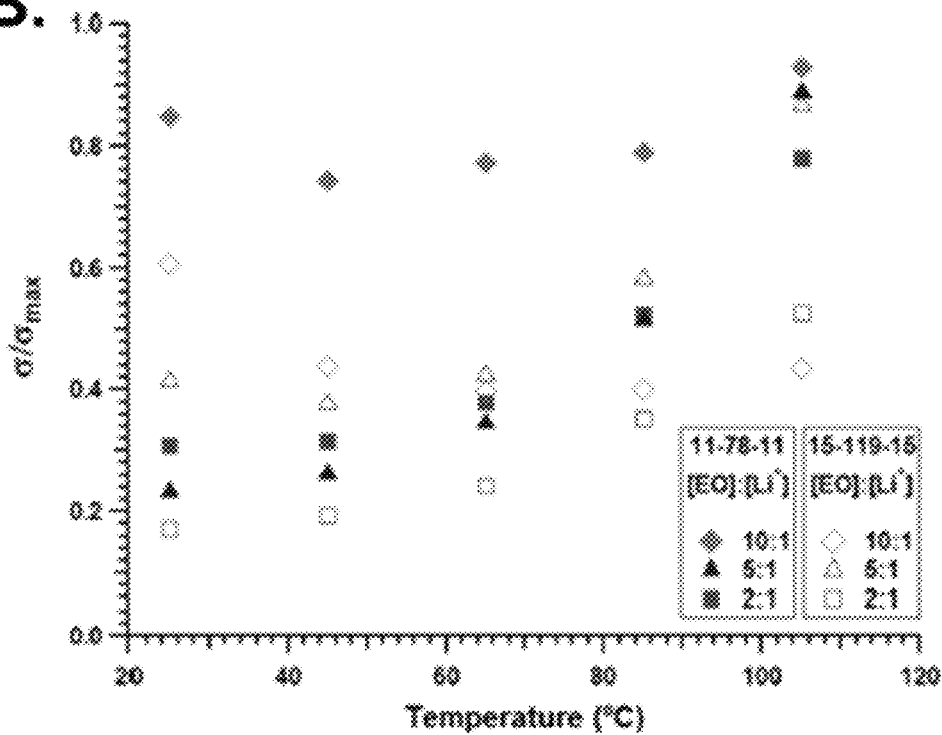

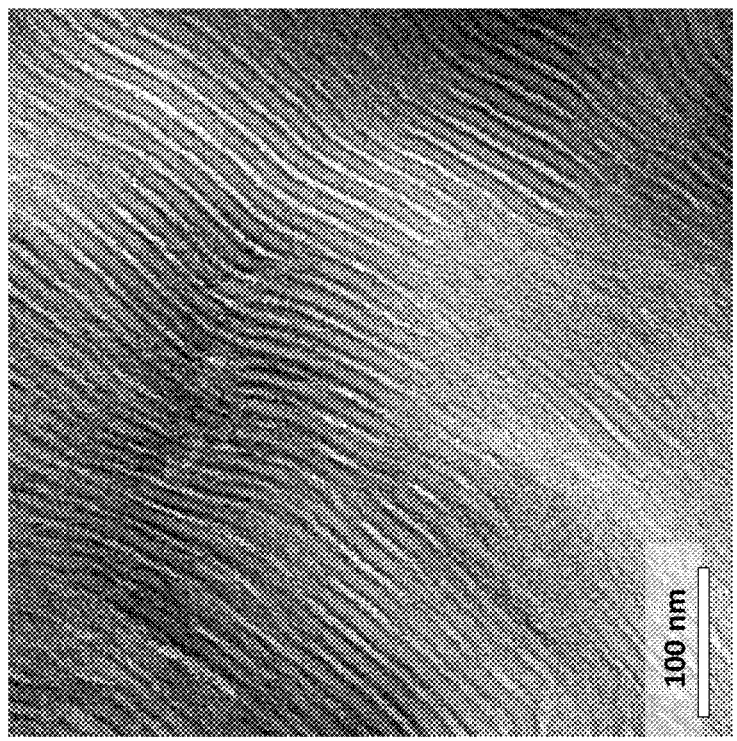
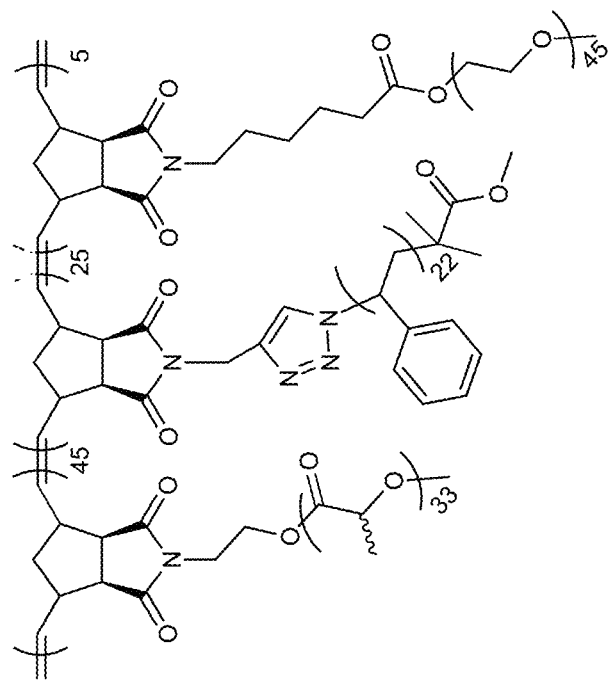
FIG. 50

BRUSH BLOCK COPOLYMER ELECTROLYTES AND ELECTROCATALYST COMPOSITIONS

CROSS-REFERENCE TO RELATED APPLICATIONS

This application claims the benefit of and priority to U.S. Provisional Patent Application No. 62/130,385, filed Mar. 9, 2015, which is hereby incorporated by reference in its entirety to the extent not inconsistent with the disclosure herein.

STATEMENT REGARDING FEDERALLY SPONSORED RESEARCH OR DEVELOPMENT

This invention was made with government support under Grant No. CHE1212767 awarded by the National Science Foundation. The government has certain rights in the invention. The government has certain rights in the invention.

BACKGROUND OF INVENTION

Polymer electrolytes have received significant attention due to their potential advantages over traditional liquid electrolytes for some electrochemical systems. Conventional Li-ion electrochemical cells, for example, often include liquid organic solvents for the electrolyte component, which are susceptible to safety issues arising from volatility and flammability, particularly in large format batteries. In contrast, Li-ion polymer or Li polymer electrochemical cells incorporate solid or gel polymer electrolytes without a liquid organic solvent component, thereby mitigating these well-recognized safety concerns. Incorporation of solid electrolytes in lithium battery systems is also a viable approach for providing mechanical properties useful for addressing other potential problems in lithium and lithium ion electrochemical cells, such as dendrite induced electrical shorting and thermal runaway.

Ion conductivity in polymer electrolyte systems is commonly achieved via doping a polymer host with one or more sources of lithium ions and counter ions, such as doping with lithium salts. Polymer systems compatible with efficient complexation of lithium ions, for example, allow for loading of more salt and greater availability of Li ions. Recently, ionic liquids have drawn attention as a potential alternative to Li salts as a means to introduce lithium ions to a useful extent into the electrochemical system. Ionic liquids are molten salts at room temperature, comprising predominately ions. An ion gel electrolyte, for example, may be formed by mixing an ionic liquid with a polymer, thereby providing potential benefits over conventional liquid electrolytes including reduced flammability, low vapor pressure, thermal stability, low toxicity and high ionic conductivity.

Block copolymers are an attractive material for polymer electrolytes due to their ability to self-assemble to form supramolecular structures characterized by nanoscale domains. This property of block copolymers is useful for achieving solid electrolytes having a combination of useful ionic conductivity and mechanical properties. Due to their potentially beneficial mechanical, chemical and electrical properties, substantial research has been directed towards use of block copolymers as solid electrolytes for lithium and lithium ion battery systems (See, e.g., Young et al., *Block Copolymer Electrolytes for Rechargeable Lithium Ion Batteries*, J. Polym. Sci. Part B: Polym. Phys., 2014, 52, 1-16). Amphophilic block copolymers are of particular interest, for example, because they allow for the selection of the composition of different polymer blocks to achieve an extent of self-assembly useful to achieve a mechanically robust system.

The development of block copolymers for solid electrolytes is currently impeded by technical challenges, most notably in achieving ionic conductivities approaching that of conventional organic solvent based liquid electrolytes. Block copolymers having a polyethylene oxide (PEO) block, for example, have been proposed and evaluated as potentially providing solid electrolytes with enhanced ionic conductivity. While methods to increase the conductivity of block copolymer electrolytes have been attempted using PEO-containing block copolymers, these approaches have proven less effective given that PEO exhibits a complex crystallization behavior in block copolymer systems.

It can be seen from the foregoing that there remains a need in the art for copolymer systems which provide enhanced physical strength as well as increased ionic conductivity, specifically for use as electrolytes and electrocatalyst platforms.

SUMMARY OF THE INVENTION

Provided herein are polymer electrolytes and electrocatalyst compositions. In an embodiment, for example, the invention provides electrolytes and electrocatalyst compositions comprising brush block copolymers, including triblock brush copolymers and pentablock brush copolymers provided with an electrochemical additive. The copolymers described have beneficial chemical, physical and electrical properties including high ionic conductivity and mechanical strength. In embodiments, the provided copolymer electrolytes and electrocatalyst compositions are doped with lithium salts or mixed with ionic liquids, for example, to form ion gels. In some embodiments, the copolymers provided herein are capable of physical cross-linking to generate polymer networks with useful chemical properties, for example, the capability of solvating ions, and physical properties, such as have a beneficial mechanical strength in the solid or gel phase. In embodiments, the brush block copolymers are characterized by low dispersity in the polymer side chains and do not require post-polymerization modifications.

In an aspect, the invention provides an ionic conducting polymer blend comprising a plurality of brush block copolymer and one or more electrochemical additives, wherein the brush block copolymers and electrochemical additive are mixed to provide an ion conductive phase. In an embodiment, for example, the invention provides an ion conducting polymer blend comprising: (i) a plurality of brush block copolymers, wherein each of the brush block copolymers independently comprise: (a) a first polymer block comprising at least 3 first repeating units, wherein each of the first repeating units of the first block comprises a first polymer backbone group directly or indirectly covalently linked to an ionophobic polymer side chain group; and (b) a second polymer block comprising at least 3 second repeating units; wherein each of the second repeating units of the second polymer block comprises a second polymer backbone group directly or indirectly covalently linked to an ionophilic polymer side chain group; wherein the second polymer block is directly or indirectly covalently linked to first the polymer block along a backbone; and (ii) an electrochemical additive; wherein the ionophilic polymer side chains and the electrochemical additive form an ionically conductive region, such as an ionically conductive domain. In an embodiment, for example, the brush block copolymers are present as a physically cross-linked polymer network.

In some embodiments, for example, the ionophilic polymer side chain groups of the brush block copolymers interact with the electrochemical additive so as to generate ions, for example via dissolution. In an embodiment, for example, the ionophilic polymer side chain groups of the brush block copolymers solvate ions generated from the electrochemical additive. In some embodiments, for example, the electrochemical additive at least partially dissociates within a region of the ionophilic polymer side chain groups, for example, within a region defined by self-assembly of the ionophilic polymer side chain groups. In an embodiment, ions are generated in regions having ionophilic side chains and are not generated in other regions of the self-assembled polymer network.

In an embodiment, for example, each of the brush block copolymers independently further comprises a third polymer block comprising at least 3 third repeating units, wherein each of the third repeating units of the third block independently comprise a third polymer backbone group directly or indirectly covalently linked to an third polymer side chain group, wherein the third polymer block is directly or indirectly covalently linked to the first polymer block, the second polymer block or both along the polymer backbone. In an embodiment, for example, each of said third polymer side chain groups is independently an ionophobic polymer side chain group. In an embodiment, at least a portion of the plurality of brush block copolymers form a physically cross-linked network, for example, comprising ionophilic and ionophobic regions.

In embodiments, each of the brush block copolymers independently is a triblock brush copolymer. In an embodiment, for example, each of the third polymer side chain groups is independently an ionophobic polymer side chain group and each of the brush block copolymers is independently defined by the formula A'-B-A", wherein A' is the first polymer block, B is the second polymer block and A" is the third polymer block, or optionally each of the brush block copolymers is defined by the formula A-B-C, wherein A is the first polymer block, B is the second polymer block and C is the third polymer block.

In some embodiments, each of the third polymer side chain group is independently an ionophobic polymer side chain group and each of the brush block copolymers independently further comprise a fourth polymer block comprising at least 3 fourth repeating units, wherein each of the fourth repeating units of the fourth block independently comprises a fourth polymer backbone group directly or indirectly covalently linked to an fourth polymer side chain group and a fifth polymer block comprising at least 3 fifth repeating units, wherein each of the fourth polymer block and the fifth polymer block is independently directly or indirectly covalently linked to the first polymer block, the second polymer block or the third polymer block along the backbone; wherein each of the block copolymers is independently defined by the formula A'-B'-A"-B"-A''', wherein A' is the first polymer block, B' is the second polymer block, A" is the third polymer block, B" is the fourth polymer block and A''' is the fifth polymer block, and optionally wherein each of said fourth polymer side chain groups is independently an ionophilic polymer side chain; wherein each of said fifth polymer side chain groups is independently an ionophobic polymer side chain group.

In an embodiment, for example, each of the brush block copolymers independently further comprises a fourth polymer block comprising at least 3 of fourth repeating units, wherein each of the fourth repeating units of the fourth block independently comprise a fourth polymer backbone group directly or indirectly covalently linked to an fourth polymer side chain group and a fifth polymer block comprising at least 3 fifth repeating units, wherein each of the fifth repeating units of the fifth block comprise a fifth polymer backbone group directly or indirectly covalently linked to a fifth polymer side chain group; wherein the each of the fourth polymer block and the fifth polymer block is independently directly or indirectly covalently linked to the first polymer block, the second polymer block or the third polymer block along the backbone; and wherein each of the block copolymers is independently defined by the formula A'-B'-C-B"-A", wherein A' is the first polymer block, B' is the second polymer block, C is the third polymer block, B" is the fourth polymer block and A" is the fifth polymer block.

In an embodiment, for example, each of the brush block copolymers independently further comprise a fourth polymer block comprising at least 3 fourth repeating units, wherein each of the fourth repeating units of the fourth block comprise a fourth polymer backbone group directly or indirectly covalently linked to an fourth polymer side chain group and a fifth polymer block comprising at least 3 fifth repeating units, wherein each of the fifth repeating units of the fifth block comprise a fifth polymer backbone group directly or indirectly covalently linked to an fifth polymer side chain group; and wherein each of the block copolymers is defined by the formula A'-B'-C-B"-A", wherein A' is the first polymer block, B' is the second polymer block, C is the third polymer block, B" is the fourth polymer block and A" is the fifth polymer block In embodiments, each of the brush block copolymers independently has a molecular weight selected from the range of 500 Da to 2,000 kDa, selected from the range of 1 kDa to 1000 kDa, or optionally, selected from the range of 1 kDa to 500 kDa. In embodiments, each of the brush block copolymers independently comprises 3 to 1000 of the first repeating units in the first polymer block, 3 to 1000 of the second repeating units in the second polymer block and, optionally, 3 to 1000 of the third repeating units in the third polymer block. In an embodiment, each of the brush block copolymers independently comprises the ionophobic polymer side chain group having 3 to 100 repeating units and, in some embodiments, the ionophilic polymer side chain group having 3 to 100 repeating units. In an embodiment, each of the brush block copolymers independently comprises the third polymer side chain group having 3 to 100 repeating units.

In embodiments, each of the brush block copolymers independently comprises the ionophobic polymer side chain comprising a polystyrene. In embodiments, each of the brush block copolymers independently comprises the ionophilic polymer side chain comprising a polyethylene oxide. In embodiments, each of the brush block copolymers independently comprises the third polymer side chain comprising a polylactide. In an embodiment, for example, each of the plurality of brush block copolymers independently have greater than 80% grafting density and optionally greater than 90% grafting density. In an embodiment, for example, each of the plurality of copolymers independently have 100% grafting density. In embodiments, the brush block copolymers are synthesized using a grafting through method, for example, ring opening metathesis polymerization.

Ion conducting polymer blends of the invention may include electrochemical additives providing a source of ions, including a range of salts and ionic liquids. In an embodiment, for example, the brush block copolymers described herein may be doped with a salt, such as one or more lithium salts, to provide ions, for example, to allow for ionic transport. The class of brush block copolymers described herein are chemically diverse so as to be compatible with doping with a wide range of lithium salts and doping ratios. Advantageously, the brush block copolymers of some embodiments limit crystallization of polymer side chain groups, for example, so as to maintain a high degree of ion conductivity.

In embodiments, the electrochemical additive is a lithium salt, for example, lithium bis(trifluorosulfonimide) or lithium perchlorate. In embodiments, each of the brush block copolymers independently comprises an ionophilic polymer side chain having less than 100 repeating units, for example, that together form one or more ionically conductive regions. In an embodiment, for example, the ionically conductive regions include an amorphous domain. In an embodiment, for example, the ionophilic polymer side chain of the brush block copolymers is not substantially crystalline, for example, less than 1% crystalline, less than 5% crystalline, or optionally less than 10% crystalline.

In certain embodiments electrochemical additives of the invention have physical and/or chemical properties providing for useful ionic concentrations for the present electrolytes and electrocatalyst compositions. In some embodiments, for example, ionic liquids of the present polymer blend have a solubility selected to provide a useful concentration of ions in the present electrolyte and electrocatalyst compositions. In some embodiments, for example, ionic salts of the present polymer blend have a dissociation selected to provide a useful concentration of ions in the present electrolyte and electrocatalyst compositions.

In some embodiments, the electrochemical additive is a lithium salt and is provided in a doping ratio of ionophilic polymer, e.g. polyethylene oxide, to lithium salt. The doping ratio refers to the ratio of the average number of ionophilic polymer repeat units to moles of lithium ion salt in the polymer blend. In an embodiment, the ionophilic polymer is polyethylene oxide and the [EO]:[Li] ratio is between 2 and 20 (i.e. 2≤[EO]:[Li]≤20, optionally, in an embodiment, the [EO]:[Li] ratio between 2 and 10 (i.e., 2≤[EO]:[Li]≤20). In an embodiment, blends with 2≤[EO]:[Li]≤10 suppress PEO crystallization. In an embodiment, for example, optimum conductivity for some applications occurs at a blend ratio approximately [EO]:[Li]=10:1. Ionophilic polymer to lithium salt loading ratios will vary with the structure of the brush block copolymer. For example, FIG. 10 shows differential scanning calorimetry differences based on Li loading for A) $gPS_{11}$-$gPEO_{78}$-$gPS_{11}$, B) $gPS_{15}$-$gPEO_{119}$-$gPS_{15}$. In some embodiments, the electrochemical additive is a salt, for example a lithium salt, and is provided in a doping ratio of the average number ionophilic polymer repeat units to salt.

In an embodiment, the electrochemical additive is an ionic liquid and the polymer blend comprises an ion gel. In some embodiments, for example, the brush block copolymer comprises between 5 and 50 wt % of the gel, in some in embodiments, the brush block copolymer comprises between 10 and 40 wt % of the ion gel. In embodiments, for example, the ionic liquid comprises greater than 50 wt % of the ion gel, in embodiments, the ionic liquid comprises between 50 wt % and 95 wt % of the gel.

In some embodiments, for example, the electrochemical additive is an electrocatalyst and the concentration of the electrochemical additive in the polymer blend of the invention is selected over the range of 1 nM and 100 mM in an ionic liquid, in some embodiments the concentration of the electrochemical additive is between 1 μM and 100 mM or, for example between 1 mM and 100 mM. In some embodiments, for example, the concentration of the electrochemical additive in the polymer blend of the invention is selected over the range of 5 to 20 mM.

In embodiments, the present ion conducting polymer electrolytes and electrocatalyst compositions comprising a plurality of brush block copolymers mixed with an ionic liquid, for example, to form an ion gel. The brush block copolymers herein are versatile and can be used with a range of ionic liquids, for example, those that are capable of forming a solution with the copolymer. Further, electrocatalysts may be dispersed through the ionic gel to provide an effective composition for electrocatalysis with superior physical, chemical and/or electrochemical properties.

In embodiments, the electrochemical additive is an ionic liquid, for example, an ionic liquid with a cation selected from the group consisting of: imidazolium, pyridinium, ammonium and pyrrolidinium. In an embodiment, for example, the ionic liquid is 1-butyl-3-methylimidazolium bis(trifluoromethylsulfonyl)imide, 1-ethyl-3-methylimidazolium bis(trifluoromethylsulfonyl)imide, 1-butyl-3-methylimidazolium hexafluorophosphate, and 1-ethyl-3-methylimidazolium hexafluorophosphate. In an embodiment, the physically assembled network comprises the ionophobic polymer side chains self-assembled to form ordered or disordered spherical micelles bridged by the B block containing ionophilic polymer segments. In embodiments, the polymer blend is an ion gel. In an embodiment, the ion conducting polymer blend further comprises an electrocatalyst, wherein the electrocatalyst is dispersed in the ion conducting polymer blend.

Electrolytes and electrocatalyst materials of the invention may be prepared by a range of methods including doping, mixing, dispersing, combining and/or dissolving electrochemical additives, such as salts and/or ionic liquids, into the brush block copolymer, for example, during before, during or after self-assembly into a physical polymer network.

The present block brush copolymer electrolytes are capable of providing beneficial physical properties for a range of applications, including primary and secondary electrochemical cells. In an embodiment, the copolymer blend has an ionic conductivity greater than or equal to $10^{-7}$ S/cm at 25° C., optionally greater than or equal to $10^{-5}$ S/cm$^3$ at 105° C. and optionally greater than or equal to $10^{-4}$ S/cm$^3$ at 105° C. In an embodiment, for example, the copolymer blend has a normalized ionic conductivity between 0.05 and 1.0 at 105° C., and optionally between 0.1 and 1.0 at 105° C. and optionally between 0.3 and 1.0 at 105° C. In some embodiments, the ionic conductivities referenced herein and provided by the present materials, material blends and electrolytes, is specifically in reference to conductivity of ions useful in an electrochemical cell, such as a primary or secondary battery, fuel cell or electrocatalysis system. In some embodiments, the ionic conductivities referenced herein and provided by the present materials, material blends and electrolytes, is specifically in reference to conductivity of lithium ions.

In an embodiment, the copolymer blend is characterized by a storage modulus greater than or equal to 2000 Pa at 105° C. and optionally 10000 Pa at 105° C. and optionally for some embodiments 20000 Pa at 105° C. In an embodiment, the copolymer blend has a loss modulus greater than or equal to 1000 Pa at 105° C. and optionally 5000 Pa at 105° C. and optionally for some embodiments 10000 Pa at 105° C.

The moduli of the present compositions depend on, at least, two synthetic parameters that may be accurately controlled: (1) the amount of brush polymer in the gel, and (2) the relative volume fractions of A (ionophobic) and B (ionophilic) blocks. That is, an ion gel with 20 weight % polymer is more solid-like (higher G') than an ion gel with 5 weight % of the same polymer. In addition, at the same weight fraction of polymer, an ion gel in which the ABA brush triblock copolymer has A=15 PS side chains and B=119 PEO side chains (i.e. $PS_{15}$-$PEO_{119}$-$PS_{15}$) is more solid-like than a gel in which the ABA brush triblock copolymer has A=3 PS side chains and B=85 PEO side chains (i.e. $PS_3$-$PEO_{85}$-$PS_3$). (In other words, for example, $PS_{15}$-$PEO_{119}$-$PS_{15}$ has a higher modulus than $PS_3$-$PEO_{85}$-$PS_3$ due to the higher proportion of PS side chains that can participate in physical crosslinks.)

In some embodiments, the ABA brush polymer ion gels are physically crosslinked networks in which micelles of A blocks (ionophobic) are bridged by B blocks (ionophilic) and dispersed in a continuous B+ionic liquid domain. Accordingly, the free-energy penalty for mixing A and B segments ($\chi_{AB}$) is an important consideration. Mixing A and B+IL domains is disfavored (due to the chemical differences), and the solid-like nature of the gel arises, at least in part, because of the physically crosslinked A micelles that form. However, upon heating the gel, this penalty for mixing is typically overcome and the A blocks pull out of the micelles into the B+IL domain. As a result, the gel relaxes and becomes liquid-like rather than solid-like. The temperature at which this occurs depends on the composition of the gel and the frequency of deformation. Accordingly, the invention allows the design of materials that having different mechanical properties at different temperatures. For example, (e.g., with reference to FIG. 42) two different ion gels are characterized, both containing 16 wt % polymer and at room temperature (25° C.). $PS_{15}$-$PEO_{119}$-$PS_{15}$ is solid-like throughout the entire measured frequency range, with $G' \sim 10^3$ Pa, and has similar modulus up to 85° C. However, at the same temperatures, $PS_3$-$PEO_{85}$-$PS_3$ has a lower modulus and transitions from solid-like (G'>G") to liquid-like (G">G') behavior in the frequency range.

These aspects of tunability and thermoreversibility have many interesting potential applications, especially for use of the compositions for the present invention as electrolytes and electrocatalysis materials. For example, materials of the invention allow for casting a gel in a certain shape for a solid-state application, then recycling the gel by heating past this temperature. Once the gel is liquid-like, it can be cooled and reshaped into a form factor as desired. Also, for electrochemistry in gels, it may be desirable to have a lower modulus (more liquid-like behavior), due to faster diffusion of small molecules through the gel.

In an aspect the invention provides an electrochemical cell having an electrolyte component comprising a plurality of block copolymers and an electrochemical additive, wherein the block copolymer and electrochemical additive form an ionically conductive region. In an embodiment, for example, provided is an electrochemical cell comprising: (i) a positive electrode; (ii) a negative electrode; (iii) an electrolyte provided between the positive electrode and the negative electrode; the electrolyte capable of conducting ions; wherein the electrolyte comprises a plurality of brush block copolymers and an electrochemical additive, wherein the brush block copolymers form an ion conducting region, such as an ionically conductive domain. In an embodiment, each of the brush block copolymer independently comprises: a first polymer block comprising at least 3 first repeating units, wherein each of the first repeating units of the first block comprises a first polymer backbone group directly or indirectly covalently linked to a ionophobic polymer side chain group; and a second polymer block comprising at least 3 second repeating units; wherein each of the second repeating units of the second polymer block comprises a second polymer backbone group directly or indirectly covalently linked to a ionophilic polymer side chain group; wherein the second polymer block is directly or indirectly covalently linked to first the polymer block along a backbone. In an embodiment, the electrochemical cell further comprises a third polymer block comprising at least 3 of the first repeating units, wherein each of the third repeating units of the third block comprise a third polymer backbone group directly or indirectly covalently linked to an third polymer side chain group; wherein the third polymer block is directly or indirectly covalently linked to the first polymer block or the second polymer block along the backbone, and wherein the plurality of brush block copolymers and the electrochemical additive form a physically cross-linked self-assembled network having an ionically conductive region. In an embodiment, each of the brush block copolymer is independently a triblock brush copolymer.

In an aspect, provided is an electrochemical system comprising: (i) a positive electrode; (ii) a negative electrode; and (iii) an electrolyte provided between the positive electrode and the negative electrode; the electrolyte capable of conducting ions; wherein the electrolyte comprises a plurality of brush block copolymers, an electrochemical additive and an electrocatalyst, wherein the brush block copolymers and the electrochemical additive mix to form an ion conducting region, for example, an ion conduction domain. In an embodiment for electrochemical systems including an electrocatalyst component, each of the brush block copolymers independently comprises: a first polymer block comprising at least 3 first repeating units, wherein each of the first repeating units of the first block comprises a first polymer backbone group directly or indirectly covalently linked to a ionophobic polymer side chain group; and a second polymer block comprising at least 3 second repeating units; wherein each of the second repeating units of the second polymer block comprises a second polymer backbone group directly or indirectly covalently linked to a ionophilic polymer side chain group; wherein the second polymer block is directly or indirectly covalently linked to first the polymer block along a backbone. In an embodiment for electrochemical systems including an electrocatalyst component, each of the brush block copolymers independently further comprises a third polymer block comprising at least 3 third repeating units, wherein each of the third repeating units of the third block comprise a polymer backbone group directly or indirectly covalently linked to an polymer side chain group; wherein the third polymer block is directly or indirectly covalently linked to the first polymer block or the second polymer block along the polymer backbone and wherein the plurality of brush block copolymers and the electrochemical additive for a physically cross-linked network. In an embodiment, each of the brush block copolymer is independently a triblock brush copolymer. In an embodiment, the negative electrode is a photo-anode. In an embodiment, the electrocatalyst is a Re based electrocatalyst.

A range of brush block copolymers is useful in the present electrochemical systems and methods. In an embodiment, for example, the brush block copolymers of the present electrochemical systems are defined by the formula (FX1a), (FX1b), (FX1c), (FX1d), (FX1e), (FX1f), (FX1g) or (FX1h):

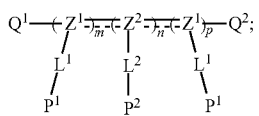 (FX1a)

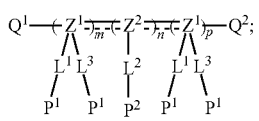 (FX1b)

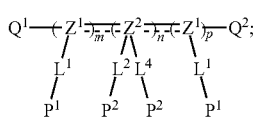 (FX1c)

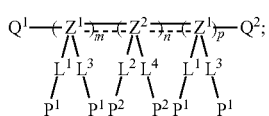 (FX1d)

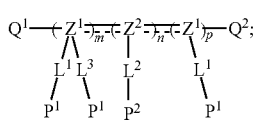 (FX1e)

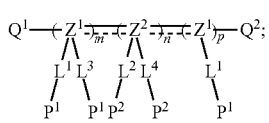 (FX1f)

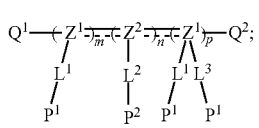 (FX1g)

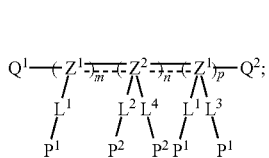 (FX1h)

Wherein each $Z^1$ is independently a first polymer backbone group and each $Z^2$ is independently a second polymer backbone group; wherein $Q^1$ is a first backbone terminating group and $Q^2$ is a second backbone terminating group; wherein each $L^1$ is independently a first linking group, each $L^2$ is independently a second linking group, each $L^3$ is independently a third linking group, and each $L^4$ is independently a fourth linking group; wherein each $P^1$ is independently the ionophobic polymer side chain group and each $P^2$ is independently the ionophilic polymer side chain group; and wherein m, n and p are each independently an integer selected from the range of 3 to 1000. In an embodiment, for example, the brush block copolymers are defined by the formula (FX1a), (FX1b), (FX1c), (FX1d), (FX1e), (FX1f), (FX1g) or (FX1 h), wherein each $Z^1$ connected to $L^1$, $L^3$, $P^1$ or a combination thereof is independently defined by the formula (FX2a), (FX2b), (FX2c), (FX2d), (FX2e) or (FX2f):

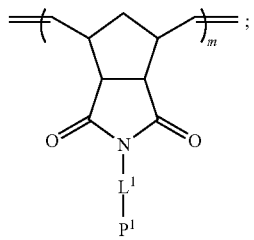 (FX2a)

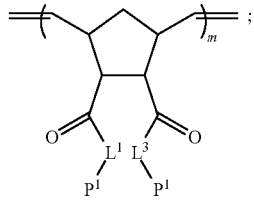 (FX2b)

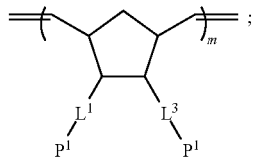 (FX2c)

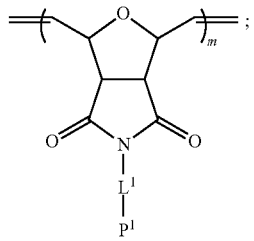 (FX2d)

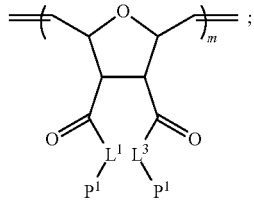 (FX2e)

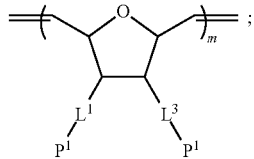 (FX2f)

wherein each $L^1$ is independently a first linking group and each $L^3$ is independently a third linking group; wherein each $P^1$ is independently an ionophobic polymer side chain; and m is an integer selected from the range of 3 to 1000. In an embodiment, for example, the brush block copolymers are defined by the formula (FX1a), (FX1b), (FX1c), (FX1d), (FX1e), (FX1f), (FX1g) or (FX1h), each $Z^2$ connected to $L^1$, $L^3$, $P^1$ or a combination thereof is independently defined by the formula (FX3a), (FX3b), (FX3c), (FX3d), (FX3e) or (FX3f):

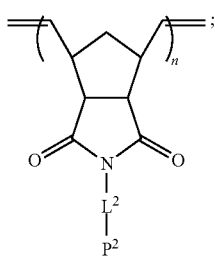
(FX3a)

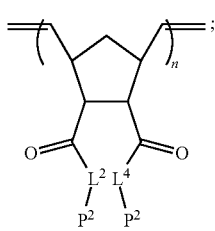
(FX3b)

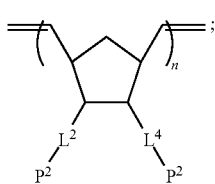
(FX3c)

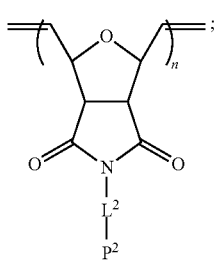
(FX3d)

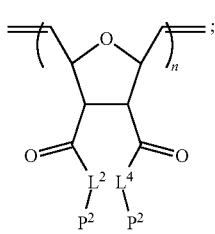
(FX3e)

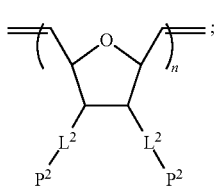
(FX3f)

wherein each $L^2$ is independently a second linking group and each $L^4$ is independently a fourth linking group; wherein each $P^2$ is independently an ionophilic polymer side chain; and n is an integer selected from the range of 3 to 1000. In an embodiment, the brush block copolymers are defined by the formula (FX1a), (FX1b), (FX1c), (FX1d), (FX1e), (FX1f), (FX1g) or (FX1h), wherein each $L^1$, $L^2$, $L^3$ and $L^4$ is independently defined by the formula (FX5a), (FX5b) or (FX5c):

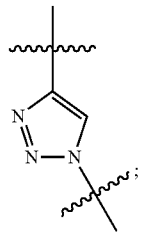
(FX5a)

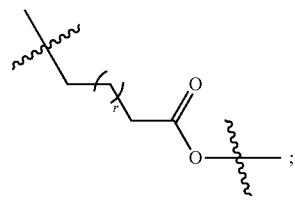
(FX5b)

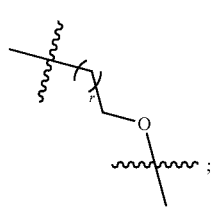
(FX5c)

wherein r is an integer selected from the range of 1 to 5. In an embodiment, the brush block copolymers are defined by the formula (FX1a), (FX1b), (FX1c), (FX1d), (FX1e), (FX1f), (FX1g) or (FX1h), wherein each ionophobic polymer side chain is independently defined by the formula (FX5a) or (FX5b):

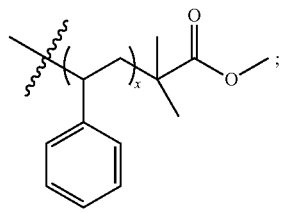
(FX5a)

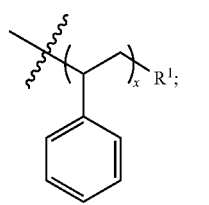
(FX5b)

wherein x is an integer selected from the range of 3 to 100; wherein $R^1$ is a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^3$, —$CONR^4R^5$, —$COR^6$, —$SOR^7$, —$OSR^8$, —$SO_2R^9$, —$OR^{10}$, —$SR^{11}$, —$NR^{12}R^{13}$, —NR$^{14}$COR$^{15}$, C$_1$-C$_{30}$ alkyl halide, phosphonate, phosphonic acid, silane, siloxane, silsesquioxane, C$_2$-C$_{30}$ halocarbon chain, C$_2$-C$_{30}$ perfluorocarbon, C$_2$-C$_{30}$ polyethylene glycol, a metal, or a metal complex, wherein each of R$^3$-R$^{15}$ is independently H, C$_5$-C$_{10}$ aryl or C$_1$-C$_{10}$ alkyl. In an embodiment, for example, the brush block copolymers are defined by the formula (FX1a), (FX1b), (FX1c), (FX1d), (FX1e), (FX1f), (FX1g) or (FX1h), wherein each ionophilic polymer side chain is independently defined by the formula (FX6a), (FX6b), (FX6c) or (FX6d):

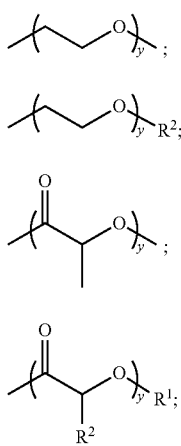

(FX6a)

(FX6b)

(FX6c)

(FX6d)

wherein y is an integer selected from the range of 3 to 100; wherein each R$^1$ and R$^2$ is independently a hydrogen, C$_1$-C$_{30}$ alkyl, C$_3$-C$_{30}$ cycloalkyl, C$_5$-C$_{30}$ aryl, C$_5$-C$_{30}$ heteroaryl, C$_1$-C$_{30}$ acyl, C$_1$-C$_{30}$ hydroxyl, C$_1$-C$_{30}$ alkoxy, C$_2$-C$_{30}$ alkenyl, C$_2$-C$_{30}$ alkynyl, C$_5$-C$_{30}$ alkylaryl, —CO$_2$R$^3$, —CONR$^4$R$^5$, —COR$^6$, —SOR$^7$, —OSR$^8$, —SO$_2$R$^9$, —OR$^{10}$, —SR$^{11}$, —NR$^{12}$R$^{13}$, —NR$^{14}$COR$^{16}$, C$_1$-C$_{30}$ alkyl halide, phosphonate, phosphonic acid, silane, siloxane, silsesquioxane, C$_2$-C$_{30}$ halocarbon chain, C$_2$-C$_{30}$ perfluorocarbon, C$_2$-C$_{30}$ polyethylene glycol, a metal, or a metal complex, wherein each of R$^3$-R$^{15}$ is independently H, C$_5$-C$_{10}$ aryl or C$_1$-C$_{10}$ alkyl. In an embodiment, for example, the brush block copolymers are defined by the formula (FX1a), (FX1b), (FX1c), (FX1d), (FX1e), (FX1f), (FX1g) or (FX1h), wherein the first backbone terminating group and the second backbone terminating group are each independently selected from the group consisting of: a hydrogen, C$_1$-C$_{30}$ alkyl, C$_3$-C$_{30}$ cycloalkyl, C$_5$-C$_{30}$ aryl, C$_5$-C$_{30}$ heteroaryl, C$_1$-C$_{30}$ acyl, C$_1$-C$_{30}$ hydroxyl, C$_1$-C$_{30}$ alkoxy, C$_2$-C$_{30}$ alkenyl, C$_2$-C$_{30}$ alkynyl, C$_5$-C$_{30}$ alkylaryl, —CO$_2$R$^3$, —CONR$^4$R$^5$, —COR$^6$, —SOR$^7$, —OSR$^8$, —SO$_2$R$^9$, —OR$^{10}$, —SR$^{11}$, —NR$^{12}$R$^{13}$, —NR$^{14}$COR$^{15}$, C$_1$-C$_{30}$ alkyl halide, phosphonate, phosphonic acid, silane, siloxane, silsesquioxane, C$_2$-C$_{30}$ halocarbon chain, C$_2$-C$_{30}$ perfluorocarbon, C$_2$-C$_{30}$ polyethylene glycol, a metal, or a metal complex, wherein each of R$^3$-R$^{15}$ is independently H, C$_5$-C$_{10}$ aryl or C$_1$-C$_{10}$ alkyl.x In an embodiment, for example, the brush block copolymers of the present electrochemical systems are defined by the formula (FX7):

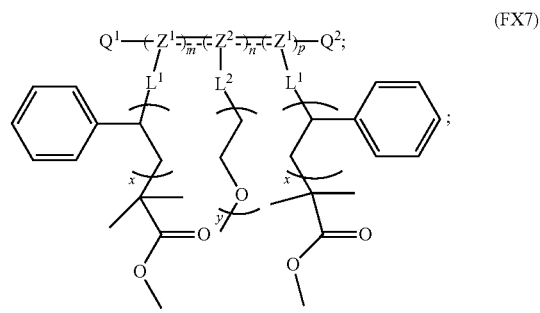

(FX7)

wherein each $Z^1$ is independently a first polymer backbone group and each $Z^2$ is independently a second polymer backbone group; wherein $Q^1$ is the first backbone terminating group and $Q^2$ is the second backbone terminating group; wherein each $L^1$ is independently a first linking group and each $L^2$ is independently a second linking group; wherein m, n and p are each independently an integer selected from the range of 3 to 1000; and wherein x is an integer selected from the range of 3 to 100 and y is an integer selected from the range of 3 to 100.

In an embodiment, for example, the brush block copolymers of the present electrochemical systems are defined by defined by the formula (FX8):

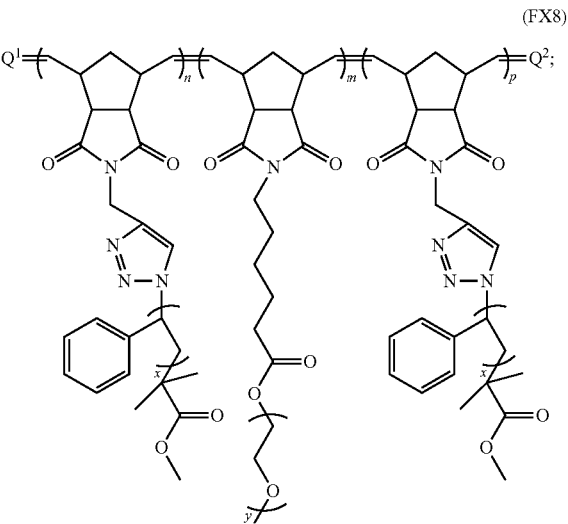

(FX8)

wherein $Q^1$ is the first backbone terminating group and $Q^2$ is the second backbone terminating group; wherein m, n and p are each independently an integer selected from the range of 3 to 1000; and wherein x is an integer selected from the range of 3 to 100 and y is an integer selected from the range of 3 to 100$_x$ Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 4A: Ionic conductivity as a function of [EO]:[Li$^+$] for $gPS_{11}$-$gPEO_{78}$-$gPS_{11}$. FIG. 4B: Normalized ionic conductivity for BBCP/LiTFSI blends relative to linear 300 kDa PEO.

FIG. 8A) Response with dissolved Re(bpy)(CO)$_3$Cl under $CO_2$. FIG. 8B) Response under $CO_2$, with and without dissolved Re(bpy)(CO)$_3$Cl.

FIG. 10A) $gPS_{11}$-$gPEO_{78}$-$gPS_{11}$, FIG. 10B) $gPS_{15}$-$gPEO_{119}$-$gPS_{15}$. Data were collected at 5° C./min ramp rate on heating. Traces are shifted vertically for clarity. Analogous gPEO brush homopolymer and neat BBCP DSC data are reported in the FIGS. 25-28.

FIG. 12A) $gPS_{11}$-$gPEO_{78}$-$gPS_{11}$, FIG. 12B) $gPS_{15}$-$gPEO_{119}$-$gPS_{15}$.

FIG. 13A) $gPS_{11}$-$gPEO_{78}$-$gPS_{11}$ and FIG. 13B) $gPS_{15}$-$gPEO_{119}$-$gPS_{15}$. The linear black line represents a fit to the VFT equation.

FIG. 50: TEM image of PLA-PS-PEO brush triblock terpolymer. The polymer was stained with $RuO_4$ vapors prior to sectioning.

FIG. 63A) Potential (V vs. Ag Wire). FIG. 63B) Square root of scan rate.

STATEMENTS REGARDING CHEMICAL COMPOUNDS AND NOMENCLATURE

Figure 1:
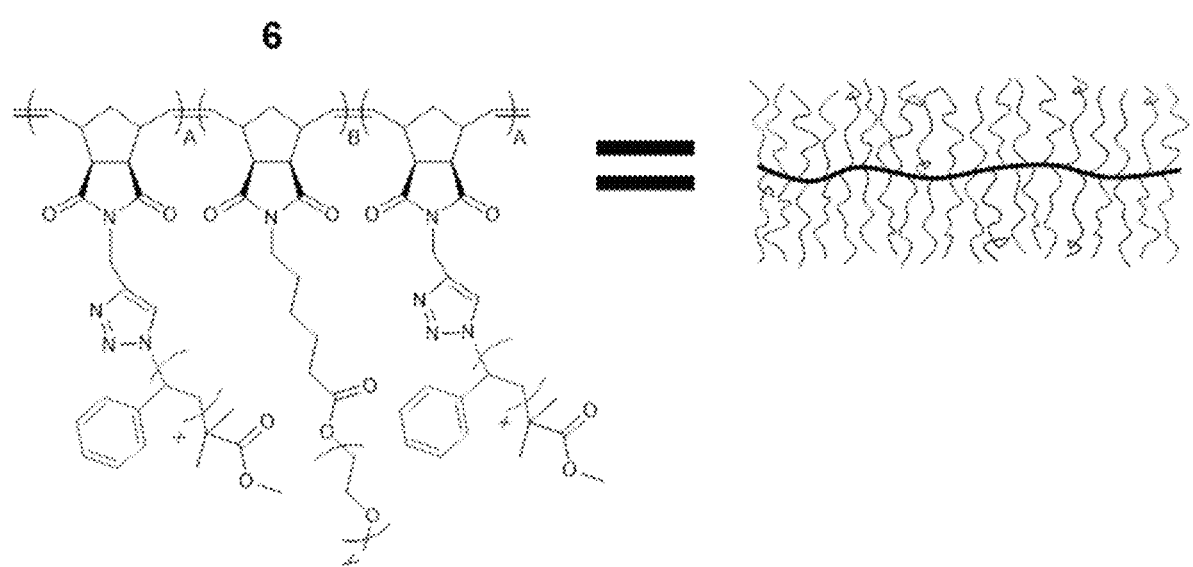
FIG. 1: Chemical structure and illustration of gPS-gPEO-gPS brush triblock copolymer, 6.

In an embodiment, a composition or compound of the invention is isolated or purified. In an embodiment, an isolated or purified compound is at least partially isolated or purified as would be understood in the art. In an embodiment, the composition or compound of the invention has a chemical purity of at least 95%, optionally for some applications at least 99%, optionally for some applications at least 99.9%, optionally for some applications at least 99.99%, and optionally for some applications at least 99.999% pure.

As used herein, the term "polymer" refers to a molecule composed of repeating structural units connected by covalent chemical bonds often characterized by a substantial number of repeating units (e.g., equal to or greater than 3 repeating units, optionally in some embodiments equal to or greater than 10 repeating units, optionally in some embodiments equal to or greater than 30 repeating units) and a high molecular weight (e.g. greater than or equal to 10,000 Da, optionally in some embodiments greater than or equal to 50,000 Da greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Cross linked polymers having linked monomer chains are useful for some applications.

An "oligomer" refers to a molecule composed of repeating structural units connected by covalent chemical bonds often characterized by a number of repeating units less than that of a polymer (e.g., equal to or less than 3 repeating units) and a lower molecular weights (e.g. less than or equal to 1,000 Da) than polymers. Oligomers may be the polymerization product of one or more monomer precursors.

"Block copolymers" are a type of copolymer comprising blocks or spatially segregated domains, wherein different domains comprise different polymerized monomers, for example, including at least two chemically distinguishable blocks. Block copolymers may further comprise one or more other structural domains, such as ionophobic groups, ionophilic groups, hydrophobic groups, hydrophilic groups, etc. In a block copolymer, adjacent blocks are constitutionally different, i.e. adjacent blocks comprise constitutional units derived from different species of monomer or from the same species of monomer but with a different composition or sequence distribution of constitutional units. Different blocks (or domains) of a block copolymer may reside on different ends or the interior of a polymer (e.g. [A][B]), or may be provided in a selected sequence ([A][B][A][B]).

"Diblock copolymer" refers to block copolymer having two different chemical blocks. "Triblock copolymer" refers to a block copolymer having three different chemical blocks, including compositions in which two blocks are the same or similar.

"Ionophobic" refers to a property of a functional group, or more generally a component of a compound, such as one or more polymer side chain groups of a brush block copolymer, which are immiscible with polar compounds, including, but not limited to, at least one of the following: water, ionic liquid, lithium salts, methanol, ethanol, and isopropanol. In a specific embodiment, for example, "ionophobic" refers to a property of a functional group, or more generally a component of a compound, such as one or more polymer side chain groups of a brush block copolymer, which are immiscible with at least one of the following water, methanol, ethanol, and isopropanol. In some embodiments, ionophobic is used to describe one or more side chains characterizing a polymer block of a copolymer that does not contribute substantially to the ionic conductivity of a copolymer or physical network thereof, but instead contributes to one or more other chemical, physical or electronic properties, such as the mechanical strength of a brush block copolymer physical network. In an embodiment, for example, polystyrene, poly(methyl methacrylate), poly(ethylene), poly(propylene), poly(butadiene), and poly(isoprene are examples of ionophobic polymer side chains. In an embodiment, an ionophobic polymer side chain of a brush block copolymer is a hydrophobic polymer side chain.

"Ionophilic" refers to a property of a functional group, or more generally a component, of a compound, such as one or more polymer side chain groups of a brush block copolymer, which exhibit miscibility at certain relative concentrations with polar compounds including, but not limited to, at least one of the following: water, ionic liquid, lithium salts, methanol, ethanol, and isopropanol. In a specific embodiment, for example, "ionophilic" refers to a property of a functional group, or more generally a component, of a compound, such as one or more polymer side chain groups of a brush block copolymer, which exhibit miscibility with at least one of the following water, methanol, ethanol, and isopropanol. In some embodiments, "ionophilic" is used to describe one or more a side chains characterizing a polymer block of a copolymer that contributes substantially to the net ionic conductivity of a copolymer or physical network thereof. In an embodiment, for example, poly(ethylene oxide), poly(lactide), poly(N-isopropylacrylamide), and poly(pyrrolidinone) are examples of ionophilic polymer side chains. In an embodiment, an ionophilic polymer side chain of a brush block copolymer is a hydrophilic polymer side chain.

"Polymer backbone group" refers to groups that are covalently linked to make up a backbone of a polymer, such as a block copolymer. Polymer backbone groups may be linked to side chain groups, such as polymer side chain groups. Some polymer backbone groups useful in the present compositions are derived from polymerization of a monomer selected from the group consisting of a substituted or unsubstituted norbornene, olefin, cyclic olefin, norbornene anhydride, cyclooctene, cyclopentadiene, styrene and acrylate. Some polymer backbone groups useful in the present compositions are obtained from a ring opening metathesis polymerization (ROMP) reaction. Polymer backbones may terminate in a range of backbone terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

"Polymer side chain group" refers to a group covalently linked to a polymer backbone group that comprises a polymer side chain, optionally imparting steric properties to the polymer. In an embodiment, for example, a polymer side chain group is characterized by a plurality of repeating units having the same, or similar, chemical composition. A polymer side chain group may be directly or indirectly linked to the polymer back bone groups. In some embodiments, polymer side chain groups provide steric bulk and/or interactions that result in an extended polymer backbone and/or a rigid polymer backbone. Some polymer side chain groups useful in the present compositions include unsubstituted or substituted polyisocyanate group, polymethacrylate group, polyacrylate group, polymethacrylamide group, polyacrylamide group, polyquinoxaline group, polyguanidine group, polysilane group, polyacetylene group, polyamino acid group, polypeptide group, polychloral group, group, polystyrene group, polyacrylate group, poly tert-butyl acrylate group, polymethyl methacrylate group, polysiloxane group, polydimethylsiloxane group, poly n-butyl acrylate group, polyethylene glycol group, polyethylene oxide group, polyethylene group, polypropylene group, polytetrafluoroethylene group, and polyvinyl chloride group. Some polymer side chain groups useful in the present compositions comprise repeating units obtained via anionic polymerization, cationic polymerization, free radical polymerization, group transfer polymerization, or ring-opening polymerization. A polymer side chain may terminate in a wide range of polymer side chain terminating groups including hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

As used herein, the term "brush block copolymer" refers to a block copolymer in containing at least one polymer backbone group covalently linked to at least one polymer side chain group.

"Polymer blend" refers to a mixture comprising at least one polymer, such as a block copolymer, e.g., brush block copolymer, and at least one additional component, and optionally more than one additional component. In some embodiments, for example, a polymer blend of the invention comprises a first brush block copolymer and one or more electrochemical additives. In some embodiments, for example, a polymer blend of the invention further comprises one or more additional brush block copolymers, homopolymers, copolymers, block copolymers, brush block copolymers, oligomers, electrochemical additives, solvents, metals, metal oxides, ceramics, liquids, small molecules (e.g., molecular weight less than 500 Da, optionally less than 100 Da), or any combination of these. Polymer blends useful for some applications comprise a first block copolymer, such as a brush block copolymer or a wedge-type block copolymer, and one or more additional components comprising block copolymers, brush block copolymers, wedge-type block copolymers, linear block copolymers, random copolymers, homopolymers, or any combinations of these. In embodiments, for example, an electrochemical additive is an electrocatalyst and the concentration of the electrochemical additive is selected over the range of 1 nM and 100 mM, in some embodiments the concentration of the electrochemical additive is selected over the range of 1 μM and 100 mM or, for example between 1 mM and 100 mM. In an embodiment, the concentration of the electrochemical additive is selected over the range of 5 to 20 mM. Polymer blends of the invention include mixture of two, three, four, five and more components.

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

"Electrolyte" refers to an electronic and/or ionic conductor which can be in the solid state, the liquid state, a gel state or more rarely a gas (e.g., plasma).

"Electrochemical additive" refers to a compound or a combination of compounds which are capable of undergoing electrochemical reactions or provides a source of ions, for example to a polymer composition. In some embodiments, for example, addition of an electrochemical additive to a polymer composition provides electrochemical functionality, such as ion conductivity. In some embodiments, an electrochemical additive comprises a salt, such as a lithium salt. In some embodiments, an electrochemical additive comprises an ionic liquid, such as an ionic liquid comprising lithium ions. In some embodiments, an electrochemical additive comprises a solvent, for example, a solvent having dissolved or solvated ions therein. In some embodiments, an electrochemical additive comprises an electrocatalyst. In an embodiment, electrochemical additive refers to a component which provides for or enhances the conductivity or transport of ions through a material, such as a polymer, a polymer network, or a polymer blend. In an embodiment, electrochemical additive refers to a component which provides for or enhances the conductivity or transport of lithium ions.

"Ionic liquid" refers to a salt which is in the liquid state at relatively low temperatures, for example, temperature less than or equal to 100° C., or optionally less than or equal to 25° C. Ionic liquids for some embodiments comprise at least one anion and one cation, wherein the anion comprises $BF_4^-$, $PF_6^-$, $Cl^-$, or bis(trifluoromethylsulfonyl)imide. In some embodiments, the cation comprises imidazolium, methylimidazolium, pyridinium, ammonium, pyrrolidinium or 1-butyl-3-methylimidazolium.

"Electrocatalyst" refers to a catalyst that participates in electrochemical reactions, typically by being present at (or proximate) to the surface of an electrode or forming the electrode itself. Electrocatalysts facilitate the transferring of electrons or ions or an intermediate chemical reaction to facilitate the transfer of electrons or ions.

Lithium salts provide an important role in establishing chemical and/or physical properties for certain embodiments of the present electrolytes and electrochemical systems. In an embodiment, for example, lithium salts impart conductivity and, optionally contribute to solid electrode interphase (SEI) layer formation, in an electrochemical system. In an embodiment, the lithium salt is a lithium phosphate, lithium fluorophosphate, lithium borate, lithium fluoroborate, lithium arsenate, lithium fluoroarsenate, lithium perchlorate, lithium fluoroperchlorate, lithium sulfonate, lithium fluorosulfonate, lithium sulfonyl imide, lithium fluoro sulfonyl imide, lithium nitramide or lithium fluoronitramide. In an embodiment, the lithium salt may be selected from the group consisting of lithium hexafluorophosphate (LiPF$_6$), lithium tetrafluoroborate (LiBF$_4$), lithium bis(oxalato) borate (LiBOB), lithium difluoro(oxalato) borate (LiDFOB), lithium tetrafluoro(oxalato) phosphate (LiTFOP), lithium hexafluoroarsenate (LiAsF$_6$), lithium perchlorate (LiClO$_4$), lithium trifluoromethanesulfonate (LiCF$_3$SO$_3$), lithium bistrifluoromethanesulfonate sulfonyl imide (LiN(SO$_2$CF$_3$)$_2$), lithium dinitramide (LiDNA) and combinations thereof. In an embodiment, the lithium salt comprises LiPF$_6$. In an embodiment, the electrolyte may contain a first lithium salt which is present in relatively high concentration and a second lithium salt which is present in relatively low concentration. In an embodiment, this second lithium salt may be viewed as an additive. In an embodiment, the additive salt may be selected from lithium bis(oxalato)borate (LiBOB); lithium difluoro(oxalato) borate (LiDFOB), lithium tetrafluoro(oxalato) phosphate (LiTFOP), or combinations thereof.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

Unless otherwise specified, the term "average molecular weight," refers to number average molecular weight. Number average molecular weight is the defined as the total weight of a sample volume divided by the number of molecules within the sample. As is customary and well known in the art, peak average molecular weight and weight average molecular weight may also be used to characterize the molecular weight of the distribution of polymers within a sample.

As used herein, the terms "alkylene" and "alkylene group" are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as linking and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups, for example, as one or more linking groups.

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups.

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group.

Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups, for example, as one or more linking groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups.

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^6$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups.

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides are comprised of two or more amino-acid connected via peptide bonds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, or 7-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6- or 7-member aromatic rings, including heterocyclic aromatic rings. The term heteroaryl specifically refers to aryl groups having at least one 5-, 6- or 7-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those which are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-membered ring and one or more additional five- or six-membered aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically non-feasible. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;
pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms;
—OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

DETAILED DESCRIPTION OF THE INVENTION

In general, the terms and phrases used herein have their art-recognized meaning, which can be found by reference to standard texts, journal references and contexts known to those skilled in the art.

The invention is further detailed in the following examples, which are offered by way of illustration and are not intended to limit the scope of the invention in any manner.

Example 1: Brush Block Copolymers for Polyelectrolyte Membranes

Overview

The present example provides description and experimental results supporting the following aspects of the present invention:
- Synthesis of fully grafted ABA brush triblock copolymers.
- Brush block copolymer (BBCP) electrolytes.
- BBCP/LiTFSI blends exhibiting high conductivity (equal to or greater than $10^{-3}$ S/cm at 105° C.), comparable to or better than previously reported systems of interest.
- Normalized conductivities that are significantly higher for BBCP/LiTFSI blends than for blends of Li salts with linear block copolymer analogues.
- Brush architectures conferring important advantages and opens opportunities for the design of polymer electrolyte membranes with high conductivity.
- BBCP ion gels.
- Polymer ion gels with embedded catalysts—a strategy that blends the benefits of solid state catalysis (shape persistence) with solution catalysis (liquid-like mobility, diffusion, and proven catalytic activity).
- Successful use of polymer ion gel electrolyte for electroanalytical chemistry and/or as a solid-state medium for electrocatalysis.
- Catalysis in ion gels has an apparent rate comparable to that of non-aqueous electrolyte solutions, with the added benefit of less negative potential.

Background

Batteries require electrolytes that physically separate the anode and cathode and simultaneously enable the reversible movement of charge. Lithium ion batteries typically utilize highly conductive liquid electrolytes that suffer from safety issues associated with lithium dendrite growth and the use of flammable small molecule solvents. Significant research efforts have thus been directed towards identifying polymeric materials ("polymer electrolyte membranes") to replace liquid electrolytes. Most materials comprise poly(ethylene oxide) (PEO) or copolymers thereof that conduct lithium ions when doped with lithium salts.

Various approaches have been reported in the literature, but no solution to this challenge exists in the current state of the art. Systems of interest include the following (Scheme 1):
- Poly(ethylene oxide) (PEO) homopolymers (1). PEO dissolves lithium salts, and its low glass transition temperature promotes ion transport. However, PEO homopolymers and PEO homopolymer/Li$^+$ blends generally exhibit poor mechanical properties. Both neat PEO and PEO/Li$^+$ blends at certain ratios crystallize, which lowers the conductivity and limits applications.
- Comb-branched homopolymers with short PEO side chains. Examples include poly(oligo(oxyethylene) methacrylate) (POEM, 2)[1-4] and comb-like peptoid polymers with PEO side chains.[5] Sufficiently low-molecular-weight (low-MW) PEO does not crystallize, resulting in improved conductivity compared to high-MW PEO. However, while low-MW PEO systems exhibit high conductivity, they also suffer from poor mechanical properties.
- Block copolymers (3-5). Block copolymers (BCPs) have been employed to address the problem of improving both conductivity and mechanical properties. In these systems, one domain exhibits ionic conductivity and another domain provides mechanical strength.[6-8] BCPs containing PEO and polystyrene (PS) blocks have emerged as the most promising candidates for polyelectrolyte materials.

Scheme 1. Examples of systems of interest for the present invention.

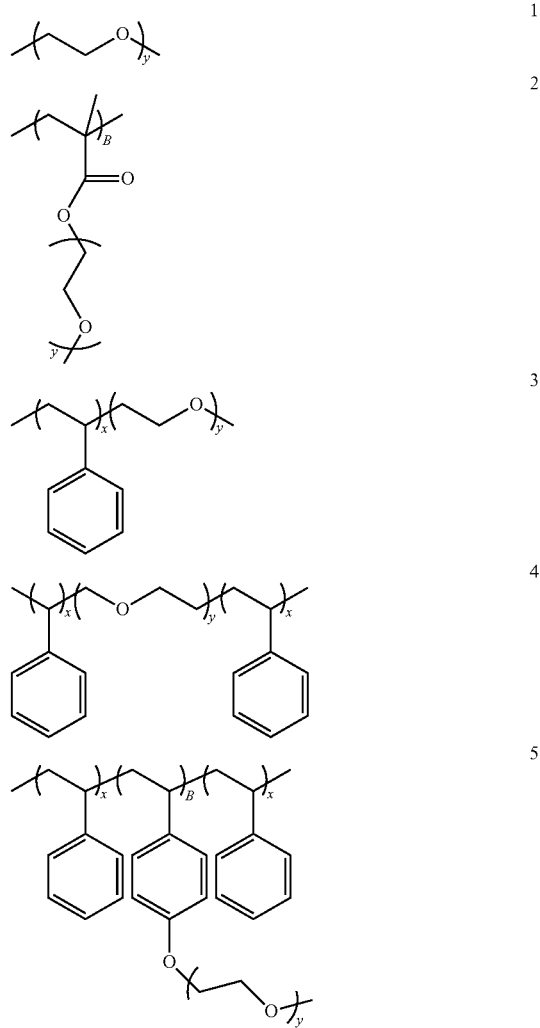

To date, most polymers developed for polyelectrolyte membrane applications have been linear block copolymers (3-4), in which a high-MW PEO chain is covalently linked to at least one glassy block that provides mechanical strength. Examples include poly(styrene-block-ethylene oxide) (PS-PEO, 3) and poly(styrene-block-ethylene oxide-block-styrene) (PS-PEO-PS, 4). Grafted polymer architectures have been explored in a few recent reports, limited to dendrimers[9] and single-block grafting (for example, 5).[10-12]

Brush Block Copolymer/Lithium Salt Blends

Relevant Publication: Bates, C. M.; Chang, A. B.; Momeilovia, N.; Jones, S. C.; Grubbs, R. H. ABA Triblock Brush Polymers: Synthesis, Self-Assembly, Conductivity, and Rheological Properties. Macromolecules 2015, 48, 4967-4973.

The technology described in herein represents a new advance in this field. Described are brush block copolymer (BBCP) materials that exhibit improved lithium ion conductivity compared to linear block copolymer materials. These materials are the first reported examples of fully grafted ABA brush triblock copolymers and first examples of BBCP electrolytes.[13]

The BBCPs consist of polynorbornene backbones fully grafted with PS and PEO side chains (FIG. 1). Different architectures have been synthesized, including AB brush diblock copolymers and ABA brush triblock copolymers (gPS-gPEO-gPS, 6). A denotes PS side chains and B denotes PEO side chains.

Unlike graft polymers previously reported in the polymer electrolyte literature, the BBCPs a. are grafted in all blocks, not only the PEO block;
b. guarantee 100% side chain grafting density;
c. feature narrow dispersity in the side chains (Đ <1.2); and
d. do not require post-polymerization modifications.

Figure 2:
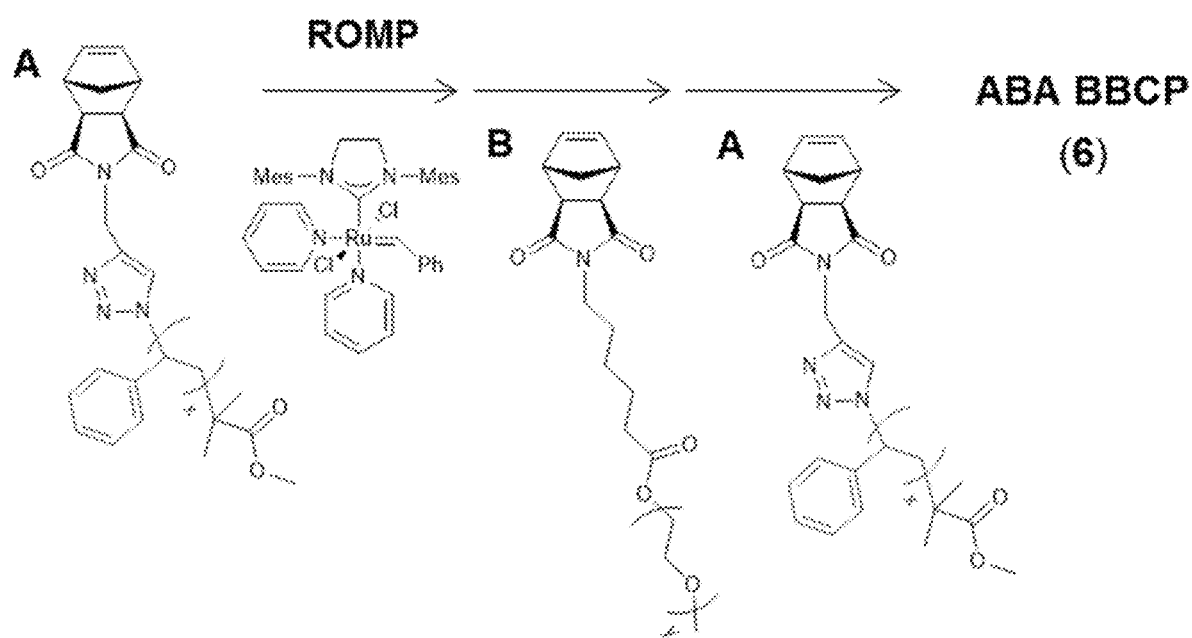
FIG. 2: Synthesis of ABA brush triblock copolymers.

The precision in the BBCP structure is enabled by the synthetic strategy. The BBCPs are synthesized by grafting-through ring-opening metathesis polymerization (ROMP) (FIG. 2). ROMP affords excellent control over molecular weight (MW) and extremely low MW-dispersity.

The BBCPs were blended with lithium bis(trifluorosulfonimide) (LiTFSI) at different component ratios (calculated as [EO][Li$^+$], the average total number of ethylene oxide repeat units per polymer chain relative to the moles of LiTFSI). Since Li$^+$ diffusion typically occurs exclusively in amorphous PEO domains, preventing crystallization is highly desirable for polymer electrolyte applications. The low-MW PEO side chains of the BBCPs (y=45) avoid crystallization. This tendency is surprising, considering that other reported polymers with low-MW PEO grafts (y≥7) show incipient crystallization.[3]

Figure 3:
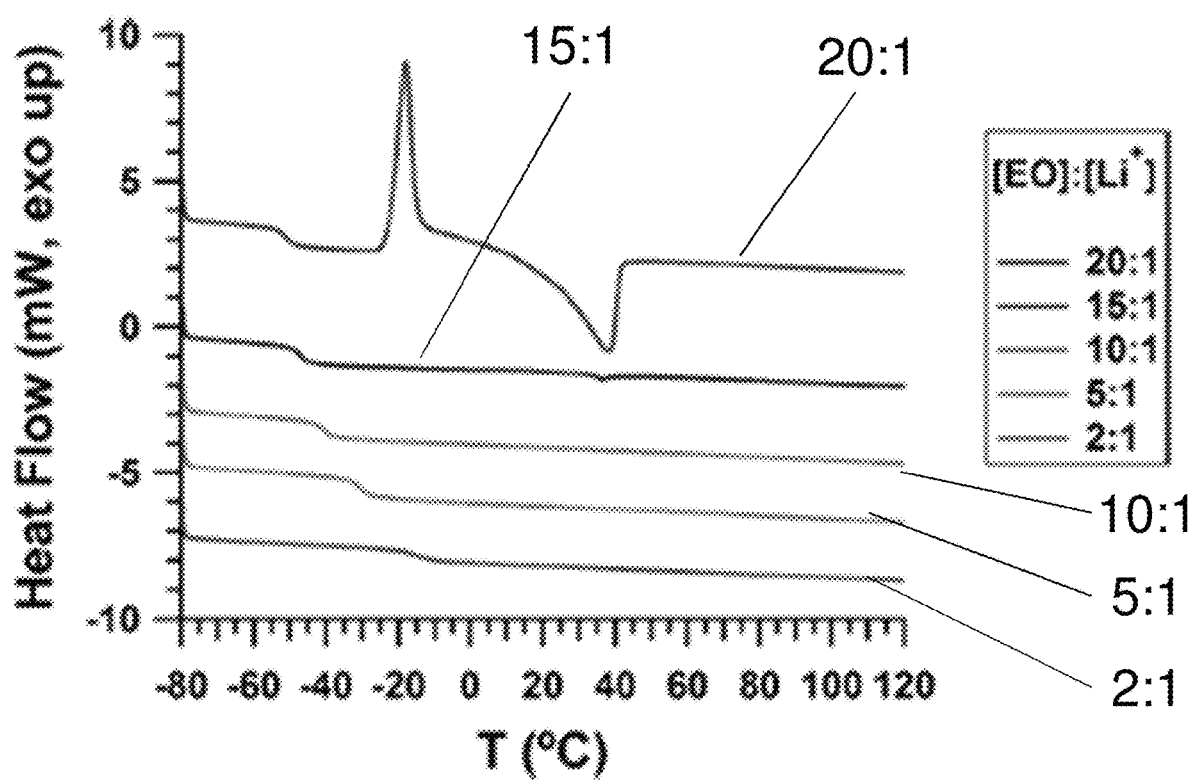
FIG. 3: BBCP DSC data as a function of LiTFSI loading for $gPS_{11}$-$gPEO_{78}$-$gPS_{11}$.

In addition, the BBCP/LiTFSI blends display a wider crystallinity gap (2≤[EO][Li$^+$]≤15) than do blends of low-MW PEO and LiTFSI (6<[EO][Li$^+$]<12).[14] Differential scanning calorimetry (DSC) reveals the crystallization behavior (FIG. 3). DSC data for blends of the linear 2.0 kDa PEO homopolymer and LiTFSI are consistent with the crystallinity gap for BBCP/LiTFSI blends. This result suggests that the linear 2.0 kDa PEO homopolymer behaves equivalently to the gPEO brush block in the BBCPs. The BBCPs have advantages over other systems explored for polymer electrolyte applications: low-MW grafted PEO side chains inherently minimize crystallization, and crystallinity does not increase with backbone (polynorbornene) degree of polymerization. Marrying the graft and block architecture combines the advantages of crystallization suppression with decoupled conductive and mechanical properties.

The BBCP/LiTFSI blends demonstrate high conductivity, attributed to high volume fraction of low-MW PEO and the suppression of crystallization by the brush architecture (FIG. 4A). The normalized conductivities ($\sigma/\sigma_{max}$, relative to linear 300 kDa PEO) are remarkably large for 2.0 kDa PEO chains (FIG. 4B). The normalized conductivity is significantly higher for the BBCP/LiTFSI blends than for linear PEO-containing block copolymers at the same Li$^+$ loadings. For systems of interest, such as linear PS-PEO, the normalized conductivity[15-16] is <0.1 and reaches 0.3 only when the MW of PEO approaches 40 kDa.[7]

The mechanical properties of the BBCPs were studied by frequency-dependent melt rheometry. The storage modulus (G') is on the order of $10^4$ Pa between 45 and 105° C. and is always larger than the loss modulus (G"). Combining the advantages of the BBCP architecture with other advances, such as polymerization-induced phase separation, may provide a route to stiffer materials with similar conductivity profiles.

Brush Polymer Ion Gels

Relevant Publication: Bates, C. M.; Chang, A. B.; Schulze, M. W.; Momčilović, N.; Jones, S. C.; Grubbs, R. H. Brush polymer ion gels. J. Polym. Sci., Part B: Polym. Phys. 2016, 54, 292-300.

Recently, BCPs containing ionic liquids (ILs) have emerged as alternative electrolytes for lithium batteries.[17-19] ILs are room-temperature molten salts composed mostly of organic ions. Their unique combination of properties—including reduced flammability, low vapor pressure, exceptional thermal and electrochemical stability, low toxicity, and high ionic conductivity—make them attractive materials for applications as electrolytes.[26-21] For device integration, providing ILs with mechanical integrity without sacrificing ionic conductivity is desired. Polymer electrolytes incorporating ILs, also called ion gels, are advantageous due to their high ionic conductivity (~$10^{-3}$ S/cm at 25° C.)[22] compared to conventional lithium salt blends such as PEO/LiClO$_4$ (~$10^{-5}$ S/cm at 25° C.).[23] The potential industrial impact delivered by this class of soft materials is highlighted by their successful implementation in a variety of electronic devices.[24-27]

Figure 5:
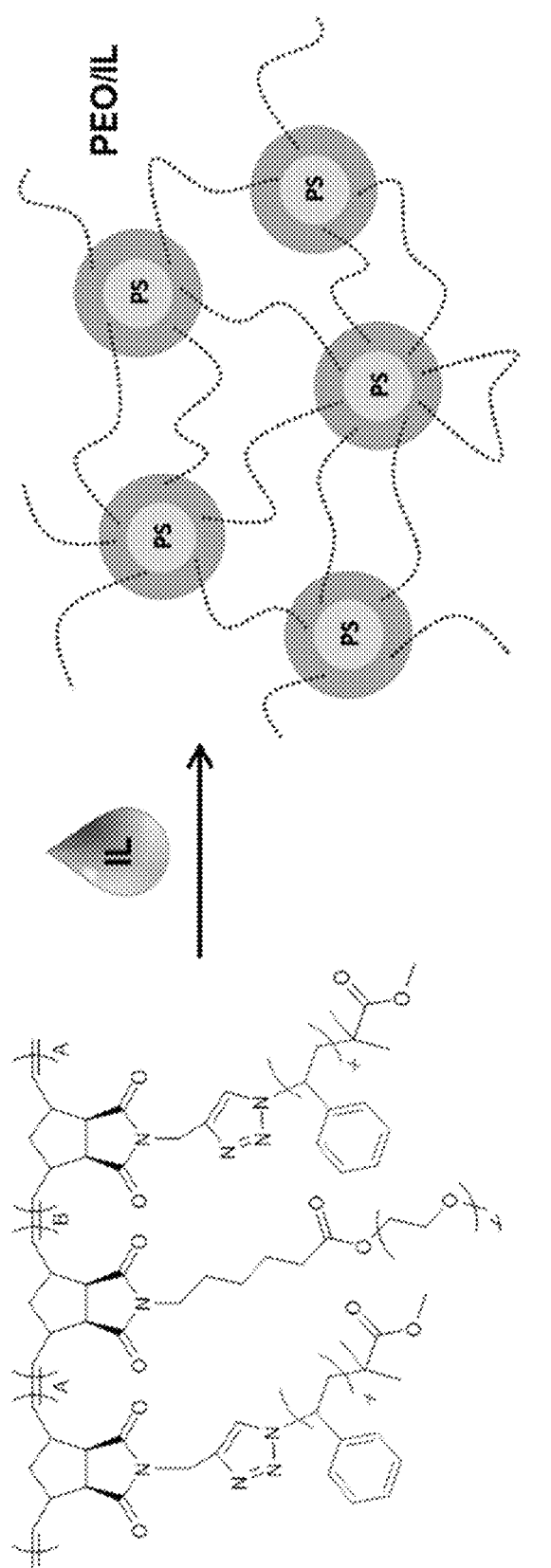
FIG. 5: Mixing gPS-gPEO-gPS BBCP with ionic liquid (IL) produces a physically cross-linked network.
Figure 6:
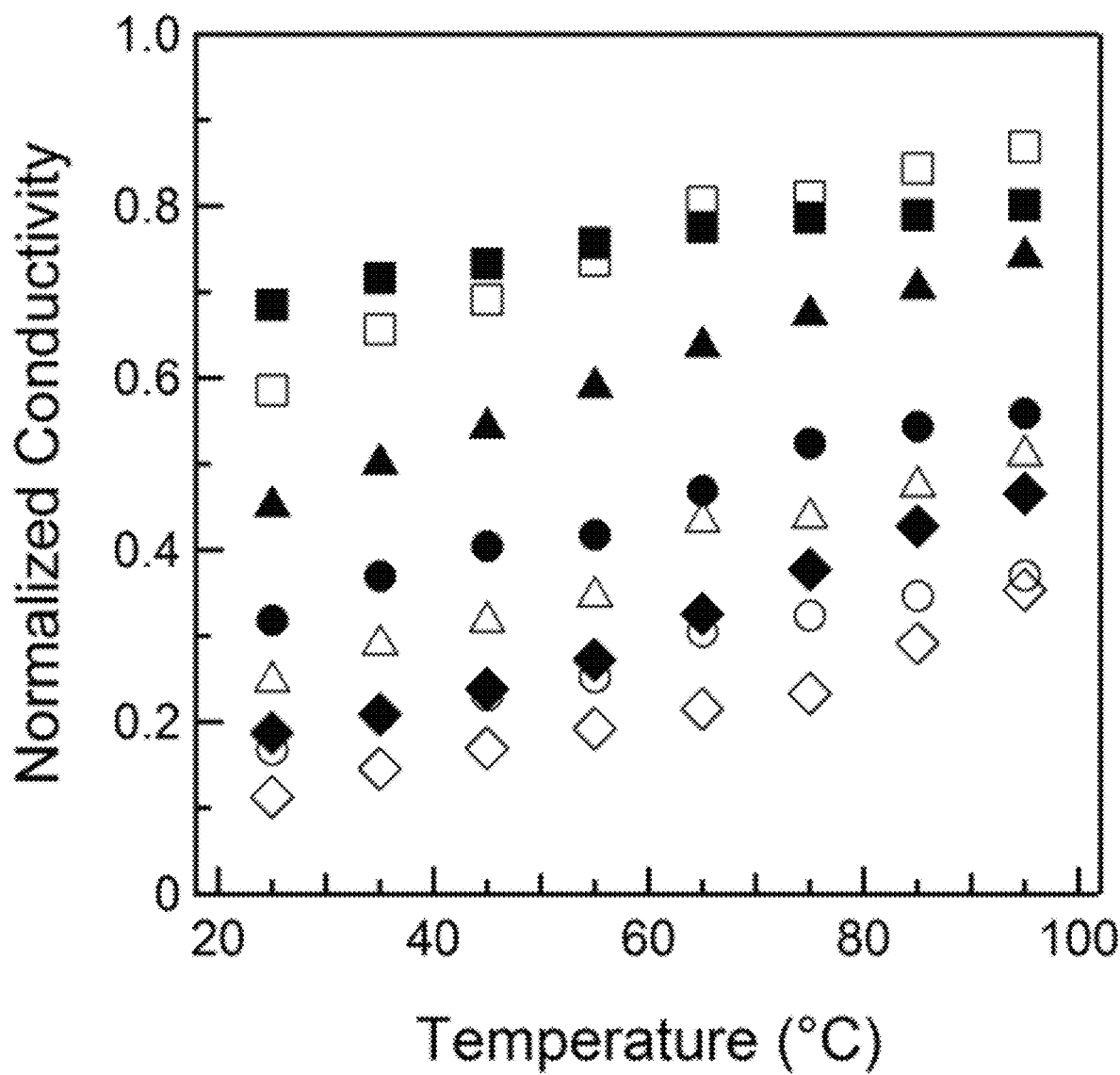
FIG. 6: Ionic conductivities normalized to neat [BMIm][TFSI]. Polymer concentrations are 9 (□ and ■), 16 (Δ and ▲), 23 (○ and ●), and 29 wt % (◇ and ◆). Closed and open symbols represent $gPS_3$-$gPEO_{85}$-$gPS_3$ and $gPS_{15}$-$gPEO_{119}$-$gPS_{15}$ samples, respectively.

Provided is the first example of BBCP ion gels. The network structure of the ion gel can be formed by creating physically associated cross-links (FIG. 5). For example, in the presence of IL, an ABA triblock copolymer with ionophobic A blocks and an ionophilic B block self-assembles to a network in which micelles of A are bridged by B blocks and dispersed in a continuous B/IL phase.[7,28] This phenomenon was exploited to fabricate brush polymer ion gels, employing the same gPS-gPEO-gPS brush framework discussed previously. This design permits small molecule additives to be blended in the gels, opening additional opportunities.

gPS-gPEO-gPS triblocks were gelled in 1-butyl-3-methylimidazolium bis(trifluoromethylsulfonyl)imide ([BMI][TFSI]) at polymer concentrations spanning 5-50 wt %. Conductivities (~$10^{-3}$ S/cm at 25° C.) are comparable to ion gels derived from linear triblock copolymers[29] and represent a considerable increase relative to dry linear[7] and brush[30] electrolytes. The relatively large normalized conductivities (FIG. 6) highlight the liquid-like order in the gel matrix phase and are in comparable with measurements obtained for linear analogues.

Dynamic mechanical analysis (DMA) reveals a strong dependence of modulus and relaxation time on end-block length, polymer composition, and/or temperature. While the grafted PEO side chains (2.0 kDa) are slightly longer than their entanglement molar mass ($M_e$=1.6 kDa),[31] the brush architecture suppresses entanglements,[32] decreasing the elastic modulus of bulk brush polymers relative to linear analogues.[33-35] This trend also holds for gels; a linear PS-PEO-PS ion gel ($\Phi_{PS}$≈0.07) exhibits frequency-dependent elastic moduli approximately $10^1$-$10^2$ Pa larger than the similar gPS-gPEO-gPS BBCP.[29]

The compositions and methods described herein extend to applications of polymer ion gels in electrochemistry. No studies exist that successfully use ionic liquid-polymer gel electrolytes for electroanalytical chemistry or as a solid-state medium for electrocatalysis, but their high conductivity make them a promising medium. In the gel network structure, any species dissolved in ionic liquid can diffuse through the solid structure. Polymer ion electrolytes are excellent platforms for solid-state catalysis. They overcome many of the problems with adsorbing a catalyst on an electrode:

a. Dispersion of catalyst in a polymer gel allows diffusion of fresh catalyst to the electrode, circumvents the catalyst falling off of the electrode, and improves the catalyst stability over extended periods of time.
b. The thermoreversibility of ionic liquid-polymer gel electrolytes provides a facile method for renewing catalytic activity and minimizing chemical waste.
c. The solubility of many small-molecule gases (for example, $CO_2$) that are targeted for reactions to make valuable products is high.
d. The hydrophobicity and low solubility of oxygen in most polymer ion gel electrolytes means less likelihood of catalyst degradation when carrying out reactions within the gel.

Figure 7A:
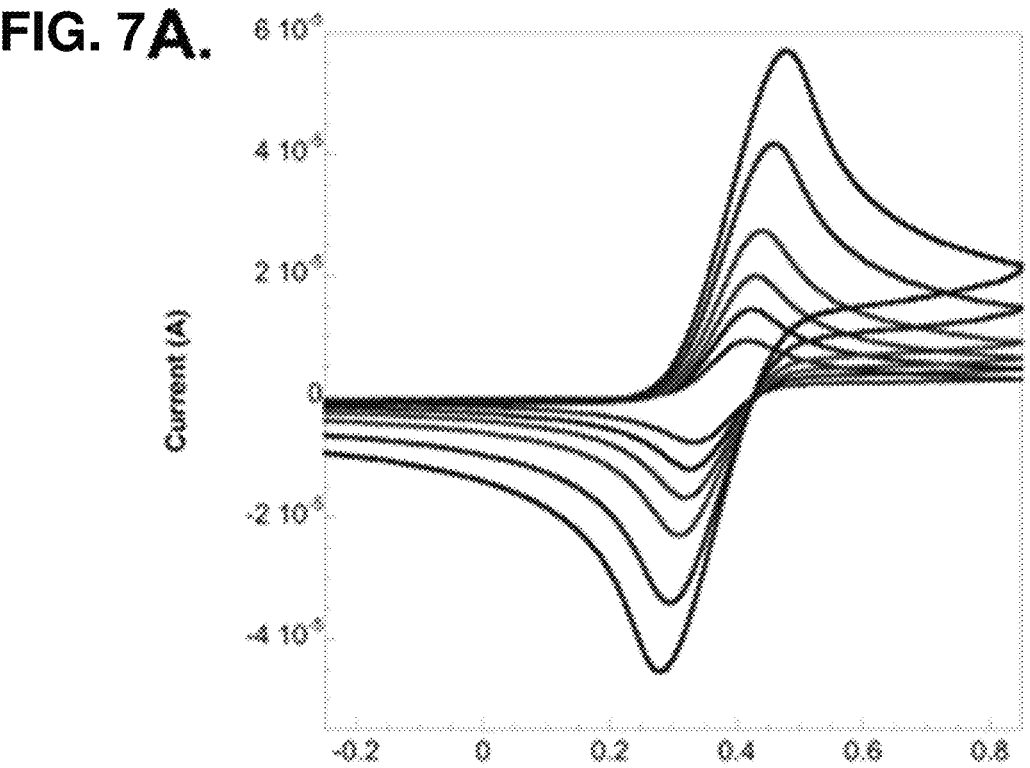
FIG. 7A: Electrochemically reversible CV of ferrocene.
Figure 7B:
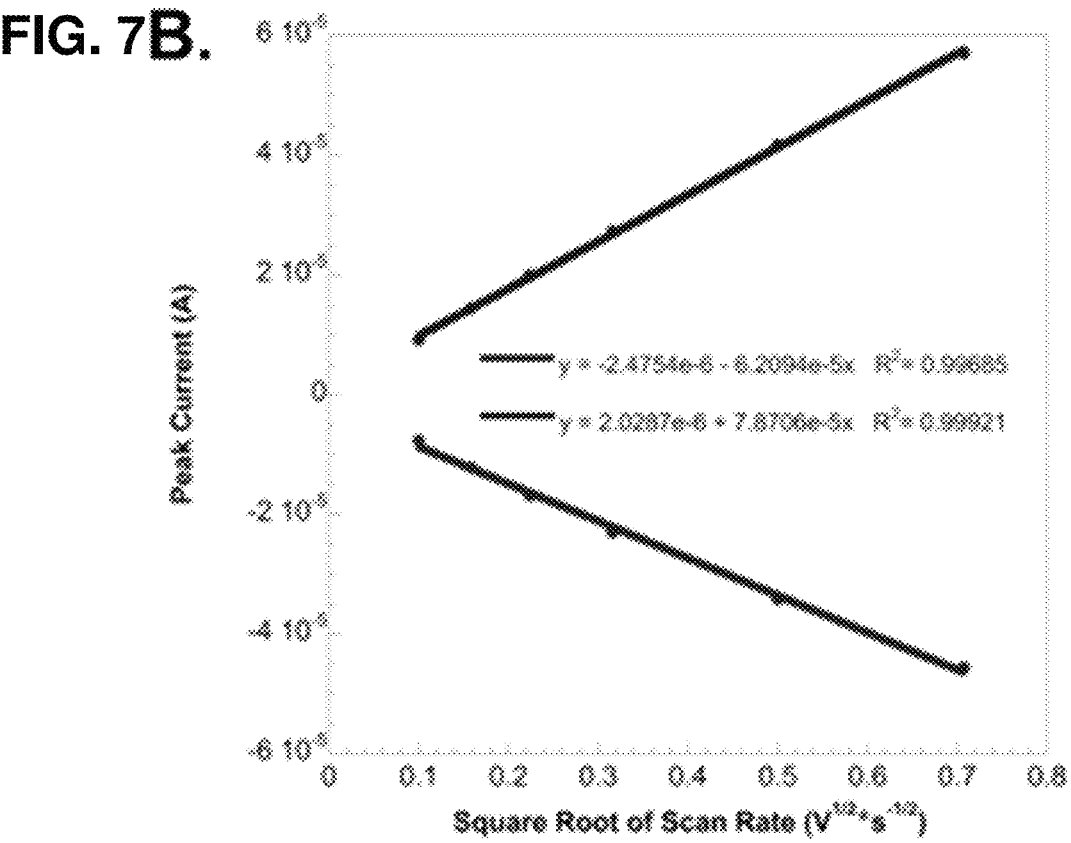
FIG. 7B: Linear fits of peak current versus square root of scan rate, indicating homogeneous behavior.

Brush polymer ion gels exhibit lower moduli than analogous linear polymer ion gels, enabling more facile diffusion throughout the solid gel. The redox activity of the ion gels was studied using a standard three-electrode cell. Cyclic voltammetry (CV) of ferrocene in a brush polymer ion gel indicates reversible behavior (FIG. 7). The linear fits show peak separation and diffusion-controlled electrochemistry, indicating that the electrochemistry is homogenous and occurring within the gel.

Figure 8A:
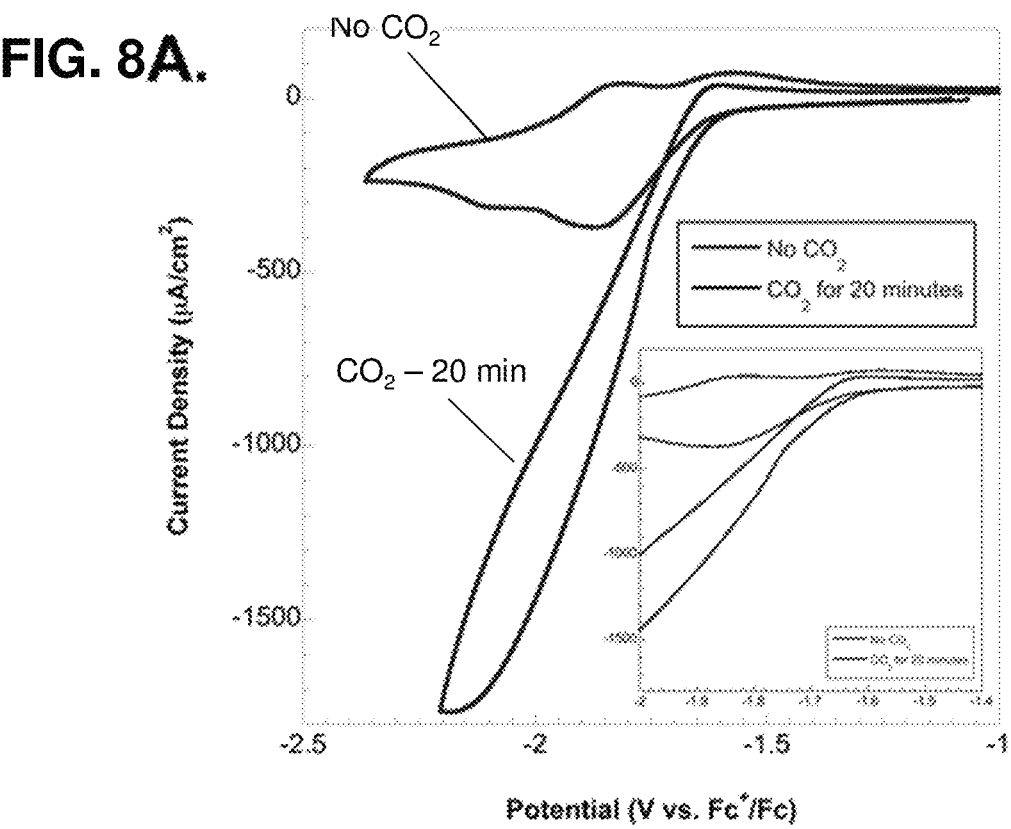
FIGS. 8A-8B: Electrochemical behavior of brush polymer ion gels.
Figure 8B:
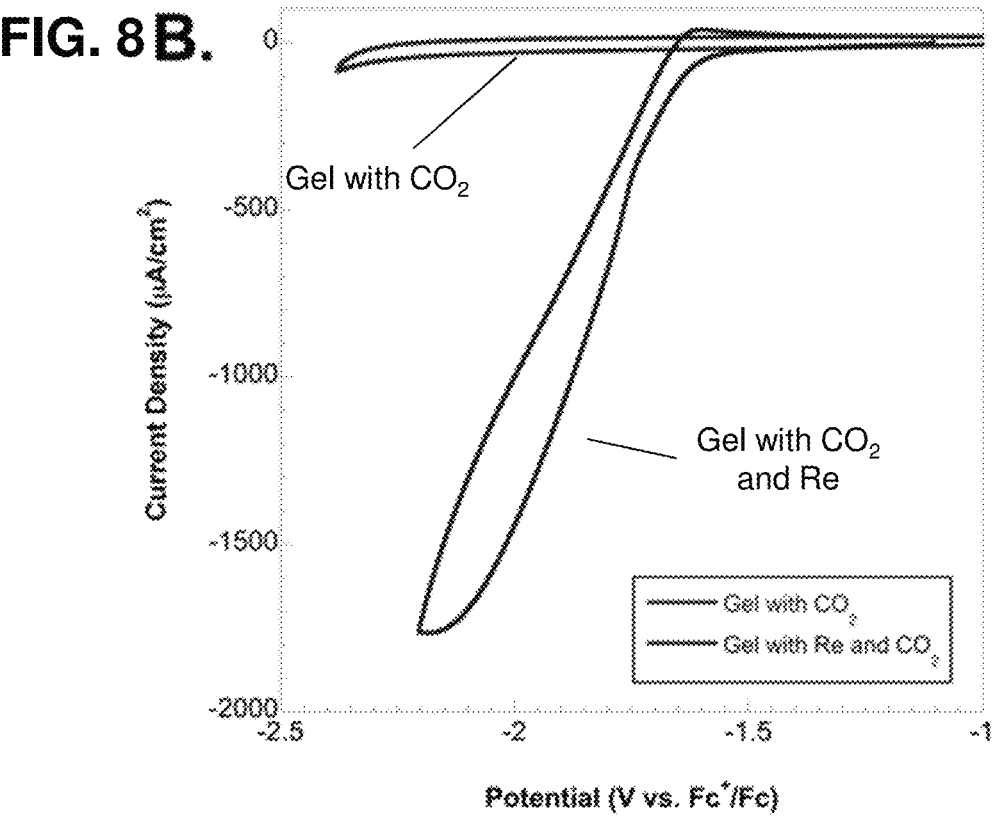

Tricarbonylchlororhenium(I) (Re(bpy)(CO)$_3$Cl), a known $CO_2$ reduction catalyst that nearly quantitatively converts $CO_2$ to CO through a two-electron pathway, was homogeneously dispersed in brush polymer ion gels. Upon introduction of $CO_2$ into the cell, a large increase in current was observed, corresponding to CO production by Re(bpy)(CO)$_3$Cl. No current was observed for blank gel with $CO_2$. FIG. 8 plots the observed responses. The catalytic wave begins at the first reduction peak of the Re catalyst, implying that both electrons are transferred at the first wave (FIG. 8A). (The additional one-electron peak at −2.23 V is attributed to additional reduction of the bipyridine ligand.) FIG. 8B compares the electrochemical behavior under $CO_2$ of the blank gel and the gel with Re(bpy)(CO)$_3$Cl. The catalytic wave only appears in the presence of the Re catalyst, suggesting that both $CO_2$ and catalyst are required for the observed response.

The apparent rate of $CO_2$ reduction at 1 atm $CO_2$ in the polymer ion gel is comparable to that of non-aqueous electrolyte solution, with the added benefit of less negative potential.

These results open many opportunities for use of the present electrochemical systems. Any other catalyst for small-molecule reduction, if soluble in ionic liquid, can be dispersed in polymer ion gel. If optimized and selective, a catalyst can be coupled with a photo-anode that can then power the catalysis through solar energy, with the ion gel electrolyte acting as a solid-state photocathode. This solid-state catalysis is useful in many applications, including oxygen generation, sequestration of $CO_2$ from power plants, conversion of syn-gas to valuable products, and generation of liquid fuels.

REFERENCES

1. Xia, D. W.; Soltz, D.; Smid, J. Conductivities of solid polymer electrolyte complexes of alkali salts with polymers of methoxypolyethyleneglycol methacrylates. *Solid State Ionics* 1984, 14, 221-224.
2. Kobayashi, N.; Uchiyama, M.; Shigehara, K.; Tsuchida, E. Ionically high conductive solid electrolytes composed of graft copolymer-lithium salt hybrids. *The Journal of Physical Chemistry* 1985, 89, 987-991.
3. Cowie, J. M. G.; Sadaghianizadeh, K. Effect of side chain length and crosslinking on the ac conductivity of oligo (ethyleneoxide) comb-branch polymer-salt mixtures. *Solid State Ionics* 1990, 42, 243-249.
4. Watanabe, M.; Endo, T.; Nishimoto, A.; Miura, K.; Yanagida, M. High ionic conductivity and electrode interface properties of polymer electrolytes based on high molecular weight branched polyether. *J. Power Sources* 1999, 81-82, 786-789.
5. Sun, J.; Stone, G. M.; Balsara, N. P.; Zuckermann, R. N. Structure-Conductivity Relationship for Peptoid-Based PEO-Mimetic Polymer Electrolytes. *Macromolecules* 2012, 45, 5151-5156.
6. Young, W.-S.; Kuan, W.-F.; Epps, T. H. Block Copolymer Electrolytes for Rechargeable Lithium Batteries. *J. Polym. Sci., Part B: Polym. Phys.* 2014, 52, 1-16.
7. Singh, M.; Odusanya, O.; Wilmes, G. M.; Eitouni, H. B.; Gomez, E. D.; Patel, A. J.; Chen, V. L.; Park, M. J.; Fragouli, P.; Iatrou, H.; Hadjichristidis, N.; Cookson, D.; Balsara, N. P. Effect of Molecular Weight on the Mechanical and Electrical Properties of Block Copolymer Electrolytes. Macromolecules 2007, 40, 4578-4585.
8. Bouchet, R.; Phan, T. N. T.; Beaudoin, E.; Devaux, D.; Davidson, P.; Bertin, D.; Denoyel, R. Charge Transport in Nanostructured PS-PEO-PS Triblock Copolymer Electrolytes. *Macromolecules* 2014, 47, 2659-2665.
9. Niitani, T.; Amaike, M.; Nakano, H.; Dokko, K.; Kanamura, K. Star-Shaped Polymer Electrolyte with Microphase Separation Structure for All-Solid-State Lithium Batteries. *J. Electrochem. Soc.* 2009, 156, A577-A583.
10. Niitani, T.; Shimada, M.; Kawamura, K.; Dokko, K.; Rho, Y.-H.; Kanamura, K. Synthesis of Li+ Ion Conductive PEO-PSt Block Copolymer Electrolyte with Microphase Separation Structure. *Electrochem. Solid-State Lett.* 2005, 8, A385-A388.
11. Wang, C.; Sakai, T.; Watanabe, O.; Hirahara, K.; Nakanishi, T. All Solid-State Lithium-Polymer Battery Using a Self-Cross-Linking Polymer Electrolyte. *J. Electrochem. Soc.* 2003, 150, A1166-A1170.
12. Kuan, W.-F.; Remy, R.; Mackay, M. E.; Epps, I. I. I. T. H. Controlled Ionic Conductivity via Tapered Block Polymer Electrolytes. *RSC Advances* 2015, 5, 12597-12604.
13. Bates, C. M.; Chang, A. B.; Momčilović, N.; Jones, S. C.; Grubbs, R. H. ABA Triblock Brush Polymers: Synthesis, Self-Assembly, Conductivity, and Rheological Properties. *Macromolecules* 2015, 48, 4967-4973.
14. Lascaud, S.; Perrier, M.; Vallee, A.; Besner, S.; Prud'homme, J.; Armand, M. Phase Diagrams and Conductivity Behavior of Poly(ethylene oxide)-Molten Salt Rubbery Electrolytes. *Macromolecules* 1994, 27, 7469-7477.
15. Panday, A.; Mullin, S.; Gomez, E. D.; Wanakule, N.; Chen, V. L.; Hexemer, A.; Pople, J.; Balsara, N. P. Effect of Molecular Weight and Salt Concentration on Conductivity of Block Copolymer Electrolytes. *Macromolecules* 2009, 42, 4632-4637.

16. Yuan, R.; Teran, A. A.; Gurevitch, I.; Mullin, S. A.; Wanakule, N. S.; Balsara, N. P. Ionic Conductivity of Low Molecular Weight Block Copolymer Electrolytes. *Macromolecules* 2013, 46, 914-921.
17. Quartarone, E.; Mustarelli, P. Electrolytes for solid-state lithium rechargeable batteries: recent advances and perspectives. *Chem. Soc. Rev.* 2011, 40, 2525-2540.
18. Armand, M.; Endres, F.; MacFarlane, D. R.; Ohno, H.; Scrosati, B. Ionic-liquid materials for the electrochemical challenges of the future. *Nat. Mater.* 2009, 8, 621-629.
19. Ye, Y.-S.; Rick, J.; Hwang, B.-J. Ionic liquid polymer electrolytes. *J. Mater. Chem. A* 2013, 1, 2719-2743.
20. Welton, T. Room-Temperature Ionic Liquids. Solvents for Synthesis and Catalysis. *Chem. Rev.* 1999, 99, 2071-2084.
21. Galiński, M.; Lewandowski, A.; Stppniak, I. Ionic liquids as electrolytes. *Electrochim. Acta* 2006, 51, 5567-5580.
22. Lee, K. H.; Zhang, S.; Lodge, T. P.; Frisbie, C. D. Electrical Impedance of Spin-Coatable Ion Gel Films. *J. Phys. Chem. B* 2011, 115, 3315-3321.
23. Fullerton-Shirey, S. K.; Maranas, J. K. Effect of LiClO4 on the Structure and Mobility of PEO-Based Solid Polymer Electrolytes. *Macromolecules* 2009, 42, 2142-2156.
24. Moon, H. C.; Lodge, T. P.; Frisbie, C. D. Solution-Processable Electrochemiluminescent Ion Gels for Flexible, Low-Voltage, Emissive Displays on Plastic. *J. Am. Chem. Soc.* 2014, 136, 3705-3712.
25. Cho, J. H.; Lee, J.; Xia, Y.; Kim, B.; He, Y.; Renn, M. J.; Lodge, T. P.; Daniel Frisbie, C. Printable ion-gel gate dielectrics for low-voltage polymer thin-film transistors on plastic. *Nat Mater* 2008, 7, 900-906.
26. Lee, J.; Panzer, M. J.; He, Y.; Lodge, T. P.; Frisbie, C. D. Ion Gel Gated Polymer Thin-Film Transistors. *J. Am. Chem. Soc.* 2007, 129, 4532-4533.
27. Imaizumi, S.; Kato, Y.; Kokubo, H.; Watanabe, M. Driving Mechanisms of Ionic Polymer Actuators Having Electric Double Layer Capacitor Structures. *The Journal of Physical Chemistry B* 2012, 116, 5080-5089.
28. He, Y.; Boswell, P. G.; Bühlmann, P.; Lodge, T. P. Ion Gels by Self-Assembly of a Triblock Copolymer in an Ionic Liquid†. *J. Phys. Chem. B* 2007, 111, 4645-4652.
29. Zhang, S.; Lee, K. H.; Frisbie, C. D.; Lodge, T. P. Ionic Conductivity, Capacitance, and Viscoelastic Properties of Block Copolymer-Based Ion Gels. *Macromolecules* 2011, 44, 940-949.
30. Bates, C. M.; Chang, A. B.; Momčilović, N.; Jones, S. C.; Grubbs, R. H. ABA Triblock Brush Polymers: Synthesis, Self-Assembly, Conductivity, and Rheological Properties. *Macromolecules* 2015.
31. Heimenz, P. C., Lodge, T. P.: *Polymer Chemistry*, 2nd Ed.; CRC Press: Boca Raton, PI, 2007.
32. Hu, M.; Xia, Y.; McKenna, G. B.; Kornfield, J. A.; Grubbs, R. H. Linear Rheological Response of a Series of Densely Branched Brush Polymers. *Macromolecules* 2011, 44, 6935-6943.
33. Pakula, T.; Zhang, Y.; Matyjaszewski, K.; Lee, H.-i.; Boerner, H.; Qin, S.; Berry, G. C. Molecular Brushes as Super-soft Elastomers. *Polymer* 2006, 47, 7198-7206.
34. Dalsin, S. J.; Hillmyer, M. A.; Bates, F. S. Molecular Weight Dependence of Zero-Shear Viscosity in Atactic Polypropylene Bottlebrush Polymers. *ACS Macro Letters* 2014, 423-427.
35. Dalsin, S. J.; Hillmyer, M. A.; Bates, F. S. Linear Rheology of Polyolefin-Based Bottlebrush Polymers. *Macromolecules* 2015, 48, 4680-4691.

Example 2: ABA Triblock Brush Polymers: Synthesis, Self-Assembly, Conductivity, and Rheological Properties Abstract The synthesis, self-assembly, conductivity, and rheological properties of ABA triblock brush polymers (BBCPs) with grafted polystyrene (A block, $N_{PS}=21$) and poly(ethylene oxide) (B block, $N_{PEO}=45$) side-chains is described. Two backbone molecular weights ($N_A:N_B:N_A=11:78:11$ and 15:119:15) were investigated with lithium bis(trifluoromethylsulfonimide) (LiTFSI) doping ratios $2<[EO]:[Li^+]<20$. Blends with $2<[EO]:[Li^+]<10$ suppress PEO crystallization and self-assemble into hexagonally packed cylinders of the minority gPS component. Conductivity is on the order of $10^{-3}$ S/cm at 105° C. with a corresponding elastic modulus circa $10^4$ Pa. The optimum conductivity occurs at a blend ratio near 10:1 $[EO]:[Li^+]$, similar to that reported for linear block copolymer analogues.

Introduction

Lithium-ion batteries now pervade virtually all aspects of society, as evidenced by their extensive use in applications including personal computers, cell phones, automobiles, and spacecraft. These batteries display good performance across a range of temperatures (commonly 0-40° C.) in part due to their highly conductive liquid electrolyte, but suffer from accompanying safety issues associated with non-aqueous solvent flammability. As a consequence, theoretical energy density is ultimately sacrificed for safety in a practical commercial Li-ion battery design: a carbonaceous intercalation anode is typically used instead of higher capacity Li metal, as the metal itself exhibits significant dendrite growth upon repeated electrochemical cycling that leads to destructive cell shorting. Significant research efforts have thus been directed towards identifying non-flammable polymeric materials (polymer electrolyte membranes, "PEMs") to replace liquid electrolytes.[1] The ideal PEM exhibits high lithium ion conductivity and a sufficiently large modulus to inhibit dendrite formation. By far the most ubiquitous polymeric component is amorphous poly(ethylene oxide) (PEO), which dissolves lithium salts such as lithium perchlorate ($LiClO_4$) and lithium bis(trifluoromethylsulfonimide) (LiTFSI), enabling the movement of lithium cations by cooperative polymer segmental motion. Unfortunately, rubbery materials such as amorphous PEO lack the mechanical integrity necessary for use as PEMs, and the literature is consequently replete with strategies intended to improve PEM stiffness (e.g., copolymerization and/or cross-linking). With few exceptions,[2-3] conductivity and elastic modulus are generally inversely related; highly conductive materials are structurally weak (e.g. fluids), while stiff materials (e.g. polymer glasses) are practically non-conductive. This trade-off motivates the investigation of block copolymers (BCPs) as PEMs, which naturally decouple conductive domains from those providing mechanical support, facilitating independent optimization of both properties.[4]

Figure 9A:
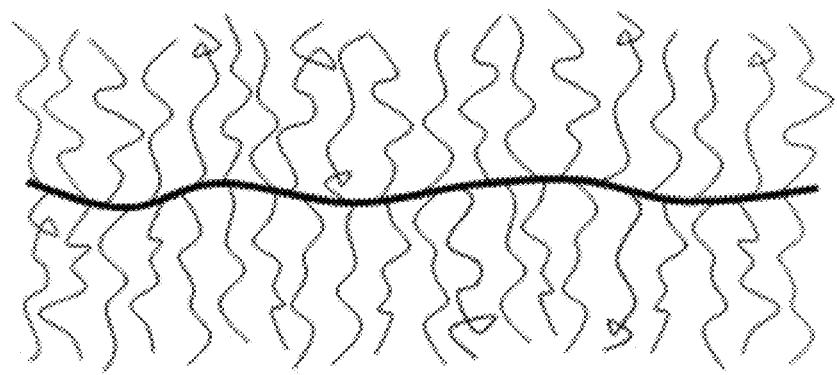
FIG. 9A: Illustration of the ABA triblock brush polymers reported herein. Black=polynorbornene, red=polystyrene, blue=poly(ethylene oxide).
Figure 9B:
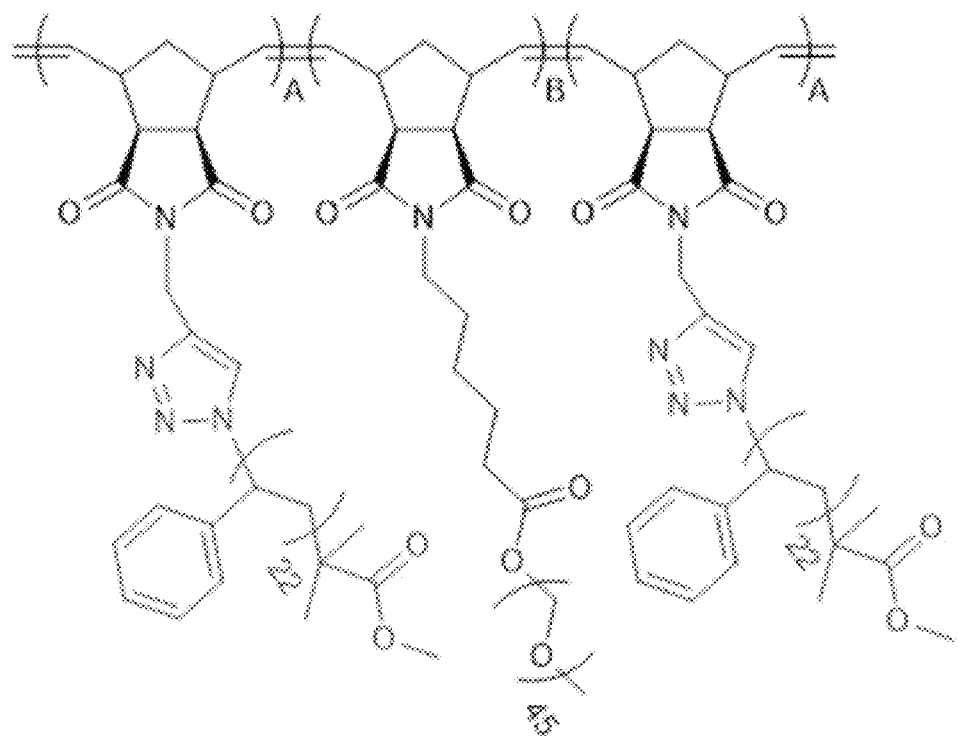
FIG. 9B: Chemical structure of gPS-gPEO-gPS.

Most BCPs studied to date for battery applications comprise linear architectures incorporating PEO integrally in the backbone, for instance poly(styrene-block-ethylene oxide) (PS-PEO),[5] poly(styrene-block-ethylene oxide-block-styrene) (PS-PEO-PS),[6] and poly(propylene-block-ethylene oxide-block-propylene) (PP-PEO-PP).[7] While other intra-chain connectivity has been well-studied with homopolymers and statistical copolymers,[8-12] literature on side-chain grafted BCPs remains limited to single-block functionalization[13-15] and dendrimers.[16] This paper describes poly[nor-bornene-graft-styrene)-block-(norbornene-graft-ethylene oxide)-block-(norbornene-graft-styrene)] (gPS-gPEO-gPS) ABA triblock brush copolymers (BBCPs, FIG. 9 synthesized via ring-opening metathesis polymerization (ROMP). In contrast to both "grafting from" and "grafting to" modification of polymer precursors, this "grafting through" polymerization of mono-functional "macromonomers" guarantees the production of brush polymers with 100% grafting density. Self-assembly, conductivity, and mechanical properties are investigated and compared to linear analogues.

Results and Discussion

Figure 17:
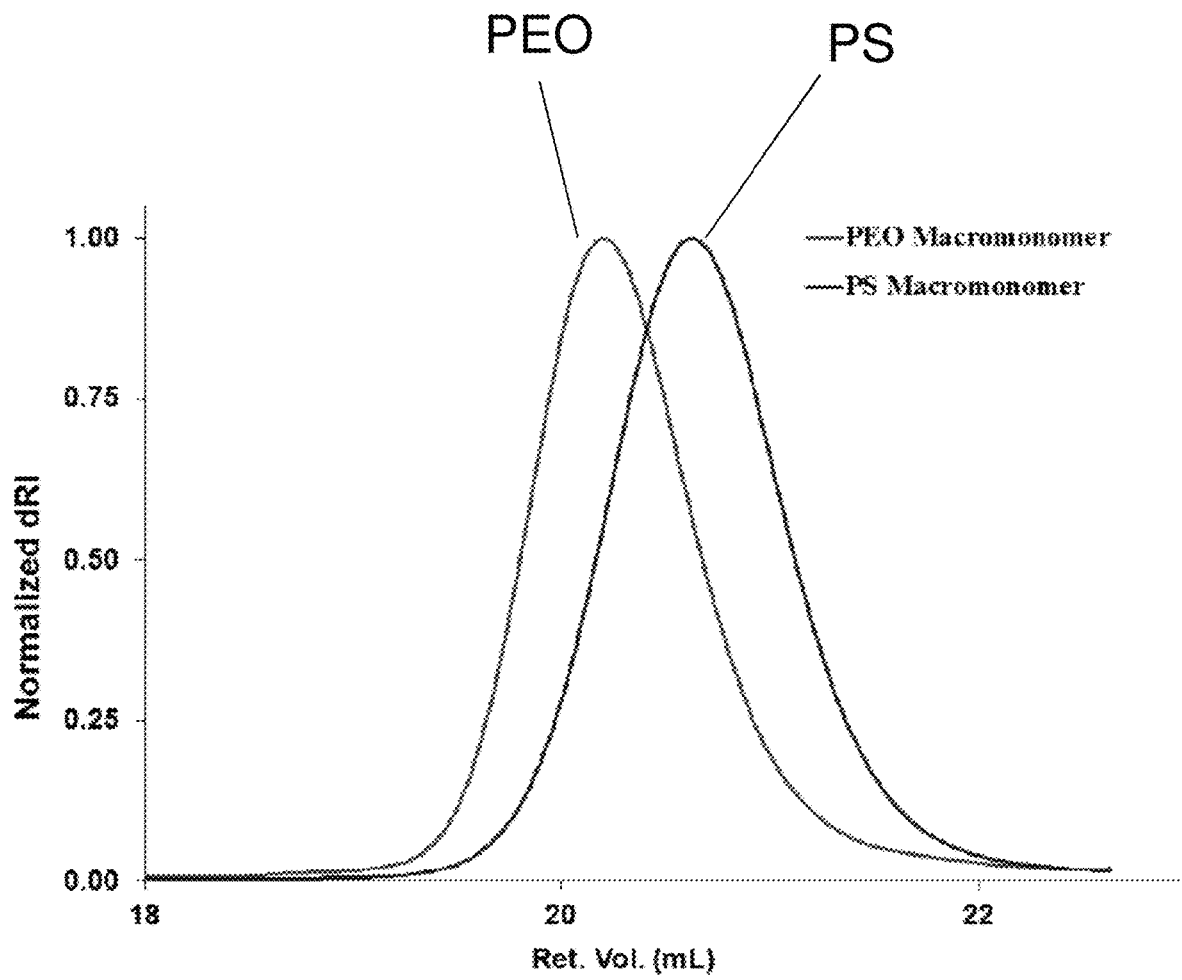
FIG. 17: Size exclusion chromatograms of polystyrene and poly(ethylene oxide) macromonomers. Mobile phase: THF with 1 vol % triethylamine.
Figure 18:
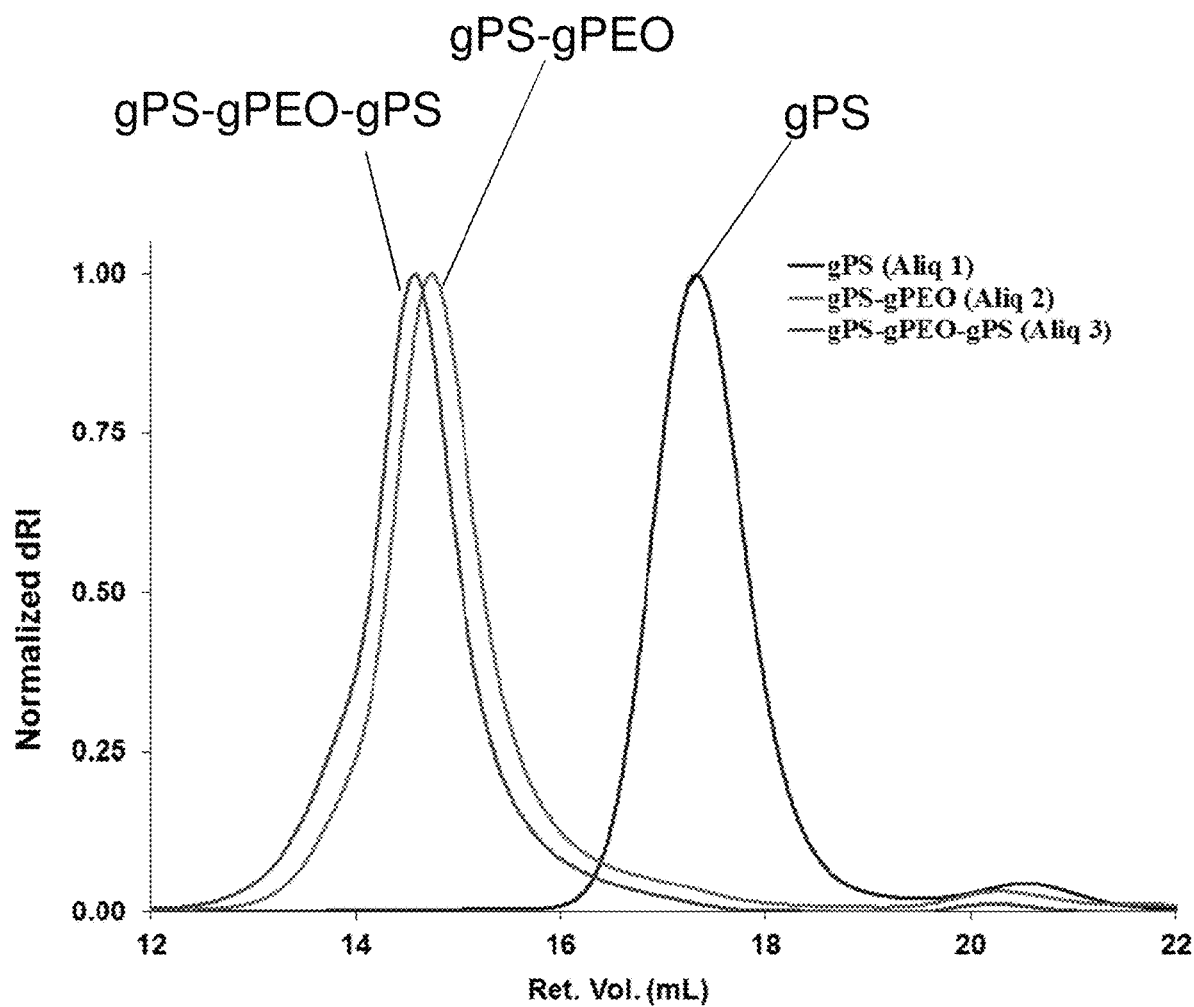
FIG. 18: Size exclusion chromatograms of $gPS_{11}$-$gPEO_{78}$-$gPS_{11}$ triblock brush polymer. Mobile phase: THF with 1 vol % triethylamine.
Figure 19:
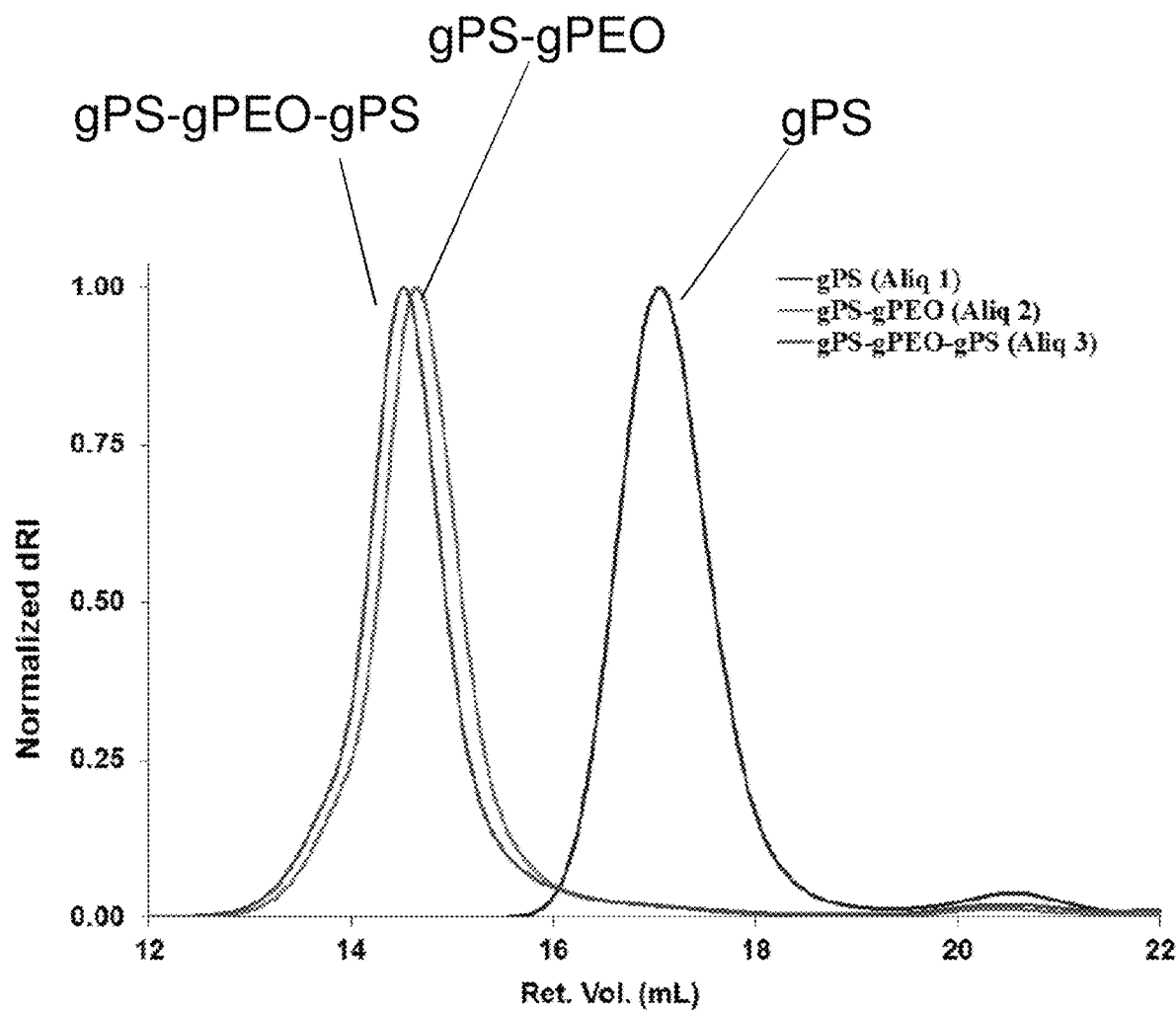
FIG. 19: Size exclusion chromatograms of $gPS_{15}$-$gPEO_{119}$-$gPS_{15}$ triblock brush polymer. Mobile phase: THF with 1 vol % triethylamine.
Figure 20:
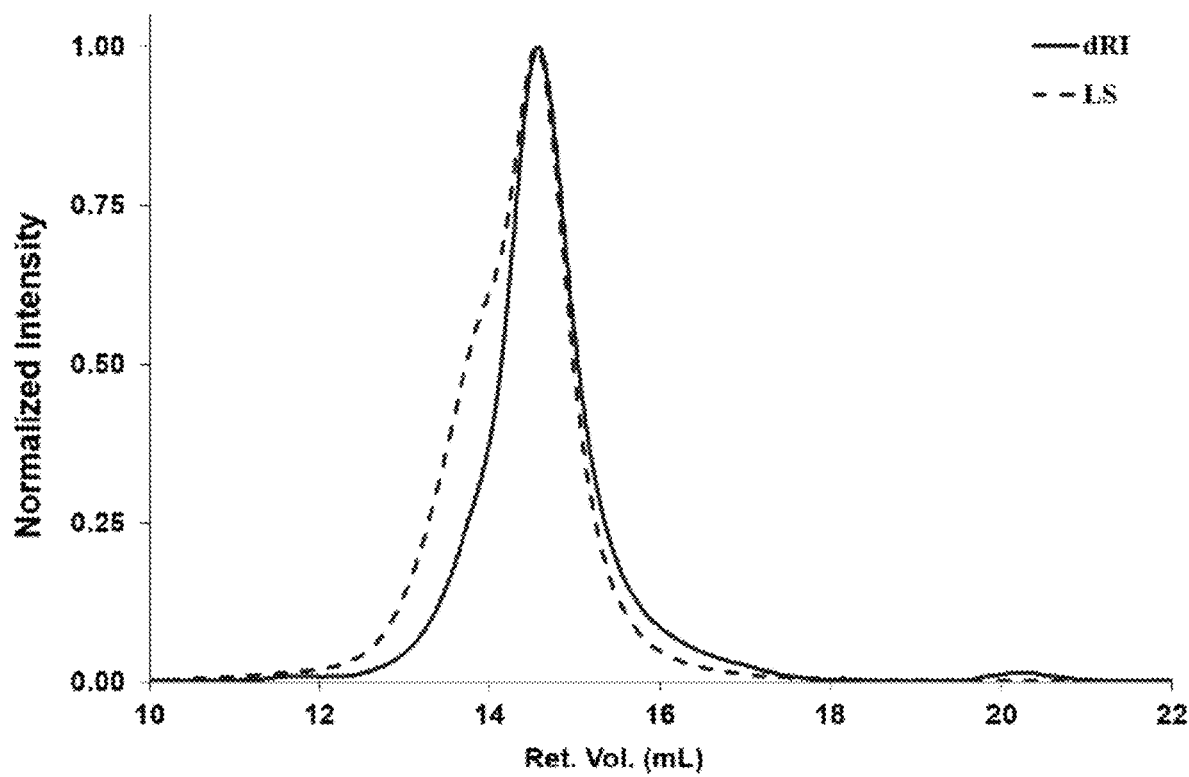
FIG. 20: Comparison of $gPS_{11}$-$gPEO_{78}$-$gPS_{11}$ differential refractive index (dRI) and light scattering (LS) SEC traces.
Figure 21:
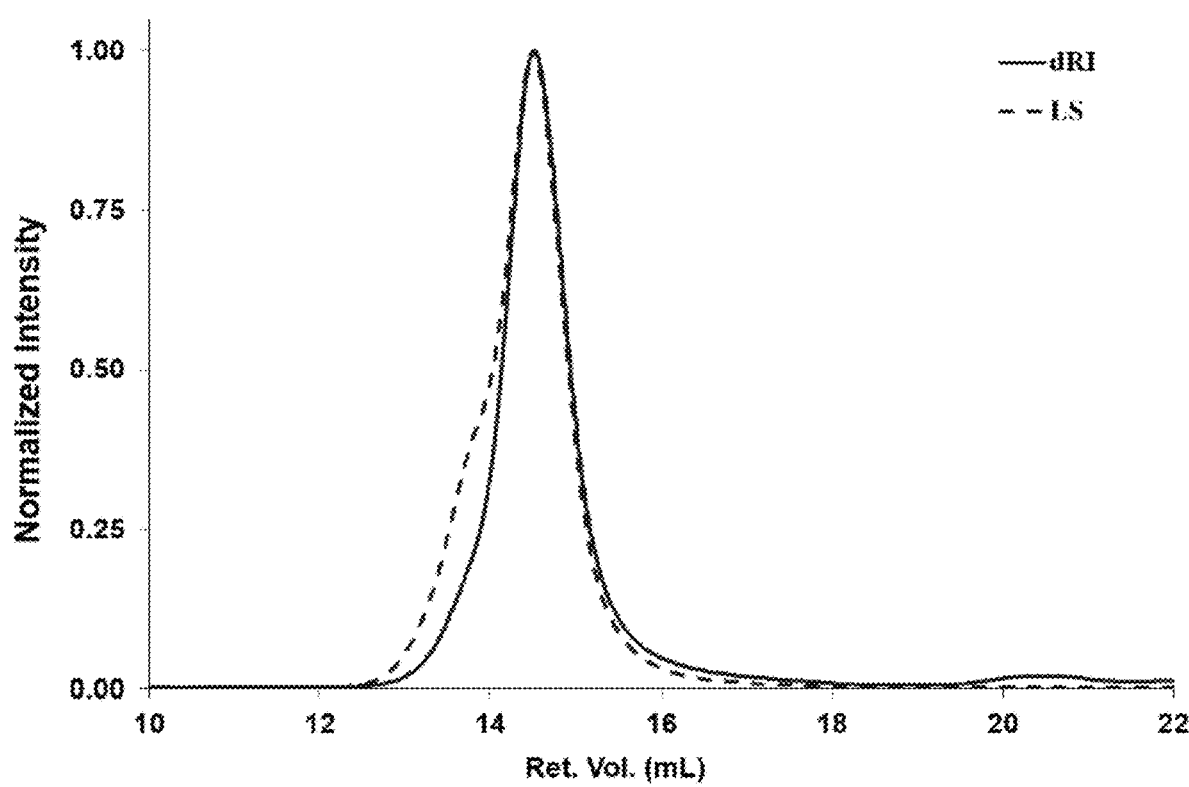
FIG. 21: Comparison of $gPS_{15}$-$gPEO_{119}$-$gPS_{15}$ differential refractive index (dRI) and light scattering (LS) SEC traces.

All BBCPs reported herein feature 1) 100% grafting density for all blocks, 2) controlled polynorbornene backbone and PS/PEO side-chain molecular weights, and 3) low molecular weight dispersities (Đ) for all components. Full BBCP synthetic details are provided in the Supporting Information. Briefly, polystyrene macromonomer ($M_n \approx 2500$ g/mol, $N_{PS}$=21) was synthesized using atom transfer radical polymerization with subsequent end-group functionalization to install a single norbornene moiety (Schemes S1-S5).[17] Commercially-available mono-methoxy PEO ($M_n \approx 2000$ g/mol, $N_{PEO}$=45) was end-functionalized with norbornene via EDC coupling (Schemes S6-S7). Macromonomer size exclusion chromatograms are provided in FIG. 17 and characterization data are summarized in Table S1. Sequential ROMP (Scheme S9) produced two ABA BBCPs with measured norbornene backbone degrees of polymerization $N_A$:$N_B$:$N_A$=11:78:11 ($gPS_{11}$-$gPEO_{78}$-$gPS_{11}$) and $N_A$:$N_B$:$N_A$=15:119:15 ($gPS_{15}$-$gPEO_{119}$-$gPS_{15}$). BBCP molecular weight data are summarized in FIGS. 18-22 and Tables S2-S4. The volume fractions $\varphi_{PEO}$ of $gPS_{11}$-$gPEO_{78}$-$gPS_{11}$ and $gPS_{15}$-$gPEO_{119}$-$gPS_{15}$ are approximately 0.75 and 0.77, respectively, using literature-reported densities for PS and PEO.[18] Additionally, gPEO brush homopolymers were synthesized (FIG. 23, Table S5) to directly compare with the two BBCPs.

BBCP/LiTFSI and gPEO brush homopolymer/LiTFSI blends were prepared with different component ratios (calculated as the average total number of ethylene oxide repeat units per polymer chain relative to the moles of LiTFSI). Differential scanning calorimetry (DSC, FIG. 10, FIGS. 24-27) reveals a regular change in PEO glass transition temperature ($T_{g-PEO}$) that shifts to higher temperature with increased LiTFSI loading for $gPS_{11}$-$gPEO_{78}$-$gPS_{11}$, gPS15-$gPEO_{119}$-$gPS_{15}$, and gPEO homopolymer (see Tables S6-S8). These data are consistent with a reduction in chain mobility due to polymer-ion interactions and transient crosslinking at high ionic contents. A marked suppression in PEO crystallization is observed for 2:1, 5:1, and 10:1 [EO]:[Li$^+$] ratios with both BBCPs. Ramp rates of 10 and 20° C./min are consistent with the trends reported in FIG. 10. Both $gPS_{11}$-$gPEO_{78}$-$gPS_{11}$ (15:1) and $gPS_{15}$-$gPEO_{119}$-$gPS_{15}$ (10:1) samples exhibit clear melting transitions after prolonged storage (circa 2 months) at room temperature, indicative of arrested crystallization kinetics; all other samples remain unchanged.

Since Li$^+$ diffusion usually occurs exclusively in amorphous PEO domains (i.e., not in crystalline domains), preventing crystallization is highly desirable for PEM applications. Various strategies have been described in an attempt to address this issue, including the use of lithium salt mixtures[19] and (meth)acrylates functionalized with low molecular weight oligo-PEO.[12, 15, 20-21] The 2 kDa PEO side chain ($N_{PEO} \approx 45$) brush polymer/Li blends described herein demonstrate a surprising tendency to avoid crystallization considering oligo-PEO acrylate derivatives with side chain degrees of polymerization $N_{PEO} \geq 7$ reportedly show incipient crystallization,[20] although in some cases Li$^+$ blends with $N_{PEO}$ up to 23 do not.[21] Additionally, a relatively small crystallinity gap between 6<[EO]:[Li$^+$]<12 exists for 4 kDa PEO/LiTFSI blends[22] compared to the BBCPs (c.f. FIG. 10, 2<[EO][Li$^+$]<10). DSC measurements performed on 2 kDa PEO homopolymer/LiTFSI blends (data not shown) are consistent with the crystallinity gap reported in FIG. 10, i.e. linear 2 kDa PEO homopolymer behaves equivalently to the gPEO brush block in the BBCPs. The lack of crystallinity over this range of Li$^+$ loadings highlights one advantage of using the brush architecture: high molecular weight polymers (large $N_A$, $N_B$) synthesized with low molecular weight grafted PEO side-chains ($N_{PEO}$) inherently minimize crystallization, since crystallinity generally increases with PEO molecular weight and evidently not main chain (polynorbornene) molecular weight. Although not directly observed in the present study, polymer architecture may also contribute to the kinetic phenomena underlying BBCP crystallization behavior.[23] For example, bulk experiments on brush poly(L-lactide) (PLLA) homopolymer reveal an Avrami exponent (n) approaching 2 (in contrast to linear PLLA where n≈4), implying considerably slower crystallization and a lower equilibrium melting temperature (indicative of increased crystal imperfection), both attributable to the brush architecture.[24] Marrying the graft and block architectures thus combines the advantages of crystallization suppression with decoupled conductive and mechanical properties (vide infra).

Figure 10A:
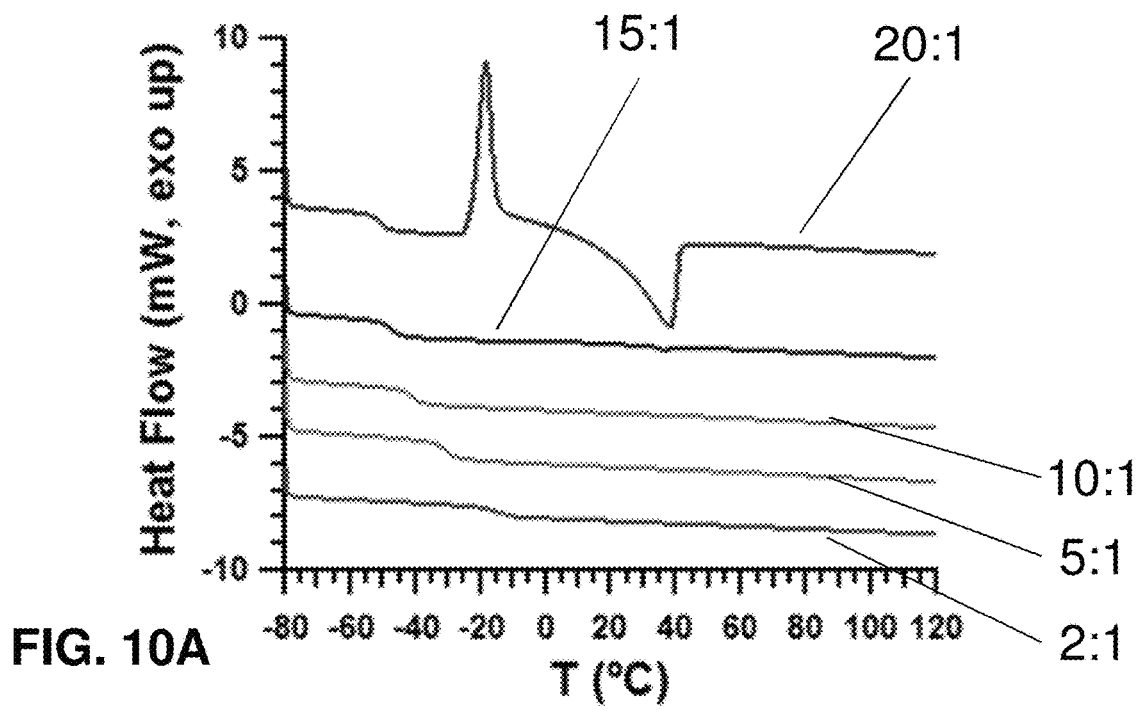
FIG. 10A-10B: BBCP DSC data as a function of LiTFSI loading.
Figure 10B:
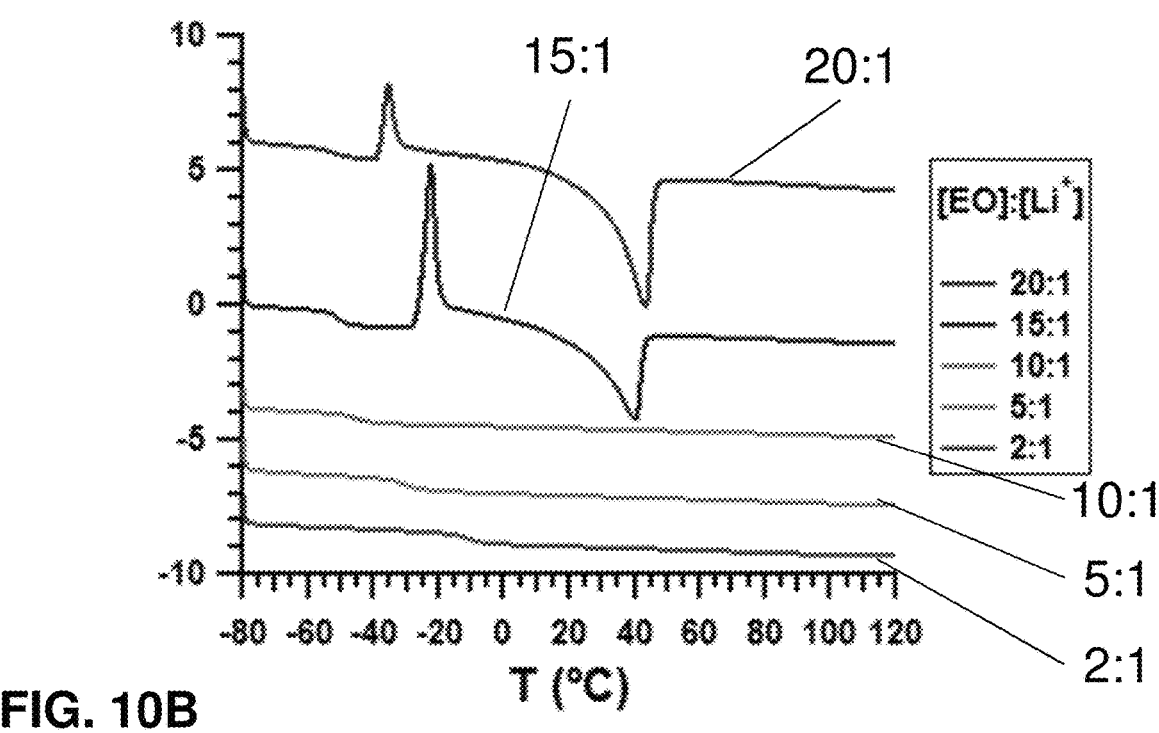
Figure 11A:
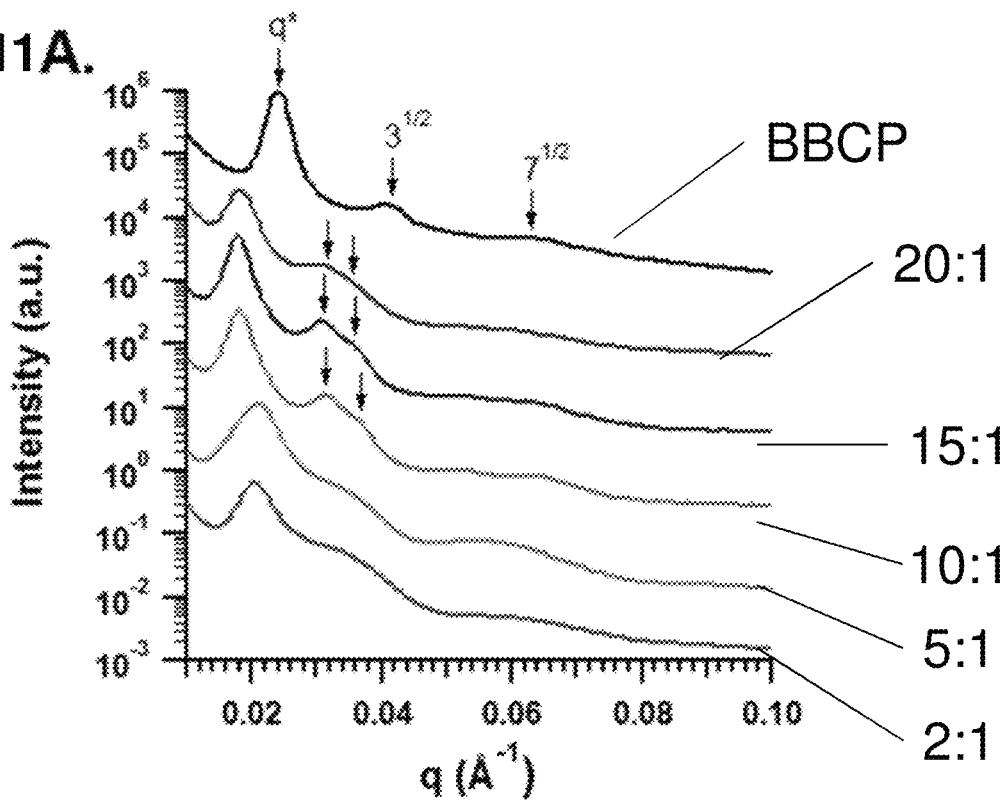
FIGS. 11A-11B: Synchrotron SAXS data of FIG. 11A) $gPS_{11}$-$gPEO_{78}$-$gPS_{11}$ and FIG. 11B) $gPS_{15}$-$gPEO_{119}$-$gPS_{15}$. The unmarked arrows correspond to $3^{1/2}q^*$ (left) and $2q^*$ (right) peak positions. Samples were prepared in a dry room and sealed hermetically. Curves are shifted vertically for clarity.
Figure 11B:
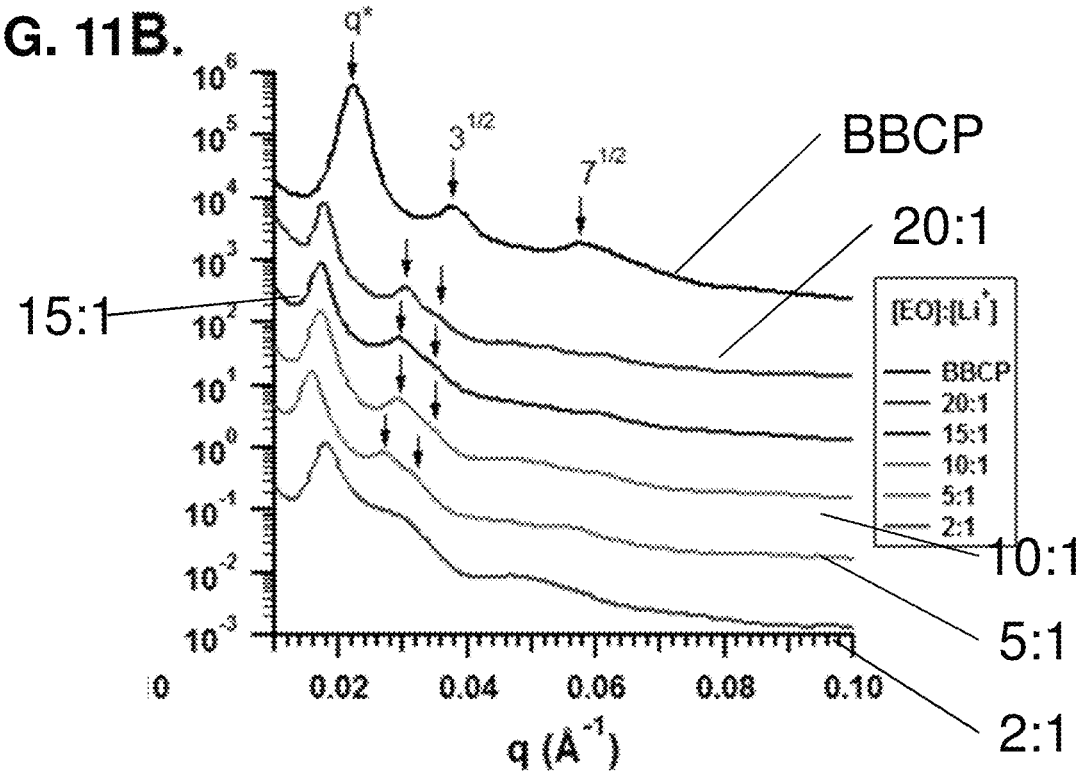
Figure 15:
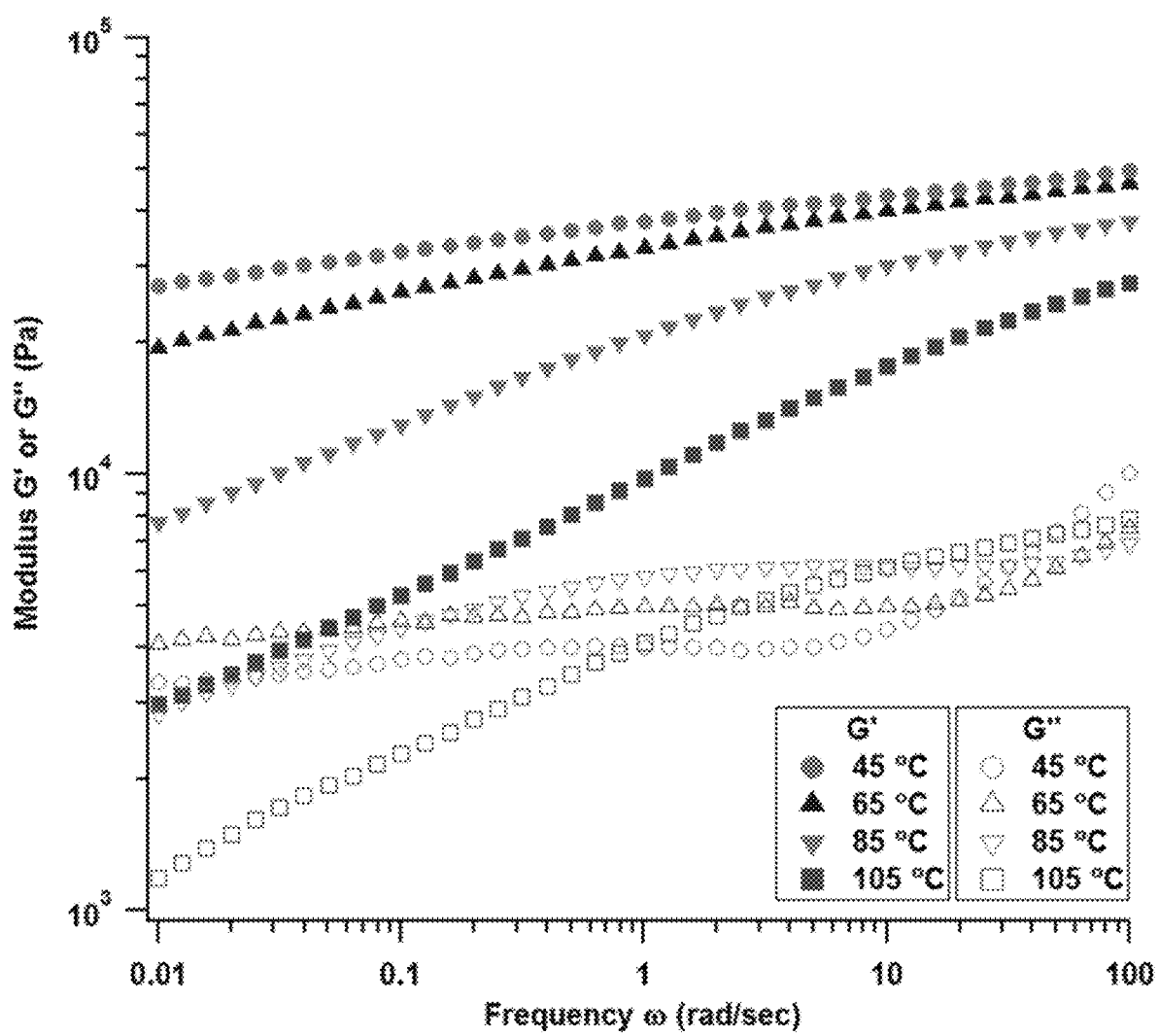
FIG. 15: Storage (G') and loss (G") moduli of $gPS_{11}$-$gPEO_{78}$-$gPS_{11}$ as a function of temperature and frequency.
Figure 16:
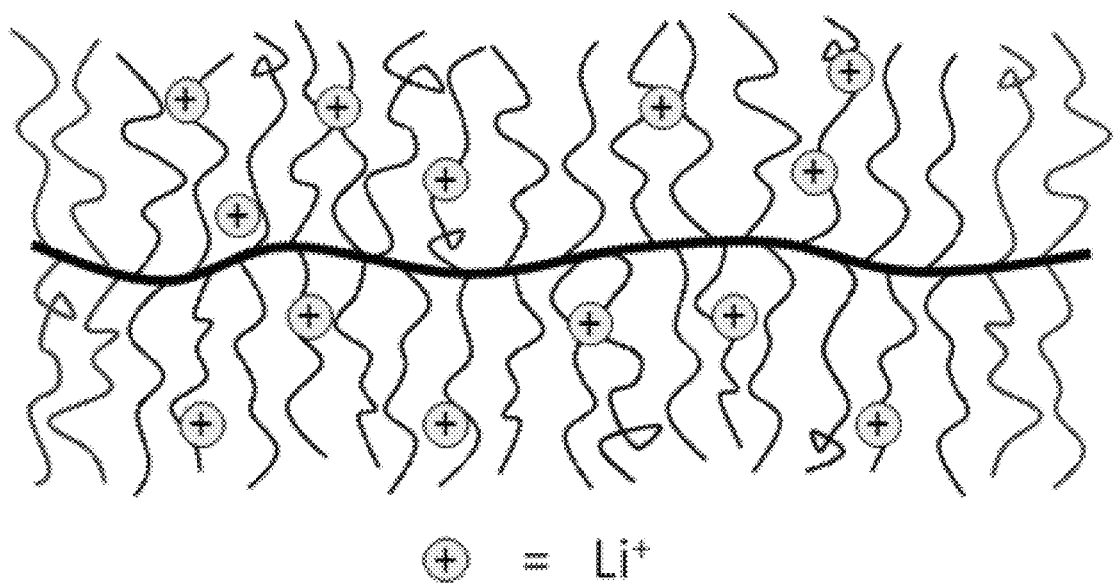
FIG. 16: provides a schematic diagram illustrating the distribution of lithium ions within a brush block copolymer of the present invention having ionophobic and ionophilic blocks.
Figure 28:
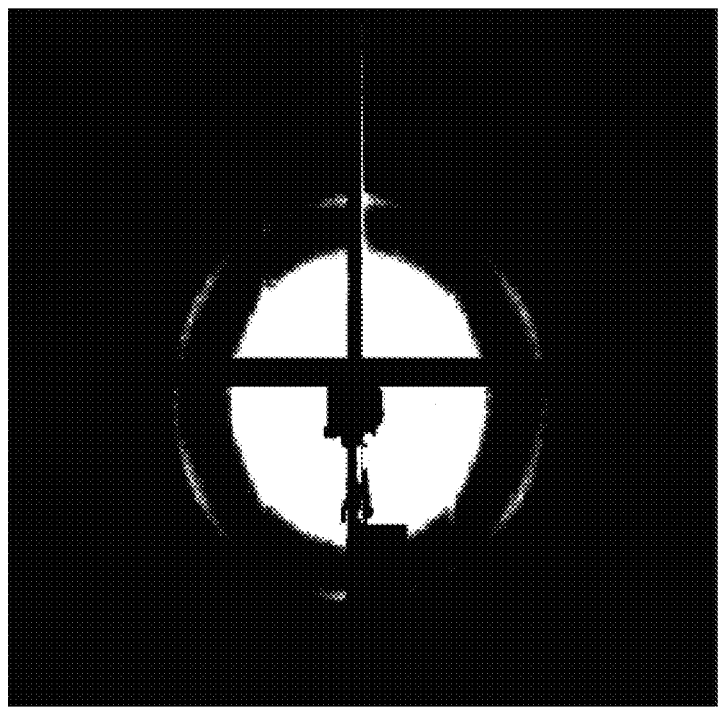
FIG. 28: 2-dimentional SAXS pattern of $gPS_{15}$-$gPEO_{119}$-$gPS_{15}$ annealed under compression at 120° C. for 2 hours between Kapton.

Azimuthally integrated one-dimensional synchrotron small angle X-ray scattering (SAXS) data of $gPS_{11}$-$gPEO_{78}$-$gPS_{11}$ and $gPS_{15}$-$gPEO_{119}$-$gPS_{15}$ annealed at 120° C. are presented in FIG. 11 and summarized in Tables S9-S10. Both neat BBCPs exhibit Bragg reflections at approximate peak positions q*, $3^{1/2}$q*, and $7^{1/2}$q*, consistent with hexagonal cylinders (HEX) of the minority gPS block. Additionally, the two-dimensional pattern for $gPS_{15}$-$gPEO_{119}$-$gPS_{15}$ clearly shows six-fold symmetry FIG. 28, thus reinforcing the HEX assignment. Lithium blends between 10:1-20:1 [EO]:[Li$^+$] ($gPS_{11}$-$gPEO_{78}$-$gPS_{11}$) and 5:1-20:1 [EO]:[Li$^+$] ($gPS_{15}$-$gPEO_{119}$-$gPS_{15}$) are also consistent with the HEX morphology, where the unlabeled arrows in FIG. 11 mark Bragg reflections $3^{1/2}$q* and 2q*. The domain spacing increases in samples doped with LiTFSI, presumably due to an increase in segregation strength derived from an increase in the block-block interaction parameter χ. This effect appears to saturate at high ionic contents for $gPS_{11}$-$gPEO_{78}$-$gPS_{11}$ (c.f. FIG. 11(A), 15:1 and 10:1 blends). The interplay between ionic content, segregation strength, χ, and domain spacing remains poorly understood, even for linear symmetric diblocks.[25] The absence of well-defined higher-order reflections for the remaining blends with high Li$^+$ content precludes definitive morphological assignment based on scattering alone. These blends exhibit some order as evidenced by a relatively sharp primary peak. Possible form factor scattering at high q is suggestive of a morphological change into disordered spheres, which may account for the relative increase in q* (c.f. FIG. 11(A), 10:1 vs. 5:1 and FIG. 11(B), 5:1 vs. 2:1).

Figure 12A:
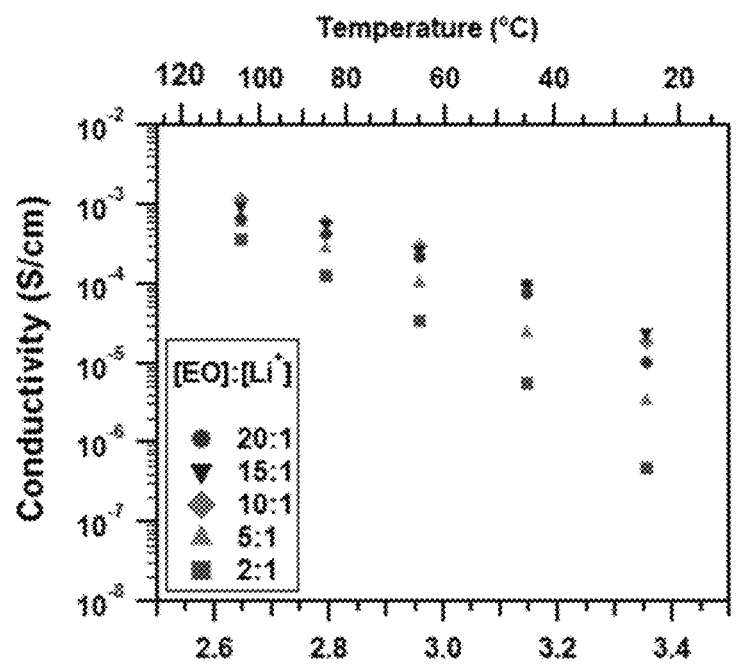
FIGS. 12A-12B: Ionic conductivity as a function of [EO]:[Li$^+$].
Figure 12B:
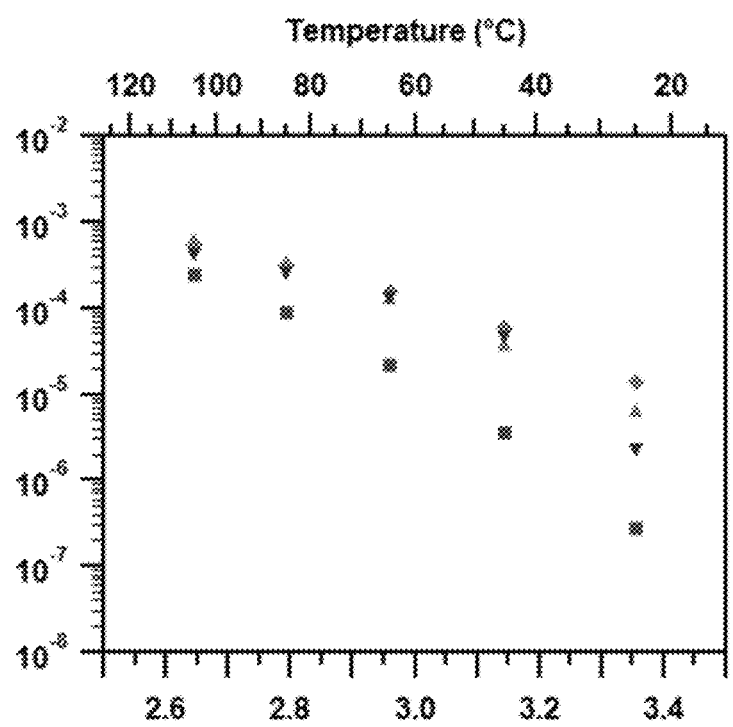
Figure 13A:
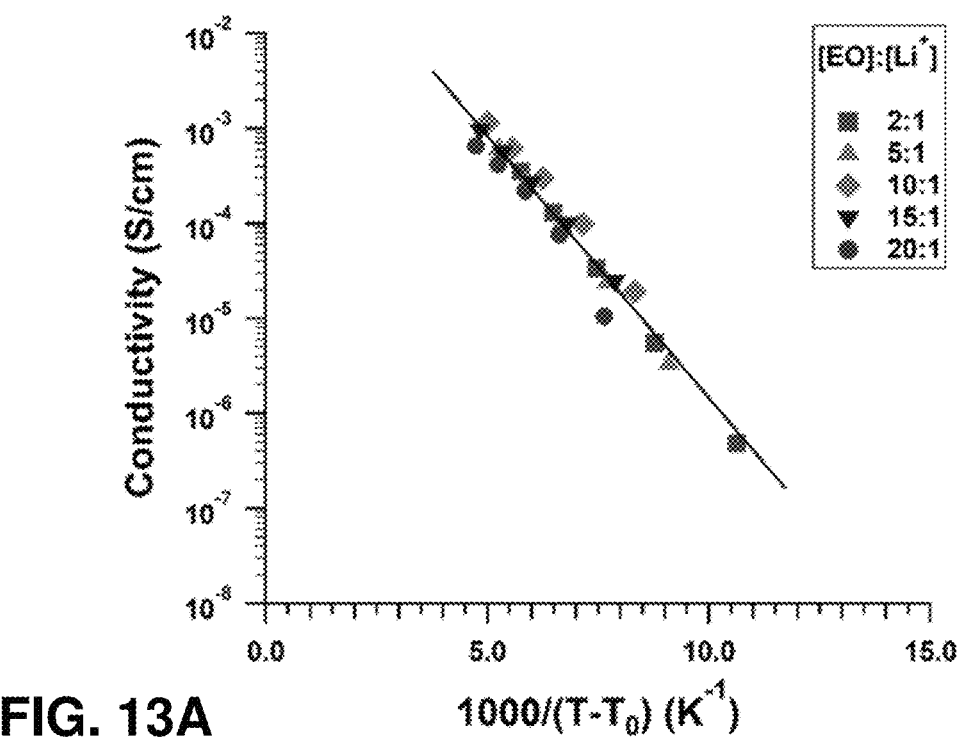
FIGS. 13A-13B: Ionic conductivities from FIG. 4 replotted with $1000/(T-T_0)$ as the abscissa.
Figure 13B:
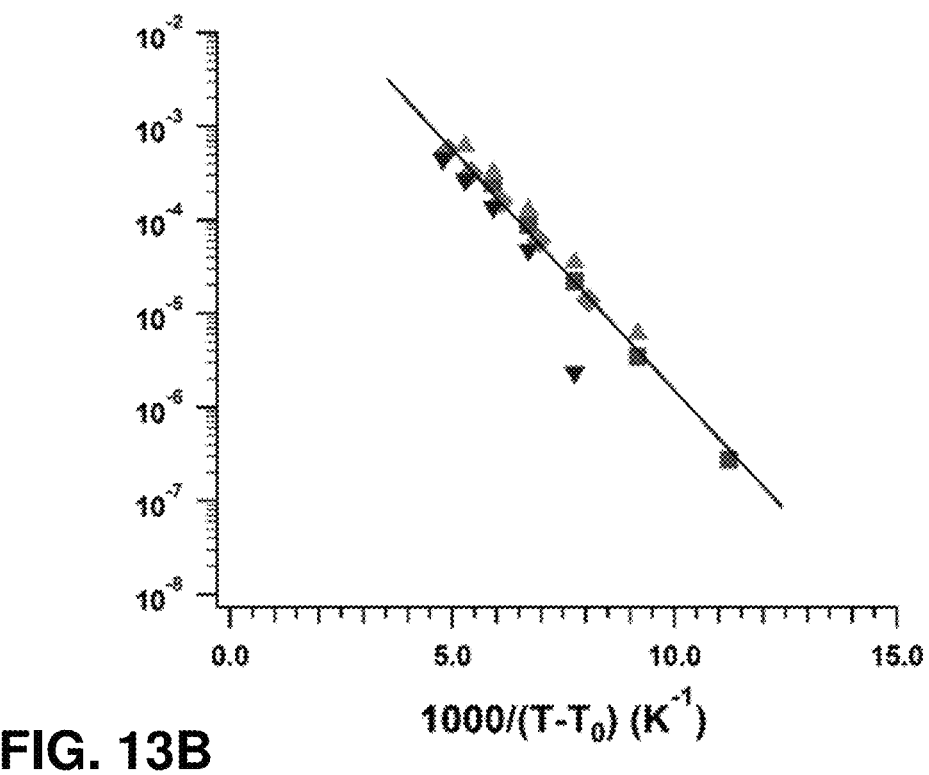

AC impedance spectroscopy was used to measure BBCP ionic conductivity on heating as a function of [EO]:[Li$^+$] doping ratio (FIG. 12). All sample preparation was performed in a dry room to prevent moisture contamination (see Supporting Information for details). Conductivity is highest with moderate blend ratios (≈10:1). At low Li$^+$ loadings, conductivity increases with Li$^+$ doping as the number of charge carriers rises, but decreases at high [Li$^+$], consistent with saturation of ethylene oxide binding motifs and an associated reduction in chain mobility due to transient ionic cross-linking. The Arrhenius-type plot in FIG. 12 yields non-linear behavior as expected for systems in which conductivity is coupled to polymer chain relaxation. FIG. 13 re-plots the conductivities versus $(T-T_0)^{-1}$; the data at high temperature follow a linear trend consistent with the Vogel-Fulcher-Tammann (VFT) equation (Eq. 1), where σ is the conductivity, $\sigma_0$ is a constant pre-factor, B is a pseudo-activation energy, and the reference temperature $T_0$ characterizes the temperature at which relaxation times become effectively infinite, herein defined as $T_0=T_g-50$.

$$\sigma = \sigma_0 e^{\frac{-B}{T-T_0}}$$ Eq. 1

Figure 29:
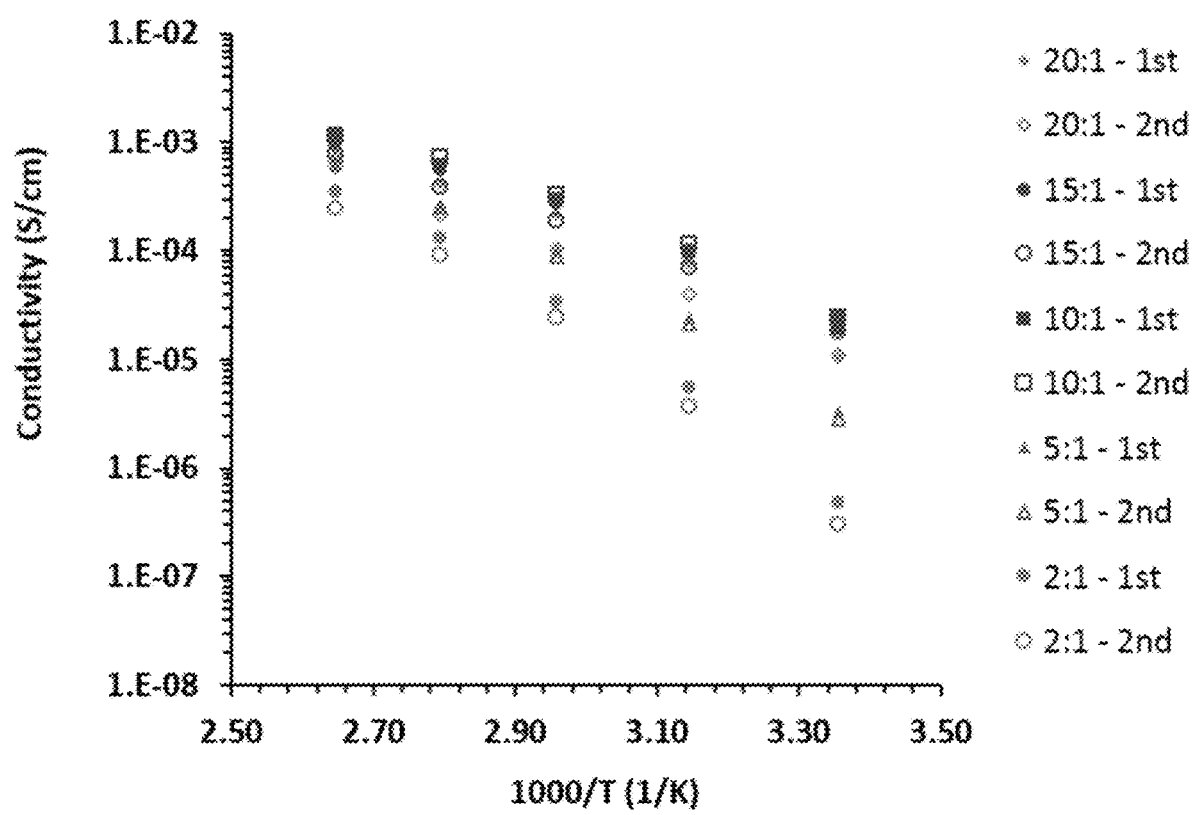
FIG. 29: Reproducibility of $gPS_{11}$-$gPEO_{78}$-$gPS_{11}$ conductivity measurements. The 20:1, 15:1, 5:1, and 2:1 datasets correspond to two physically different coin cells, while the 10:1 data represent the same coin cell measured on two separate heating cycles.
Figure 30:
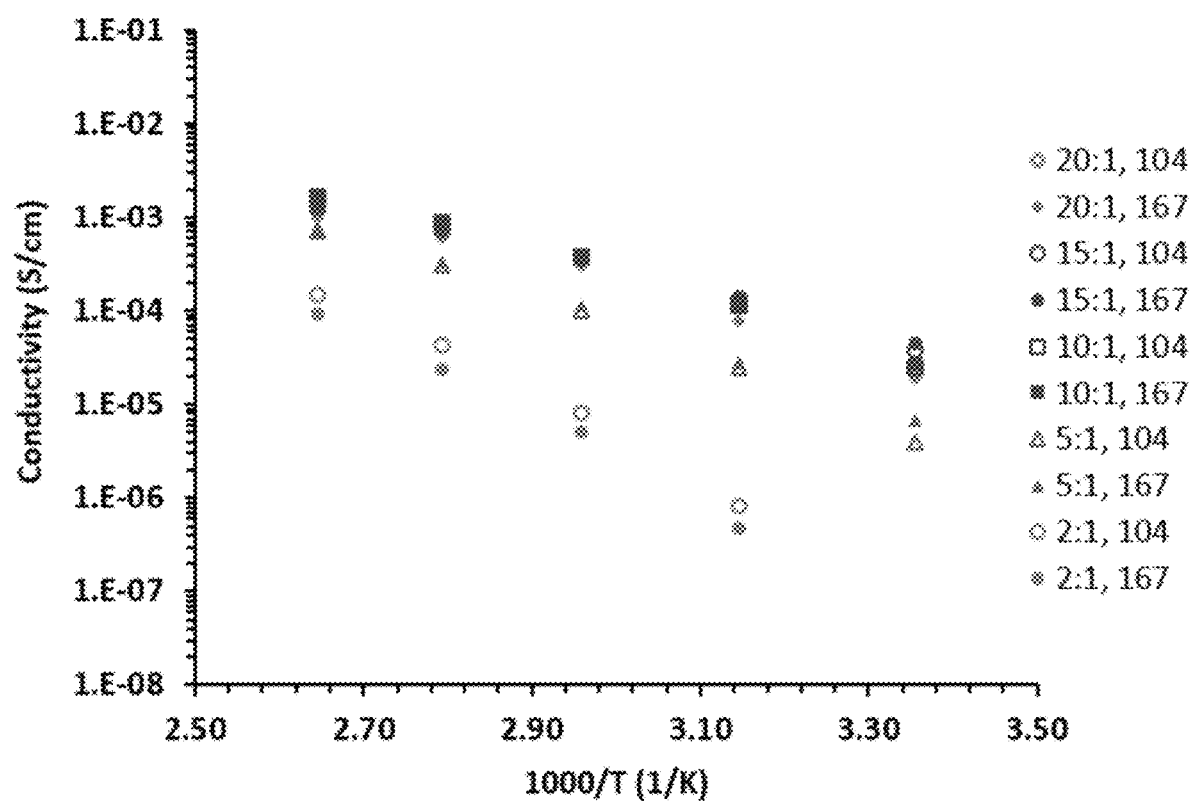
FIG. 30: Comparison of gPEO brush homopolymer conductivity data, N=104 and 167.

Since Li$^+$ conductivity requires cooperative PEO segmental motion,[26] the fractional free volume dictates the conductivity, which depends not on the temperature T but the effective thermal distance from the reference temperature $(T-T_0)$. The high temperature conductivity data consequently follow a linear trend when plotted versus inverse shifted temperature. Furthermore, the equivalent temperature dependence of the conductivity for each blend results in a similar slope for all samples when plotted in FIG. 13. In principle, the data sets should actually collapse onto a single master line since all samples at a given $T-T_0$ contain equivalent free volumes; the relatively small deviation from this expected trend may reflect experimental uncertainty, although measured consistency was in general good (FIGS. 29-30). Interestingly, Wang et al.[14] observed Arrhenius behavior over the same temperature range with poly[styrene-block-(styrene-graft-ethylene oxide)-block-styrene] produced by grafting-from polymerization, a difference possibly related to architecture or grafting density effects.

Figure 31:
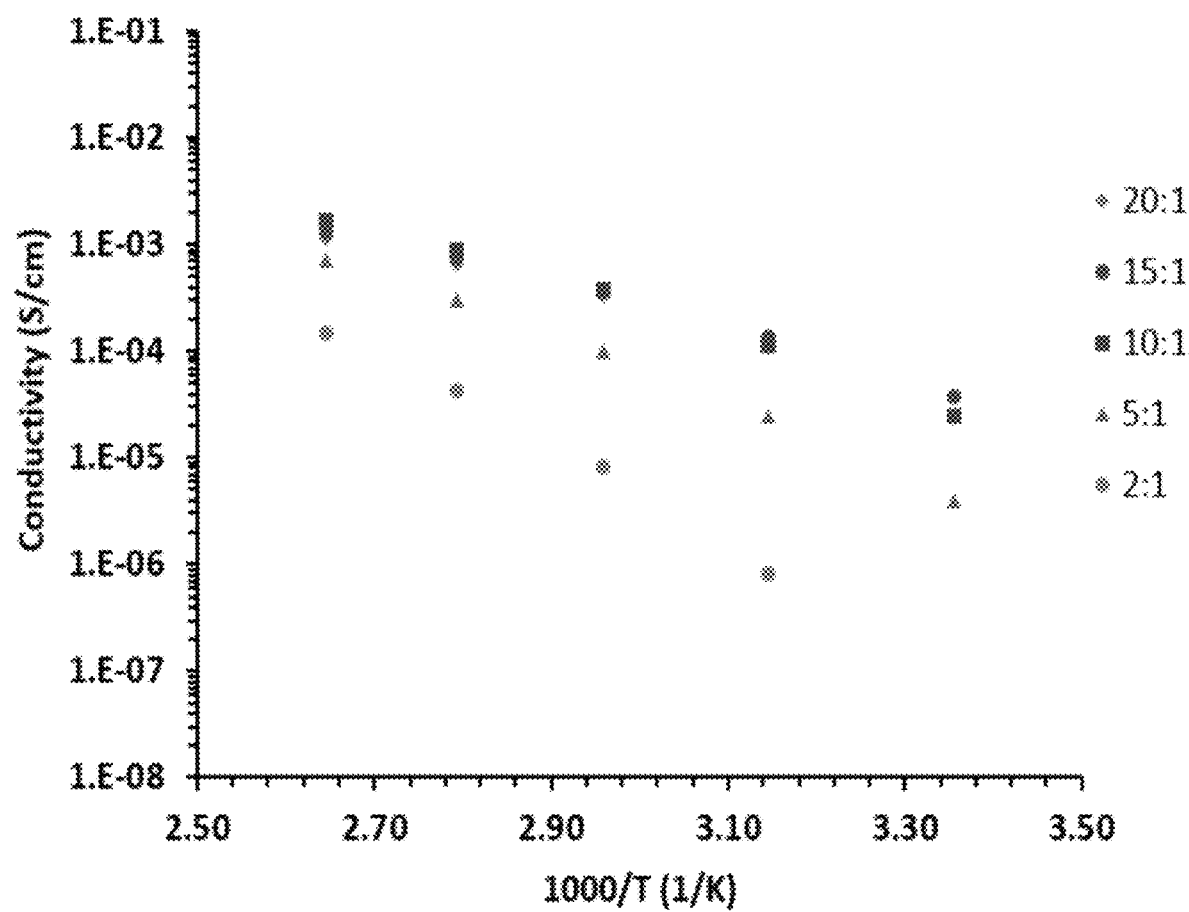
FIG. 31: Measured gPEO brush homopolymer conductivity data, N=104.
Figure 32:
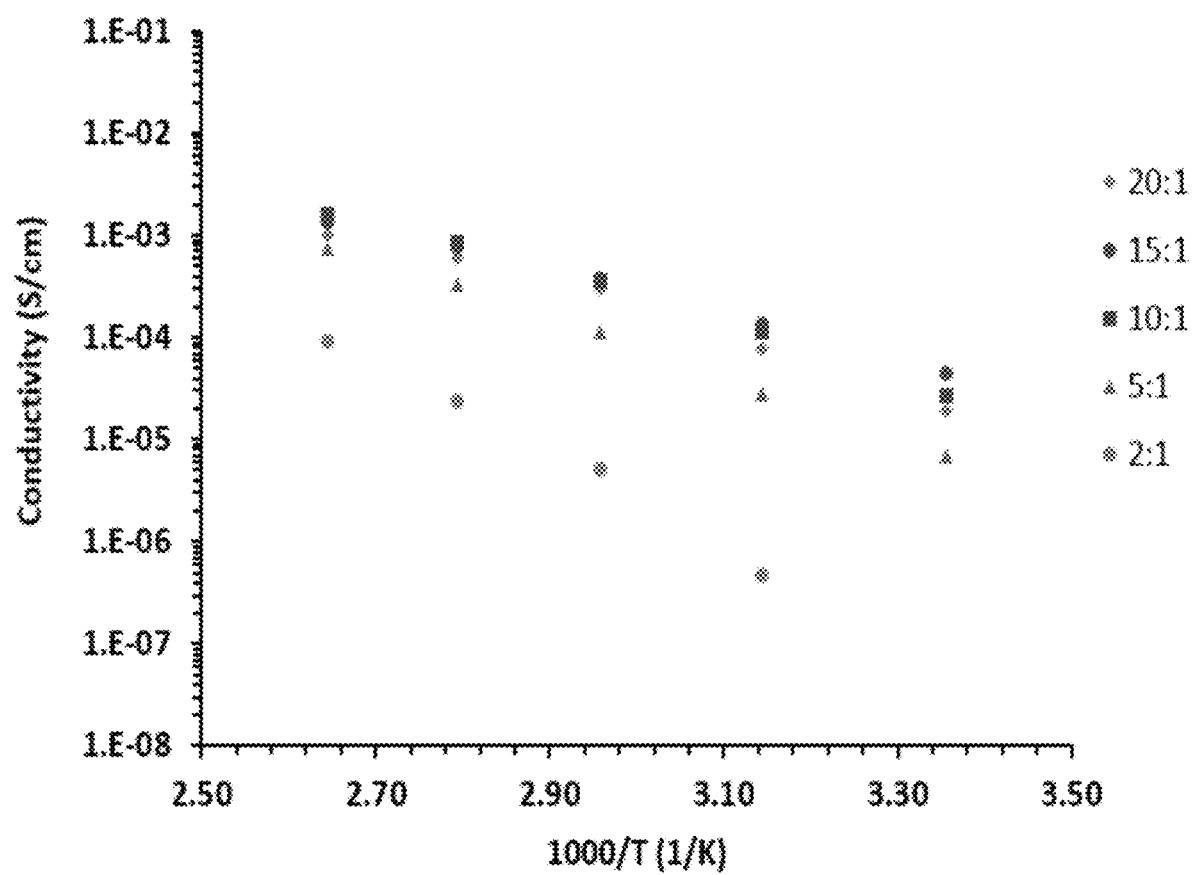
FIG. 32: Measured gPEO brush homopolymer conductivity data, N=167.

The BBCPs described herein demonstrate similar or moderately higher conductivity than lithium-doped linear PEO-containing block copolymers such as PS-PEO,[27] PS-PEO-PS,[6] and PP-PEO-PP.[7] The comparable conductivity, especially at such low PEO molecular weights, is perhaps surprising since the brush architecture effectively dilutes the volume fraction of the conducting PEO domain with norbornene end groups (in the case of gPS$_{11}$-gPEO$_{78}$-gPS$_{11}$ by about 10%), a consideration that has previously been assumed to decrease conductivity.[4] This dilution effect is likely counterbalanced by a variety of architecture-induced contributions, including low entanglement,[28] an altered lithium ion distribution in the PEO domain,[29] chain end effects,[30] ionic interactions,[31] and/or conductive domain grain size.[32] The conductivity of BBCPs appears to decrease with increasing $N_B$, the degree of polymerization of the gPEO block norbornene backbone (c.f. FIGS. 12(A) and 12(B)), in stark contrast to linear PEO-containing block copolymers, which exhibit a dramatic increase in conductivity as $N_{PEO}$ is increased.[5, 27] Conventional reasoning applied to linear BCPs invokes a zone with minimal diffusivity[29-30] in proximity to the block-block interface, yielding improvements in conductivity only as the relative fraction of PEO moieties within the PEO domain that are situated far from the interface increases. In linear BCPs, this occurs at large molecular weights since domain spacing D~$N^\alpha$, with α on order 0.66, while the interfacial thickness approaches a constant value. If this situation were the primary factor governing the conductivity of the gPS-gPEO-gPS BBCPs, one would expect an even stronger molecular weight dependence; the rigid nature of densely-grafted brush block copolymers trends a towards 1.[33] In contrast to BCPs, ion diffusivity in linear homopolymers is controlled by chain-ends, which decrease in concentration with increasing molecular weight. Conductivity measurements on gPEO homopolymers (FIGS. 30-32) reveal negligible molecular weight dependence at moderate Li$^+$ loadings, consistent with a constant concentration of PEO chain ends irrespective of polynorbornene backbone molecular weight. The physical mechanism underpinning the unexpected dependence of BBCP conductivity on molecular weight remains unclear at this time; we postpone further speculation in hopes that additional insight will be gleaned from theory in due time.

Figure 14:
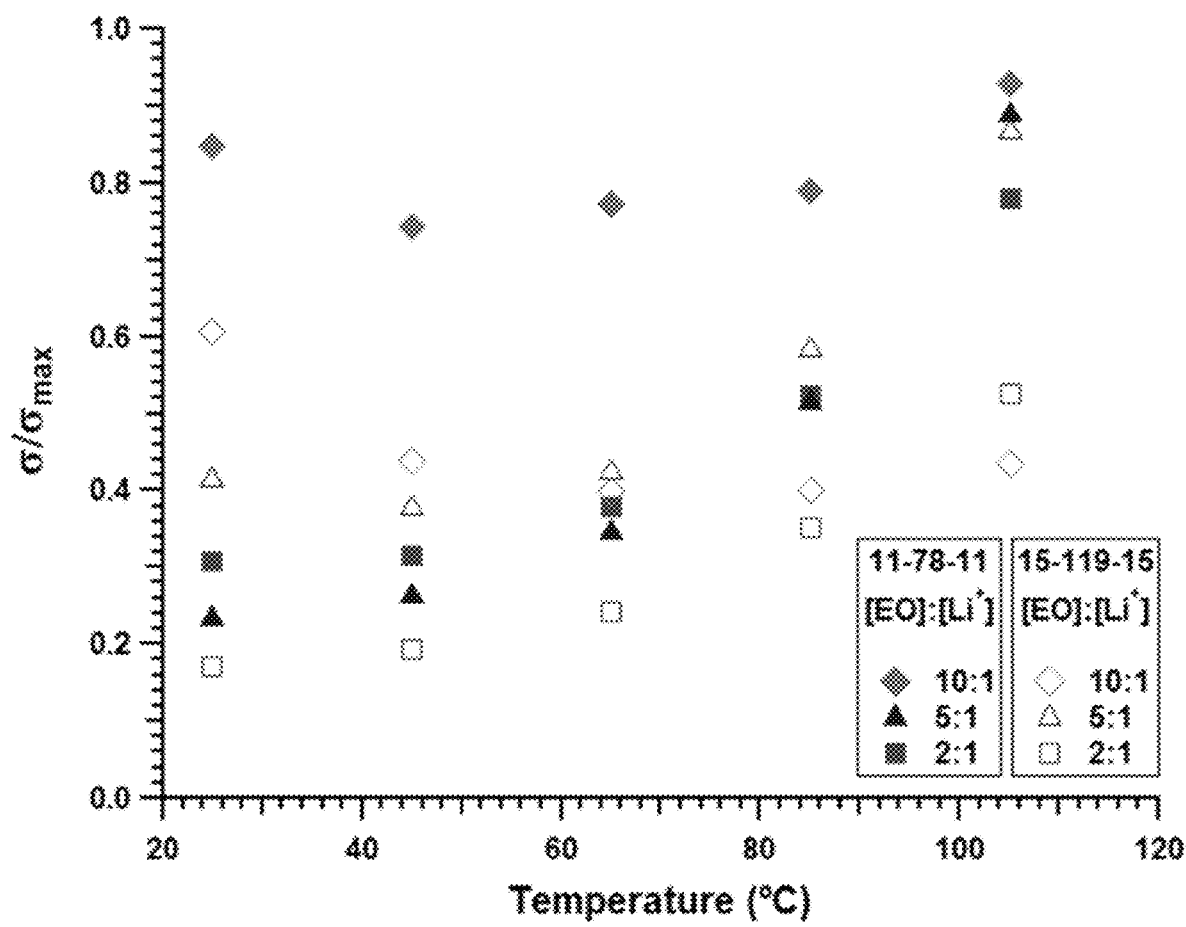
FIG. 14: Normalized ionic conductivity for BBCP/LiTFSI blends relative to linear 300 kDa PEO.
Figure 33:
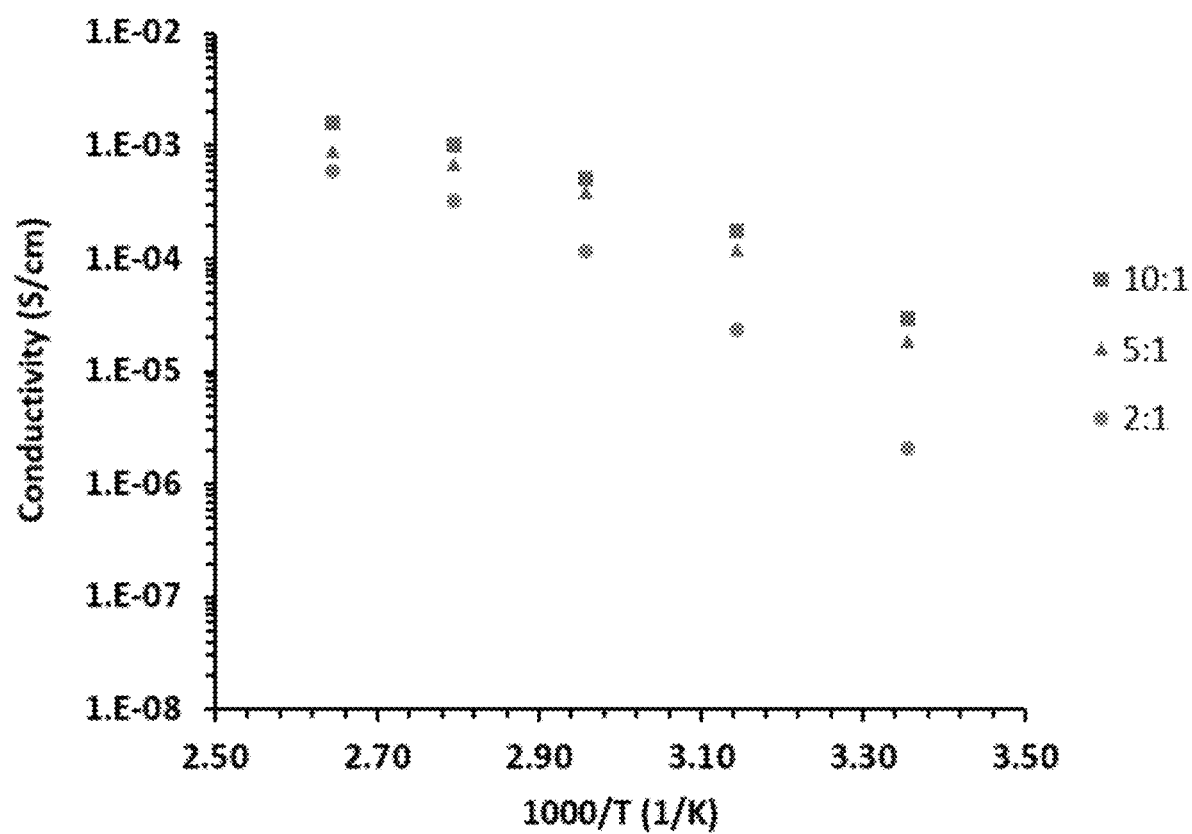
FIG. 33: Measured linear 300 kDa PEO homopolymer conductivity data.

FIG. 14 plots normalized conductivity ($\sigma/\sigma_{max}$, relative to linear 300 kDa PEO) versus temperature for 10:1, 5:1, and 2:1 [EO]:[Li$^+$] blends. The maximum conductivity ($\sigma_{max}$) is defined analogous to previous reports[5] as the measured conductivity of linear PEO homopolymer ($\sigma_{PEO}$, FIG. 33) moderated by the volume fraction of PEO in the BBCP ($\varphi_{PEO}$) and a morphology factor (0<f<1) related to the continuity of the conducting phase.

$$\sigma_{max}=f\varphi_{PEO}\sigma_{PEO}$$ Eq. 2

The continuous PEO domains within both BBCPs (see SAXS data in FIG. 11 dictate f=1.[1] All of the normalized conductivities in FIG. 14 are remarkably large for 2 kDa PEO chains. (Normalization with literature-reported[22] ≈4 kDa linear PEO conductivities yields a 50% reduction in $\sigma/\sigma_{max}$ and the same overall conclusion.) Comparable linear PS-PEO normalized ionic conductivity[27, 34] is <0.1 and reaches 0.3 only at $M_{PEO}\approx40$ kDa;[0.5] the values calculated herein are more reminiscent of ultra-low molecular weight disordered PS-PEO diblocks.[35] Normalized conductivity values approaching one suggest differences between graft and linear BCP architectures involving Li$^+$ ion diffusion, with the former more closely mimicking PEO homopolymer. Normalization to gPEO brush homopolymers (FIG. 34) yields similarly large $\sigma/\sigma_{max}$ values.

Figure 35:
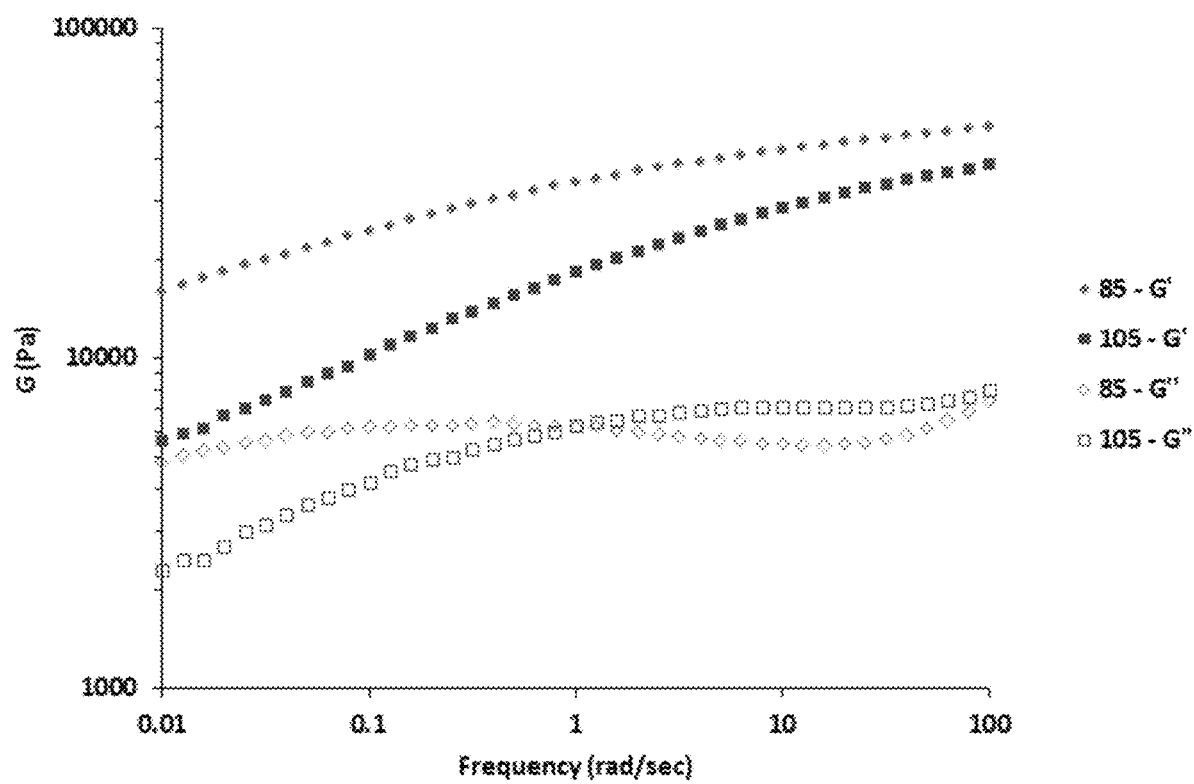
FIG. 35: Storage and loss moduli of $gPS_{15}$-$gPEO_{119}$-$gPS_{15}$ as a function of temperature and frequency.
Figure 36:
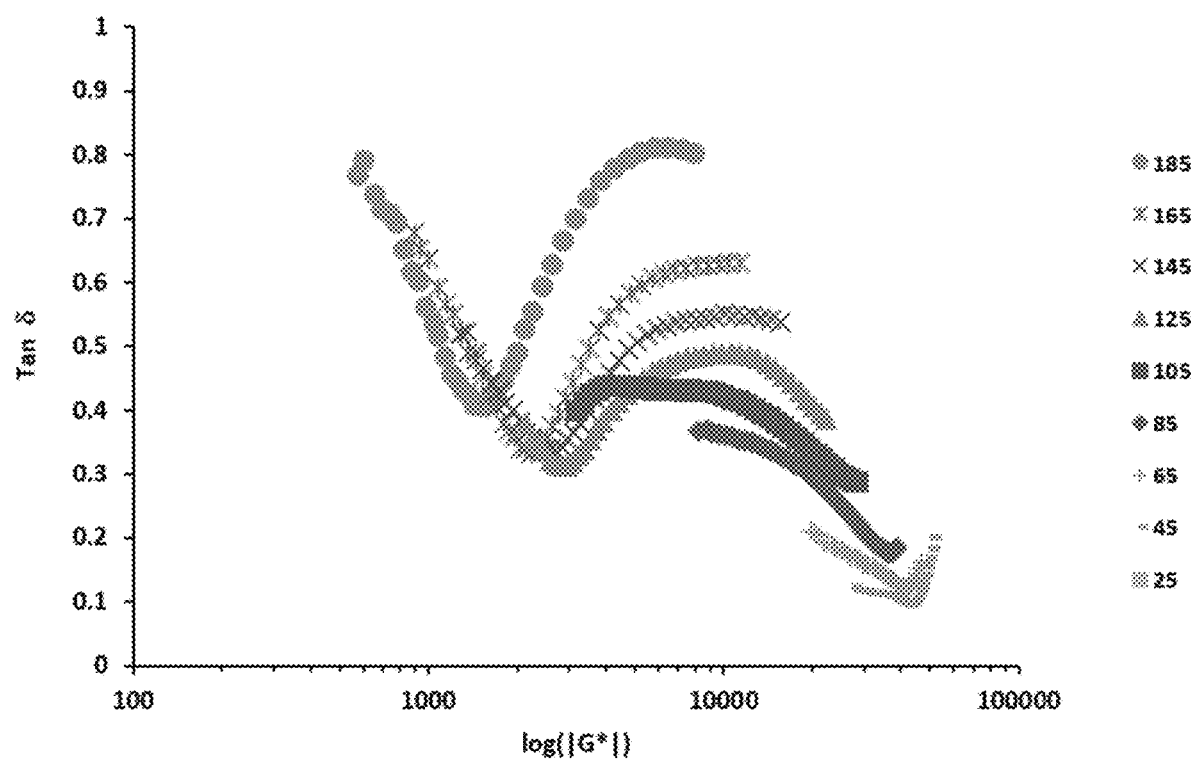
FIG. 36: van Gurp-Palmen plot of tan δ versus the magnitude of the complex modulus $|G^*|=[(G')^2+(G'')^2]^{1/2}$ for $gPS_{11}$-$gPEO_{78}$-$gPS_{11}$.

Frequency-dependent melt rheology data are reported in FIG. 15 for gPS$_{11}$-gPEO$_{78}$-gPS$_{11}$ and FIG. 35 for gPS$_{15}$-gPEO$_{119}$-gPS$_{15}$. The storage modulus (G') is on the order of 10$^4$ Pa between 0.01 and 100 rad/sec at temperatures 45-105° C. and is always larger than the loss modulus (G") (tan δ<1). Both BBCPs are thus viscoelastic solids, albeit considerably softer than linear PS-PEO with 38 vol % PEO (G'≈10$^7$ Pa at 90° C.).[5] A van Gurp-Palmen plot[36] of the loss tangent versus the magnitude of the complex modulus reveals time-temperature superposition fails with these materials in the temperature range of interest (FIG. 36) and the data reported in FIG. 15 are therefore un-shifted. We anticipate based on linear PS-PEO literature[5] that Li$^+$ doped samples will be marginally more elastic, perhaps an order of magnitude, but the relative softness is likely an intrinsic limitation of the brush architecture.[21, 37] Combining the BBCP architecture with techniques such as polymerization-induced phase separation[2-3] may provide a route towards stiffer materials with similar conductivity profiles.

Conclusions

The synthesis, self-assembly, conductivity, and mechanical properties of densely-grafted ABA triblock brush polymers containing grafted polystyrene (A block, $N_{PS}$=21) and poly(ethylene oxide) (B block, $N_{PEO}$=45) side chains are reported. Both gPS$_{11}$-gPEO$_{78}$-gPS$_{11}$ ($N_A$=11, $N_B$=78, $N_A$=11) and gPS$_{15}$-gPEO$_{119}$-gPS$_{15}$ ($N_A$=15, $N_B$=119, $N_A$=15) suppress PEO crystallization over a range of LiTFSI blend ratios and form well-ordered structures consistent with hexagonal cylinders composed of the minority PS block ($\varphi_{PEO}\approx0.75$). Ionic conductivity is comparable to or better than many linear BCP analogues (≈10⁻³ S/cm at 105° C.), but these improvements are moderated by a lower elastic modulus (≈10⁴ Pa at 105° C.) across all temperatures investigated. Conductivity for both BBCPs is optimal at a blend ratio near 10:1 [EO]:[Li⁺], similar to that reported for linear symmetric PS-PEO.[27]

REFERENCES

1. Hallinan, D. T.; Balsara, N. P., Polymer Electrolytes. *Annual Review of Materials Research* 2013, 43 (1), 503-525.
2. Schulze, M. W.; McIntosh, L. D.; Hillmyer, M. A.; Lodge, T. P., High-Modulus, High-Conductivity Nanostructured Polymer Electrolyte Membranes via Polymerization-Induced Phase Separation. *Nano Lett.* 2013, 14 (1), 122-126.
3. McIntosh, L. D.; Schulze, M. W.; Irwin, M. T.; Hillmyer, M. A.; Lodge, T. P., Evolution of Morphology, Modulus, and Conductivity in Polymer Electrolytes Prepared via Polymerization-Induced Phase Separation. *Macromolecules* 2015, 48 (5), 1418-1428.
4. Young, W.-S.; Kuan, W.-F.; Epps, T. H., Block copolymer electrolytes for rechargeable lithium batteries. *Journal of Polymer Science Part B: Polymer Physics* 2014, 52(1), 1-16.
5. Singh, M.; Odusanya, O.; Wilmes, G. M.; Eitouni, H. B.; Gomez, E. D.; Patel, A. J.; Chen, V. L.; Park, M. J.; Fragouli, P.; Iatrou, H.; Hadjichristidis, N.; Cookson, D.; Balsara, N. P., Effect of Molecular Weight on the Mechanical and Electrical Properties of Block Copolymer Electrolytes. *Macromolecules* 2007, 40 (13), 4578-4585.
6. Bouchet, R.; Phan, T. N. T.; Beaudoin, E.; Devaux, D.; Davidson, P.; Bertin, D.; Denoyel, R., Charge Transport in Nanostructured PS-PEO-PS Triblock Copolymer Electrolytes. *Macromolecules* 2014, 47 (8), 2659-2665.
7. Young, N. P.; Devaux, D.; Khurana, R.; Coates, G. W.; Balsara, N. P., Investigating polypropylene-poly(ethylene oxide)-polypropylene triblock copolymers as solid polymer electrolytes for lithium batteries. *Solid State Ionics* 2014, 263 (0), 87-94.
8. Trapa, P. E.; Won, Y.-Y.; Mui, S. C.; Olivetti, E. A.; Huang, B.; Sadoway, D. R.; Mayes, A. M.; Dallek, S., Rubbery Graft Copolymer Electrolytes for Solid-State, Thin-Film Lithium Batteries. *Journal of the Electrochemical Society* 2005, 152 (1), A1-A5.
9. Trapa, P. E.; Acar, M. H.; Sadoway, D. R.; Mayes, A. M., Synthesis and Characterization of Single-Ion Graft Copolymer Electrolytes. *Journal of the Electrochemical Society* 2005, 152 (12), A2281-A2284.
10. Gavelin, P.; Jannasch, P.; Wesslen, B., Amphiphilic polymer gel electrolytes. I. preparation of gels based on poly(ethylene oxide) graft copolymers containing different ionophobic groups. *Journal of Polymer Science Part A: Polymer Chemistry* 2001, 39 (13), 2223-2232.
11. Daigle, J.-C.; Vijh, A.; Hovington, P.; Gagnon, C.; Hamel-Paquet, J.; Verreault, S.; Turcotte, N.; Clement, D.; Guerfi, A.; Zaghib, K., Lithium battery with solid polymer electrolyte based on comb-like copolymers. *Journal of Power Sources* 2015, 279 (0), 372-383.
12. Sun, J.; Stone, G. M.; Balsara, N. P.; Zuckermann, R. N., Structure-Conductivity Relationship for Peptoid-Based PEO-Mimetic Polymer Electrolytes. *Macromolecules* 2012, 45 (12), 5151-5156.
13. Niitani, T.; Shimada, M.; Kawamura, K.; Kanamura, K., Characteristics of new-type solid polymer electrolyte controlling nano-structure. *Journal of Power Sources* 2005, 146 (1-2), 386-390.
14. Wang, C.; Sakai, T.; Watanabe, O.; Hirahara, K.; Nakanishi, T., All Solid-State Lithium-Polymer Battery Using a Self-Cross-Linking Polymer Electrolyte. *Journal of the Electrochemical Society* 2003, 150 (9), A1166-A1170.
15. Kuan, W.-F.; Remy, R.; Mackay, M. E.; Epps, T. H., Controlled ionic conductivity via tapered block polymer electrolytes. *RSC Advances* 2015, 5 (17), 12597-12604.
16. Niitani, T.; Amaike, M.; Nakano, H.; Dokko, K.; Kanamura, K., Star-Shaped Polymer Electrolyte with Microphase Separation Structure for All-Solid-State Lithium Batteries. *Journal of the Electrochemical Society* 2009, 156 (7), A577-A583.
17. Xia, Y.; Kornfield, J. A.; Grubbs, R. H., Efficient Synthesis of Narrowly Dispersed Brush Polymers via Living Ring-Opening Metathesis Polymerization of Macromonomers. *Macromolecules* 2009, 42 (11), 3761-3766.
18. Fetters, L. J.; Lohse, D. J.; Richter, D.; Witten, T. A.; Zirkel, A., Connection between Polymer Molecular Weight, Density, Chain Dimensions, and Melt Viscoelastic Properties. *Macromolecules* 1994, 27 (17), 4639-47.
19. Young, W.-S.; Albert, J. N. L.; Schantz, A. B.; Epps, T. H., Mixed-Salt Effects on the Ionic Conductivity of Lithium-Doped PEO-Containing Block Copolymers. *Macromolecules* 2011, 44 (20), 8116-8123.
20. Cowie, J. M. G.; Sadaghianizadeh, K., Effect of side chain length and crosslinking on the ac conductivity of oligo (ethyleneoxide) comb-branch polymer-salt mixtures. *Solid State Ionics* 1990, 42 (3-4), 243-249.
21. Zhang, Y.; Costantini, N.; Mierzwa, M.; Pakula, T.; Neugebauer, D.; Matyjaszewski, K., Super soft elastomers as ionic conductors. *Polymer* 2004, 45 (18), 6333-6339.
22. Lascaud, S.; Perrier, M.; Vallee, A.; Besner, S.; Prud'homme, J.; Armand, M., Phase Diagrams and Conductivity Behavior of Poly(ethylene oxide)-Molten Salt Rubbery Electrolytes. *Macromolecules* 1994, 27 (25), 7469-7477.
23. Heimenz, P. C., Lodge, T. P., *Polymer Chemistry*, 2nd Ed. CRC Press: Boca Raton, Pl, 2007.
24. Zhao, C.; Wu, D.; Huang, N.; Zhao, H., Crystallization and thermal properties of PLLA comb polymer. *Journal of Polymer Science Part B: Polymer Physics* 2008, 46 (6), 589-598.
25. Teran, A. A.; Balsara, N. P., Thermodynamics of Block Copolymers with and without Salt. *The Journal of Physical Chemistry B* 2014, 118 (1), 4-17.
26. Meyer, W. H., Polymer Electrolytes for Lithium-Ion Batteries. *Advanced Materials* 1998, 10 (6), 439-448.
27. Panday, A.; Mullin, S.; Gomez, E. D.; Wanakule, N.; Chen, V. L.; Hexemer, A.; Pople, J.; Balsara, N. P., Effect of Molecular Weight and Salt Concentration on Conductivity of Block Copolymer Electrolytes. *Macromolecules* 2009, 42 (13), 4632-4637.
28. Hu, M.; Xia, Y.; McKenna, G. B.; Kornfield, J. A.; Grubbs, R. H., Linear Rheological Response of a Series of Densely Branched Brush Polymers. *Macromolecules* 2011, 44, 6935-6943.
29. Gomez, E. D.; Panday, A.; Feng, E. H.; Chen, V.; Stone, G. M.; Minor, A. M.; Kisielowski, C.; Downing, K. H.; Borodin, O.; Smith, G. D.; Balsara, N. P., Effect of Ion Distribution on Conductivity of Block Copolymer Electrolytes. *Nano Letters* 2009, 9 (3), 1212-1216.

30. Ganesan, V.; Pyramitsyn, V.; Bertoni, C.; Shah, M., Mechanisms Underlying Ion Transport in Lamellar Block Copolymer Membranes. *ACS Macro Letters* 2012, 1 (4), 513-518.
31. Hou, W.-H.; Chen, C.-Y.; Wang, C.-C.; Huang, Y.-H., The effect of different lithium salts on conductivity of comb-like polymer electrolyte with chelating functional group. *Electrochimica Acta* 2003, 48 (6), 679-690.
32. Chintapalli, M.; Chen, X. C.; Thelen, J. L.; Teran, A. A.; Wang, X.; Garetz, B. A.; Balsara, N. P., Effect of Grain Size on the Ionic Conductivity of a Block Copolymer Electrolyte. *Macromolecules* 2014, 47 (15), 5424-5431.
33. Hong, S. W.; Gu, W.; Huh, J.; Sveinbjornsson, B. R.; Jeong, G.; Grubbs, R. H.; Russell, T. P., On the Self-Assembly of Brush Block Copolymers in Thin Films. *ACS Nano* 2013, 7 (11), 9684-9692.
34. Yuan, R.; Teran, A. A.; Gurevitch, I.; Mullin, S. A.; Wanakule, N. S.; Balsara, N. P., Ionic Conductivity of Low Molecular Weight Block Copolymer Electrolytes. *Macromolecules* 2013, 46 (3), 914-921.
35. Teran, A. A.; Mullin, S. A.; Hallinan, D. T.; Balsara, N. P., Discontinuous Changes in Ionic Conductivity of a Block Copolymer Electrolyte through an Order-Disorder Transition. *ACS Macro Letters* 2012, 1 (2), 305-309.
36. van Gurp, M., Palmen, J., Time-Temperature Superposition For Polymer Blends. *Rheol. Bull.* 1998, 67, 5-8.
37. Pakula, T.; Zhang, Y.; Matyjaszewski, K.; Lee, H.-i.; Boerner, H.; Qin, S.; Berry, G. C., Molecular brushes as super-soft elastomers. *Polymer* 2006, 47 (20), 7198-7206.

Supporting Information: ABA Triblock Brush Polymers: Synthesis, Self-Assembly, Conductivity, and Rheological Properties General All reagents were used as received unless otherwise noted. Carbic anhydride was purchased from Acros Organics. Propargylamine, copper(I) bromide, 1-ethyl-3-(3-dimethylaminopropyl)carbodiimide (EDC), methyl α-bromoisobutyrate, N,N,N',N',N"-pentamethyldiethylenetriamine (PMDETA), sodium azide, triethylamine, 6-aminohexanoic acid, 4-dimethylaminopyridine, poly(ethylene glycol) methyl ether ($M_n$=2000 g/mol), and pyridine were purchased from Sigma Aldrich. Grubbs' second generation catalyst [(H$_2$IMes)(PCy$_3$)(Cl)2Ru=CHPh] was generously supplied by Materia. CDCl$_3$ and C$_6$D$_6$ were purchased from Cambridge Isotopes Labs. Toluene, benzene, dichloromethane (DCM), dimethylformamide (DMF), methanol, tetrahydrofuran (THF), pentane, sodium sulfate, and magnesium sulfate were purchased from VWR.

Synthesis of Norbornene Exo-Anhydride (1):

Scheme S1: Synthesis of norbornene exo-anhydride.

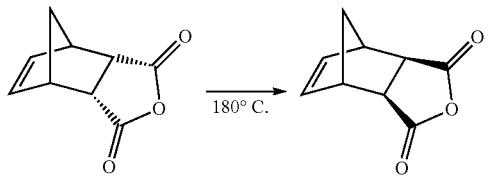

A 500 mL round bottom flask was half filled with commercially available norbornene endo-anhydride (carbic anhydride), fitted with a reflux condenser, and heated neat at 180° C. for 16 hours. The resulting molten yellow solid was slowly cooled to 75° C. and benzene was added before the entire volume crystallized to facilitate dissolution. The resulting mixture was heated to reflux and crystallized at room temperature. The recrystallization in benzene was repeated three additional times to yield a white or slightly off-white crystalline solid (ca. 30 g isolated mass). $^1$H NMR (CDCl$_3$) δ (ppm): 6.31 (2H, t), 3.43 (2H, s), 2.99 (2H, s), 1.65 (1H, m), 1.42 (1H, m).

Synthesis of Norbornene Propargyl Imide (2):

Scheme S2: Synthesis of norbornene propargyl imide.

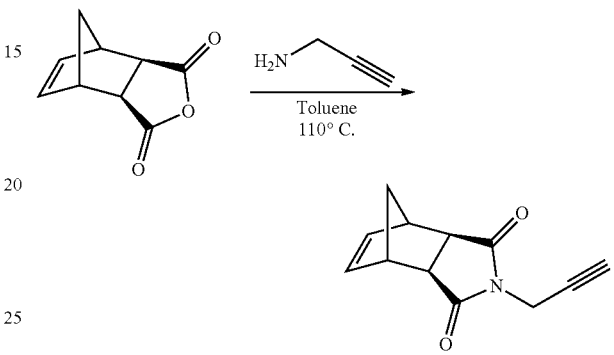

Norbornene exo-anhydride (1) (1.0 eq., 62.59 g, 381.2 mmol), propargylamine (1.0 eq., 21.00 g, 381.2 mmol), triethylamine (0.1 eq., 3.86 g, 38.1 mmol) and toluene (300 mL) were mixed in a round bottom flask equipped with a Dean-Stark trap. The mixture was heated to reflux for 15 hours. The resulting orange solution was cooled to room temperature, and the toluene was removed in vacuo. The crude solid was recrystallized in ethanol to yield light brown, plate-like crystals (56.25 g). $^1$H NMR (CDCl$_3$) δ (ppm): 6.28 (2H, m), 4.20 (2H, d), 3.30 (2H, m), 2.70 (2H, d), 2.17 (1H, t), 1.50 (1H, d), 1.25 (1H, d).

Synthesis of Polystyrene Macromonomer:

Synthesis of Polystyrene (3) using Atom Transfer Radical Polymerization

Scheme S3: Atom transfer radical polymerization of styrene.

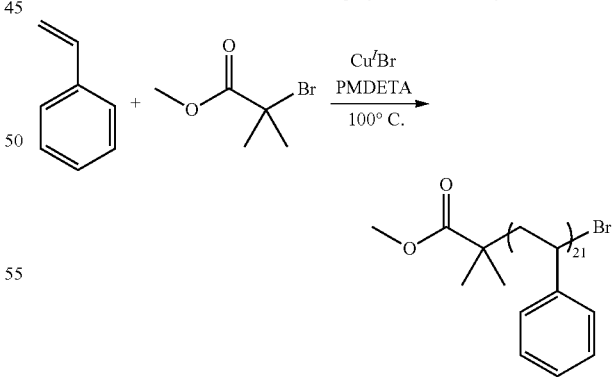

Styrene monomer (500 mL) was stirred with basic alumina for 30 min and filtered to yield a clear liquid. Styrene (50.0 eq., 350 mL, 3.054 mol) was added to a 500 mL Schlenk flask equipped with a stir bar and septum. The flask was charged with ligand N,N,N',N',N"-pentamethyldiethylenetriamine (0.3 eq., 3.83 mL, 0.018 mol) and subsequently freeze-pump-thawed three times to remove oxygen. The flask was frozen in liquid nitrogen, placed under an active flow of argon (while still frozen), and Cu(I)Br (0.3 eq., 2.63 g, 0.018 mol) was quickly added upon removal of the septum. The septum was re-attached, the argon flow stopped, and the flask was evacuated. (Caution: argon condenses at liquid nitrogen temperatures and can cause an explosion upon expansion when thawed.) Three additional pump/purge (argon/vacuum) cycles were performed and the flask was left under dynamic vacuum for at least 5 min. The flask was thawed in warm water and placed under argon. Most, but not all, of the copper dissolved to yield a green solution. (A blue color indicates oxygen contamination; a yellow color indicates insufficient copper dissolution—both result in a failed polymerization.) In a separate flask, methyl α-bromoisobutyrate was freeze-pump-thawed three times. Methyl α-bromoisobutyrate (1.0 eq., 7.90 mL, 0.061 mol) was injected into the Schlenk flask containing styrene and the mixture was heated in an oil bath pre-set to 100° C. Aliquots were collected every ca. 30 min under a dynamic flow of argon. Conversion was monitored by $^1$H NMR. The polymerization was quenched in liquid nitrogen after 2 hr 35 min at approximately 38% conversion. The viscous solution was warmed to room temperature, diluted with tetrahydrofuran (100 mL), filtered through basic alumina to remove copper, and precipitated into methanol at −78° C. The polymer was redissolved in THF and reprecipitated five more times into methanol at −78° C. and dried in vacuo to yield a white powder.

Synthesis of Polystyrene-Azide (4)

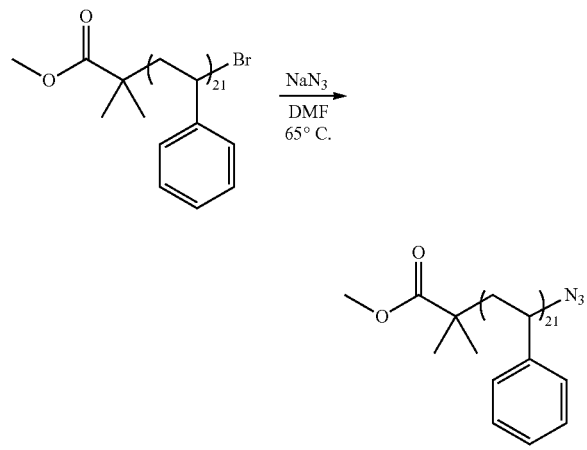

Scheme S4: Synthesis of polystyrene-azide.

Polystyrene (3) (1.0 eq., 73 g, 37.0 mmol), sodium azide (3.0 eq., 7.12 g, 109.5 mmol), and dimethylformamide (350 mL) were mixed in a round bottom flask equipped with a stir bar and reflux condenser. The mixture was heated at 65° C. for 16 hr and then cooled to room temperature. The product was precipitated into methanol at −78° C., redissolved in THF, and the precipitation procedure was repeated 4 additional times. Quantitative conversion of the end group was observed by $^1$H NMR (CDCl$_3$) δ(ppm): PS—Br 4.6-5.0 ppm, PS—N3 3.75-4.25.

Synthesis of Polystyrene Macromonomer (5)

Scheme S5: Synthesis of polystyrene macromonomer.

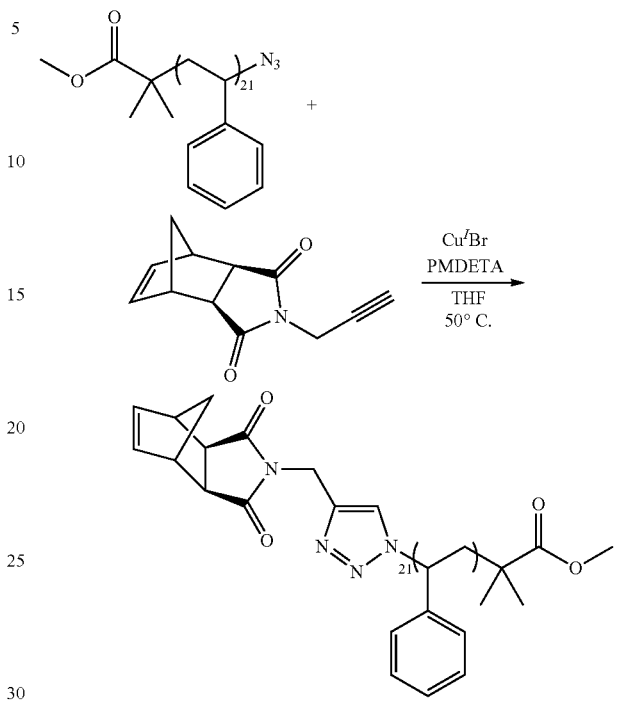

Polystyrene-azide (4) (1.0 eq., 64.30 g, 30.6 mmol), norbornene propargyl imide (2) (1.5 eq., 9.24 g, 45.9 mmol), and Cu$^I$Br (0.4 eq., 1.76 g, 12.3 mmol) were added to a 500 mL three-neck round bottom flask equipped with a stir bar, reflux condenser, and two septa. The flask was pump/purged with argon three times and placed under argon. Dry tetrahydrofuran (180 mL) was added via syringe, followed by N,N,N',N',N''-pentamethyldiethylenetriamine (0.4 eq., 2.56 mL, 12.3 mmol), upon which the solution turned light green and clear. The flask was heated at 50° C. for 16 hr and cooled to room temperature. The solution was diluted with tetrahydrofuran (100 mL), filtered through basic alumina to remove the copper, and precipitated into methanol at −78° C. The precipitation was repeated 5 additional times to yield a white powder. Quantitative conversion of the end group was observed by $^1$H NMR (CDCl$_3$) δ (ppm): PS—N3 3.75-4.25, PS-norbornene 4.89-5.05.

Synthesis of norbornene carboxylic acid imide (6):

Scheme S6: Synthesis of norbornene carboxylic acid imide.

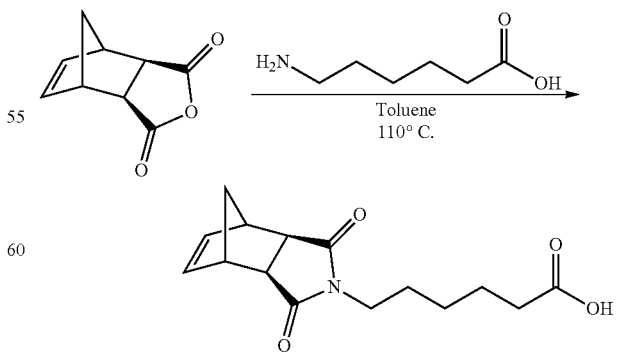

Norbornene exo-anhydride (1) (1.0 eq., 8 g, 48.7 mmol), 6-aminohexanoic acid (1.0 eq., 6.39 g, 48.7 mmol), triethylamine (0.1 eq., 0.679 mL, 4.87 mmol), and toluene (51 mL) were added to a round bottom flask equipped with a stir bar and reflux condenser. The mixture was heated at 110° C. for 19 hr, cooled to room temperature, and the solvent was removed in vacuo. The remaining solid was redissolved in dichloromethane, washed with water (×3), washed with brine (×3), and dried with magnesium sulfate. The solvent was removed in vacuo to yield a white or slightly off white solid. $^1$H NMR (CDCl$_3$) δ (ppm): 6.28 (2H, m), 3.46 (2H, t), 3.27 (2H, m), 2.35 (2H, t), 1.72-1.18 (10H, m).

Synthesis of PEO Macromonomer (7):

Scheme S7: Synthesis of PEO macromonomer.

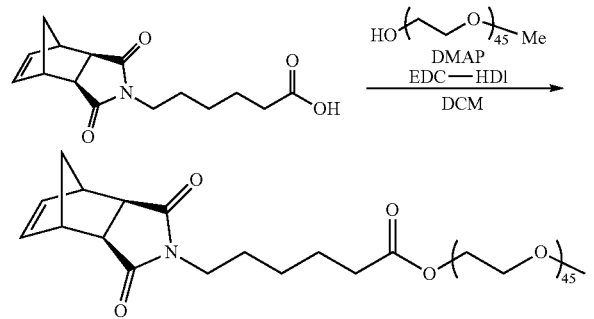

Norbornene carboxylic acid imide (6) (1.2 eq., 19.742 g, 71.2 mmol), poly(ethylene glycol) methyl ether ($M_n$=2000 g/mol, 1.0 eq., 118.641 g, 59.3 mmol), 1-Ethyl-3-(3-dimethylaminopropyl)carbodiimide (1.6 eq., 18.244 g, 117.5 mmol), 4-dimethylaminopyridine (0.1 eq., 0.725 g, 5.9 mmol), and dichloromethane (790 mL) were mixed in a 1 L round bottom flask equipped with a stir bar. The reaction was stirred for 24 hr and about half of the dichloromethane was removed in vacuo. The mixture was washed with 1 M HCl (×3), brine (×1), and dried with sodium sulfate. Most of the solvent was removed in vacuo and the remaining solution was precipitated into diethyl ether at −78° C. The off-white solid was filtered and dried in vacuo to yield 123.3 g (93%) of isolated material.

TABLE S1

Macromonomer molecular weight information.

| Macromonomer | Molecular Weight (kDa) | | | Đ | N |
| --- | --- | --- | --- | --- | --- |
| | $M_n$ (NMR) | $M_n$ (SEC) | $M_w$ (SEC) | | |
| PS | 2.54 | 2.43 | 2.50 | 1.03 | 21[#] |
| PEO | 2.46 | 2.58 | 2.68 | 1.04 | 45[*] |

[#]Determined by $^1$H NMR, excludes endgroups
[*]As reported by supplier

Synthesis of Ruthenium Catalyst [(H$_2$IMes)(pyr)$_2$(Cl)$_2$Ru=CHPh] (8)

Scheme S8: Synthesis of bispyridine ruthenium catalyst.

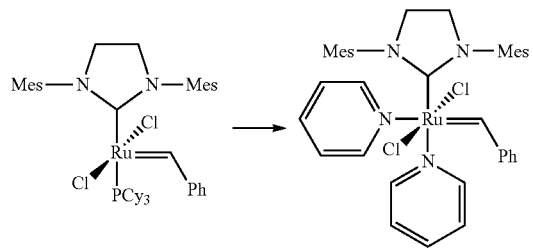

Grubbs' second-generation catalyst [(H$_2$IMes)(PCy$_3$)(Cl)$_2$ Ru=CHPh] (1.0 eq., 1.0 g, 1.4 mmol) and pyridine (30.0 eq., 3.3 mL, 41.4 mmol) were mixed in a 30 mL glass jar. The mixture was stirred in air at room temperature for 5 minutes. A color change from dark purple-red to dark green was immediately observed. After 5 minutes, room-temperature pentane (15 mL) was layered onto the green mixture. The jar was capped under air and cooled in a freezer for 24 hr. After 24 hr, the catalyst was isolated by vacuum filtration, washed with 30 mL pentane (×3), and dried in vacuo to afford 0.87 g (87%) of isolated material. $^1$H NMR (C$_6$D$_6$) δ (ppm): 19.63 (1H, s), 8.63 (2H, s), 8.33 (2H, s), 8.02 (2H, d), 7.19 (1H, t), 6.87-6.11 (9H, m), 3.41 (4H, d), 2.83 (6H, s), 2.42 (6H, s), 2.12 (6H, s).

Synthesis of poly[(norbornene-graft-styrene)-block-(norbornene-graft-ethylene oxide)-block-(norbornene-graft-styrene)] (gPS-gPEO-gPS) (9):

Scheme S9: Synthesis of ABA triblock brush polymers.

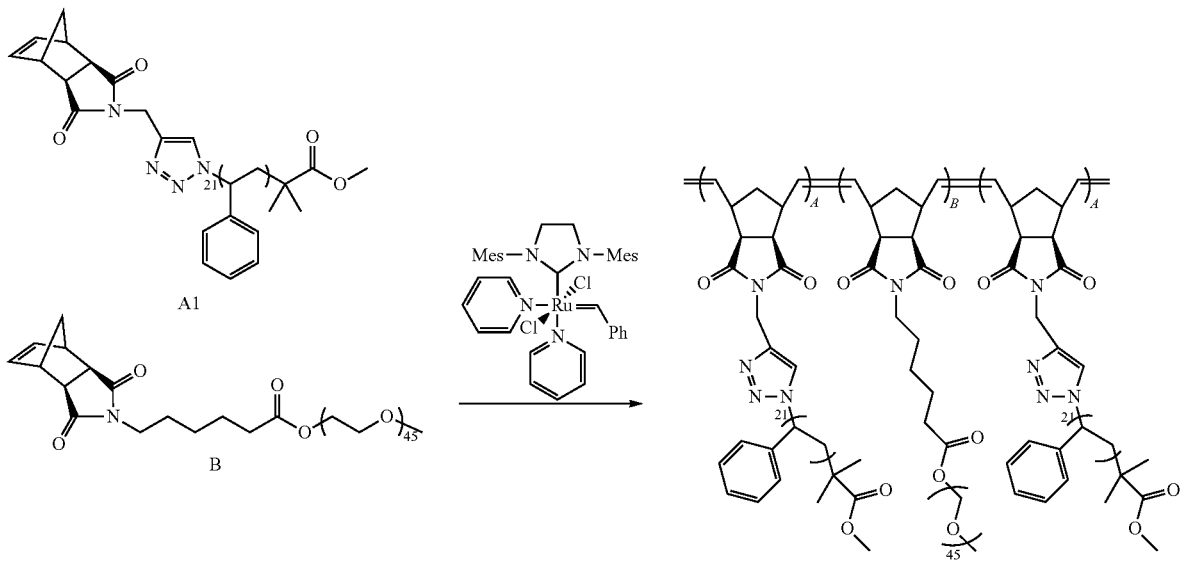

-continued

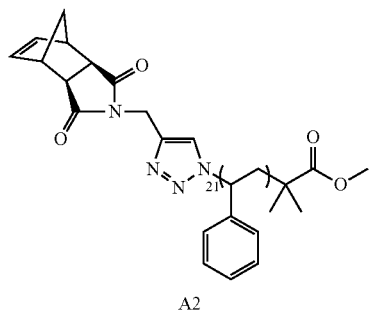

A2

In a glove box, three separate vials were prepared containing solutions of macromonomers in dry dichloromethane. Vial A1: PS macromonomer (10.0 eq., 0.635 g), DCM (4.27 mL); Vial B: PEO macromonomer (80.0 eq., 4.554 g), DCM (40 mL); Vial A2: PS macromonomer (10.0 eq., 0.635 g), DCM (5 mL). A fourth vial was prepared with the ruthenium catalyst (31.1 mg, 0.025 mmol) in 1.244 mL DCM. The polymerization was initiated by injecting 0.726 mL of the catalyst solution into vial A1. After 40 minutes, a small aliquot was extracted, quenched with ethyl vinyl ether, and vial B was quickly added in full to vial A1. After 100 min, a small aliquot was extracted, quenched with ethyl vinyl ether, and vial A2 was added in full to vial A1. After 120 min, vial A1 was removed from the glove box, rapidly stirred, and quenched with 5 mL of ethyl vinyl ether. The ABA triblock brush polymer was precipitated into diethyl ether (600 mL) at −78° C., filtered, and dried in vacuo to yield an off white powder.

Size Exclusion Chromatography (SEC):

SEC data were collected using two MZ-Gel SDplus 300×8.0 mm columns with 10 μm beads, an Agilent 1100 series autosampler and pump, and a Wyatt ViscoStar viscometer, Optilab rEX differential refractive index detector, and three-angle miniDAWN TREOS light scattering detector. On-line determination of do/dc assumed 100% mass elution under the peak of interest. The mobile phase was THF with 1 vol % triethylamine, which eliminated artificial dragging effects in pure THF (presumably arising from PEO/column interactions).

TABLE S2

Summary of $gPS_{11}$-$gPEO_{78}$-$gPS_{11}$ triblock brush polymer size exclusion chromatography molecular weight data. The dn/dc value of the diblock and triblock copolymers was arbitrarily set to 0.050.

| Sample | $N_{target}$ | $N_{calc}$ | SEC | | | |
|---|---|---|---|---|---|---|
| | | | $M_n$ (kDa) | $M_w$ (kDa) | Đ | dn/dc (mL/g) |
| $gPS_{11}$ | 10 | 11^ | 28.8 | 29.3 | 1.02 | 0.165* |
| $gPS_{11}$-$gPEO_{78}$ | 10-80 | 11^-78# | 459.7 | 518.3 | 1.13 | 0.050 |
| $gPS_{11}$-$gPEO_{78}$-$gPS_{11}$ | 10-80-10 | 11^-78#-11# | 656.5 | 764.8 | 1.17 | 0.050 |

Calculated by $^1$H NMR
^Calculated by SEC
*Measured by SEC

TABLE S3

Summary of $gPS_{15}$-$gPEO_{119}$-$gPS_{15}$ triblock brush polymer size exclusion chromatography molecular weight data. The dn/dc value of the diblock and triblock copolymers was arbitrarily set to 0.050.

| Sample | $N_{target}$ | $N_{calc}$ | SEC | | | |
|---|---|---|---|---|---|---|
| | | | $M_n$ (kDa) | $M_w$ (kDa) | Đ | dn/dc (mL/g) |
| $gPS_{15}$ | 15 | 15^ | 38.41 | 38.55 | 1.00 | 0.165* |
| $gPS_{15}$-$gPEO_{119}$ | 15-120 | 15^-119# | 562.6 | 604.2 | 1.07 | 0.050 |
| $gPS_{15}$-$gPEO_{119}$-$gPS_{15}$ | 15-120-15 | 15^-119#-15# | 710.0 | 769.3 | 1.08 | 0.050 |

Calculated by $^1$H NMR
^Calculated by SEC
*Measured by SEC

The high molecular weight shoulder in the light scattering SEC signal (FIGS. 20-21) is exacerbated at high PEO NB values (data not shown). We have evidence that this shoulder is related to an impurity in the commercially available (Sigma Aldrich) mono-functional 2000 g/mol PEO. Since the LS signal~M*c (where M is molecular weight and c is polymer concentration) while the dRI signal~c, the concentration of species giving rise to the shoulder for $gPS_{11}$-$gPEO_{78}$-$gPS_{11}$ and $gPS_{15}$-$gPEO_{119}$-$gPS_{15}$ is relatively small at this N. The orders of magnitude price difference between small quantities of extensively purified PEO (e.g. from Jenkem) and large quantities of readily available PEO may warrant using the latter if a process is capable of tolerating the behavior observed in FIGS. 20-21.

TABLE S4

Figure 22:
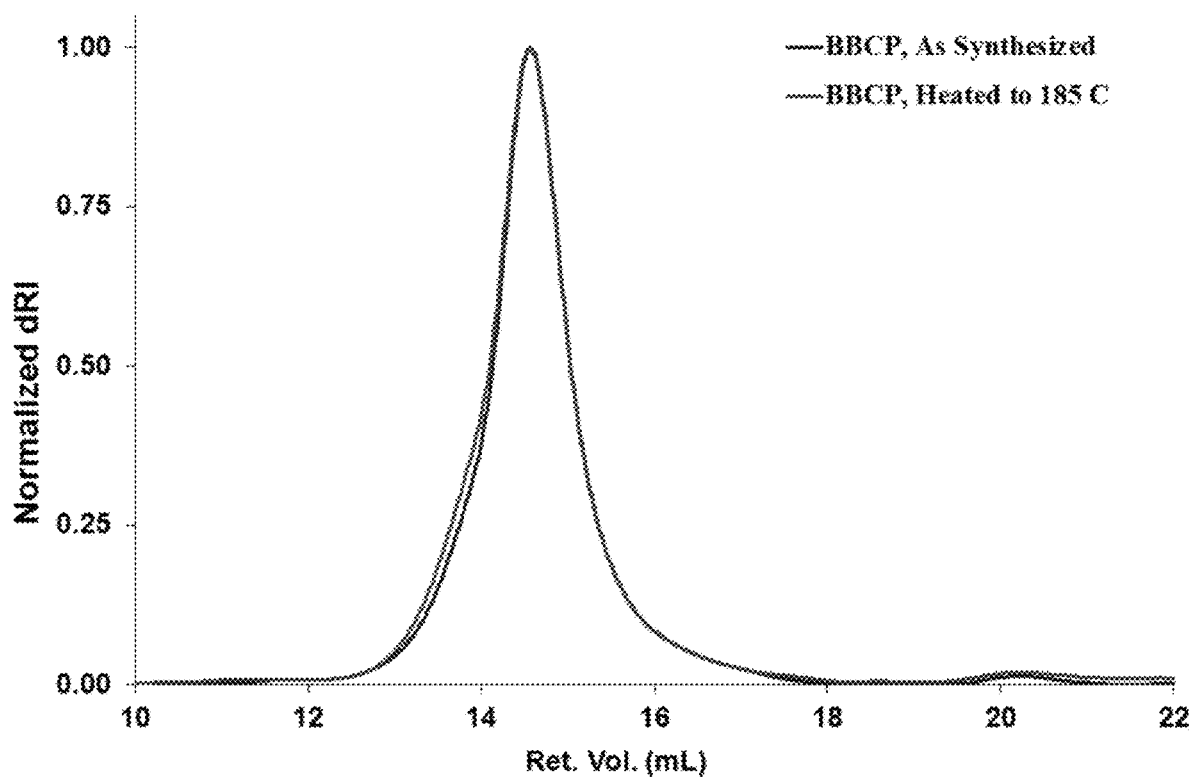
FIG. 22: Thermal stability of $gPS_{11}$-$gPEO_{78}$-$gPS_{11}$ as measured by SEC. Blue curve: as synthesized. Red curve: sample characterized by rheology (maximum heating temperature 185° C., under N2).

SEC molecular weight characterization corresponding to FIG. 22.

| Sample | $M_n$ (kDa) | $M_w$ (kDa) | Đ |
|---|---|---|---|
| As Synthesized | 656.5 | 764.8 | 1.17 |
| Heated to 185° C. | 730.4 | 882.8 | 1.21 |

Figure 23:
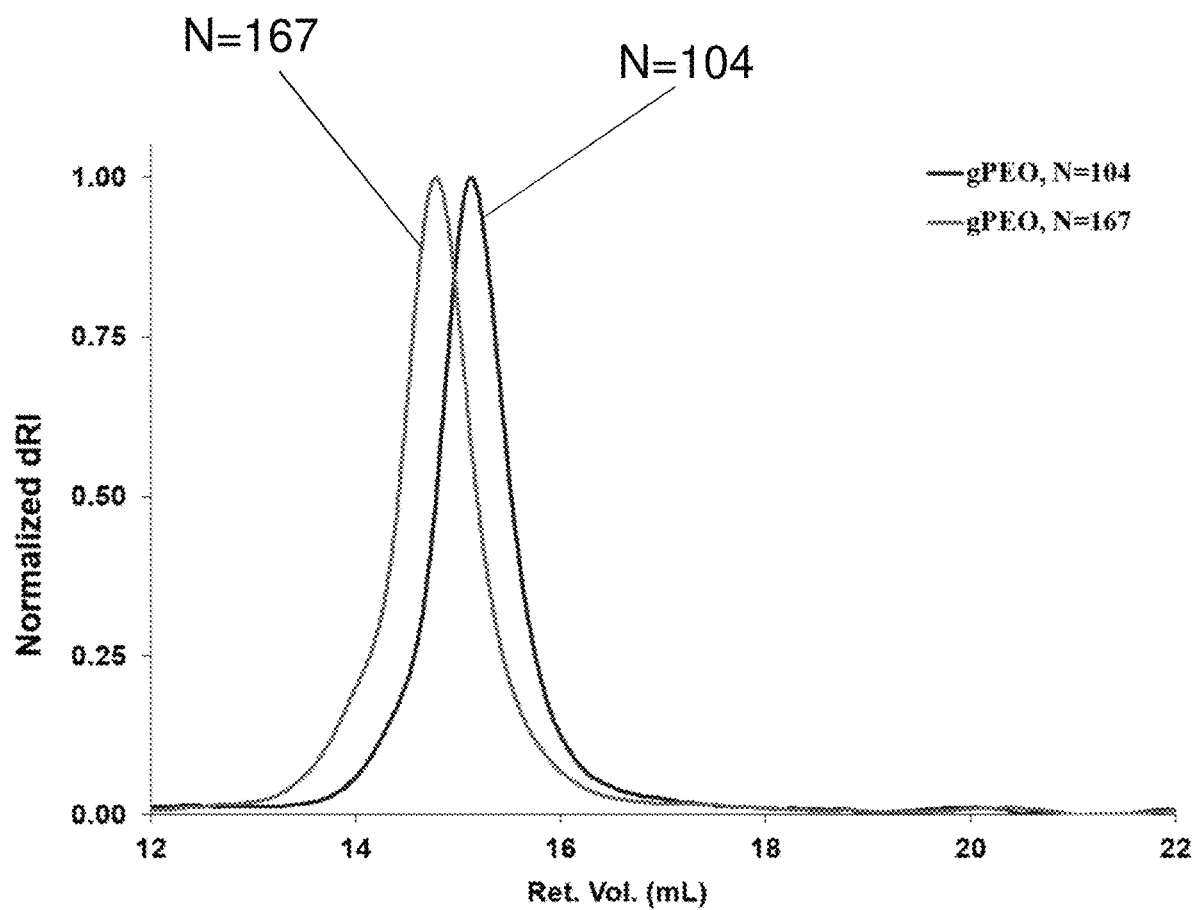
FIG. 23: gPEO brush homopolymer (N=104 and 167) SEC traces.
Figure 24:
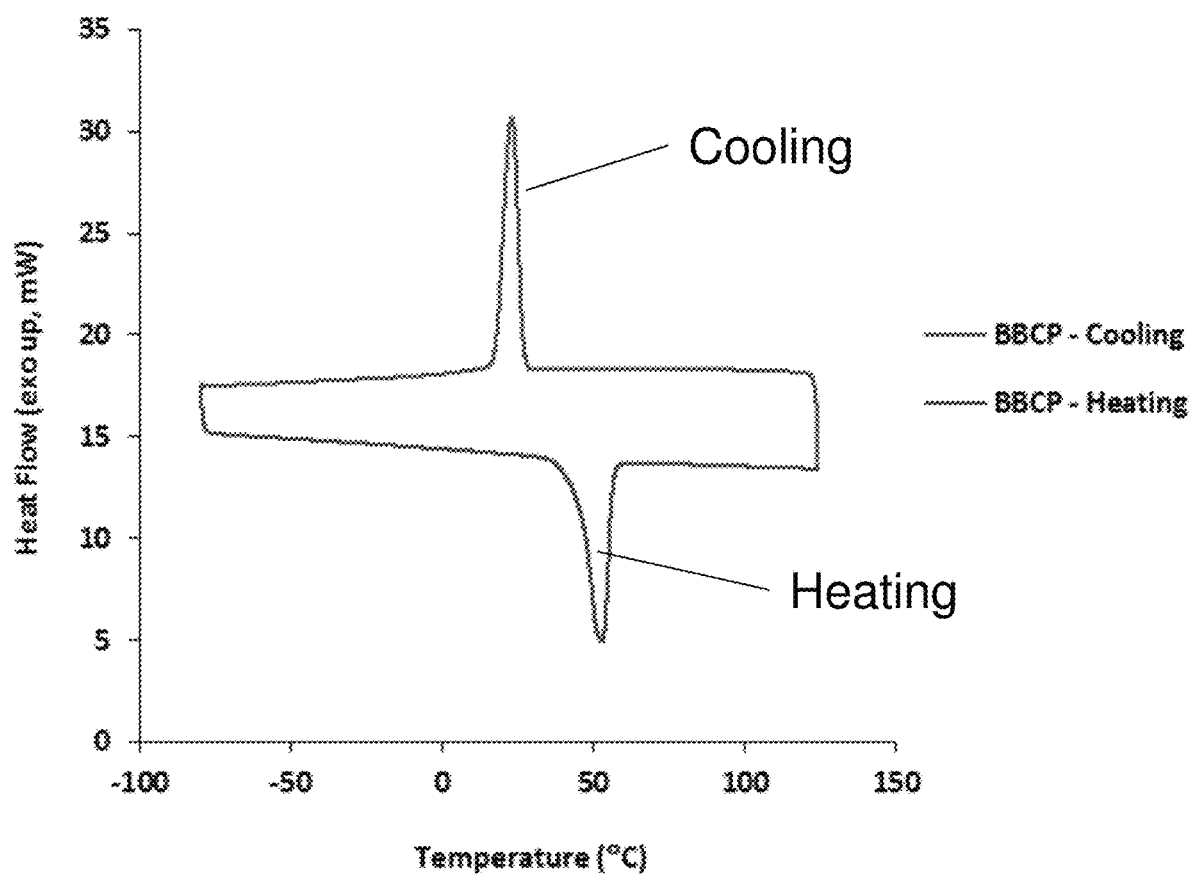
FIG. 24: $gPS_{11}$-$gPEO_{78}$-$gPS_{11}$ DSC data.
Figure 25:
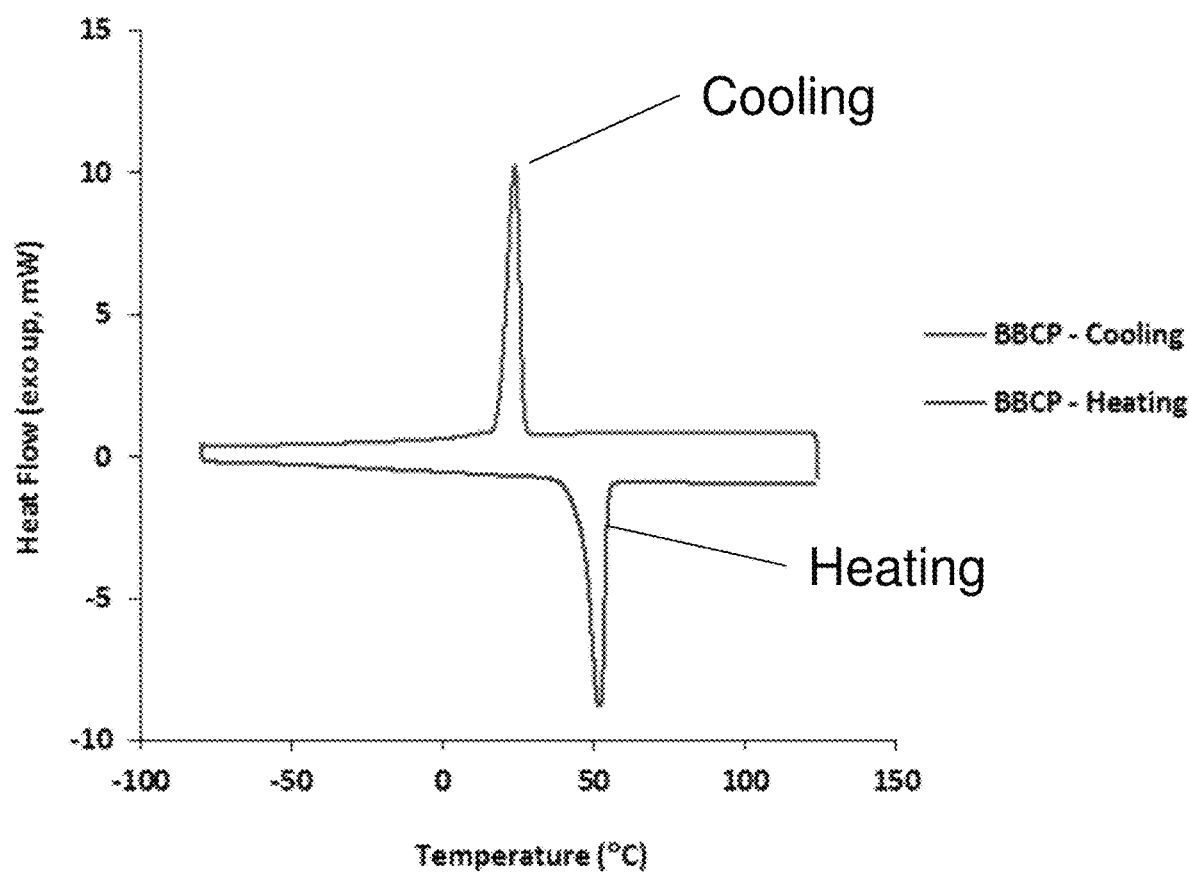
FIG. 25: $gPS_{15}$-$gPEO_{119}$-$gPS_{15}$ DSC data.
Figure 26:
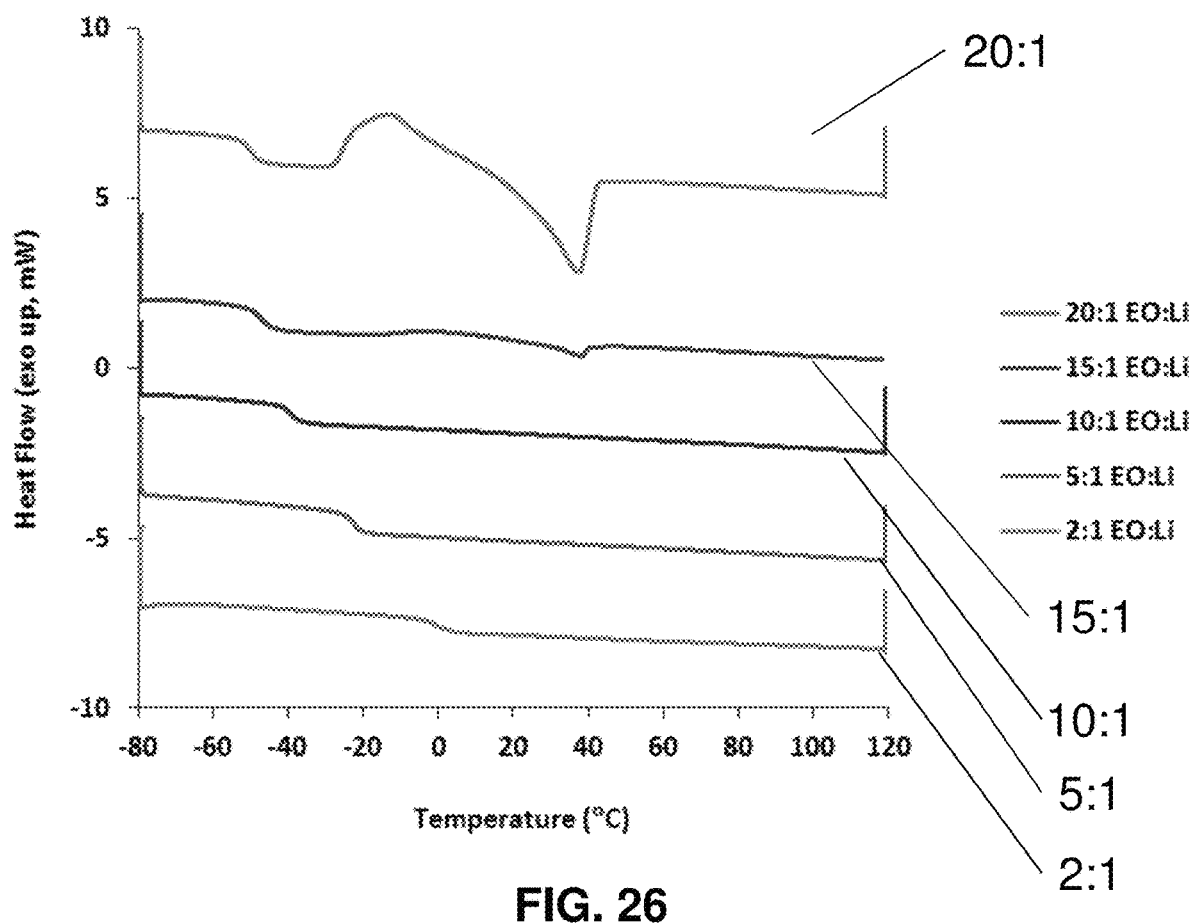
FIG. 26: Li+/$gPEO_{104}$ brush homopolymer DSC data.
Figure 27:
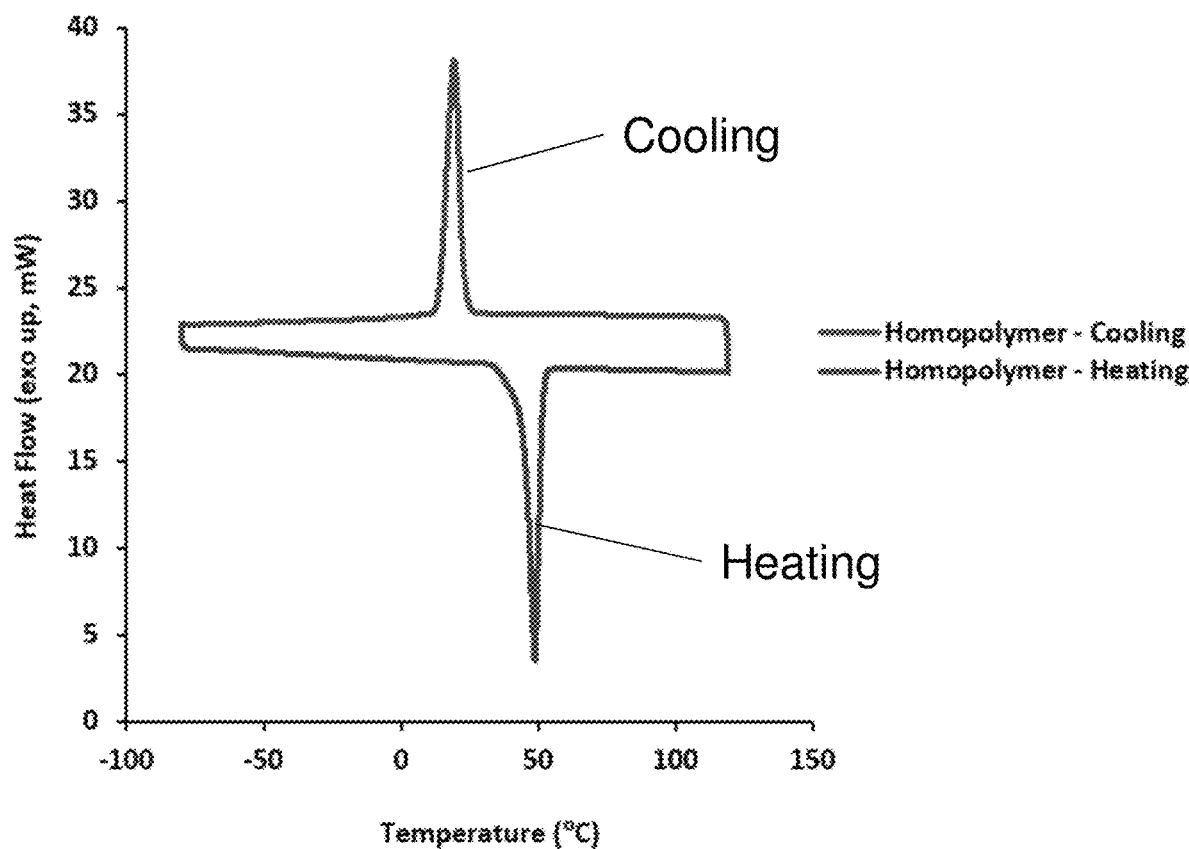
FIG. 27: $gPEO_{104}$ brush homopolymer DSC.

TABLE S5 gPEO SEC molecular weight characterization corresponding to FIG. 23.

| Sample | $N_{calc}$ | $M_n$ (kDa) | $M_w$ (kDa) | Đ | dn/dc (mL/g) |
|---|---|---|---|---|---|
| $gPEO_{104}$ | 104 | 237.2 | 253.2 | 1.07 | 0.0566 |
| $gPEO_{167}$ | 167 | 381.2 | 418.4 | 1.10 | 0.0566 |

Differential Scanning Calorimetry (DSC):

Differential scanning calorimetry (DSC) data were collected on a TA Instruments Q2000 under a dry $N_2$ atmosphere. The samples were heated and cooled between −80 and 120° C. at 20° C., 10° C., and 5° C./min. The reported DSC data were collected on the third heating (and/or cooling) cycle at 5° C./min. Samples were prepared from the same blend precursor solutions used to cast films for conductivity testing. All sample preparation was performed in a dry room (<−45° C. dew point) to prevent moisture contamination; DSC pans were hermetically sealed in Tzero pans. $gPEO_{167}$ homopolymer/Li+ blend DSCs (not shown) are nearly identical to the $gPEO_{104}$ data in FIGS. 26-27 and Table S8.

TABLE S6

Summary of $gPS_{11}$-$gPEO_{78}$-$gPS_{11}$ DSC data (see main text, FIG. 10A).

| [EO]:[Li+] | $T_g$ (° C.) | $T_c$ (° C.) | $T_m$ (° C.) | $T_m$ (° C.)[#] |
|---|---|---|---|---|
| BBCP | — | 24 | 51 | 55 |
| 20:1 | −56 | −19 | 35 | 32, 46 |
| 15:1 | −52 | — | 34* | 51 |
| 10:1 | −45 | — | — | — |

TABLE S6-continued

Summary of $gPS_{11}$-$gPEO_{78}$-$gPS_{11}$ DSC data (see main text, FIG. 10A).

| [EO]:[Li+] | $T_g$ (° C.) | $T_c$ (° C.) | $T_m$ (° C.) | $T_m$ (° C.)[#] |
|---|---|---|---|---|
| 5:1 | −35 | — | — | — |
| 2:1 | −19 | — | — | — |

*Barely observable at 5° C./min, not observable at 10 and 20° C./min (see main text).
[#]After ≈2 months at 23° C.

TABLE S7

Summary of $gPS_{15}$-$gPEO_{119}$-$gPS_{15}$ DSC data (see main text, FIG. 10B).

| [EO]:[Li+] | $T_g$ (°C) | $T_c$ (° C.) | $T_m$ (° C.) | $T_m$ (° C.)[#] |
|---|---|---|---|---|
| BBCP | — | 25 | 51 | 55 |
| 20:1 | −56 | −36 | 42 | 36, 45 |
| 15:1 | −54 | −23 | 38 | 37, 46 |
| 10:1 | −49 | — | — | 50 |
| 5:1 | −34 | — | — | — |
| 2:1 | −14 | — | — | — |

[#]After ≈2 months at 23° C.

TABLE S8

Summary of $gPEO_{104}$ brush homopolymer DSC data.

| [EO]:[Li+] | $T_g$ (° C.) | $T_c$ (° C.) | $T_m$ (° C.) |
|---|---|---|---|
| gPEO | — | 19 | 49 |
| 20:1 | −50 | −13 | 38 |
| 15:1 | −47 | — | 38 |
| 10:1 | −38 | — | — |
| 5:1 | −22 | — | — |
| 2:1 | −2 | — | — |

SAXS Data:

SAXS data were collected at Argonne National Laboratory APS Beamline 12-ID-B on the same blend samples that were subjected to DSC analysis (i.e., all samples were prepared in a dry room and hermetically sealed to avoid moisture contamination). The neat BBCP samples were fabricated as follows: 1) BBCP powder (ca. 20 mg) was placed between two sheets of Kapton film, 2) the Kapton film was sandwiched between thick glass slides, 3) the glass slides were compressed with medium-sized binder clips, 4) the films were annealed under vacuum at 120° C. for 2 hrs and subsequently slowly cooled to room temperature under vacuum. The neat BBCP samples clearly flowed during annealing and produced a transparent and slightly light brown film. The Kapton film was cut with scissors to yield approximate dimensions 2×15×0.07 mm (height×width×thickness). SAXS data were collected parallel to the Kapton film plane through the sample dimension approximately 2 mm thick.

TABLE S9

Summary of gPS$_{11}$-gPEO$_{78}$-gPS$_{11}$ SAXS data.

| Sample | q* (1/Å) | D* (nm) | 2nd peak | 2nd Peak/q* | 3rd Peak | 3rd Peak/q* |
|---|---|---|---|---|---|---|
| BBCP | 0.023997 | 26.2 | 0.041995 | 1.75 | 0.062993 | 2.63 |
| 20:1 | 0.017998 | 34.9 | 0.031496 | 1.75 | ≈0.035496 | 1.97 |
| 15:1 | 0.017998 | 34.9 | 0.030996 | 1.72 | 0.035996 | 2.00 |
| 10:1 | 0.017998 | 34.9 | 0.031496 | 1.75 | 0.036496 | 2.03 |
| 5:1 | 0.020998 | 29.9 | — | — | — | — |
| 2:1 | 0.018998 | 33.1 | — | — | — | — |

TABLE S10

Summary of gPS$_{15}$-gPEO$_{119}$-gPS$_{15}$ SAXS data.

| Sample | q* (1/Å) | D* (nm) | 2nd peak | 2nd Peak/q* | 3rd Peak | 3rd Peak/q* |
|---|---|---|---|---|---|---|
| BBCP | 0.021997 | 28.6 | 0.037496 | 1.70 | 0.057993 | 2.64 |
| 20:1 | 0.017498 | 35.9 | 0.029997 | 1.71 | 0.035496 | 2.03 |
| 15:1 | 0.016998 | 37.0 | 0.028997 | 1.71 | 0.034996 | 2.03 |
| 10:1 | 0.016998 | 37.0 | 0.029497 | 1.74 | 0.034996 | 2.06 |
| 5:1 | 0.015498 | 40.5 | 0.026997 | 1.74 | 0.031996 | 2.06 |
| 2:1 | 0.017998 | 34.9 | — | — | — | — |

Conductivity Measurements:
General Information:

All sample preparation was performed in a dry room (dew point <−45° C.) to prevent water contamination. The linear PEO homopolymer (300 kDa) utilized in normalized conductivity experiments was purchased from Sigma Aldrich and dried in vacuo at 100° C. before use. gPEO homopolymer was dried in vacuo at room temperature before use. The following coin cell parts were purchased from Pred Materials (part # CR2032): coin cell kit (Al-clad case, cap, and gasket), coin cell wave spring (15.0 mm diameter, 1.4 mm height), and coin cell spacer disk (16.0 mm diameter, 1.0 mm thickness). A Princeton Applied Research/Ametek VersaSTAT MC was used for AC impedance measurements. Potentiostatic AC impedance spectra were obtained between 1 MHz and 100 mHz using a 10 mV RMS AC signal. Bulk ionic conductivity (σ) was calculated according to the equation σ=L/(AR), where R is the impedance value corresponding to the high frequency plateau of the Bode Re(Z) plot, L is the thickness of the sample and A is the surface area of the polymer electrolyte (taken as the surface area of the disk upon which it was cast, or as 71.48 mm2 for gPEO homopolymers). Variable temperature experiments were performed using a Tenney TUJR thermal test chamber, allowing at least 30 minutes for sample equilibration at each temperature before measurement.

Polymer Thin Film Preparation:

Polymer and LiTFSI were dissolved in cyclopentanone (4:1 wt ratio solvent:polymer), stirred for ca. 1.5 hr, and drop cast onto 1 mm thick circular stainless steel discs (area=1.86 cm$^2$). Most of the cyclopentanone was slowly evaporated in a fume hood over the course of 18 hr, which yielded relatively smooth and mostly homogenous films. The samples were placed in a vacuum oven, heated at 120° C. for 21 hr, and slowly cooled to room temperature under vacuum. Separate $^1$H NMR experiments (data not shown) confirmed this sample preparation is sufficient to remove all traces of cyclopentanone within the resolution limits of the analytical technique. The gPEO samples were surrounded by a Teflon shell (inner punched diameter: ⅜", outer diameter: ⅝", thickness 0.15 mm) to prevent cell shorting during annealing. A second stainless steel spacer was placed on top of the polymer film and the sandwich was pressed into a coin cell using a coin cell wave spring to ensure good electrical contact. The coin cells were annealed under vacuum at 120° C. for 2 hours, cooled to room temperature under vacuum, and then studied by AC impedance spectroscopy. Film thicknesses used in the conductivity calculations were determined after conductivity experiments by removing the spacer+polymer+spacer sandwich from the coin cell, measuring the stack thickness using calipers, and calculating the polymer thickness by difference (typical polymer thickness values were 50-150 μm). Most BBCP polymer films were within 10-20% of their initial (pre-conductivity experiment) thickness. The thickness of the PEO homopolymer films shrank significantly due to their rubbery physical state (T>>Tg). The final thickness of the gPEO samples was 0.15 mm as expected from the Teflon shell thickness.

Reproducibility:

Conductivity measurement reproducibility was probed with gPS$_{11}$-gPEO$_{78}$-gPS$_{11}$ in two ways: one sample (10:1) was subjected to repeated heating and cooling cycles to verify internal consistency, and the remaining samples (2:1, 5:1, 15:1, 20:1) were refabricated to measure coin cell batch-to-batch uniformity. The data are plotted in FIG. 29. In addition, two gPEO homopolymer samples with different norbornene backbone degrees of polymerization (N=104 and 167) were synthesized to probe synthetic batch-to-batch conductivity reproducibility (FIG. 30).

Figure 34:
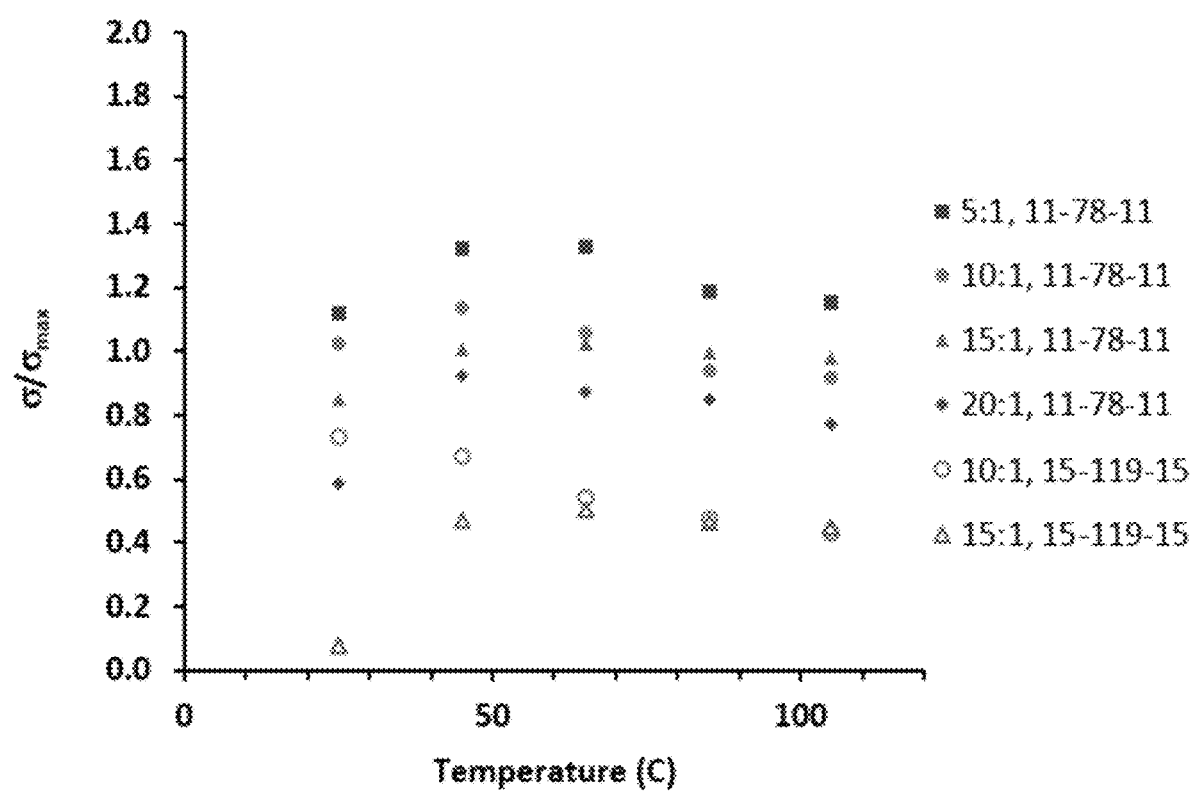
FIG. 34: Normalized conductivities of select BBCP samples relative to gPEO (N=104).

The normalized conductivities reported in FIG. 34 follow the general trends described in the manuscript: moderate blend ratios exhibit large normalized conductivities relative to linear PS-PEO containing 2 kDa PEO chains and gPS$_{11}$-gPEO$_{78}$-gPS$_{11}$ generally yields higher conductivities than gPS$_{15}$-gPEO$_{119}$-gPS$_{15}$ at a given blend ratio. The normalized conductivities are fairly sensitive to small differences between the gPEO homopolymer and BBCP conductivities at a given temperature. Consequently, the σ/σ$_{max}$ values >1 probably reflect experimental uncertainty, and the non-monotonic behavior likely derives from statistical noise due to small fluctuations in the σBBCP and σgPEO conductivities at a given temperature around the mean average conductivity, an effect qualitatively dampened when viewing log-scale plots. Similar normalized conductivity trends (magnitudes and statistical variability) were observed with both sets of gPS$_{11}$-gPEO$_{78}$-gPS$_{11}$ BBCPs normalized to gPEO with either N=104 or N=167.

Rheology:

Rheology data were collected on a Rheometric Scientific ARES-M using 25 mm diameter parallel plates under constant flow of nitrogen gas. Bulk BBCP was heated under compression in a 1 mm thick circular mold (25 mm diameter) under vacuum for ca. 16 hr. The sample was loaded into the rheometer, heated to 125° C., and the gap was reduced to ca. 0.75 mm. The sample was equilibrated for 1 hr and subsequently cooled to 50° C. under a dynamic N$_2$ purge to visually ensure uniform coverage between the plates. Any polymer overflowing from the edges was removed and the sample was again heated to 125° C. Each temperature was equilibrated for at least 1.5 hr before data collection began. Strain sweeps were performed at each temperature after equilibration to ensure linear viscoelastic response (G' and G" independent of applied strain). Frequency sweep data for temperatures 45-125° C. were collected on cooling; temperatures 145-185° C. were collected on heating. Frequency was scanned in the range 0.01-100 rad/sec at each temperature.

Example 3: Brush Block Copolymers

Background:

Batteries require electrolytes that physically separate the anode and cathode and simultaneously enable the reversible movement of charge. Lithium ion batteries typically utilize highly conductive liquid electrolytes that suffer from safety issues associated with lithium dendrite growth and the use of flammable small molecule solvents. Significant research efforts have thus been directed towards identifying polymeric materials ("polymer electrolyte membranes") to replace liquid electrolytes. Most materials comprise poly (ethylene oxide) (PEO) or copolymers thereof that conduct lithium ions when doped with lithium salts.

Summary:

Described are brush block copolymer (BBCP) materials that exhibit improved lithium ion conductivity compared to linear analogues. The BBCPs contain poly(norbornene) polymer backbones with side chain brushes composed of polystyrene (PS) and poly(ethylene oxide). Two architectures have been synthesized, including AB diblock brush copolymers and ABA triblock brush copolymers (herein, A denotes PS side chains and B denotes PEO side chains). These materials are synthetically accessible via ring-opening metathesis polymerization, which produces well-defined brush polymer architectures with 100% grafting density without post-polymerization modification, in contrast to the graft polymer electrolyte membranes previously described in the literature. Furthermore, all materials synthesized herein are characterized by low molecular mass dispersities. The poly(styrene-block-ethylene oxide-block-styrene) ABA triblock brush block copolymer exhibits improved conductivity compared to linear poly(styrene-block-ethylene oxide) and linear poly(styrene-block-ethylene oxide-block-styrene).

Figure 37:
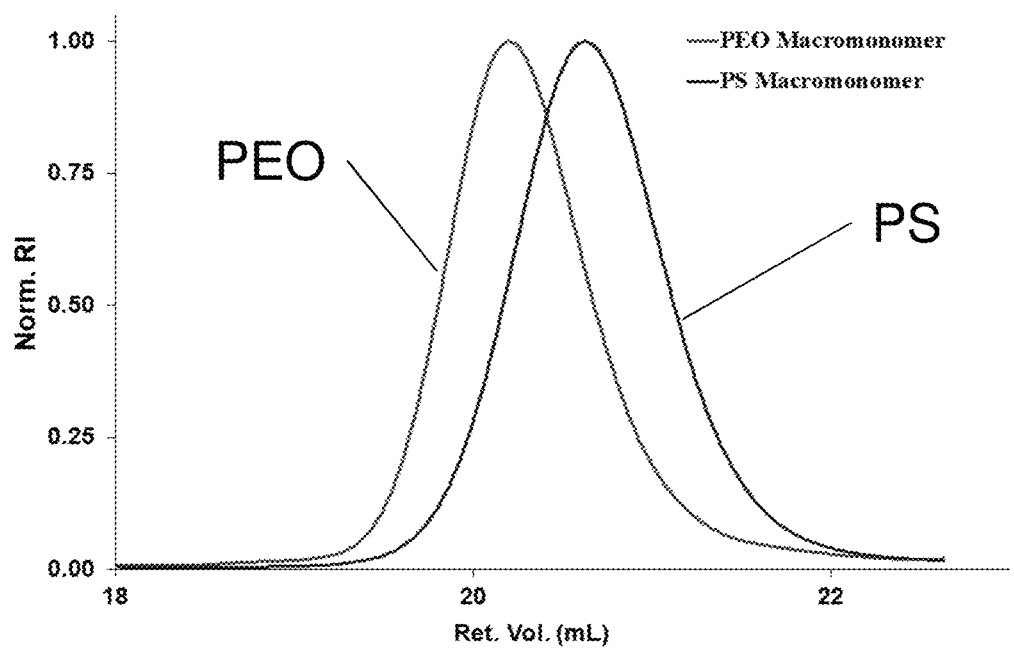
FIG. 37: Size exclusion chromatograms of polystyrene and poly(ethylene oxide) macromonomers.

Description:

BBCP fabrication begins with the synthesis of low molecular weight "macromonomers" containing either polystyrene or poly(ethylene oxide) repeat units and a single norbornene end group (Scheme 10). Macromonomer molecular weight information is shown in FIG. 37 and summarized in Table 11.

Scheme 10: Synthesis of polystyrene and poly(ethylene oxide) macromonomers.

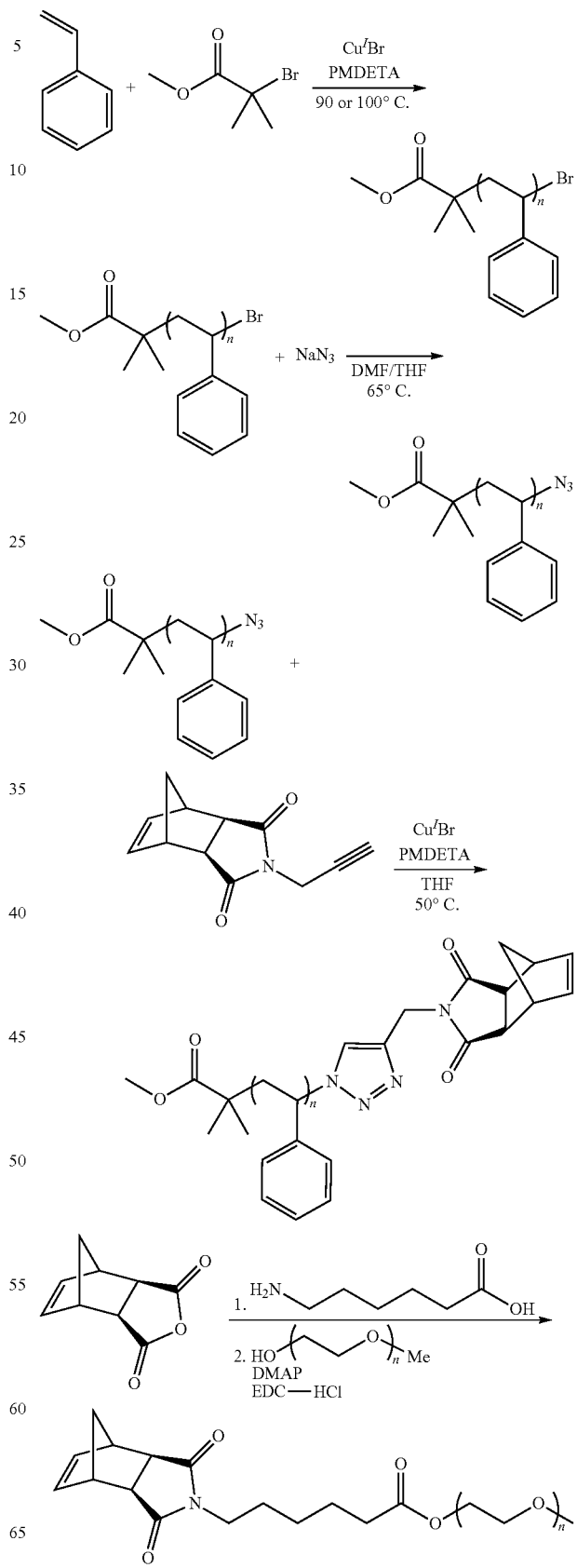

TABLE 11

Macromonomer molecular weight information.

| Macromonomer | Mn (NMR) | Mn (g/mol) | Mw (g/mol) | Đ |
|---|---|---|---|---|
| PS | 2540 | 2434 | 2495 | 1.03 |
| PEO | 2464 | 2575 | 2675 | 1.04 |

Figure 38:
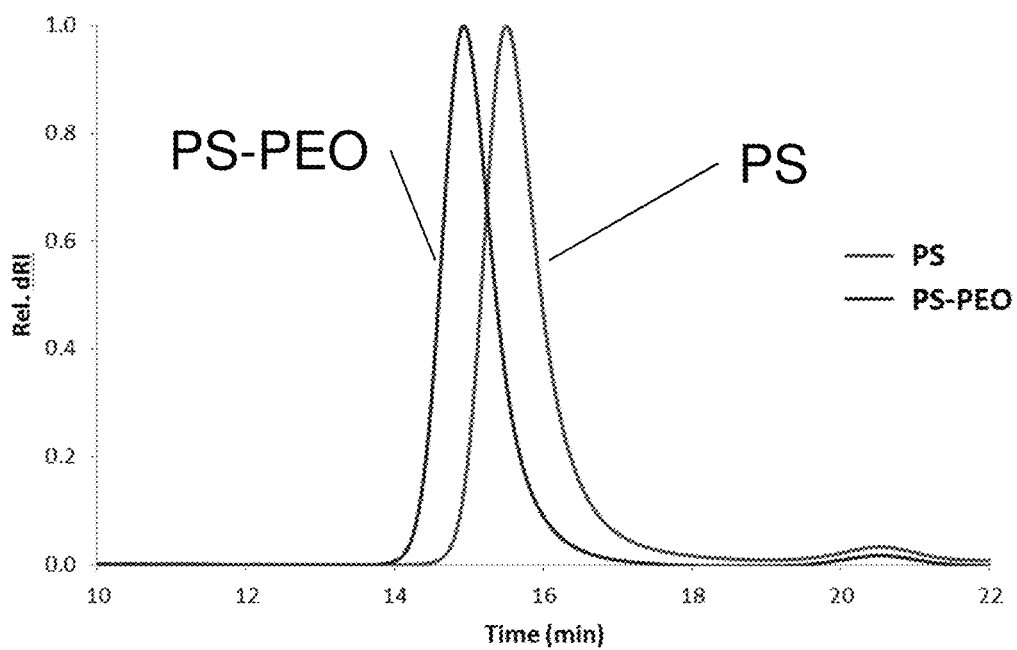
FIG. 38: Size exclusion chromatograms of PS-b-PEO diblock brush polymer (target $N_{backbone}$=50:50).
Figure 39:
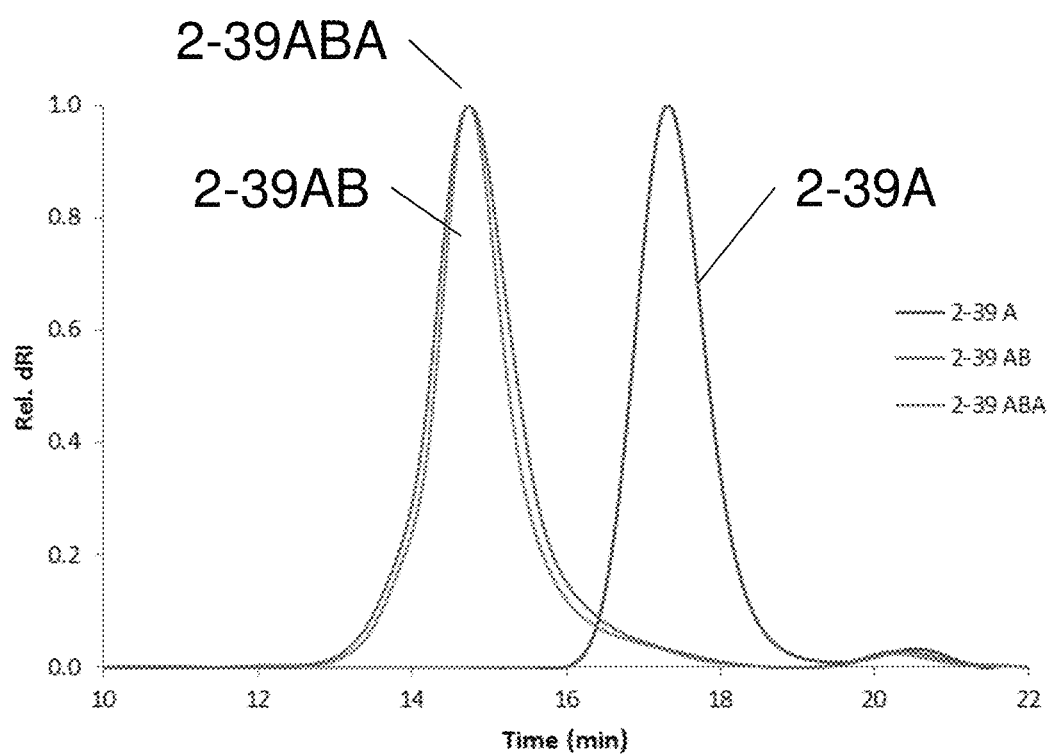
FIG. 39: Size exclusion chromatograms of PS-b-PEO-b-PS triblock brush polymer (target $N_{backbone}$=10:80:10).

The norbornene end groups were sequentially polymerized via ring-opening metathesis polymerization to yield AB diblock or ABA triblock copolymers (Scheme 11). ROMP polymerizations produced monomodal molecular weight distributions with low dispersities and minimal macromonomer contamination (FIGS. 38-39, Tables 12-13).

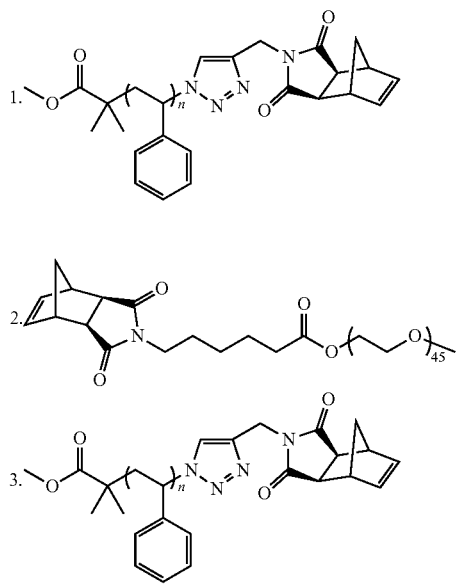

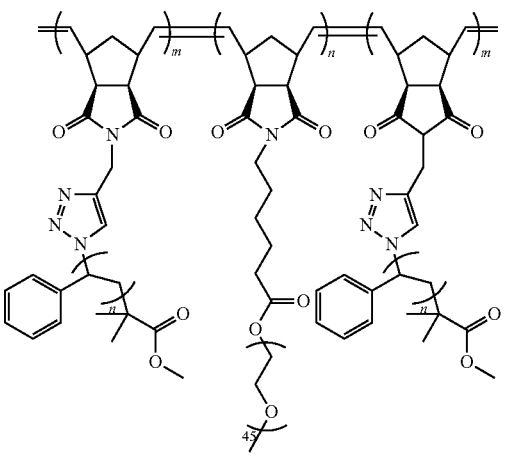

Scheme 11: Synthesis of poly(styrene-block-ethylene oxide-block-styrene) AB diblock and ABA triblock brush copolymers with poly(norbornene) backbones via ring-opening metathesis polymerization. Step 3 is omitted in the synthesis of AB architectures and performed in the synthesis of ABA architectures.

TABLE 12

PS-b-PEO diblock brush polymer size exclusion chromatography molecular weight data.

| Entry | $M_n$ (kDa) | $M_w$ (kDa) | Đ ($M_w/M_n$) |
|---|---|---|---|
| PS | 130.8 | 131.7 | 1.007 |
| PS-PEO | 265.6 | 267.0 | 1.005 |

TABLE 13

PS-b-PEO-b-PS triblock brush block copolymer size exclusion chromatography molecular weight data.

| Entry | $M_n$ (kDa) | $M_w$ (kDa) | Đ |
|---|---|---|---|
| PS | 28.8 | 29.3 | 1.017 |
| PS-PEO | 459.7 | 518.3 | 1.127 |
| PS-PEO-PS | 571.2 | 634.6 | 1.111 |

Figure 40A:
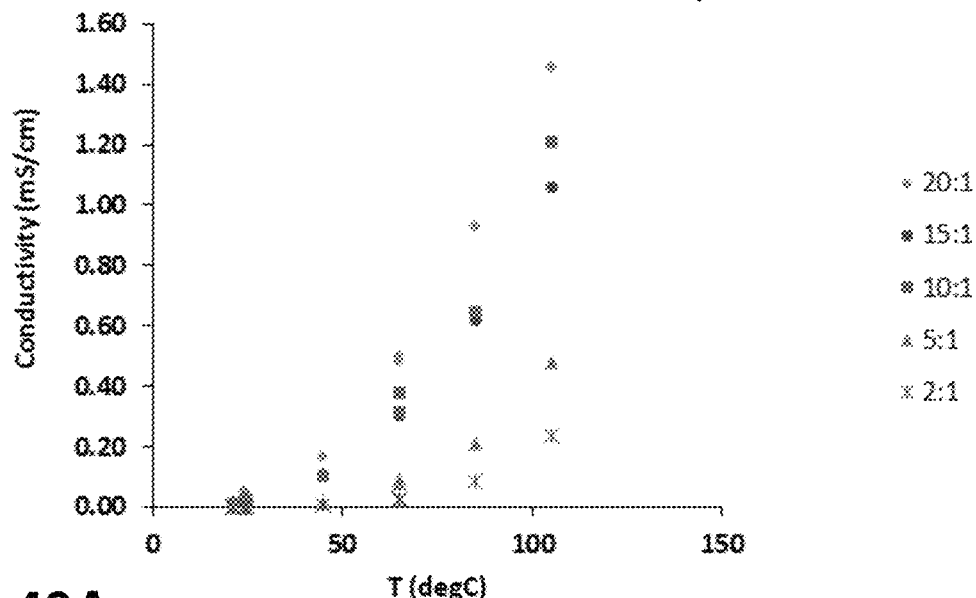
FIGS. 40A-40B: Conductivity vs. temperature as a function of the ethylene oxide repeat unit:Li$^+$ ratio.
Figure 40B:
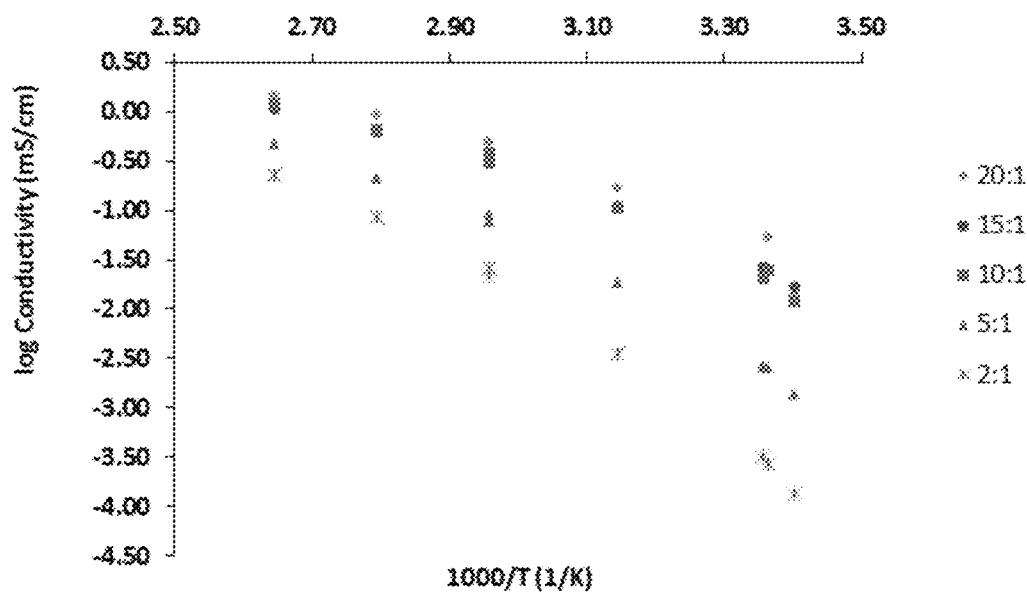
Figure 41A:
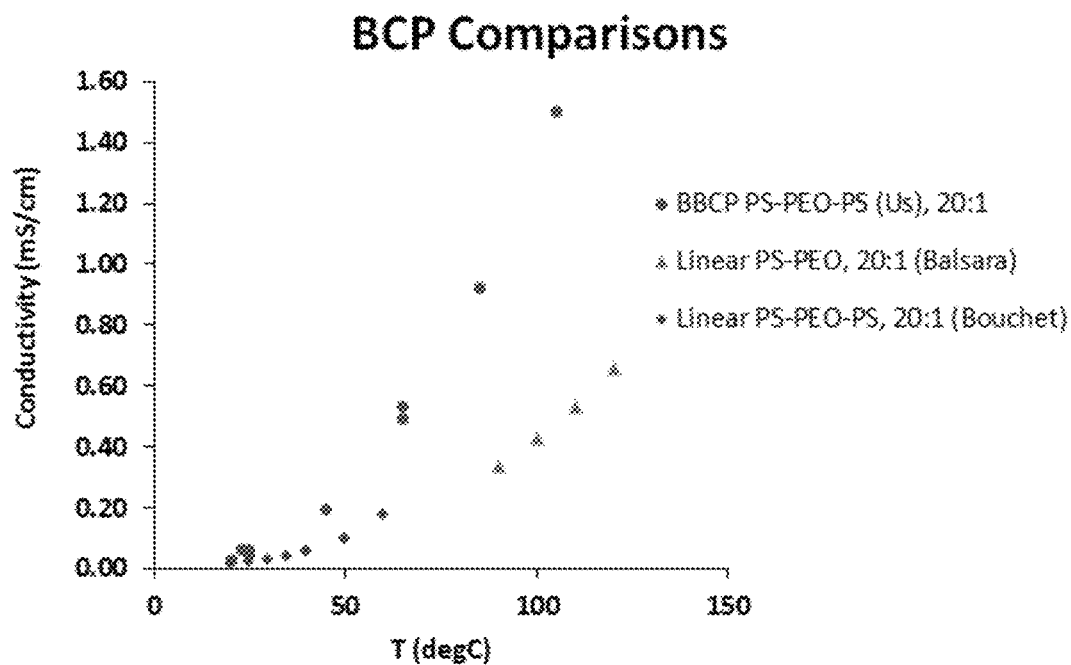
FIGS. 41A-41B: Conductivity vs. temperature comparison between PS-b-PEO-b-PS brush block copolymers (described herein) and linear analogues reported by Balsara (Macromolecules, 2007, 40, 4578) and Bouchet (Macromolecules, 2014, 47, 2659).
Figure 41B:
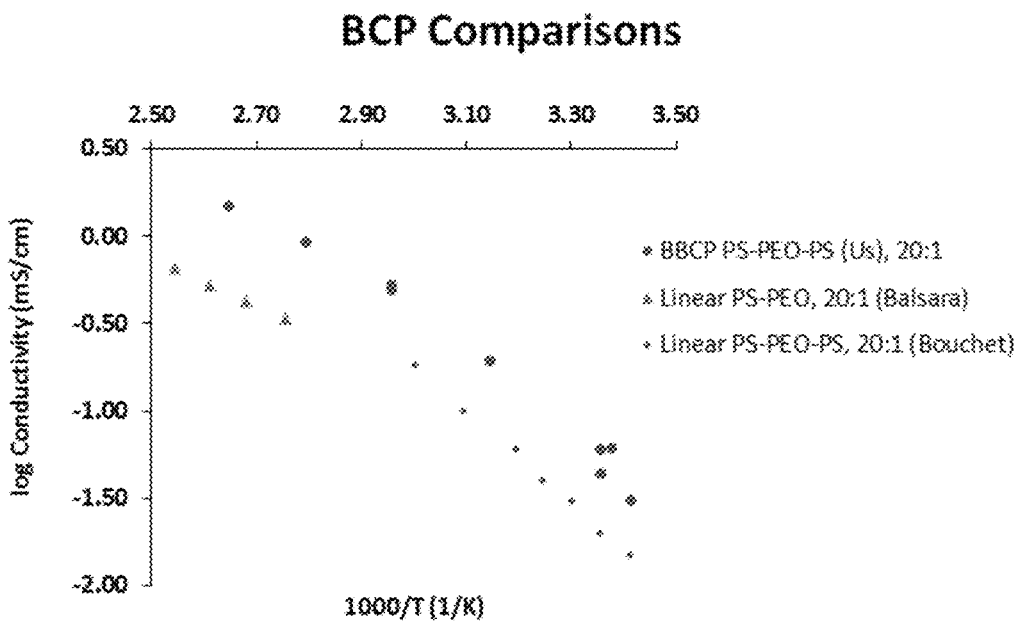

The conductivity of PS-b-PEO-b-PS triblock brush copolymer doped with lithium bis(trifluorosulfonamide) varies with the Li⁺ loading (relative to the total number of ethylene oxide repeat units contained in the PEO block, FIG. 40. The conductivity of the 20:1 PEO:Li⁺ sample is compared in FIG. 41 to the conductivity of linear PS-b-PEO and PS-b-PEO-b-PS reported in the literature with identical Li⁺ loadings. The BBCP reported herein exhibits higher conductivity at all measured temperatures.

Figure 42:
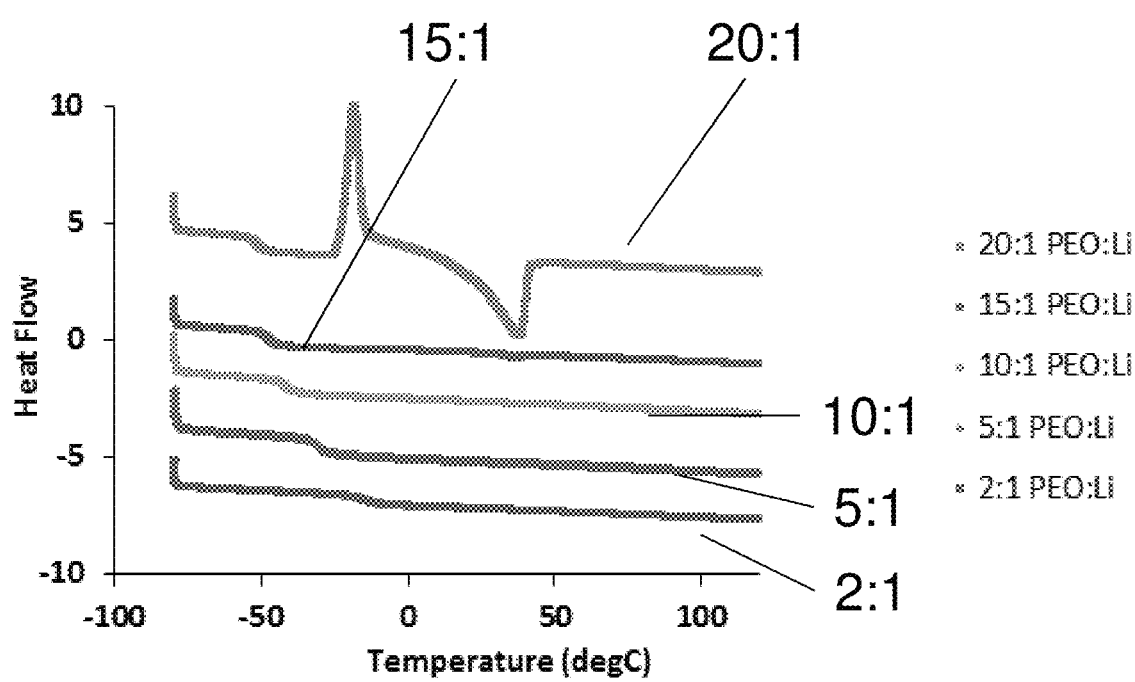
FIG. 42: Differential scanning calorimetry data corresponding to different PEO:LiTFSI loadings.

Most compositions of the BBCP/LiTFSI mixtures exhibit a marked suppression of PEO crystallization upon doping with Li⁺ (FIG. 42); only the 20:1 sample shows evidence of crystallization.

Example 4: ABC Brush Triblock Terpolymers

Compared to AB diblock copolymers, ABC triblock terpolymers vastly expand the parameter space for block copolymer self-assembly.

Figure 43:
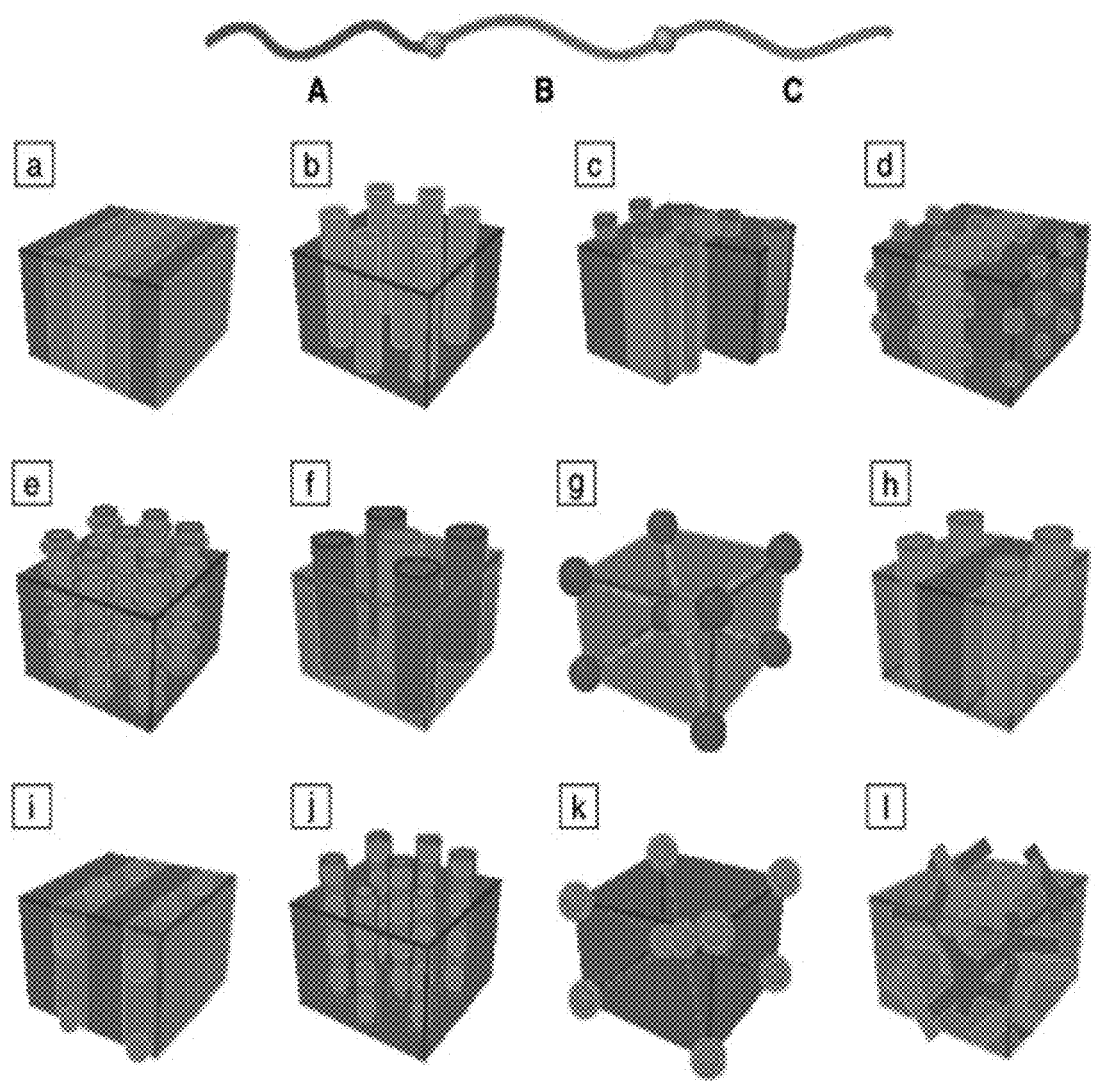
FIG. 43: (a)-(l) Morphologies for linear ABC triblock terpolymers. Blue, red, and green domains correspond to blocks A, B, and C, respectively.

Whereas eight equilibrium morphologies are known for linear AB diblock copolymers, over thirty morphologies have been identified for linear ABC triblock terpolymers (FIG. 43).[1-2] Although the self-assembly of linear ABC triblock terpolymers has been studied by both experiment and theory, the self-assembly of brush ABC triblocks is relatively unexplored. Our work has closed this gap. It represents the first systematic study of ABC brush triblock terpolymer synthesis and self-assembly.

Figure 44:
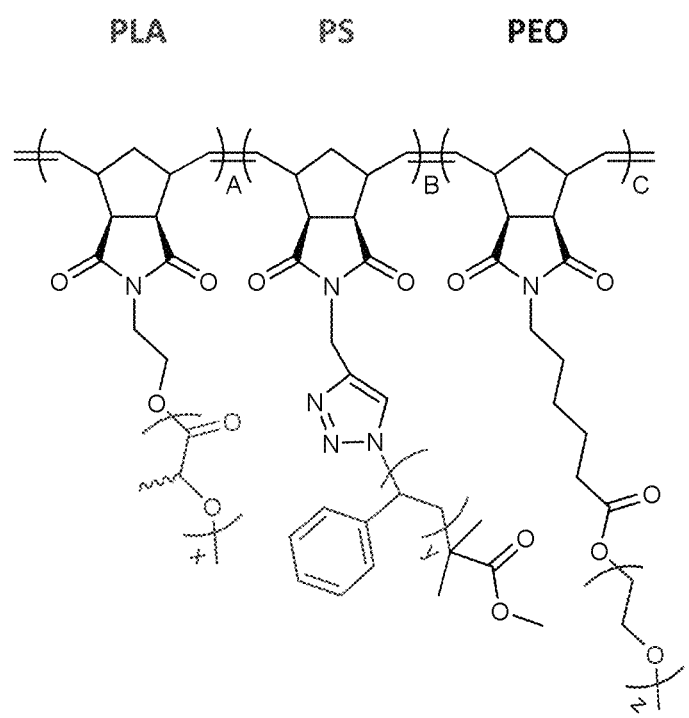
FIG. 44: Structure of ABC brush triblock terpolymers. The grafted side chains are PLA (A), PS (B), and PEO (C).
Figure 45:
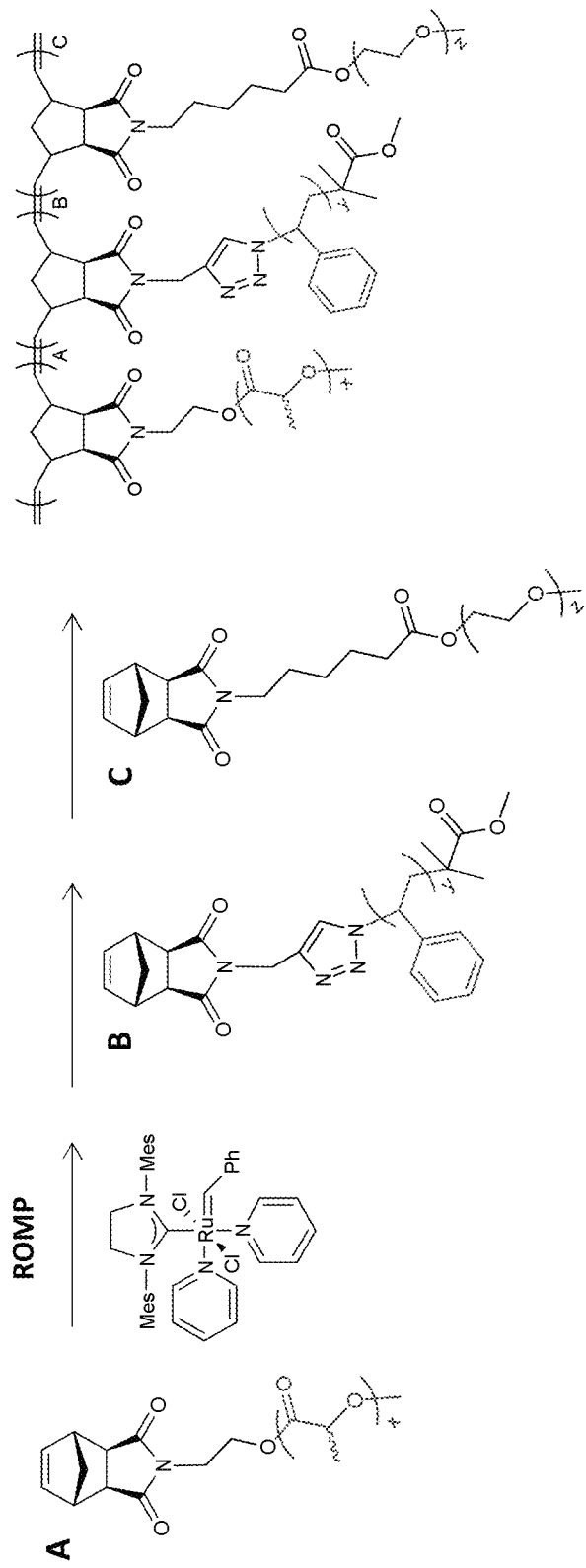
FIG. 45: Synthesis of ABC brush triblock terpolymers by grafting-through ROMP.

We synthesized a series of ABC triblock terpolymers having grafted (PLA), polystyrene (PS), and poly(ethylene oxide) (PEO) side chains of similar molecular weights ($M_n$=2.62, 2.65, 2.27 kg/mol, respectively) (FIG. 44). These ABC triblocks were synthesized by the grafting-through ring-opening metathesis polymerization (ROMP) of norbornene-functionalized macromonomers (FIG. 45). As described in earlier documents related to our patent strategy, these brush block copolymers (BBCPs) are unique compared to previously reported graft polymers. The BBCPs have the following advantages
   a) complete grafting in all blocks (not only one block);
   b) 100% side chain grafting density on the backbone;
   c) excellent control over molecular weight;
   d) narrow dispersity (Đ <1.2); and
   e) no required post-polymerization modifications.

Our system incorporates blocks with advantageous physical and chemical properties: (i) chemically etchable, biorenewable PLA; (ii) thermoplastic PS; and (iii) water-soluble, biocompatible PEO. Other polymers with desired physical or chemical properties can be incorporated in the ABC architecture, creating new platforms for polymer materials.

The structure can be varied in many ways. There are two approaches to introducing asymmetry: (1) Varying the backbone degrees of polymerization (A, B, C) and (2) varying side chain degrees of polymerization (x, y, z). Both approaches to introducing asymmetry vary the effective volume fractions of blocks, and therefore potentially affect the self-assembly and properties of the triblocks.

Figure 46:
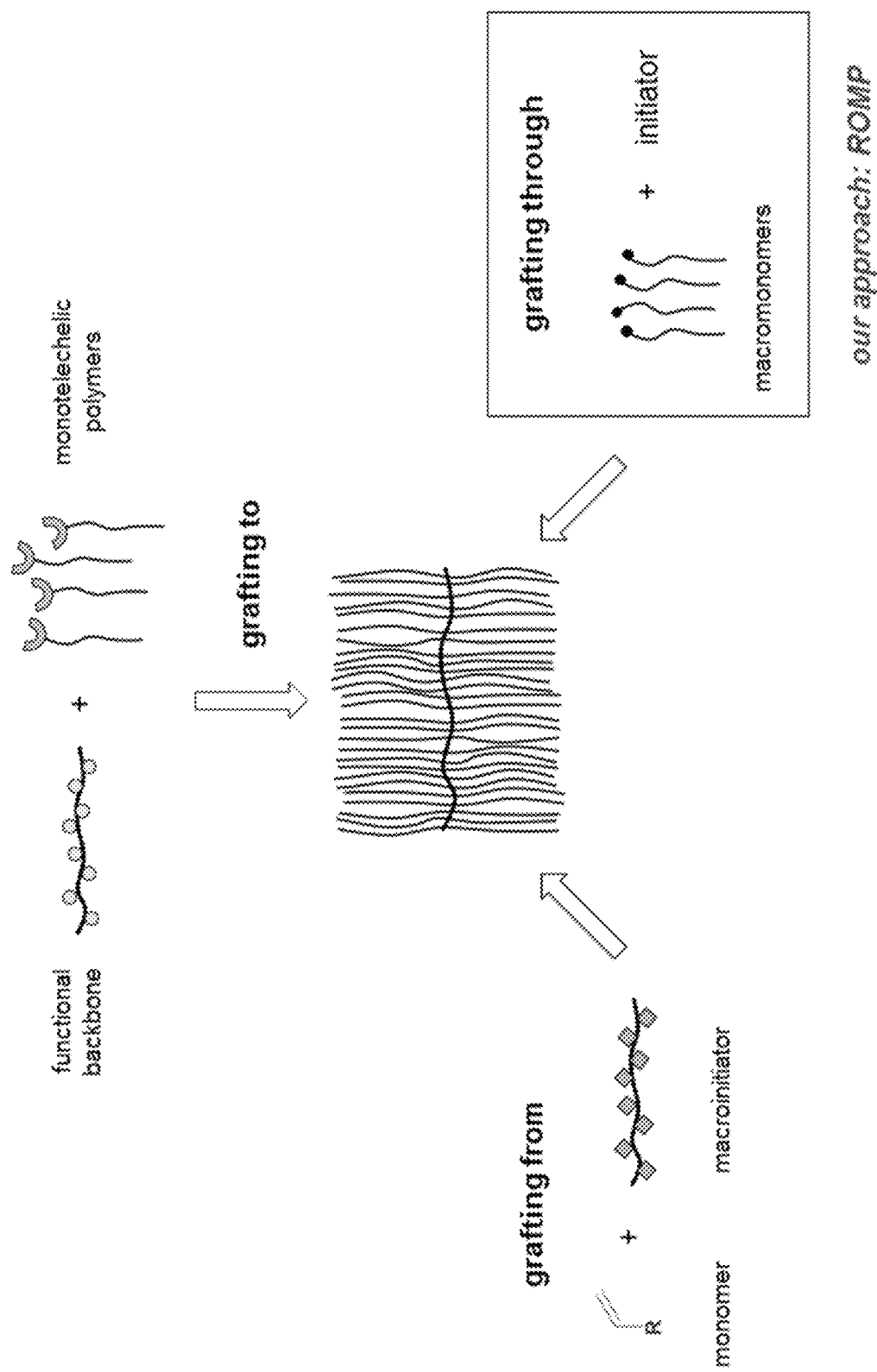
FIG. 46: Approaches to synthesizing bottlebrush polymers.

ROMP enables independent variation of all structural parameters as synthesis of ABC bottlebrush polymers by other strategies is challenging. There are three general approaches to synthesizing bottlebrush polymers: grafting to, grafting from, and grafting through (FIG. 46). Grafting-to and grafting-from approaches to synthesizing brush block copolymers typically result in incomplete grafting of the backbone and/or broad distributions in the lengths of side chains. In addition, they often involve complicated protection/deprotection steps. For these reasons, the grafting-to and grafting-from approaches are not synthetically tractable for generating a library of polymers for systematic study of ABC brush triblock self-assembly.

The Rzayev group recently reported a system of interest. Rzayev and coworkers synthesized an ABC brush triblock terpolymer by grafting from a poly(methyl methacrylate) backbone.[3] The side chains were polystyrene (PS), poly(methyl methacrylate) (PMMA), and (PLA). Because the synthesis required multiple grafting from steps from a pre-formed backbone, only one composition was synthesized and characterized. Size-exclusion chromatography (SEC) indicated a broad distribution of molecular weights, and small-angle X-ray scattering (SAXS) of a thermally annealed sample suggested minimal long-range order. The PS-PMMA-PLA triblock self-assembles to two-phase lamellae with domain spacing 79 nm.

Figure 47:
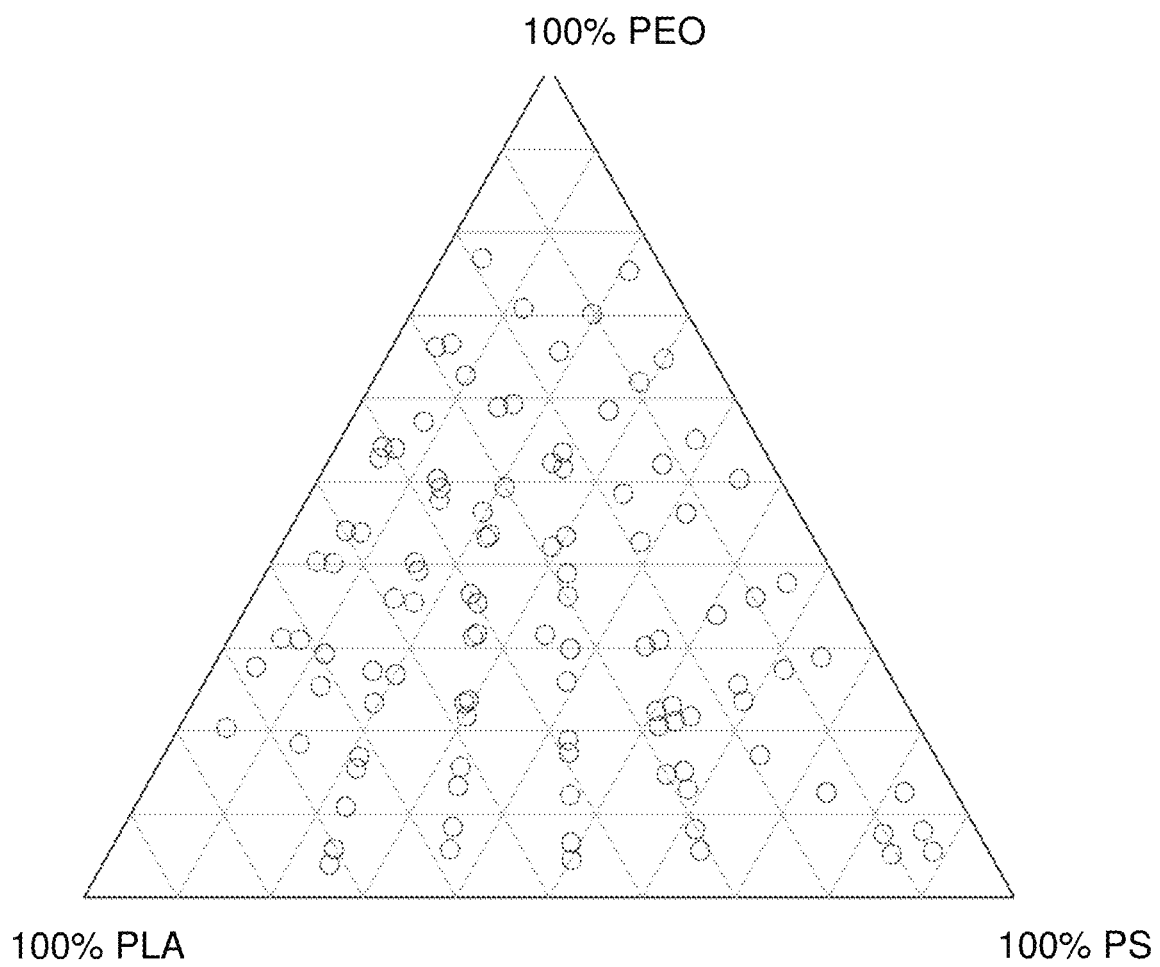
FIG. 47: Blank ternary diagram showing the compositions of all the ABC brush triblock terpolymers synthesized.

Using ROMP, we were able to synthesize many ABC brush triblock terpolymers rapidly and with excellent control over the polymer architecture. FIG. 47 shows >100 ABC triblocks we were able to synthesize in under 1 week. The samples spanned various variations in backbone degree of polymerization and side chain molecular weight. This blank ternary diagram shows that the samples cover the entire composition space.

Figure 48:
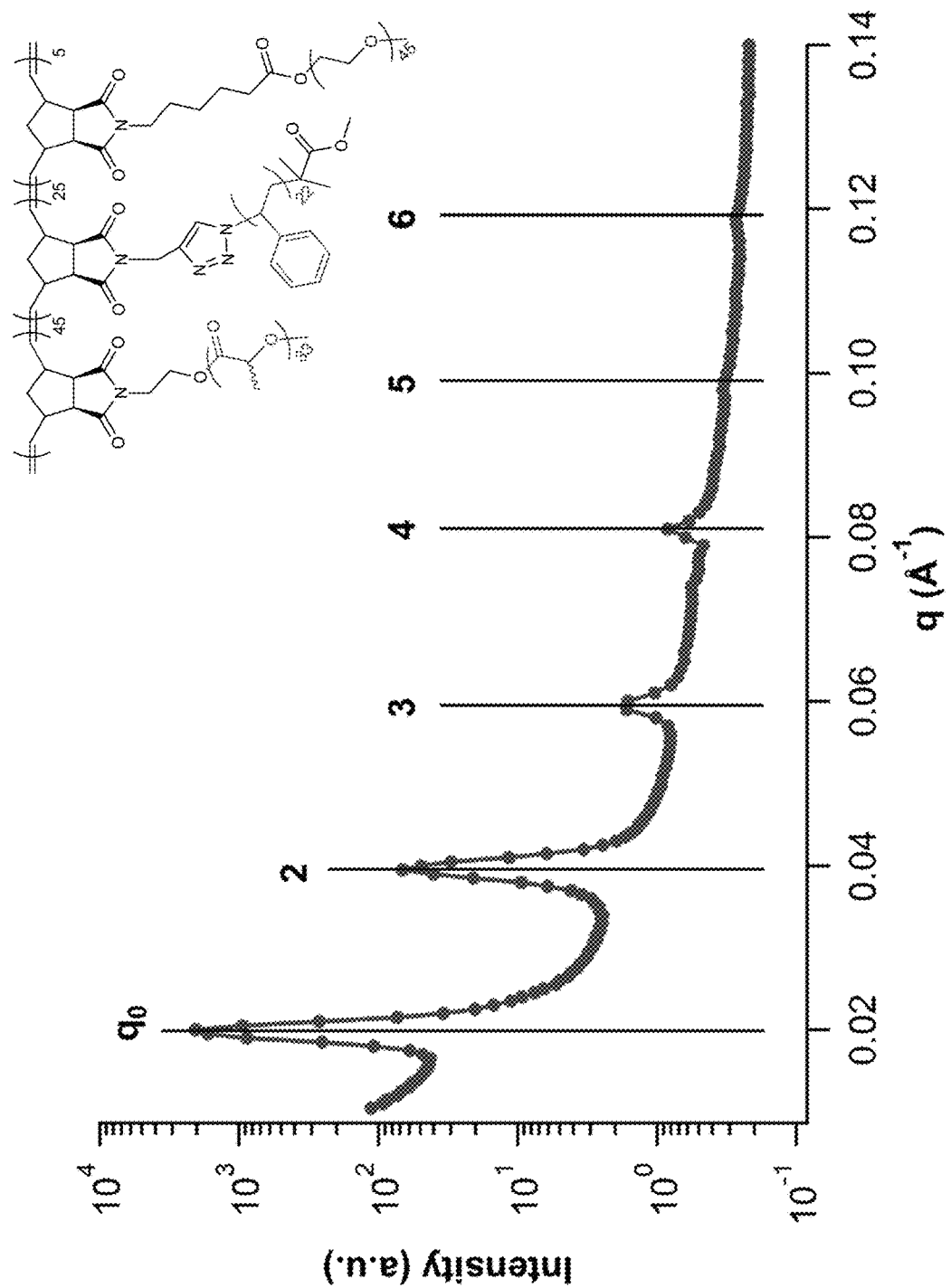
FIG. 48: SAXS profile for PLA-PS-PEO brush triblock terpolymer. Volume fractions of side chains: $f_{PLA}$=0.58, $f_{PS}$=0.36, $f_{PEO}$=0.06.

The polymers were thermally annealed at 140° C. and characterized by synchrotron-source SAXS. FIG. 48 provides an example of an ABC brush triblock that self-assembles to well-ordered lamellae. Sharp diffraction peaks present at relative positions $q/q_o$=1, 2, 3, 4, 5, 6 are consistent with lamellar symmetry. The lowest-order reflection at $q_o$=0.020 Å indicates that the lamellar period is 31.4 nm.

Figure 49:
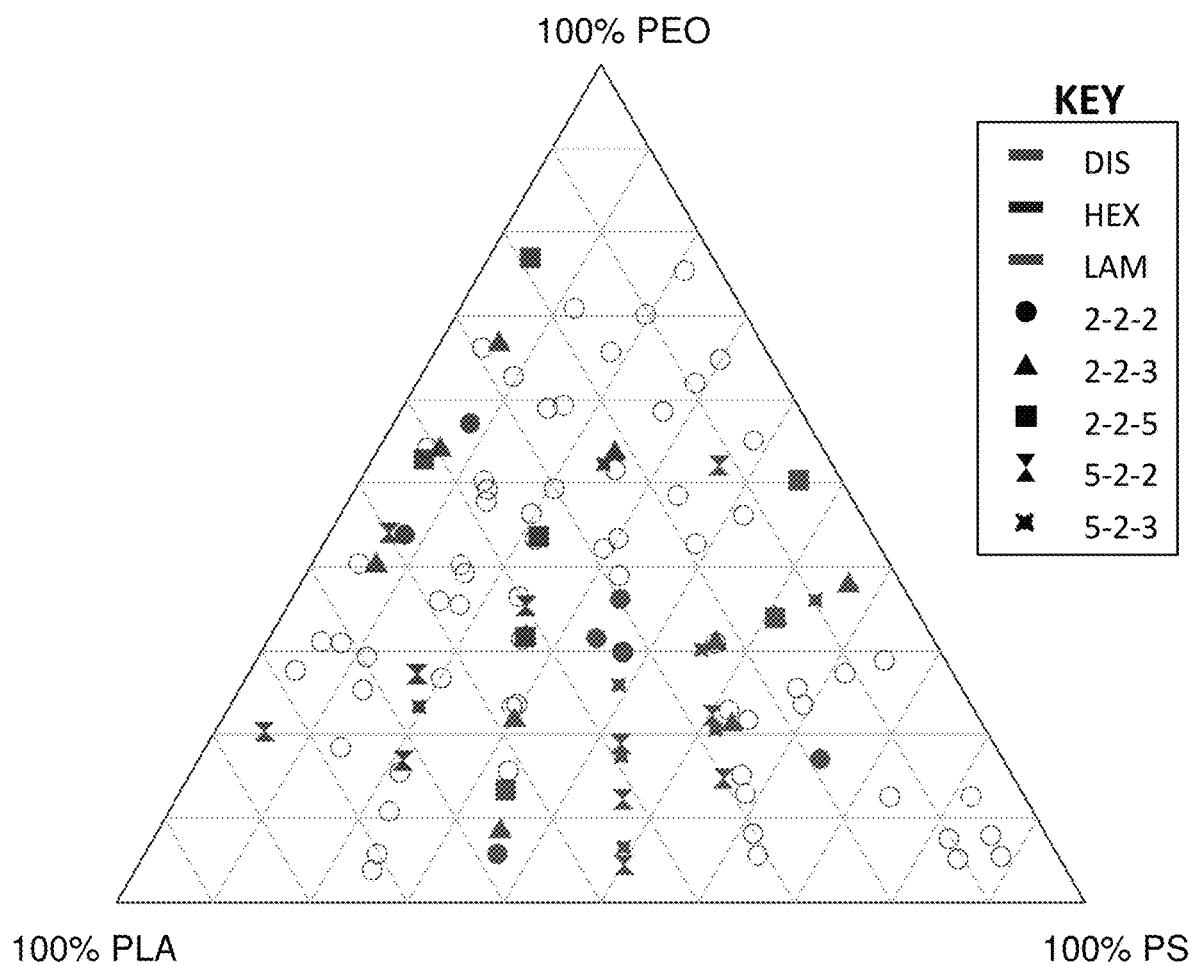
FIG. 49: Ternary phase diagram with structures as identified by SAXS.

SAXS analysis for all synthesized samples enables assignments for the self-assembled morphologies. In this way, we developed a comprehensive understanding of ABC brush triblock copolymer self-assembly. Compare FIGS. 47 and 49. The structures that can be unambiguously assigned by SAXS appear in color in FIG. 49. There is a large region of lamellar (LAM, green) morphologies, a narrow band of stable hexagonally packed cylinder structures (HEX, blue), and at low midblock content, a disordered region. The different shapes represent different variations in side chain asymmetry.

Real-space observation by transmission electron microscopy (TEM) complements structural assignments by SAXS. For the ABC brush triblock that afforded the scattering pattern in FIG. 48. TEM (FIG. 50) shows long-range order and three-phase contrast (dark-medium-dark-light). Remarkably, the observed domain connectivity for these materials is not consistent with widely accepted knowledge in the field of block copolymer self-assembly.

REFERENCES

1. Zheng, W.; Wang, Z.-G. Morphology of ABC triblock copolymers. Macromolecules 1995, 28, 7215-7223.
2. Bates, F. S.; Fredrickson, G. H. Block Copolymers—Designer Soft Materials. Phys. Today 1999, 52, 32-38.
3. Rzayev, J. Synthesis of Polystyrene—Bottlebrush Block Copolymers and Their Melt Self-Assembly into Large Domain Nanostructures. Macromolecules 2009, 42, 2135-2141.

Example 5: Brush Polymer Ion Gels

Abstract

The structure, rheological response, and ionic conductivity of ABA brush block copolymer (BBCP) ion gels containing 1-butyl-3-methylimidazolium bis(trifluoromethylsulfonyl)imide ([BMIm][TFSI]) at polymer concentrations spanning 5-50 wt % ($\Phi_{gel}$) were studied by small angle X-ray scattering, dynamic mechanical analysis, and AC impedance spectroscopy. Application of a hard sphere form factor and Percus-Yevick structure factor reveals trends in gel micellar structure as a function of BBCP molecular weight, block volume fraction ($\Phi_A$), and $\Phi_{gel}$. Viscoelastic properties are strongly dependent on end-block molar mass, with storage moduli≤$10^3$ Pa at 25° C. Impedance measurements reveal near liquid-like dynamics in the matrix phase as evidenced by conductivities ca. 1 mS/cm at 25° C. that decrease with increasing $\Phi_{gel}$ and $\Phi_A$.

Introduction

The unique properties of ionic liquids[1] (ILs) stimulate considerable research interest across a variety of contemporary materials applications.[2] High intrinsic IL ion density coupled with liquid-like diffusivity and a large electrochemical stability window are enticing attributes for energy storage and conversion devices.[3] Composites of ILs and physically[6-8] cross-linked polymers, so-called "ion gels," derive a remarkable blend of beneficial properties from their constituent components, including moderate mechanical integrity and high ionic conductivity. Continued optimization of polymer structure and corresponding IL interactions remains an important challenge.[9]

Linear ABA triblock copolymers with ionophobic A blocks and ionophilic B blocks form reversible physically cross-linked networks comprising A block micelles in a B+IL matrix.[6] Lodge and co-workers have reported the connection between ionic conductivity and rheological properties for polymers including poly(styrene-block-methyl methacrylate-block-styrene) (PS-PMMA-PS),[10] poly(styrene-block-ethylene oxide-block-styrene) (PS-PEO-PS),[11] poly(styrene-block-ethyl acrylate-block-styrene) (PS-PEA-PS),[12] and PS-PEO-PS with chemically cross-linked PS cores[13] in 1-ethyl-3-methylimidazolium bis(trifluoromethylsulfonyl)imide ([EMIm][TFSI]). The potential industrial impact delivered by this class of soft materials is highlighted by their successful implementation in a variety of electronic devices.[14-17]

Here, we probe the effect of ABA triblock polymer architecture (brush vs. linear) on gel microstructure, viscoelastic response, and ionic conductivity. Literature describing brush block copolymer (BBCP) micelles to date remains scarce.[18] The poly[(norbornene-graft-styrene)-biock-(norbornene-graft-ethylene oxide)-block-(norbornene-graft-styrene)] (gPS-gPEO-gPS) materials studied herein were synthesized by ring opening metathesis polymerization as reported previously.[19] Each block contains 100% grafting density with PS ($N_{PS}$=21) and PEO ($N_{PEO}$=45) side-chains. Four gPS-gPEO-gPS triblocks with backbone degrees of polymerization $N_A$:$N_B$:$N_A$=3:85:3, 6:87:5, 11:78:11, and 15:119:15 were gelled in 1-butyl-3-methylimidazolium bis(trifluoromethylsulfonyl)imide ([BMI][TFSI]) at polymer concentrations spanning≈5-50 wt % and analyzed by a combination of small angle X-ray scattering (SAXS), dynamic mechanical analysis (DMA), and alternating current (AC) impedance spectroscopy. The elucidated structure, dynamics, and transport properties of these gels provide insight into the influence of polymer architecture on physically cross-linked networks.

Experimental
Materials Characterization

Full brush polymer synthetic details are described in the supporting information of our previous report.[19] The first gPS block molar masses were determined by size exclusion chromatography (SEC) in THF with 1 vol % triethylamine using a Wyatt ViscoStar viscometer, Optilab rEX differential refractive index detector, and three-angle miniDAWN TREOS light scattering detector with do/dc measured on-line assuming 100% mass elution under the polymer peak. Second and third block number-average molar masses were determined by $^1$H NMR. Differential scanning calorimetry (DSC) data were collected with a TA Instruments Q2000 on second heating between temperatures −90-120° C. at a rate of 10° C./min.

Small Angle X-Ray Scattering (SAXS)

SAXS patterns were collected at Argonne National Laboratory beamline 12-ID-B. Gels were prepared in aluminum DSC pans, dried in air for at least two days, and hermetically sealed. Blank aluminum pan background scattering was subtracted before analysis. A description of the SAXS model utilized in the analysis is also provided herein in the appendix Dynamic Mechanical Analysis (DMA)

Dynamic mechanical analysis (DMA) was used to extract storage (G') and loss (G") moduli of 16 wt % gPS$_3$-gPEO$_{85}$-gPS$_3$ and gPS$_{15}$-gPEO$_{119}$-gPS$_{15}$ ion gels. Measurements were collected on a Rheometric Scientific ARES-RFS instrument using oscillatory shear with 50 mm or 25 mm diameter parallel plates for gPS$_3$-gPEO$_{85}$-gPS$_3$ and gPS$_{15}$-gPEO$_{119}$-gPS$_{15}$, respectively. Each gel was isothermally equilibrated at temperatures 25-85° C. for 30 min prior to measurement. Strain sweeps were performed to determine the linear viscoelastic regime (0.5-2% strain). In agreement with bulk gPS-gPEO-gPS,[19] time-temperature superposition of the relaxation spectra fails; the data are therefore reported as isothermal frequency sweeps.

AC Impedance Spectroscopy

Brush polymer and [BMIm][TFSI] were dissolved in cyclopentanone with stirring for approximately 18 hours, drop cast onto 1 mm stainless steel (SS) electrodes, and dried at room temperature for 24 hours; all operations were carried out in a dry room (dew point <−45° C.) to avoid moisture contamination. $^1$H NMR experiments established this drying protocol to be sufficient to remove all traces of cyclopentanone. A Teflon spacer (0.15 mm thick) composed of a 9.52:15.875 mm inner:outer diameter annulus surrounded the ion gel to prevent cell shorting and was covered with a second 1 mm thick SS electrode. The SS+ion gel+SS sandwich was pressed into a coin cell using a SS spring to ensure electrical contact. Coin cell components purchased from Pred Materials (part # CR2032) included a coin cell kit (Al-clad case, cap, and gasket), coin cell wave spring (15.0 mm diameter, 1.4 mm height), and coin cell spacer disk (16.0 mm diameter, 1.0 mm thickness). AC impedance measurements were performed with a Princeton Applied Research/Ametek VersaSTAT MC. Potentiostatic AC impedance spectra with a 10 mV RMS AC signal were obtained between 1 MHz and 100 mHz. Ionic conductivity (σ) was determined using the equation σ=L/(AR), where L is the sample thickness (taken as the Teflon spacer thickness, 0.15 mm), A is the contact surface area between the ion gel and the SS electrodes (151.21 mm$^2$), and R is the impedance value extracted from the high frequency plateau of the Bode Re(Z) plot. A Tenney TUJR thermal test chamber was used for variable temperature measurements. Samples were equilibrated for ≥30 min at each temperature prior to data collection.

Results and Discussion
Brush Polymer Ion Gel Structure

Characterization data for the four BBCPs studied are reported in Table 14. The samples include a range of gPS end block and total BBCP molar masses. Note that a modest increase in $N_A$ from 3 to 15 yields an additional 252 styrene monomers since the grafted PS side chain degree of polymerization is $N_{PS}$≈21. For concentrations ≥5 wt %, gPS$_{11}$-gPEO$_{78}$-gPS$_{11}$ and gPS$_{15}$-gPEO$_{119}$-gPS$_{15}$ in [BMIm][TFSI] formed gels upon co-solvent evaporation, while gPS$_6$-gPEO$_{87}$-gPS$_5$ and gPS$_3$-gPEO$_{85}$-gPS$_3$ required increased polymer loadings (≥9 and 16 wt %, respectively), reflecting an increased critical micelle concentration.

Figure 51:
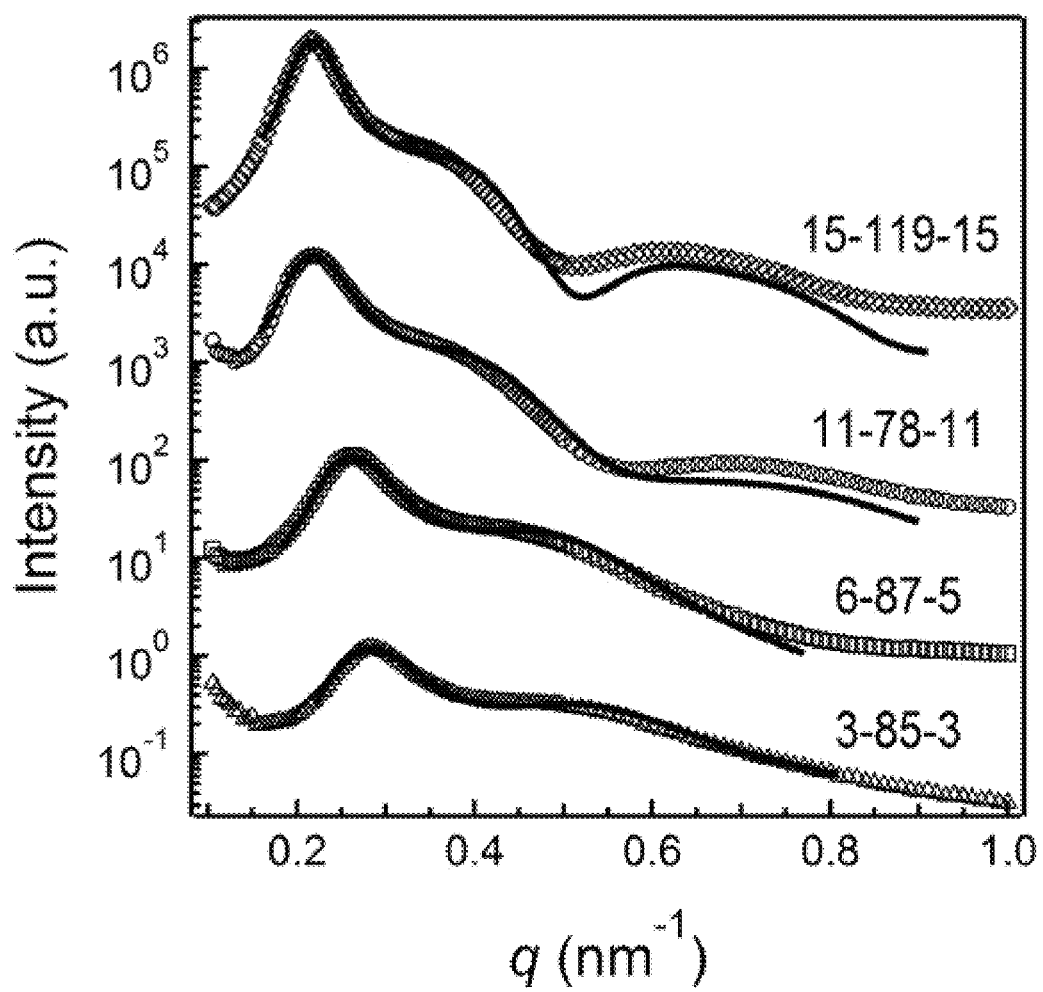
FIG. 51: Representative ion gel SAXS patterns derived from 4 different BBCPs at 33 wt % polymer concentration. Solid black lines are model fits using a hard sphere form factor and Percus-Yevick structure factor. Traces are shifted vertically for clarity.

Ion gel SAXS patterns of each BBCP at 33 wt % polymer are shown in FIG. 51. Model fits derived from a hard sphere form factor and Percus-Yevick structure factor are displayed as solid black lines and qualitatively capture the experimental data. The primary inter-particle interference peaks (denoted q*) at small q are fit particularly well. q* progressively decreases as BBCP molar mass increases, resulting in average inter-micellar distances d=2π/q* ranging from 22.3-29.0 nm.

TABLE 14

BBCP Characterization Data

| Sample[a] | N[b] | M$_n$[c] | Đ | Φ$_{gPS}$[d] |
|---|---|---|---|---|
| gPS$_3$-gPEO$_{85}$-gPS$_3$ | 3-85-3 | 208.3 | 1.05 | 0.077 |
| gPS$_6$-gPEO$_{87}$-gPS$_5$ | 6-87-5 | 224.8 | 1.12 | 0.12 |

TABLE 14-continued

BBCP Characterization Data

| Sample[a] | N[b] | $M_n$[c] | Đ | $\Phi_{gPS}$[d] |
|---|---|---|---|---|
| $gPS_{11}$-$gPEO_{78}$-$gPS_{11}$ | 11-78-11 | 234.3 | 1.17 | 0.24 |
| $gPS_{15}$-$gPEO_{119}$-$gPS_{15}$ | 15-119-15 | 347.5 | 1.08 | 0.22 |

[a]Samples $gPS_{11}$-$gPEO_{78}$-$gPS_{11}$ and $gPS_{15}$-$gPEO_{119}$-$gPEO_{15}$ were previously reported.[19]
[b]Molar mass of the first block was calculated by SEC using a measured dn/dc (0.165) in THF with 1 vol % triethylamine; second and third block molar masses were calculated by $^1$H NMR spectroscopy.
[c]kg/mol.
[d]gPS volume fraction calculated using $\rho_{PS}$ = 1.05 g/cm$^3$ and $\rho_{PEO}$ = 1.064 g/cm$^3$.

The secondary shoulder (for instance, at approximately q=0.37 nm$^{-1}$ for the $gPS_{15}$-$gPEO_{119}$-$gPS_{15}$ gel) also arises from the structure factor but is less sufficiently captured by the model, which predicts a maximum shoulder intensity at q≈0.41 nm$^{-1}$. Both this artifact and the shoulder intensity are more pronounced at larger molar masses and higher polymer concentrations. (Concentration effects are further discussed below.) Broad, low intensity form factor scattering at high q is observed for $gPS_{11}$-$gPEO_{78}$-$gPS_{11}$ and $gPS_{15}$-$gPEO_{119}$-$gPS_{15}$ at moderate to high concentration (≥16 wt %) but is not observed for all $gPS_6$-$gPEO_{87}$-$gPS_5$ and $gPS_3$-$gPEO_{85}$-$gPS_3$ concentrations (5-50 wt %). While the overlay of the fit and the form factor peaks is imperfect, the qualitative shape and approximate peak positions agree with the experimental data. The presence of form factor scattering suggests that the two higher molar mass BBCPs form more defined micelles with sharper interfaces that better approximate the hard sphere assumption explicit in the model. (Note that we incorporated a Gaussian diffuse micelle-matrix interface into the SAXS model but found almost no dependence on the standard deviation fit parameter; the reported fits thus only reflect a perfectly sharp boundary.) The lower molar mass gPS end-blocks may better accommodate small quantities of ionic liquid in the micelle core, causing a reduction in scattering contrast and consequently attenuated intra- and inter-particle scattering intensity. Relative primary peak intensities shown in FIG. 51 are consistent with this interpretation.

Figure 52:
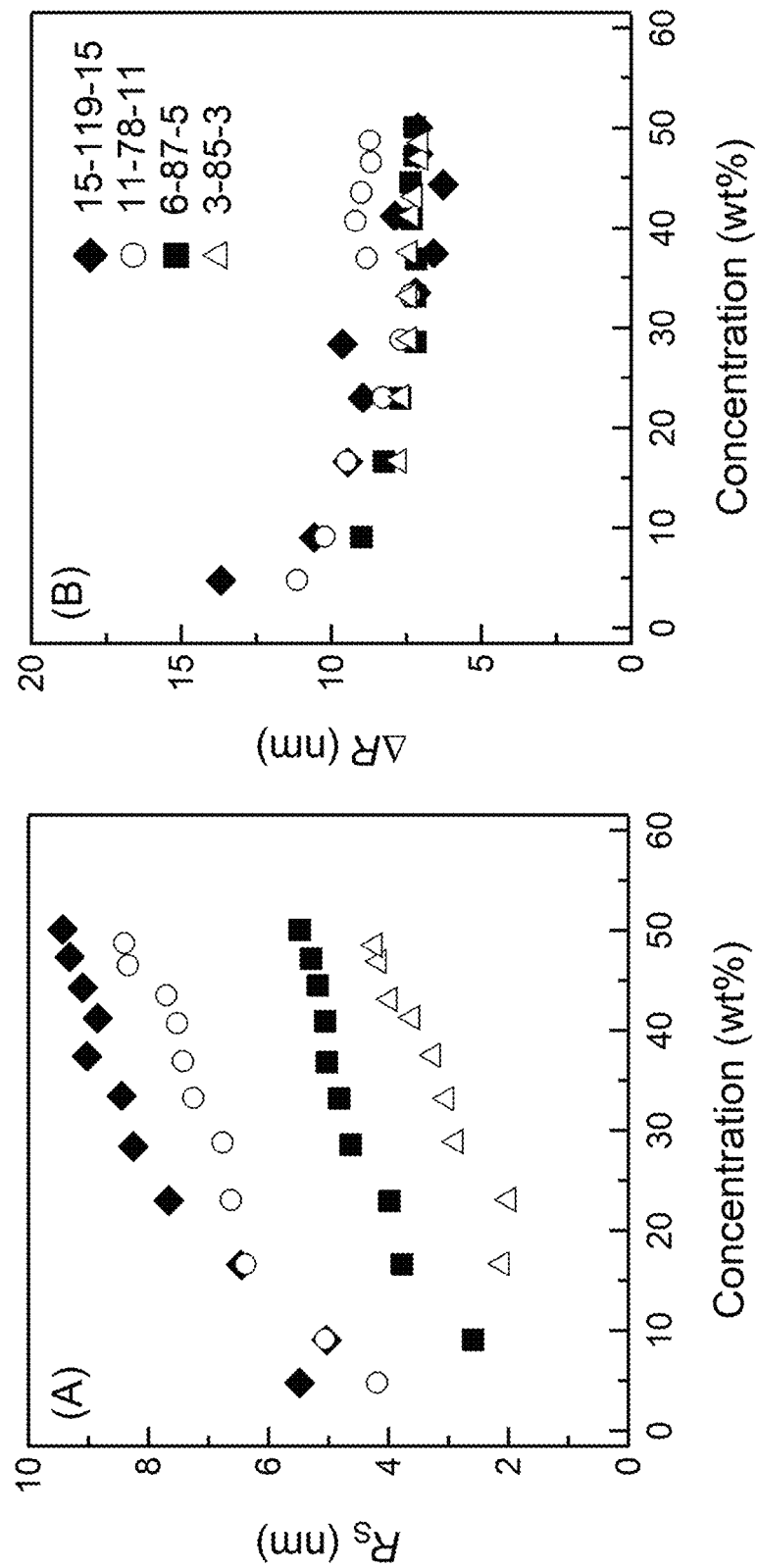
FIG. 52: (A) Spherical core radius and (B) $\Delta R$ ($=R_{HS}-R_S$) as a function of polymer concentration.

FIG. 52 shows extracted micelle core radii ($R_S$) and $\Delta R$(=$R_{HS}$–$R_S$) determined for each ion gel. $R_S$ values follow the expected trends, increasing with gPS end block molar masses (at constant grafted $N_{PS}$) and polymer concentration. Core size standard deviations are typically ≈1±0.5 nm. After quickly dropping at low concentrations, $\Delta R$ shows relatively little concentration dependence. Similar trends are observed with linear triblock polymers dissolved in B-block selective solvents.[20] Localization of the A-B block interface at the surface of the micelle generates steric congestion in its vicinity that can cause a softer but still repulsive interaction potential at radii larger than that pervaded by the impenetrable spherical core. The hard sphere radius is controlled primarily by polymer chain connectivity and thus varies little with concentration, leading to a constant $\Delta R$. The more irregular $gPS_{15}$-$gPEO_{119}$-$gPS_{15}$ parameters might be related to the aforementioned difficulties fitting the q* shoulder, which impacts $R_{HS}$ through the calculated structure factor.

Figure 53:
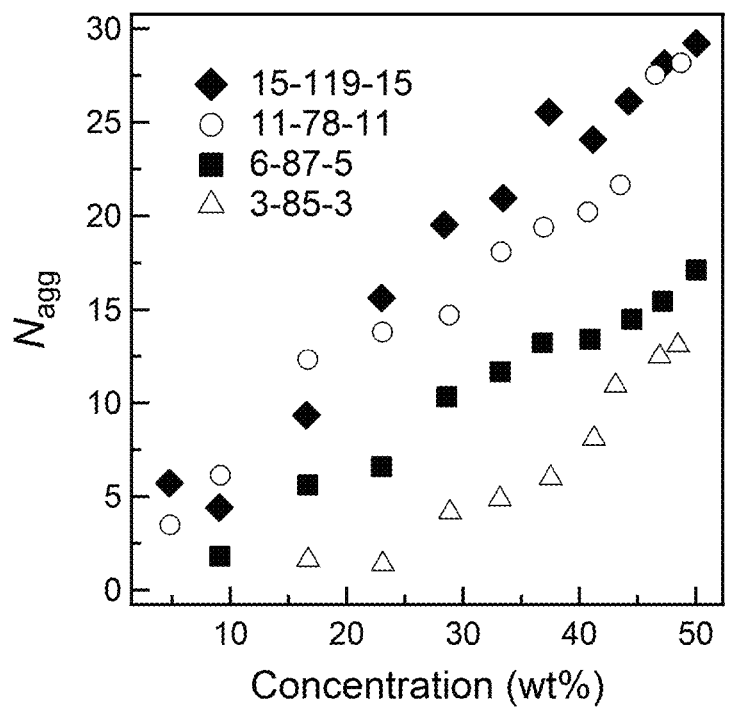
FIG. 53: Aggregation number as a function of polymer concentration.
Figure 54:
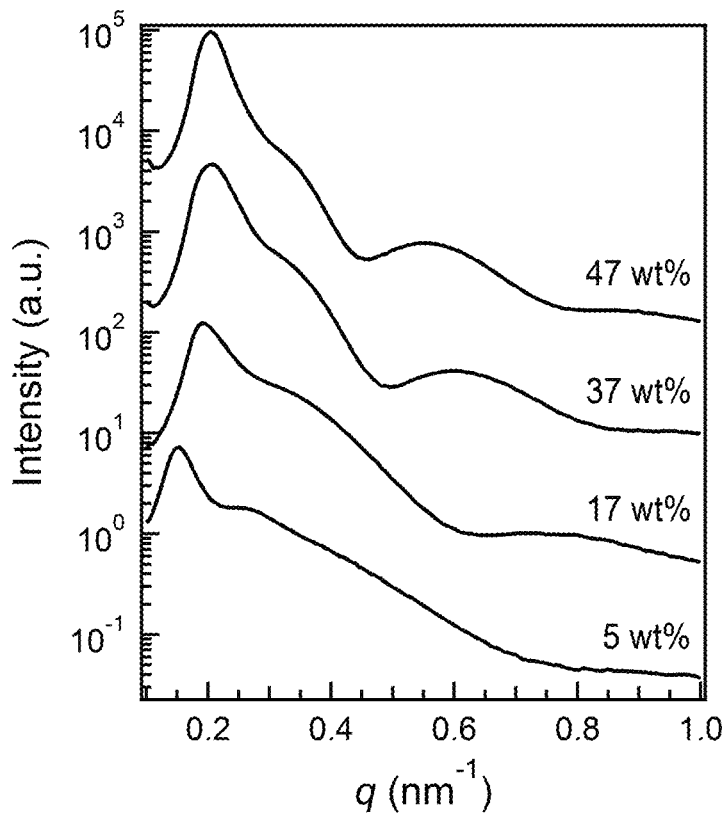
FIG. 54: SAXS patterns (25° C.) at various $gPS_{15}$-$gPEO_{119}$-$gPS_{15}$ concentrations. Traces are shifted vertically for clarity.

The aggregation number per micelle ($N_{agg}$) was calculated according to Eq. 3 assuming no ionic liquid core penetration (FIG. 53). Herein we define $M_{n,gPS}$ as the total molecular weight of a single A block (including the norbornene backbone) and assume $\rho_{gPS} \approx \rho_{PS}$=1.05 g/cm$^3$.

$$\frac{4}{3}\pi R_S^3 = \frac{2M_{n,gPS}N_{agg}}{N_{Av}\rho_{PS}} \quad \text{Eq. 3}$$

$N_{agg}$ thus describes the average number of BBCP chains per micelle, each of which contains numerous pendant low molar mass PS side-chains (with $N_{PS}$≈21). This present definition of $N_{agg}$ necessarily differs from that for standard linear ABA triblock polymers, where the aggregation number describes the average number of polymer (i.e. polystyrene) chains per micelle.

Calculated $N_{agg}$ values (FIG. 53) are considerably smaller than for linear ion gel analogues, a consequence of the BBCP architecture. Assuming the micelle is composed exclusively of A blocks and that the polymer density is equivalent for linear and brush materials (i.e., neglecting any norbornene backbone and architectural contribution), the micelle size should be controlled by the total number of incorporated styrene monomers. As calculated for $gPS_{15}$-$gPEO_{119}$-$gPS_{15}$ at 50 wt %, $R_S$=9.4 nm and $N_{agg}$=28.4 yields approximately 18,000 total styrene monomers per micelle. In comparison, an ion gel derived from linear PS-PMMA-PS with a reported $R_S$=9.4 nm (at 140° C.) and $N_{agg}$=65 contains 21,000 styrene monomers per micelle, in reasonable agreement.[21]

If free energy minimization drives the formation of micelles, the system in principle exhibits two limiting responses to accommodate higher polymer chain concentrations: (1) increasing micelle size at constant number density or (2) increasing micelle number density at constant size. Both mechanisms operate in BBCP ion gels. Higher molar mass BBCPs ($gPS_{11}$-$gPEO_{78}$-$gPS_{11}$ and $gPS_{15}$-$gPEO_{119}$-$gPS_{15}$) develop a pronounced form factor peak that shifts to lower q as concentration increases (FIG. 55), consistent with larger, better-defined micelles.

In contrast, neither $gPS_3$-$gPEO_{85}$-$gPS_3$ nor $gPS_6$-$gPEO_{87}$-$gPS_5$ produce significant high q peaks at any concentration investigated.

Additionally, a clear increase in q* is observed as concentration increases, especially at low to moderate concentrations (ca. 5-25 wt %). This decrease in inter-micellar domain spacing at constant temperature implies an increase in micelle number density. In the dilute concentration regime, nucleation of new micelles is apparently energetically favorable over the formation of large, isolated polymer aggregates. Additional topological constraints imposed by the brush architecture likely amplify the energetic preference due to a stiffer bending modulus that opposes the chain curvature necessary for looping, instead favoring bridging conformations that increase micelle number density at low concentration. The BBCP ion gel $N_{agg}$, d, and q* peak intensity concentration dependencies track those observed with linear ABA triblock polymers such as poly(methyl methacrylate-block-n-butyl acrylate-block-methyl methacrylate) swollen in B-selective solvents.[22]

Figure 55:
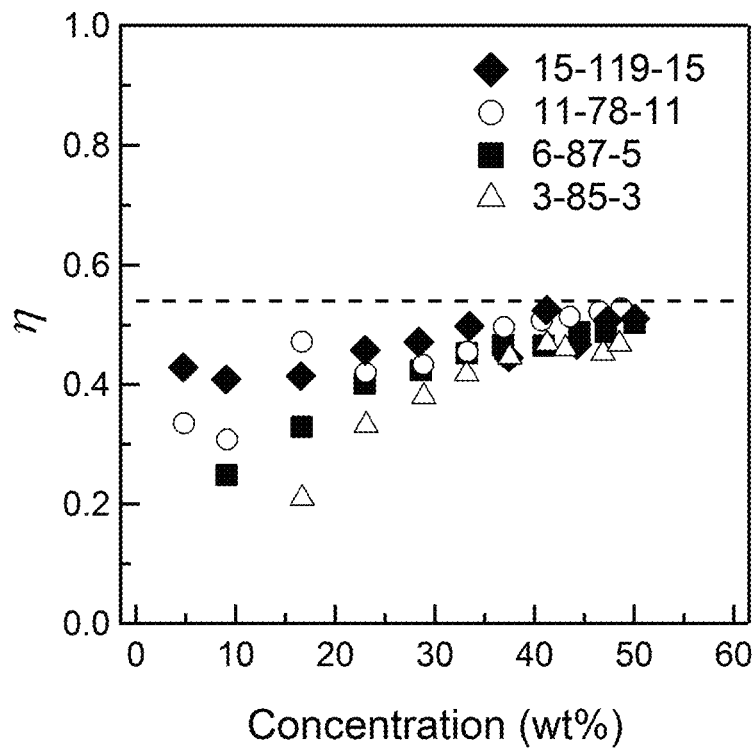
FIG. 55: Hard sphere volume fraction as a function of concentration.

FIG. 55 shows the hard sphere (micelle) volume fraction calculated using model fits. For most concentrations, BBCPs containing larger volume fractions of gPS (see Table 14) produce a higher volume fraction of micelles in the ion gel. At high polymer concentrations, all samples approach a limiting volume fraction η-0.54, which marks the onset of hard sphere crystallization and thus the maximum possible η[23] The asymptotic approach to the expected high concentration value supports to a first approximation the use of a hard sphere potential in modeling brush polymer inter-micellar interactions. Similar trends have been observed with linear poly(ethylene oxide-block-propylene oxide-block-ethylene oxide) triblock polymer micelles in water.[20]

Dynamic Mechanical Analysis (DMA)

Figure 56:
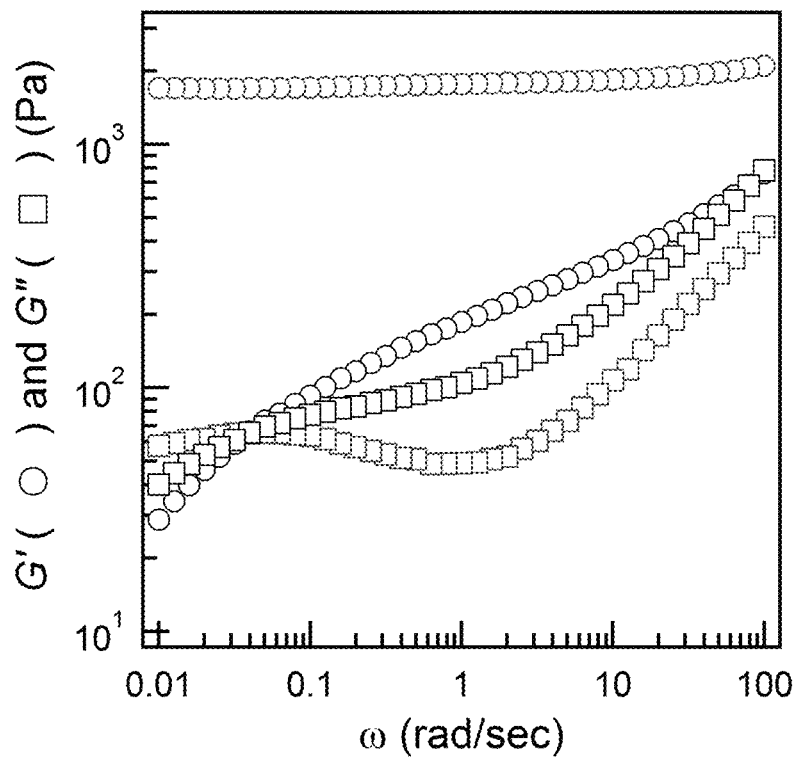
FIG. 56: Dynamic mechanical analysis of $gPS_{15}$-$gPEO_{119}$-$gPS_{15}$ (red) and $gPS_3$-$gPEO_{85}$-$gPS_3$ (black) 16 wt % ion gels at 25° C.

Frequency-dependent storage and loss moduli are reported in FIG. 56 for $gPS_3$-$gPEO_{85}$-$gPS_3$ and $gPS_{15}$- gPEO$_{119}$-gPS$_{15}$ at 25° C. The two samples exhibit markedly different viscoelastic behavior, primarily a consequence of the disparate gPS end block molar masses.

G' for gPS$_{15}$-gPEO$_{119}$-gPS$_{15}$ ($\Phi_{gPS}$=0.22) remains almost constant ($\approx 10^3$ Pa) at frequencies 0.01-100 rad/sec and temperatures 25-85° C. In contrast, gPS$_3$-gPEO$_{85}$-gPS$_3$ ($\Phi_{gPS}$=0.077) transitions from a solid-like (G'>G") to liquid-like (G'<G") response at 25° C. on roughly a $10^2$ sec timescale, which shortens by at least four orders of magnitude as the temperature increases to 85° C. The strong dependence of modulus and relaxation time on end-block length, polymer composition, and/or temperature is also observed with linear ABA block copolymer gels.[22] The energetic penalty for chain pullout (a stress relaxation mechanism) is controlled by the interaction parameter $\chi_{AS}$ characterizing the unfavorable A block-solvent interactions. For solutions exhibiting upper critical solution behavior (as expected for PS-ionic liquid interactions), $\chi_{AS} \sim T^1$ and thus the interactions become more favorable as temperature increases. In contrast, increasing A block molar mass (N$_A$) should decrease intermixing with solvent since the ideal combinatorial entropy of mixing scales as $\Delta S_{mix} \sim N_A^{-1}$. Mid-block entanglements also significantly influence the modulus and relaxation of ABA triblock copolymers and their corresponding gels. While the grafted PEO side-chains are slightly longer than their entanglement molar mass (M$_e$=1.6 kDa),[24] the brush architecture suppresses entanglements,[25] decreasing the elastic modulus of bulk brush polymers relative to linear analogues.[26-28] This trend also holds for gels; a linear PS-PEO-PS ion gel ($\Phi_{PS} \approx 0.07$) exhibits frequency-dependent elastic moduli approximately $10^1$-$10^2$ Pa larger than the similar gPS$_3$-gPEO$_{85}$-gPS$_3$ BBCP reported herein.[10]

Brush Polymer Ion Gel Conductivities

Figure 57:
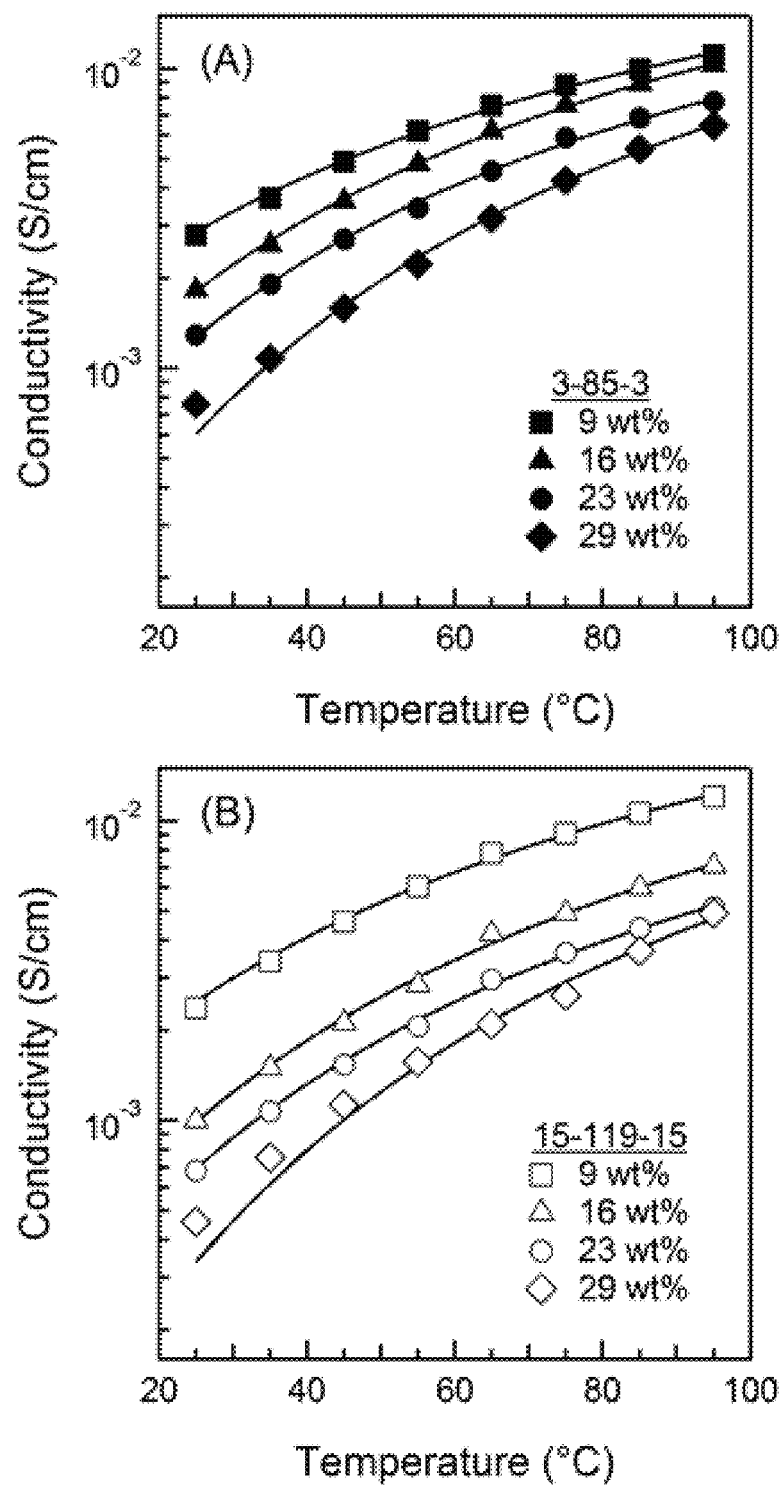
FIG. 57: Ionic conductivity as a function of temperature and concentration for (A) $gPS_3$-$gPEO_{85}$-$gPS_3$ and (B) $gPS_{15}$-$gPEO_{119}$-$gPS_{15}$. Solid black lines are fits to the VFT equation (parameters are provided in Table 2).

The ionic conductivity ($\sigma$) of three BBCP ion gels was probed using AC impedance spectroscopy over the temperature range 25-95° C. FIG. 57 compares the $\sigma$ concentration and temperature dependence of gPS$_3$-gPEO$_{85}$-gPS$_3$ and gPS$_{15}$-gPEO$_{119}$-gPS$_{15}$.

Figure 58:
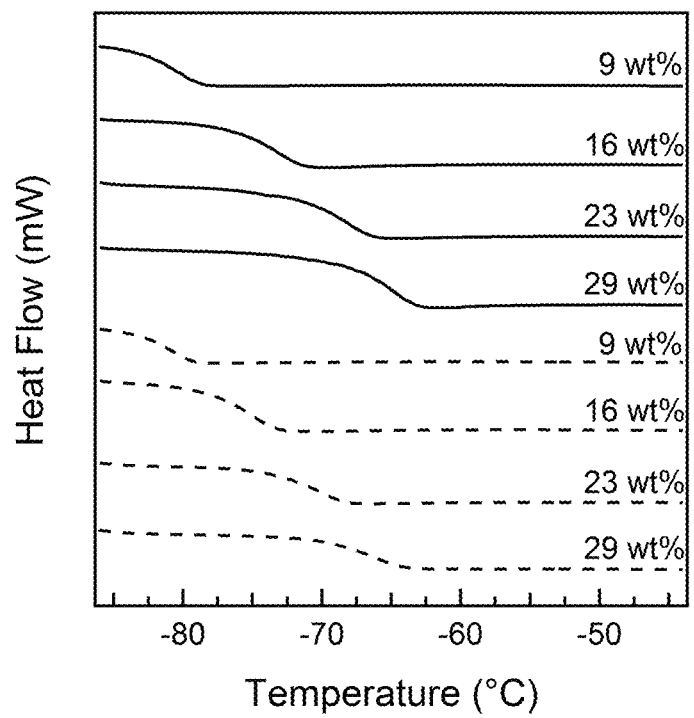
FIG. 58: DSC traces (exo up) acquired at 10° C./min of $gPS_3$-$gPEO_{85}$-$gPS_3$ (solid lines) and $gPS_{15}$-$gPEO_{119}$-$gPS_{15}$ (dashed lines) ion gels at various polymer concentrations. Glass transition temperatures are tabulated in Table 2.

Conductivities (~1 mS/cm at 25° C.) are comparable to ion gels derived from linear triblock copolymers[10] and represent a considerable increase relative to dry linear[29] and brush[19] electrolytes. The ionic conductivity temperature dependence is well-described by the Vogel-Fulcher-Tammann equation (Eq. 4), with the reference temperature defined herein as T$_0$=T$_g$, where T$_g$ is the glass transition temperature of the matrix (gPEO+IL, FIG. 58).

TABLE 15

Summary of DSC data and VFT fit parameters.

| Sample | Concentration (wt %) | T$_g$ (° C.) | $\sigma_0$ | B (K) |
|---|---|---|---|---|
| gPS$_3$-gPEO$_{85}$-gPS$_3$ | 9 | −80 | 0.0893 | 362 |
| | 16 | −73 | 0.121 | 412 |
| | 23 | −68 | 0.0903 | 397 |
| | 29 | −65 | 0.137 | 486 |
| gPS$_6$-gPEO$_{87}$-gPS$_5$ | 9 | −80 | 0.0852 | 374 |
| | 16 | −74 | 0.123 | 440 |
| | 23 | −69 | 0.143 | 492 |
| | 29 | −65 | 0.123 | 495 |
| gPS$_{15}$-gPEO$_{119}$-gPS$_{15}$ | 9 | −81 | 0.136 | 423 |
| | 16 | −75 | 0.120 | 480 |
| | 23 | −70 | 0.0821 | 456 |
| | 29 | −66 | 0.147 | 553 |

(Defining the reference temperature as T$_g$−50 changes the value of the fit parameters $\sigma_0$ and B but not the fit quality.)

$$\sigma = \sigma_0 e^{\frac{-B}{T-T_0}} \qquad \text{Eq. 4}$$

Conductivity generally decreases as polymer concentration increases due to an increase in T$_g$ and concomitant decrease in ion mobility, a trend also found in physically[12] cross-linked linear polymer gels. The low glass transition temperature of PEO ($\approx −60°$ C.) results in similar curvature for each ion gel concentration versus temperature dataset. A single T$_g$ is observed for all ion gels, indicating a homogenous ion-conducting phase; no PS T$_g$ is observed due to its low concentration in the gel. Glass transition temperatures and VFT fitting parameters are summarized in Table 15.

Figure 59:
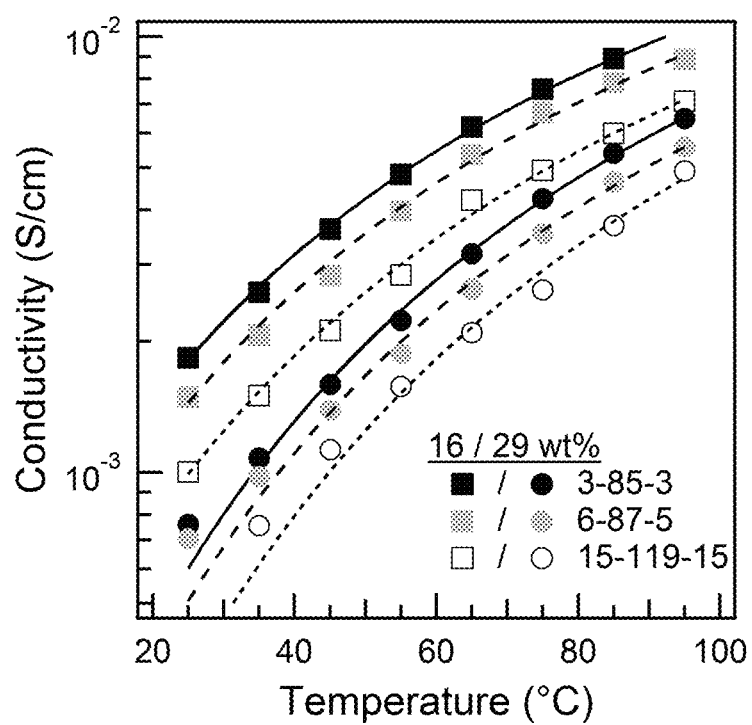
FIG. 59: Comparison of ionic conductivity for BBCP polymers at select concentrations. Solid and dashed lines are fits to the VFT equation.

Ion gel conductivity comparisons with three BBCPs at two concentrations (16 and 29 wt %) yields the following sequence at all temperatures (FIG. 59): gPS$_3$-gPEO$_{85}$-gPS$_3$>gPS$_8$-gPEO$_{87}$-gPS$_5$>gPS$_{15}$-gPEO$_{119}$-gPS$_{15}$.

The result that lower ratios of N$_A$:N$_B$ yield higher conductivities at equivalent temperatures and polymer concentrations seems intuitive but actually contrasts observations with linear polymer ion gels.[12]

Typically, larger N$_A$ at constant N$_B$ (e.g., 9-20-9 versus 2-20-2) produces a higher conductivity, since the fraction of ionic liquid in the conducting matrix at a constant polymer wt % loading increases. (The modest decrease in conductivity from an increase in PS volume fraction[11] apparently does not fully compensate for this effect.) The opposite trend measured with the brush polymers (FIG. 59: 3-85-3 versus 6-87-5) is small and may fall within experimental uncertainty, but was consistently observed for almost all samples, concentrations, and temperatures. The brush architecture might contribute to a larger micelle obstruction effect compared to linear analogues—further work to clarify this possibility is ongoing.

Figure 60:
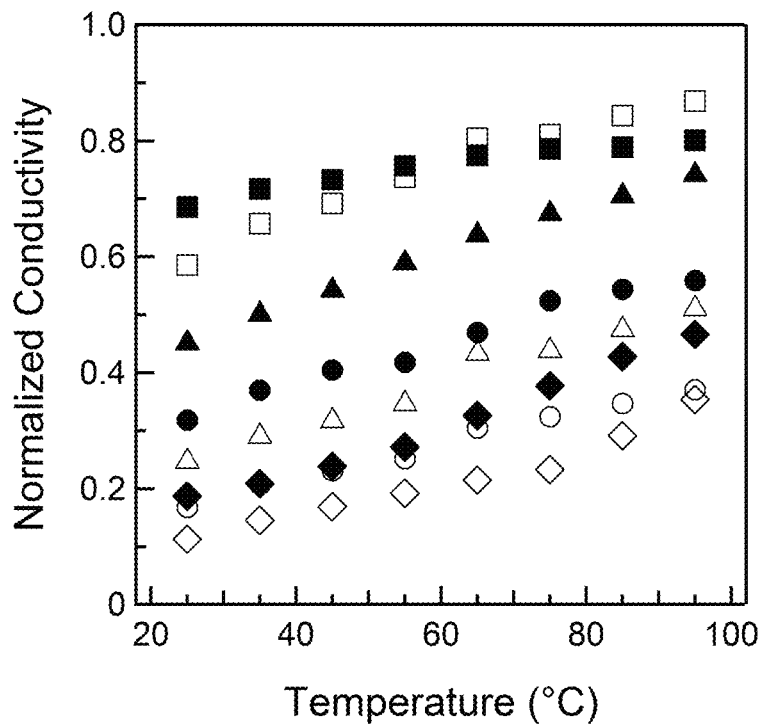
FIG. 60: Ionic conductivities from normalized to neat [BMIm][TFSI]. Polymer concentrations are 9 (□ and ■), 16 (Δ and ▲), 23 (○ and ●), and 29 wt % (◇ and ◆). Closed and open symbols represent $gPS_3$-$gPEO_{85}$-$gPS_3$ and $gPS_{15}$-$gPEO_{119}$-$gPS_{15}$ samples, respectively.
Figure 61:
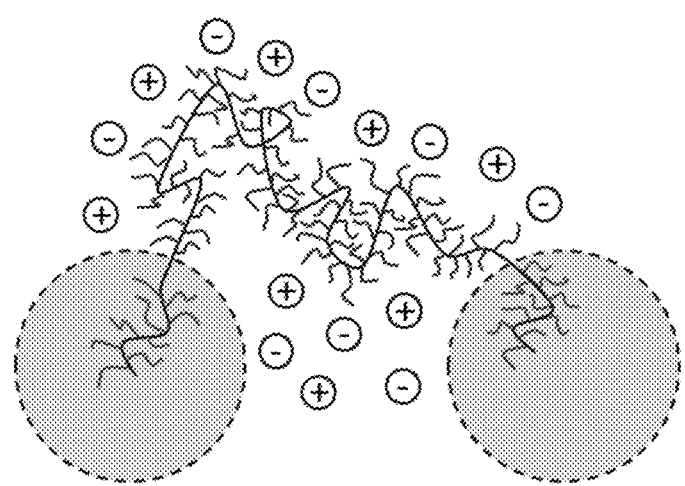
FIG. 61: A schematic diagram illustrating brush polymer ion gels with physically cross-linked polymer chains bridging micelles.

Normalized conductivities (relative to as-measured neat [BMI][TFSI]) are provided in FIG. 60. The relatively large normalized conductivities highlight the liquid-like order in the gel matrix phase and are in general agreement with measurements obtained on linear analogues.

CONCLUSIONS

Brush polymer ion gels produced with varying molar masses and volume fractions were studied at concentrations 5-50 wt % by SAXS, DMA, and AC impedance spectroscopy. To a first approximation, the hard sphere interaction potential adequately captures the ion gel structure, enabling the extraction of a variety of physical parameters and trends. The success of the hard sphere potential is somewhat surprising considering the wealth of complicated electrostatic interactions in the matrix phase,[1] but echoes observations on linear polymer micelles.[20] Elastic moduli increase with N$_A$ and reach values=$10^3$ Pa for gPS$_{15}$-gPEO$_{119}$-gPS$_{15}$. Conductivity decreases with increasing N$_A$:N$_B$ block ratios and polymer concentration but generally remains near neat [BMIm][TFSI] ($\sigma_{gel}/\sigma_{IL} \sim 0.2$-$0.8$). Ion gels and related IL-incorporating polymers[30-31] provide extraordinary opportunities to specifically tailor materials for technological applications. Appreciating the connection between polymer architecture and properties may facilitate the development of designer materials with improved function.

APPENDIX

Gel structural information was extracted from SAXS patterns using a hard sphere form factor and the Percus- Yevick disordered sphere structure factor. This model assumes each individual scatterer is spherical and accounts for inter-particle interference effects at moderate to high concentrations. The scattering amplitude of an isolated hard sphere with radius $R_S$ and scattering length density $b=\rho_0$ inside the sphere and $b=0$ outside is given by:[32]

$$A_S(q) = 3\rho_0 v_0 \frac{\sin(qR_S) - qR_S\cos(qR_S)}{(qR_S)^3} \quad (A1)$$

where $v_0=(4/3)\pi R_S^3$ is the sphere volume and $q=(4\pi/\lambda)\sin(\theta)$ is the scattering wave vector. The corresponding scattered intensity is given by the square of the amplitude (A2). This scattering intensity accounts for independent spheres and must be corrected for inter-particle interference effects, which become particularly important at the concentrations studied herein.

$$I_S(q) = A_S(q)^2 = 9\rho_0^2 v_0^2 \left[\frac{\sin(qR_S) - qR_S\cos(qR_S)}{(qR_S)^3}\right]^2 \quad (A2)$$

The pair (radial) distribution function $g(r)$ is defined as the sphere number density per unit volume $n(r)=N/V$ at a radius $r$ normalized to the average number density of spheres $\langle n \rangle = \langle N \rangle /V$ (Eq. A3).[32] The total correlation function $h(r)=g(r)-1$ therefore describes the deviation of the local number density from the background average number density (A4), which gives rise to inter-particle interference effects.

$$g(r) = \frac{n(r)}{\langle n \rangle} \quad (A3)$$

$$h(r) = g(r) - 1 = \frac{n(r)}{\langle n \rangle} - \frac{\langle n \rangle}{\langle n \rangle} = \frac{n(r) - \langle n \rangle}{\langle n \rangle} \quad (A4)$$

In simple fluids, $g(r)$ oscillates as a function of position since spheres cannot occupy the same volume—a greater number density is found at radii corresponding to approximate coordination shells, which consequently reduces $g(r)$ at intermediate distances. The interference function (structure factor) between N equivalent scatterers in volume V after discarding null scattering is given by the Fourier transform of the total correlation function (as derived in Roe[32]):

$$\frac{I(q)}{Nb^2} \equiv S(q) = 1 + \langle n \rangle \int_V dr[g(r) - 1]e^{-iqr} \quad (A5)$$

Assuming radial symmetry and integrating over the solid angle gives the radial Fourier transform in Eq. A6, which only depends on the magnitude of the radius and not the direction. The general derivation of the radial form of the Fourier transform integral can also be found in Roe.[32]

$$\frac{I(q)}{Nb^2} \equiv S(q) = 1 + 4\pi\langle n \rangle \int_0^\infty dr[g(r) - 1]r^2 \frac{\sin(qr)}{qr} \quad (A6)$$

Ornstein and Zernike derived Eq. A7 as the connection between the total correlation function $h(r)$ and direct correlation function $c(r)$ for particles 1 and 2.[33] Since $r_{13}=r_{12}-r_{32}$, the integral in Eq. A7 is a convolution, and the Fourier transform of Eq. A7, after invoking the convolution theorem, is given by Eq. A8 using the notation $C(q)=F\{c(r)\}$.

$$h(r_{12}) = c(r_{12}) + \langle n \rangle \int dr_3 c(r_{13})h(r_{32}) \quad (A7)$$

$$H(q) = C(q) + \langle n \rangle C(q)H(q) \quad (A8)$$
$$= C(q)[1 + \langle n \rangle H(q)] = C(q)S(q)$$

Eq. A6 shows that $S(q)=1+\langle n \rangle H(q)$ and thus Eq. A8 can be written as $H(q)=C(q)S(q)$, which finally leads to the result for the structure factor:

$$S(q) = \frac{1}{1 - \langle n \rangle C(q)} = \frac{4\pi R_{HS}^3}{4\pi R_{HS}^3 - 3\eta C(q)} \quad (A9)$$

where the total hard sphere volume fraction $\eta=(4/3)\pi R_{HS}^3 \langle n \rangle$ and the hard sphere radius $R_{HS}=R_S+\Delta R$ is related to the core radius by an offset $\Delta R$, which corresponds to a penetrable shell with a softer but still repulsive potential. Access to $C(q)$ therefore directly provides the structure factor. The Percus-Yevick approximation relates the direct correlation function $c(r)$ to the pair distribution function $g(r)$ through Eq. A10.[34]

$$c(r) = g(r)\left[1 - e^{-\frac{w(r)}{kT}}\right] \quad (A10)$$

Modeling the interaction potential $w(r)$ as classical hard spheres each with radius $R_{HS}$ separated by distance r (Eq. A11) leads to an analytical solution of the Ornstein-Zernike equation for $c(r)$ (Eq. A12-A15).[34] The constants $\alpha$, $\delta$, and $\xi$ only depend on $\eta$, which is treated as a fitting parameter.

$$w(r) = \begin{cases} \infty, & r < 2R_{HS} \\ 0, & r \geq 2R_{HS} \end{cases} \quad (A11)$$

$$c(r) = \begin{cases} \alpha + \frac{\xi r}{2R_{HS}} + \delta\left(\frac{r}{2R_{HS}}\right)^3, & r < 2R_{HS} \\ 0, & r \geq 2R_{HS} \end{cases} \quad (A12)$$

$$\alpha = \frac{-(1 + 2\eta)^2}{(1 - \eta)^4} \quad (A13)$$

$$\xi = \frac{6\eta(1 + 0.5\eta)^2}{(1 - \eta)^4} \quad (A14)$$

$$\delta = \frac{-0.5\eta(1 + 2\eta)^2}{(1 - \eta)^4} \quad (A15)$$

$C(q)$ is then calculated as the radial Fourier transform of $c(r)$ from Eq. A12, $$C(q) = 4\pi \int_0^\infty dr c(r) r^2 \frac{\sin(qr)}{qr} \quad (A16)$$

The beauty of the Percus-Yevick approximation is that it produces an analytical solution to the integral in Eq. A16. Inserting Eq. A12-A15 into Eq. A16 and evaluating the integral leads to an exact expression for $C(q)$ as explicitly stated elsewhere.[33] The structure factor $S(q)$ can then be evaluated through insertion of Eq. A16 into Eq. A9. The structure factor under these approximations only depends on $\eta$ and $R_{HS}$, which are both treated as fitting parameters.

Dispersity in micelle size is captured with the "local monodisperse approximation" as derived by Pedersen.[35] The total intensity $I(q)$ at each $q$ is written as the product of the form and structure factors weighted by a probability density function $N(R_S)$ that describes the micelle distribution as a function of the core radius $R_S$, summed (integrated) over all values of $R_S$ (Eq. A17). Note that for clarity we have explicitly stated the $R_S$ and $R_{HS}$ dependence of $I_S(q)$ and $S(q)$ respectively, but since $R_{HS}=R_S+\Delta R$, integrating over all $R_S$ also impacts $R_{HS}$. Herein we model $N(R_S)$ as a normalized Gaussian distribution with standard deviation $\sigma$ (Eq. A18).

$$I(q) = \Delta\rho^2 \int_0^\infty dR_S I_S(q, R_S) S(q, R_{HS}) N(R_S) \quad (A17)$$

$$N(R_S) = \frac{1}{\sqrt{2\pi}\,\sigma} e^{-\frac{(R_S - <R_S>)^2}{2\sigma^2}} \quad (A18)$$

The implementation of Eq. A17 for modeling SAXS data proceeds as follows. For each value of $q$, the core radius $R_S$ is iterated from $<R_S>-\sigma$ to $<R_S>+3\sigma$. "Instantaneous" values of $I_S(q)$ and $S(q)$ are calculated for every $R_S$ using the fitting parameters $R_S$, $R_{HS}$ (or equivalently, the offset constant $\Delta R$), and $\eta$. Multiplication by the instantaneous value of $N(R_S)$ yields the product $I_S(R_S)S(R_{HS})N(R_S)$. The calculation of this product is repeated for each value of $R_S$ and the results summed. After multiplication by the scattering length density difference squared ($\Delta\rho^2$, which is herein treated as a fitting parameter), this sum gives the total scattered intensity at a single $q$ value. The procedure is then repeated for each $q$. A custom fitting procedure was written in Igor Pro to simultaneously optimize each fitting parameter. Fits generally converged to similar (but not exactly identical) local minima on the chi-square surface relatively independent of initial guesses. (These slight differences are not surprisingly attributed to the large number of fitting parameters and do not significantly impact the trends reported below.)

REFERENCES AND NOTES

1. Hayes, R.; Warr, G. G.; Atkin, R., Structure and Nanostructure in Ionic Liquids. *Chemical Reviews* 2015.
2. Lu, J.; Yan, F.; Texter, J., Advanced applications of ionic liquids in polymer science. *Prog. Polym. Sci.* 2009, 34 (5), 431-448.
3. MacFarlane, D. R.; Tachikawa, N.; Forsyth, M.; Pringle, J. M.; Howlett, P. C.; Elliott, G. D.; Davis, J. H.; Watanabe, M.; Simon, P.; Angell, C. A., Energy applications of ionic liquids. *Energy & Environmental Science* 2014, 7 (1), 232-250.
4. Susan, M. A. B. H.; Kaneko, T.; Noda, A.; Watanabe, M., Ion Gels Prepared by in Situ Radical Polymerization of Vinyl Monomers in an Ionic Liquid and Their Characterization as Polymer Electrolytes. *J. Am. Chem. Soc.* 2005, 127 (13), 4976-4983.
5. Seki, S.; Susan, M. A. B. H.; Kaneko, T.; Tokuda, H.; Noda, A.; Watanabe, M., Distinct Difference in Ionic Transport Behavior in Polymer Electrolytes Depending on the Matrix Polymers and Incorporated Salts. *The Journal of Physical Chemistry B* 2005, 109 (9), 3886-3892.
6. Lodge, T. P., A Unique Platform for Materials Design. *Science* 2008, 321 (5885), 50-51.
7. Miranda, D. F.; Versek, C.; Tuominen, M. T.; Russell, T. P.; Watkins, J. J., Cross-Linked Block Copolymer/Ionic Liquid Self-Assembled Blends for Polymer Gel Electrolytes with High Ionic Conductivity and Mechanical Strength. *Macromolecules* 2013, 46 (23), 9313-9323.
8. He, Y.; Boswell, P. G.; BUhlmann, P.; Lodge, T. P., Ion Gels by Self-Assembly of a Triblock Copolymer in an Ionic Liquidt. *The Journal of Physical Chemistry B* 2007, 111 (18), 4645-4652.
9. Ueki, T.; Watanabe, M., Macromolecules in Ionic Liquids: Progress, Challenges, and Opportunities. *Macromolecules* 2008, 41 (11), 3739-3749.
10. Zhang, S.; Lee, K. H.; Frisbie, C. D.; Lodge, T. P., Ionic Conductivity, Capacitance, and Viscoelastic Properties of Block Copolymer-Based Ion Gels. *Macromolecules* 2011, 44 (4), 940-949.
11. Zhang, S.; Lee, K. H.; Sun, J.; Frisbie, C. D.; Lodge, T. P., Viscoelastic Properties, Ionic Conductivity, and Materials Design Considerations for Poly(styrene-b-ethylene oxide-b-styrene)-Based Ion Gel Electrolytes. Macromolecules 2011, 44 (22), 8981-8989.
12. Tang, B.; White, S. P.; Frisbie, C. D.; Lodge, T. P., Synergistic Increase in Ionic Conductivity and Modulus of Triblock Copolymer Ion Gels. *Macromolecules* 2015.
13. Gu, Y.; Zhang, S.; Martinetti, L.; Lee, K. H.; McIntosh, L. D.; Frisbie, C. D.; Lodge, T. P., High Toughness, High Conductivity Ion Gels by Sequential Triblock Copolymer Self-Assembly and Chemical Cross-Linking. *J. Am. Chem. Soc.* 2013, 135 (26), 9652-9655.
14. Moon, H. C.; Lodge, T. P.; Frisbie, C. D., Solution-Processable Electrochemiluminescent Ion Gels for Flexible, Low-Voltage, Emissive Displays on Plastic. *J. Am. Chem. Soc.* 2014, 136 (9), 3705-3712.
15. Cho, J. H.; Lee, J.; Xia, Y.; Kim, B.; He, Y.; Renn, M. J.; Lodge, T. P.; Daniel Frisbie, C., Printable ion-gel gate dielectrics for low-voltage polymer thin-film transistors on plastic. *Nat Mater* 2008, 7 (11), 900-906.
16. Lee, J.; Panzer, M. J.; He, Y.; Lodge, T. P.; Frisbie, C. D., Ion Gel Gated Polymer Thin-Film Transistors. *J. Am. Chem. Soc.* 2007, 129 (15), 4532-4533.
17. Imaizumi, S.; Kato, Y.; Kokubo, H.; Watanabe, M., Driving Mechanisms of Ionic Polymer Actuators Having Electric Double Layer Capacitor Structures. *The Journal of Physical Chemistry B* 2012, 116 (16), 5080-5089.
18. Fenyves, R.; Schmutz, M.; Horner, I. J.; Bright, F. V.; Rzayev, J., Aqueous Self-Assembly of Giant Bottlebrush Block Copolymer Surfactants as Shape-Tunable Building Blocks. *J. Am. Chem. Soc.* 2014, 136 (21), 7762-7770.
19. Bates, C. M.; Chang, A. B.; MomOiloviO, N.; Jones, S. C.; Grubbs, R. H., ABA Triblock Brush Polymers: Synthesis, Self-Assembly, Conductivity, and Rheological Properties. *Macromolecules* 2015.
20. Mortensen, K.; Pedersen, J. S., Structural study on the micelle formation of poly(ethylene oxide)-poly(propylene oxide)-poly(ethylene oxide) triblock copolymer in aqueous solution. *Macromolecules* 1993, 26 (4), 805-812.
21. Zhang, S. Dissertation: Block Copolymer-Based Ion Gels as Solid Polymer Electrolytes. University of Minnesota, 2012.
22. Seitz, M. E.; Burghardt, W. R.; Faber, K. T.; Shull, K. R., Self-Assembly and Stress Relaxation in Acrylic Triblock Copolymer Gels. *Macromolecules* 2007, 40 (4), 1218-1226.

23. Pusey, P. N.; van Megen, W., Phase behaviour of concentrated suspensions of nearly hard colloidal spheres. *Nature* 1986, 320 (6060), 340-342.
24. Heimenz, P. C., Lodge, T. P., *Polymer Chemistry*, 2nd Ed. CRC Press: Boca Raton, Pl, 2007.
25. Hu, M.; Xia, Y.; McKenna, G. B.; Kornfield, J. A.; Grubbs, R. H., Linear Rheological Response of a Series of Densely Branched Brush Polymers. *Macromolecules* 2011, 44, 6935-6943.
26. Pakula, T.; Zhang, Y.; Matyjaszewski, K.; Lee, H.-i.; Boerner, H.; Qin, S.; Berry, G. C., Molecular brushes as super-soft elastomers. *Polymer* 2006, 47 (20), 7198-7206.
27. Dalsin, S. J.; Hillmyer, M. A.; Bates, F. S., Molecular Weight Dependence of Zero-Shear Viscosity in Atactic Polypropylene Bottlebrush Polymers. *ACS Macro Letters* 2014, 423-427.
28. Dalsin, S. J.; Hillmyer, M. A.; Bates, F. S., Linear Rheology of Polyolefin-Based Bottlebrush Polymers. *Macromolecules* 2015, 48 (13), 4680-4691.
29. Singh, M.; Odusanya, O.; Wilmes, G. M.; Eitouni, H. B.; Gomez, E. D.; Patel, A. J.; Chen, V. L.; Park, M. J.; Fragouli, P.; Iatrou, H.; Hadjichristidis, N.; Cookson, D.; Balsara, N. P., Effect of Molecular Weight on the Mechanical and Electrical Properties of Block Copolymer Electrolytes. *Macromolecules* 2007, 40 (13), 4578-4585.
30. McIntosh, L. D.; Schulze, M. W.; Irwin, M. T.; Hillmyer, M. A.; Lodge, T. P., Evolution of Morphology, Modulus, and Conductivity in Polymer Electrolytes Prepared via Polymerization-Induced Phase Separation. *Macromolecules* 2015, 48 (5), 1418-1428.
31. Schulze, M. W.; McIntosh, L. D.; Hillmyer, M. A.; Lodge, T. P., High-Modulus, High-Conductivity Nanostructured Polymer Electrolyte Membranes via Polymerization-Induced Phase Separation. *Nano Lett.* 2013, 14 (1), 122-126.
32. Roe, R.-J., Methods of X-Ray and Neutron Scattering in Polymer Science. Oxford University Press: 2000.
33. Kinning, D. J.; Thomas, E. L., Hard-sphere interactions between spherical domains in diblock copolymers. *Macromolecules* 1984, 17 (9), 1712-1718.
34. NIST Distance Learning, Chapter 32: Structure Factors for Particulate Systems. ncnrnist.gov/staff/hammouda/distance_learning/chapter_32.pdf.
35. Pedersen, J., Determination of size distribution from small-angle scattering data for systems with effective hard-sphere interactions. *Journal of Applied Crystallography* 1994, 27 (4), 595-608.

Graphical Abstract
Brush Polymer Ion Gels

Ion gels comprising ABA brush block copolymers and 1-butyl-3-methylimidazolium bis(trifluoromethylsulfonyl) imide ([BMI][TFSI]) are reported. Structure and conductivity measurements reveal trends in gel properties as a function of block volume fraction, polymer molar mass, and concentration. Conductivities ca. 1 mS/cm at 25° C. and normalized conductivities ca. 0.2-0.8 highlight liquid-like dynamics in the matrix phase and potentially presage future applications.

Example 6: Electrochemical Characterization of Brush-Block Copolymer-Ionic Liquid Gel Electrolytes and Application as a Solid-State Medium for the Electrocatalytic Reduction of $CO_2$ Successful voltammetric characterization of ionic-liquid-polymer gels has been shown for the first time. Gels comprising PS:PEO:PS triblock brush polymer, 1-butyl-3-methylimidazolium bis(trifluoromethylsulfonyl) imide (BMIm-TFSI), and some combination of ferrocene (Fc), cobaltocenium ($CoCp_2^+$), and $Re(bpy)(CO)_3Cl$ (1) exhibit diffusion-controlled redox processes with diffusion coefficients approximately one-fifth of those observed in neat BMIm-TFSI. Notably, 1 dissolves homogeneously in the interpenetrating matrix domain of the ion gel and displays electrocatalytic $CO_2$ reduction to CO in the solid state. The catalytic wave exhibits a sizeable, positive shift compared to analogous non-aqueous measurements with a reduction potential 500 mV positive of onset and 90% Faradaic efficiency. These materials a promising and alternative approach to immobilized electrocatalysis, creating numerous opportunities for applications in solid-state devices.

Alternative methods are needed for stabilization of molecular catalysts and minimization of catalyst underutilization and decomposition.

Block copolymers are soft materials that exhibit a high degree of order on the macroscopic length scale.[5] A straightforward procedure for the synthesis of ABA triblock brush-block copolymers has been developed using living ring-opening metathesis polymerization of macromonomers that have been functionalized with a norbornene linker using "click" chemistry.[6] Great control over polydispersity and molecular weight are provided when using 3$^{rd}$ generation Grubbs catalyst. When block copolymers are added to ionic liquids, ionic-liquid-polymer gel electrolytes form.[16] These solids exhibit a physically ordered but microscopically disordered structure with nonpolar micelles bridged by polar chains that favorably interact with the charge of ionic liquid. We have characterized brush-block copolymers both independently and as ionic liquid-polymer gel electrolytes using small-angle x-ray scattering (SAXS), conductivity, and rheometry.[7]

To our knowledge, reversible voltammetry has not been observed for ionic liquid-polymer gel electrolytes, aside from one report of a reversible $Fc^+/Fc$ wave when a gel was wet with casting solvent.[8]

It has been shown that ionic liquids can enhance the efficiency $CO_2$ reduction at a more positive potential.[9] Recent demonstrations of high conductivity, low modulus, diffusional properties, and high thermal stability for gels of 1-butyl-3-methylimidazolium bis(trifluoromethylsulfonyl) imide (BMIm-TFSI) and polystyrene:polyethyleneoxide:polystyrene (PS:PEO:PS) led us to probe their viability as new catalytic media.

15:119:15 triblock PS:PEO:PS brush-block copolymer was synthesized and combined with vacuum-dried BMIm-TFSI in the presence of dry DCM and stirred for twenty minutes. To determine if reversible redox couples could be observed, Fc and $CoCp_2^+$ were added to the casting solution. Gels set in a glove box for over 24 hours before electrochemical testing in a nitrogen-filled glove box. NMR of the polymer gels confirmed complete removal of DCM, and SAXS characterization showed no change in morphology with electroactive species (see supplemental information, below). Electrochemical measurements were conducted by resting a glassy carbon working electrode on the surface of the gel and inserting a Pt-wire counter electrode and a silver pseudo-reference electrode into the gel.

Figure 62:
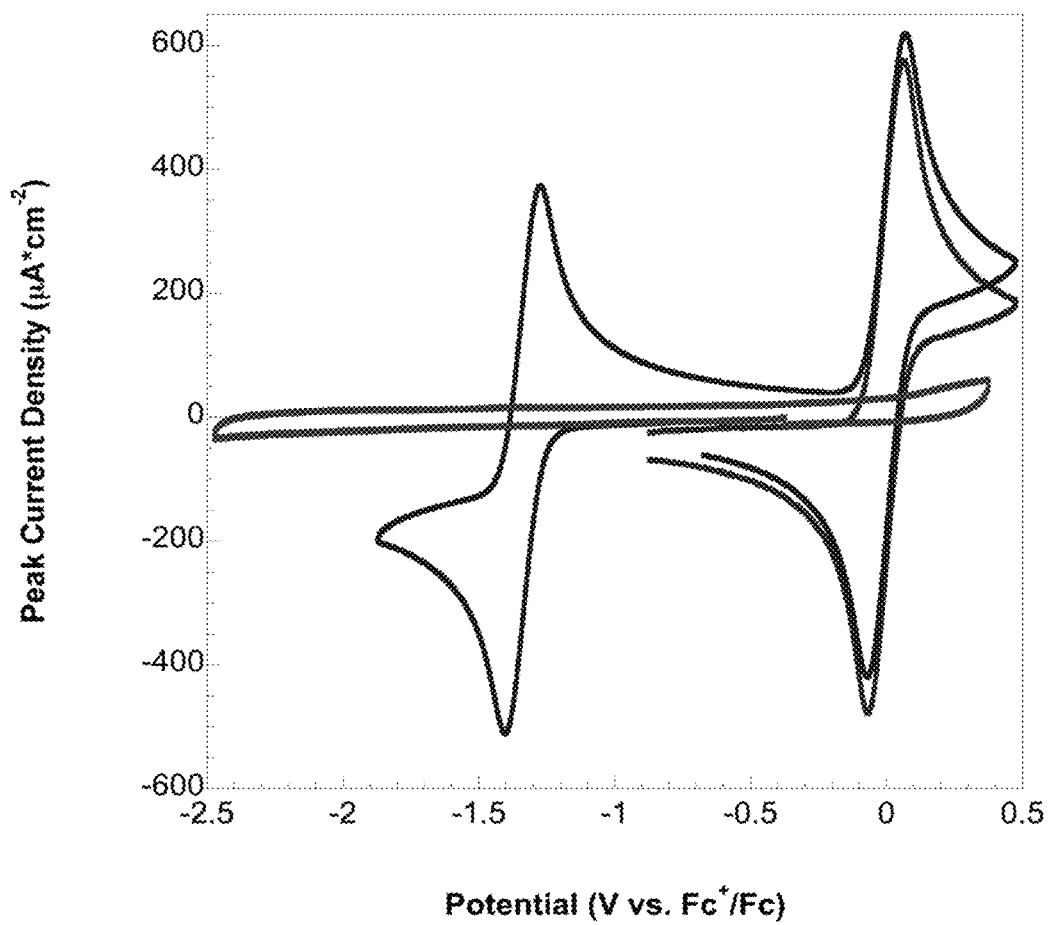
FIG. 62: Cyclic voltammetric scans of blank 15:119:15 PS:PEO:PS-BMIm-TFSI ionic liquid-polymer gel electrolyte (green), with 14.3 mM Fc (red), and 14.3 mM Fc and 15.3 mM $CoCp_2^+$ (blue).
Figures 63A, 63B:
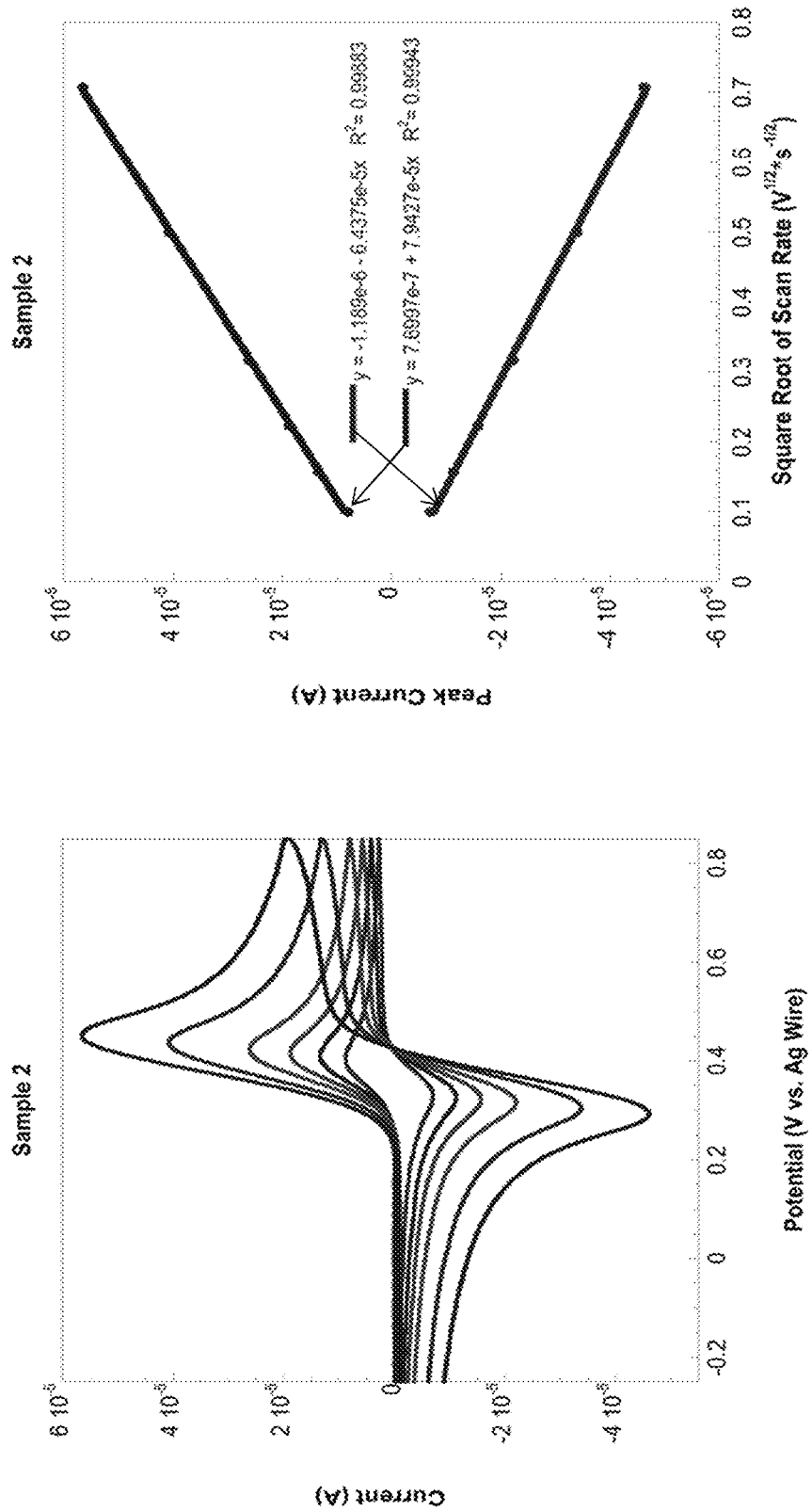
FIGS. 63A-63B: Scan rate dependence of $Fe^{+/0}$ in ionic liquid-polymer gel electrolyte (14.3 mM Fc).
Figure 64:
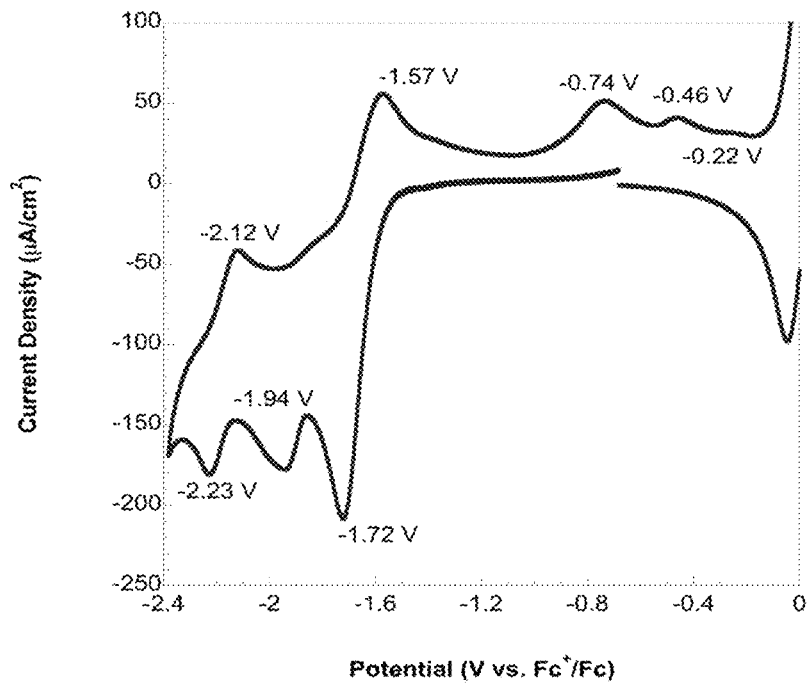
FIG. 64: CV of 15:119:15 PS:PEO:PS-BMIm-TFSI ionic liquid-polymer gel electrolyte with 14.3 mM Re(bpy)(CO)$_3$Cl and 5 mM Fc. Potentials were shifted relative to the half-wave potential of $Fc^{+/0}$.

Potentials measured in the medium were shown to be reproducible. FIG. 62 displays potential sweeps for blank gel, gel with Fc, and gel with Fc and $CoCp_2^+$. The $E_{1/2}$ for $CoCp_2^{+/0}$ is −1.33 V vs. $Fc^{+/0}$ in FIG. 62, consistent with reported values for $CoCp_2^{+/0}$ in ionic liquids as well as other electrolytes.[13] In addition, to confirm the redox mechanism of the $Fc^{+/0}$ and $CoCp_2^{+/0}$ redox couples in ion gel, diagnostic plots were obtained by Nicholson and Shain metrics, which confirm the redox behavior of both couples as "Case I", corresponding to an electrochemically reversible redox process The peak current of a reversible electron transfer in homogeneous electrochemistry is given in Equation 5 (Eq. 5), $$i_p = 0.4463 n^{3/2} F^{3/2} A C_0^* \sqrt{\frac{D_O v}{RT}}$$ Eq. 5 where n is the number of electrons (n=1 e– for Fc oxidation and $CoCp_2^+$ reduction), $D_O$ is the diffusion coefficient of the electroactive species (cm$^2$ s$^{-1}$), v is the scan rate (V s$^{-1}$), A is the electrode surface area (A=0.0707 cm$^2$) and $C_O^*$ is the bulk concentration of analyte (mol L$^{-1}$); the diffusion coefficient can be obtained from a plot of peak current versus $v^{1/2}$ (FIG. 63b).[12] The was high reproducibility in the values obtained. FIG. 63 displays the scan-rate dependence for the $Fc^{+/0}$ redox couple and the corresponding linear fits (see SI). Table 16 gives average values for the diffusion coefficients of Fc, $Fc^+$, $CoCp_2$, and $CoCp_2^+$.[11]

To determine if $CO_2$ reduction in a gel was possible, Re(bpy)(CO)$_3$Cl was employed since it is a well-characterized catalyst.[9,14] Recently, ionic liquids have been to shown to improve catalytic activity for Re(bpy)(CO)3Cl.[9a] The increased $CO_2$ reduction activity observed in ionic liquids is proposed to be due to the imidazolium cation, where the imidazolium hydrogen bonds to the halide ligand to generate the catalytically active form of the complex at a more positive potential.[9a,b].

TABLE 16

Diffusion Coefficients Obtained by Randles-Sevcik Analysis and Literature Data for Fc and $CoCp_2^+$.

| Species | $D_0$ in Gel (×10$^{-11}$ m$^2$s$^{-1}$) | $D_0$ in BMIm-TFSI (×10$^{-11}$ m$^2$s$^{-1}$) |
|---|---|---|
| Fc | 0.81 ± 0.04 | 3.77[a] ± 0.04 |
| $CoCp_2^+$ | 0.53 ± 0.04 | 2.22[a] ± 0.04 |

[a]Literature values.

Figure 65:
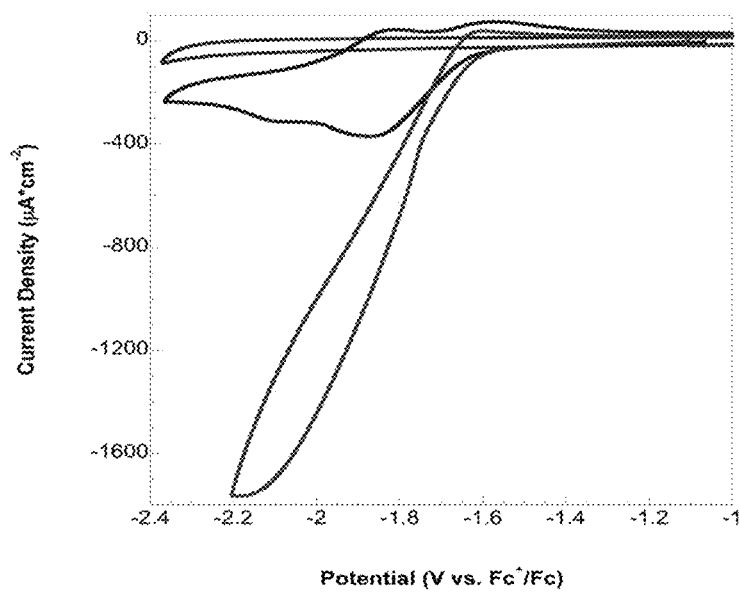
FIG. 65: Cyclic voltammetric scans of 15:119:15 PS:PEO:PS-BMIm-TFSI ionic liquid-polymer gel electrolyte with 14.3 mM Fc and 1 atm $CO_2$ (Red), with 5 mM Fc and 10 mM Re(bpy)(CO)$_3$Cl (Blue), and 7.1 mM Fc, 14.3 mM Re(bpy)(CO)$_3$Cl, and 1 atm $CO_2$ (Green).
Figure 66:
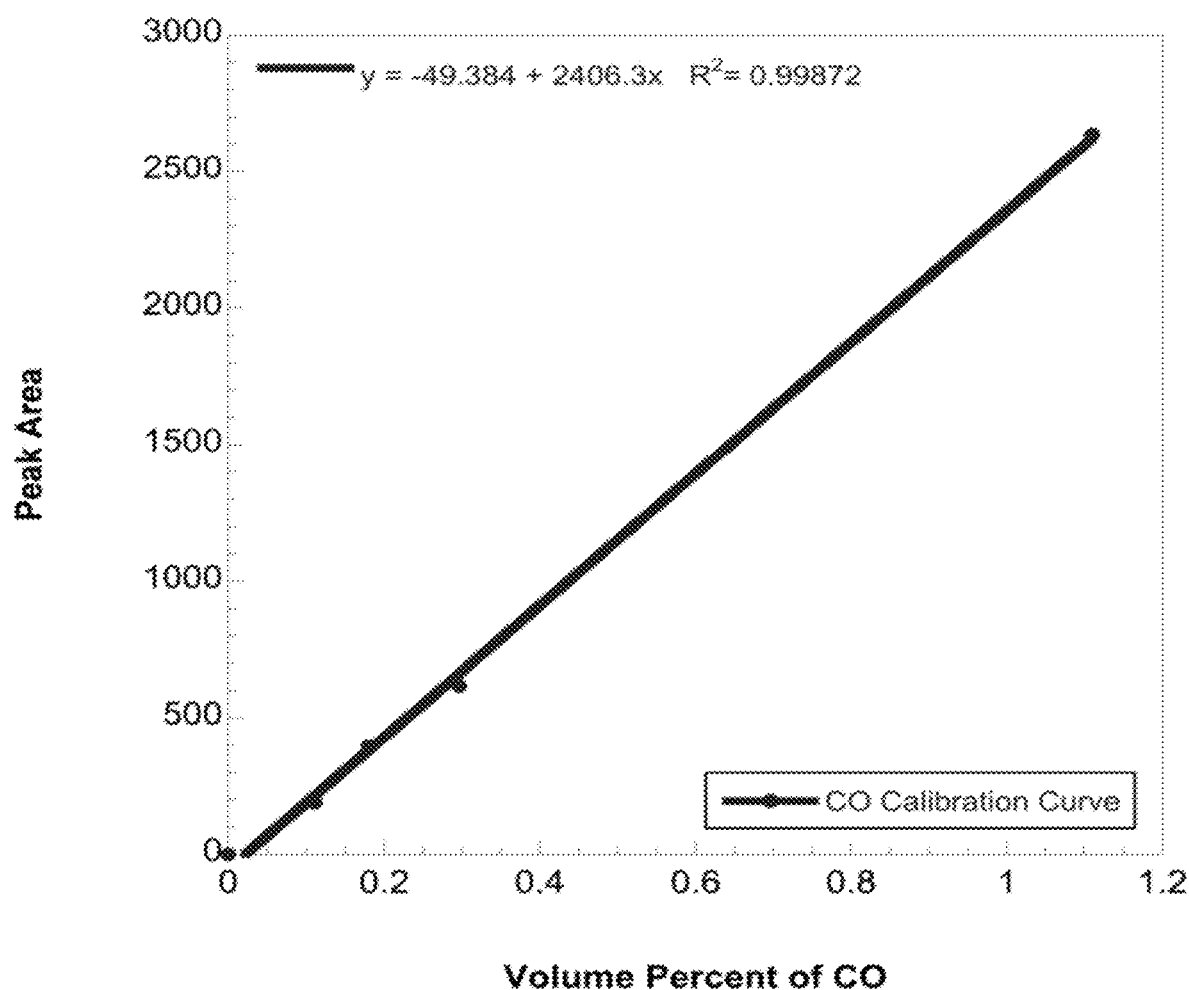
FIG. 66: CO calibration curve for bulk electrolysis of Re(bpy)(CO)$_3$Cl.

FIG. 65 displays the electrochemistry of ion gel with Fc and $CO_2$, ion gel with Re(bpy)(CO)$_3$Cl and Fc, and ion gel with Fc and Re(bpy)(CO)$_3$Cl under 1 atm $CO_2$. Under 1 atm of $CO_2$, a catalytic wave is observed. The potential needed for reduction of $CO_2$ with Re(bpy)(CO)$_3$Cl is shifted 500 mV positive of its value in nonaqueous systems. FIG. 65 displays the trace of controlled potential electrolysis of the gel. Results of bulk electrolysis of neat BMIm-TFSI or gel with a glassy carbon plate working electrode are summarized in Table 17.

TABLE 17

Controlled Potential Electrolysis of 1 mM Re(bpy)(CO)$_3$Cl in Neat IL and Gel.

| Medium | Potential (vs. $Fc^{+/0}$) | Faradaic Efficiency for CO |
|---|---|---|
| BMIm-TFSI | −1.9 V | 92% ± 5% |
| BMIm-TFSI/ PS:PEO:PS | −2.0 V | 90% ± 5% |

We have demonstrated the efficacy of a new solid-state medium for electrocatalytic $CO_2$ reduction. These ion gels are sustainable media with the ability to dissolve more catalyst, recast the gel, and renew its activity. Employing 1, we have shown that the catalytic enhancement from ionic liquid coupled with the high solubility of $CO_2$ in ionic liquid-polymer gel electrolytes result in a 500 mV decrease in potential required for $CO_2$ reduction. This new catalytic medium is a beneficial platform for implementation of molecular catalysts in solid-state devices.

Bulk Electrolysis Summary

Samples were saturated with $CO_2$ for 1-2 hours, and the cell was sealed before electrolysis started. Bulk electrolysis at −1.8 V vs. $Ag^{+/0}$ (0.01 M) in MeCN with TBAPF$_0$ (0.1 M) was carried out for 1 hour for each sample. GC analysis and conversion gave consistent measurements for the triplicate samples for CO production. These results are summarized herein.

Gel was vacuum dried for 4 days before being subjected to electrolysis. Samples were saturated with $CO_2$ for 2 hours, and the cell was sealed before electrolysis started. Bulk electrolysis at −1.8 V vs. Ag wire was carried out for 1 hour for each sample. GC analysis and conversion gave consistent measurements for the triplicate samples for CO production. These results are summarized. Gel was confirmed to be free of DCM by $^1$H NMR.

REFERENCES 1. (a) Appel, A. M.; Bercaw, J. E.; Bocarsly, A. B.; Dobbek, H.; DuBois, D. L.; Dupuis, M.; Ferry, J. G.; Fujita, E.; Hille, R.; Kenis, P. J. A.; Kerfeld, C. A.; Morris, R. H.; Peden, C. H. F.; Portis, A. R.; Ragsdale, S. W.; Rauchfuss, T. B.; Reek, J. N. H.; Seefeldt, L. C.; Thauer, R. K.; Waldrop, G. L. Chem. Rev. 2013, 113, 6621-6658. (b) Benson, E. E.; Kubiak, C. P.; Sathrum, A. J.; Smieja, J. M. Chem. Soc. Rev. 2009, 38, 89-99. (c) Sampson, M. D.; Froehlich, J. D.; Smieja, J. M.; Benson, E. E.; Sharp, I. D.; Kubiak, C. P. Energy Environ. Sci. 2013, 6, 3748-3755. (d) Costentin, C.; Robert, M.; Saveant, J. M. Chem. Soc. Rev. 2013, 42, 2423-2436. (e) Savéant, J.-M. Chem. Rev. 2008, 108, 2348-2378.
2. Under, A. J. V. Ind. Eng. Chem. 1940, 32, 449.
3. (a) Taheri, A.; Thomspon, E. J.; Fettinger, J. C.; Berben, L. A. ACS Catal. 2015, 5, 7140-7151. (b) Luca, O. R.; McCrory, C. C. L.; Dalleska, N. F.; Koval, C. A. J. Electrochem. Soc. 2015, 162, H473-H476.
4. Blakemore, J. D.; Gupta, A.; Warren, J. J.; Brunschwig, B. S.; Gray, H. B. J. Am. Chem. Soc. 2013, 135, 18288-18291.
5. (a) Bates, F. S.; Fredrickson, G. H. Phys. Today 1999, 52, 32-38. (b) Kinning, D. J.; Thomas, E. L. Macromolecules 1984, 17, 1712-1718. (c) Lodge, T. P. Science 2008, 321, 50-51. (d) Gu, Y.; Zhang, S.; Martinetti, L.; Lee, K. H.; McIntosh, L. D.; Frisbie, C. D.; Lodge, T. P. J. Am. Chem. Soc. 2013, 135, 9652-9655. (e) He, Y.; Boswell, P. G.; Bühlmann, P.; Lodge, T. P. J. Phys. Chem. B 2007, 111, 4645-4652.
6. Xia, Y.; Kornfield, J. A.; Grubbs, R. H. Macromolecules 2009, 42, 3761-3766.
7. Bates, C. M.; Chang, A. B.; Momeilovia, N.; Jones, S. C.; Grubbs, R. H. Macromolecules 2015, 48, 4967-4973.
8. Fuller, J.; Breda, A. C.; Carlin, R. T. J. Electrochem. Soc. 1997, 144, L67-L70.
9. (a) Grills, D. C.; Matsubara, Y.; Kuwahara, Y.; Golisz, S. R.; Kurtz, D. A.; Mello, B. A. J. Phys. Chem. Lett. 2014, 5, 2033-2038. (b) Matsubara, Y.; Grills, D. C.; Kuwahara, Y.; *ACS Catal.* 2015, 5, 6440-6452. (c) Sun, L.; Ramesha, G. K.; Kamat, P. V.; Brennecke, J. F. *Langmuir* 2014, 30, 6302-6308. (d) Alvarez-Guerra, M.; Albo, J.; Alvarez-Guerra, E.; Irabien, A. *Energy Environ. Sci.* 2015, 8, 2574-2599. (e) Oh, Y.; Hu, X. *Chem. Comm.* 2015, 51, 13698-13701.
10. Nicholson, R. S.; Shain, I. *Anal. Chem.* 1964, 36, 706-723.
11. (a) Hapiot, P.; Lagrost, C. *Chem. Rev.* 2008, 108, 2238-2264. (b) Barosse-Antle, L. E.; Bond, A. M.; Compton, R. G.; O'Mahony, A. M.; Rogers, E. I.; Silvester, D. S. *Chem. Asian J.* 2010, 5, 202-230.
12. Bard, A. J.; Faulkner, L. R. *Electrochemical Methods*, $2^{nd}$ ed.; Wiley, 2000.
13. Rogers, E. I.; Silvester, D. S.; Poole, D. L.; Aldous, L.; Hardacre, C.; Compton, R. G. *J. Phys. Chem. C* 2008, 112, 2729-2735.
14. (a) Hawecker, J.; Lehn, J.-M.; Ziessel, R. *J. Chem. Soc. Chem. Commun.* 1984, 6, 328-330. (b) O'Toole, T. R.; Margerum, L. D.; Westmoreland, D.; Vining, W. J.; Murray, R. W.; Meyer, T. J. *J. Chem. Soc. Chem. Commun.* 1985, 20, 1416-1417. (c) Hawecker, J.; Lehn, J.-M.; Ziessel, R. 1986, 69, 1990-2012. (d) Juris, A.; Campagna, S.; Bidd, I.; Lehn, J.-M.; Ziessel, R. *Inorg. Chem.* 1988, 27, 4007-4011. (e) Smieja, J. M.; Kubiak, C. P. *Inorg. Chem.* 2010, 49, 9283-9289.
15. Tsurumaki, A.; Kagimoto, J.; Ohno, H. *Polym. Adv. Technol.* 2011, 22, 1223-1228.
16. Bates, C. M.; Chang, A. B.; Schulze, M. W.; Momčilović, N.; Jones, S. C.; Grubbs, R. H. *J. Polym. Sci. B Polym. Phys.* 2016, 54, 292-300.

Example 7: Ionic Liquid-Polymer Gel Electrolytes as Solid-State Media for the Electrocatalytic Reduction of Small Molecules Ionic liquid-polymer gel electrolytes form from the addition of soft-acid, soft-base ionic liquids to a triblock copolymer, triblock brush-block copolymer, or chemically cross-linked homopolymer. Literature has shown that all of these solid-state media are conductive, resistant to flow, and have smaller diffusion coefficients compared to neat ionic liquid or non-aqueous solvents.

It is believed that no studies exist on successfully using ionic liquid-polymer gel electrolytes for electroanalytical chemistry or as a solid-state medium for electrocatalysis, but their high conductivity make them a promising medium. Ionic liquid-polymer gel electrolytes form by a polymer assembling into a micellar structure that is then swelled by ionic liquid, allowing species dissolved in ionic liquid to diffuse through the solid structure. Ionic liquid-polymer gel electrolytes overcome many of the problems with adsorbing a catalyst on an electrode. Dispersion of catalyst in a polymer gel allows diffusion of fresh catalyst to the electrode, circumvents the catalyst falling off of the electrode, and improves the catalyst stability over extended periods of time. The thermoreversibility of ionic liquid-polymer gel electrolytes provides a facile method for renewing catalytic activity and minimizing the generation of chemical waste. Solid-state catalysis is more promising for industrial and device application of reduction catalysts, as supported by prior research. Additionally, the solubility of many small-molecule gases that are targeted for reactions to make more useful products is high, and the hydrophobicity and low solubility of oxygen in many ionic liquid-polymer gel electrolytes means less likelihood of catalyst degradation when carrying out reactions within the gel. Brush-block copolymer gel electrolytes were tested first due to their lower modulus and greater propensity for flow, making it more likely that diffusion will occur more readily throughout the physically assembled structure.

Figure 67:
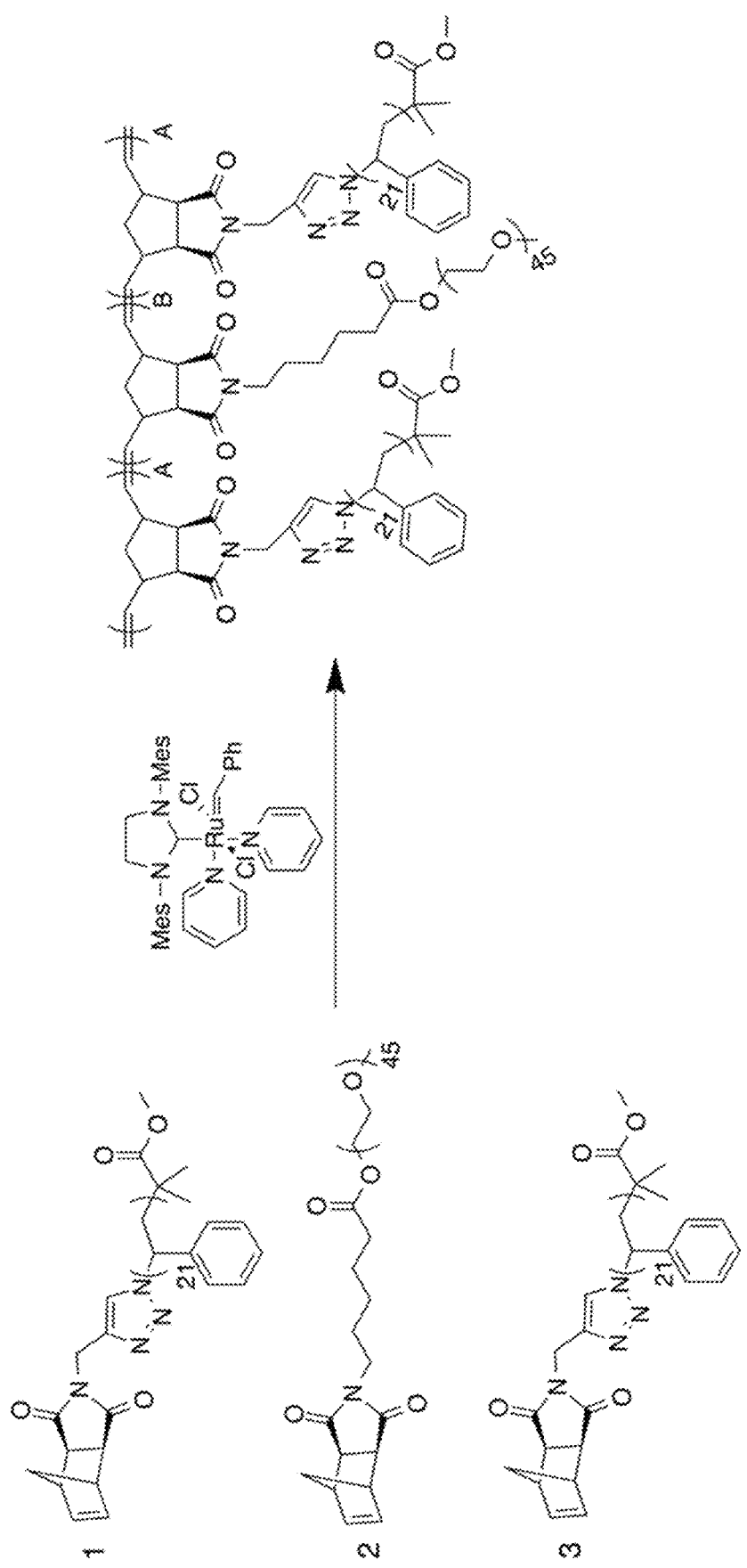
FIG. 67: Synthesis of ABA triblock brush-block copolymer using Grubbs 3$^{rd}$ generation catalyst. Addition of ionic liquid (BMIm-TFSI) to a solution of polymer in dichloromethane and evaporation of dichloromethane over 24 hours results in a gel free of solvent (confirmed by NMR). Addition of redox-active complexes, such as ferrocene, which are soluble in the ionic liquid results in gels with homogeneously dispersed complex.

FIG. 67 displays the synthetic scheme used for synthesis the of ionic liquid-polymer gel electrolyte. All gels in these studies were synthesized using BMIm-TFSI as the ionic liquid.

Figure 68:
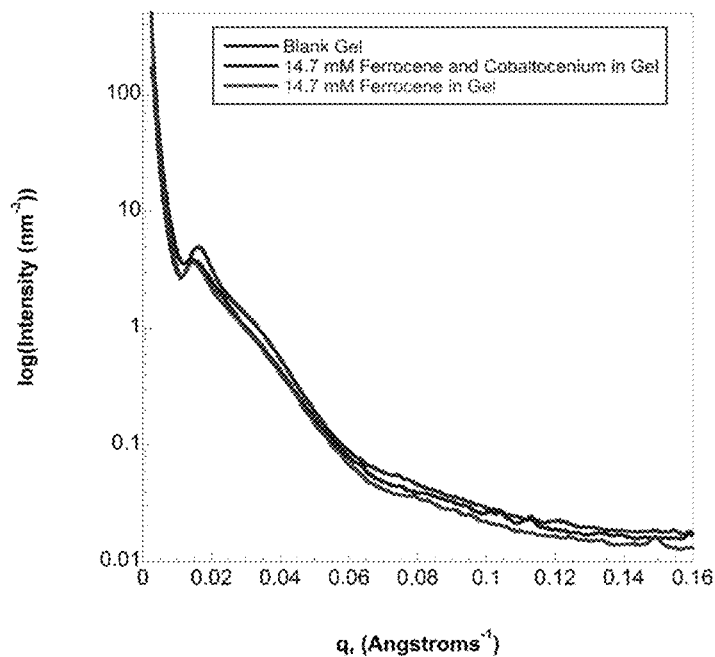
FIG. 68: SAXS characterization of brush-block copolymer ionic liquid-polymer gel electrolytes with added redox-active compounds.

To further characterize the microscopic structure of the gel electrolytes, SAXS data on brush-block copolymer ionic liquid-polymer gel electrolytes with added, redox-active molecules were collected. FIG. 68 confirms that the network structure of the physical assembly is composed of disordered, micellar spheres of non-covalently interacting ends of the polystyrene blocks of the copolymer with bridging polyethyleneoxide chains that interact with the charges of the ionic liquid. The ionic liquid swells these open volumes surrounded by chains of polyethyleneoxide. No change in microscopic structure was observed in the SAXS data when redox-active species are present.

Figure 69:
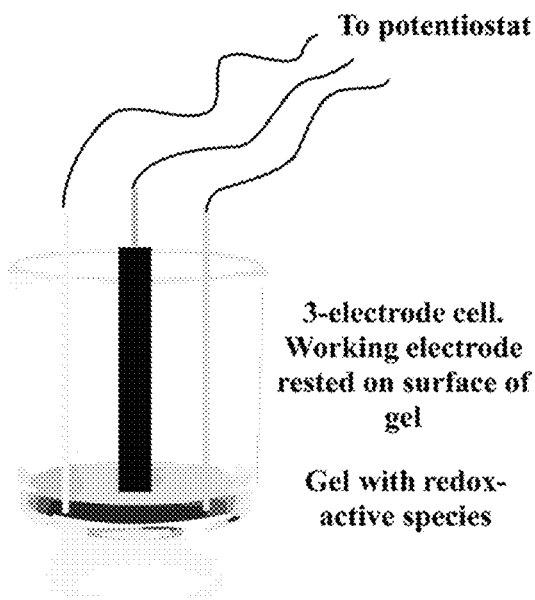
FIG. 69: 3-electrode cell used for electrochemical characterization of ionic-liquid polymer gel electrolytes.
Figure 70A:
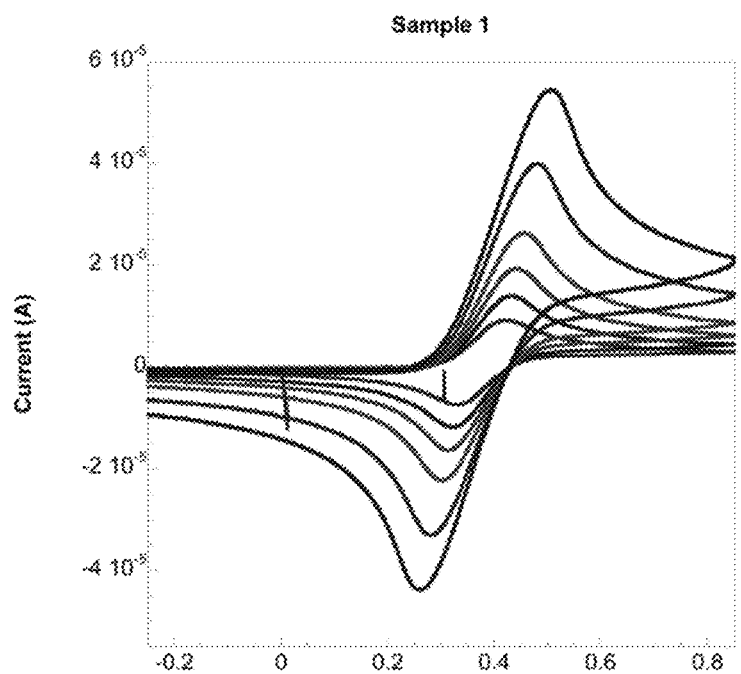
FIGS. 70A-70F: Electrochemically reversible voltammetry of ferrocene in brush-block copolymer ionic liquid-polymer gel electrolyte. The peak separation and diffusion-controlled electrochemistry, shown by the linear fits on the right, indicate that the electrochemistry is homogeneous and occurring within the gel.
Figure 70B:
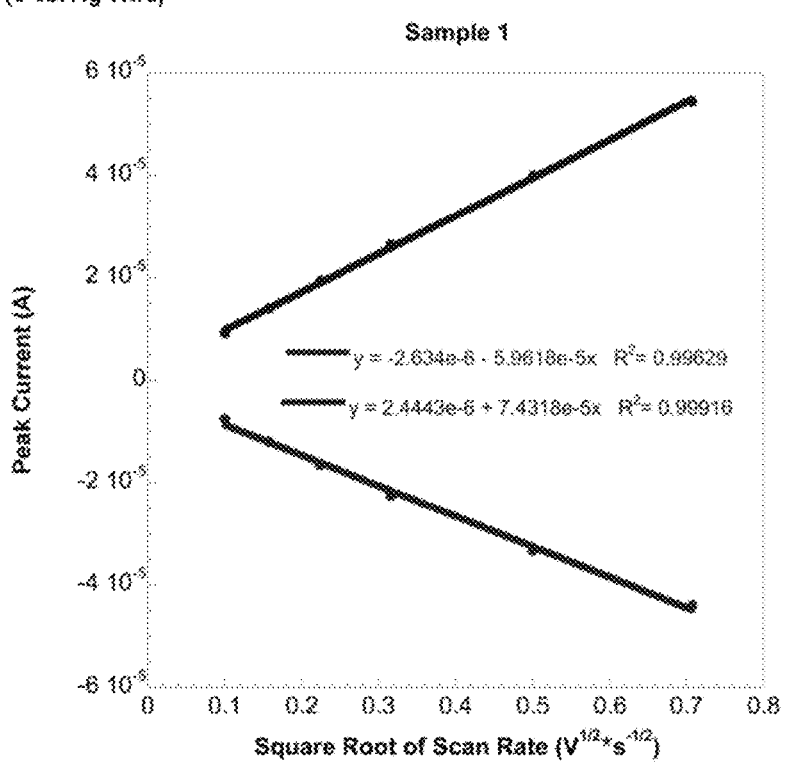
Figure 70C:
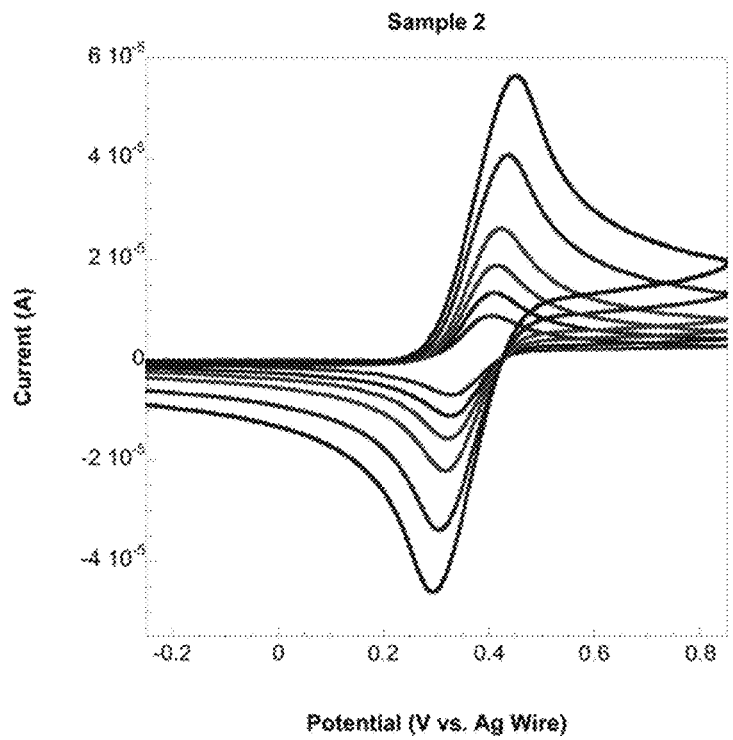
Figure 70D:
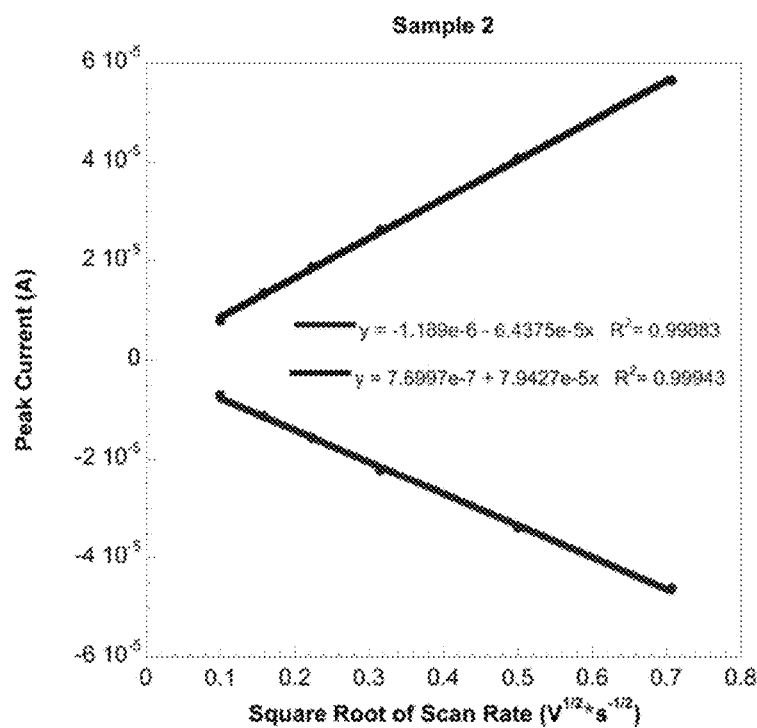
Figure 70E:
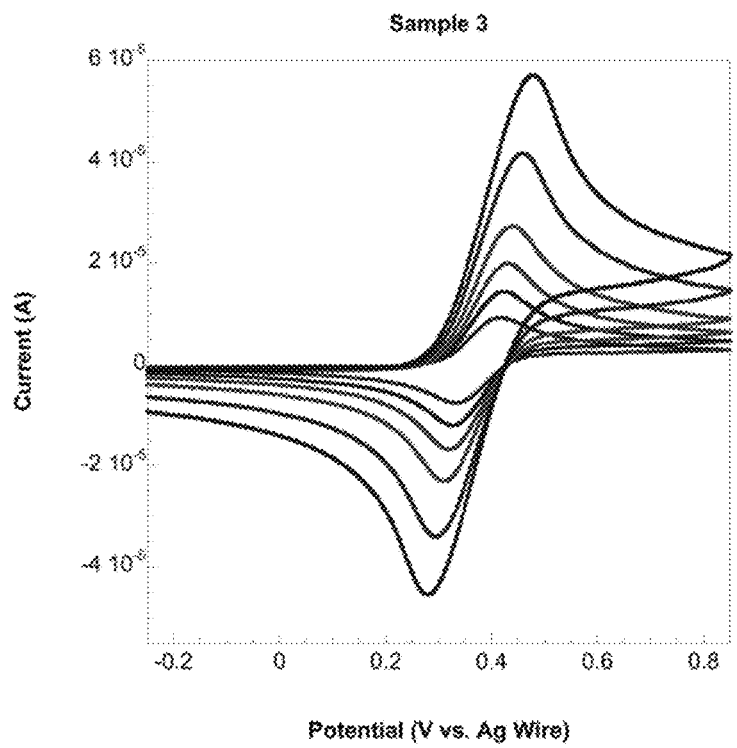
Figure 70F:
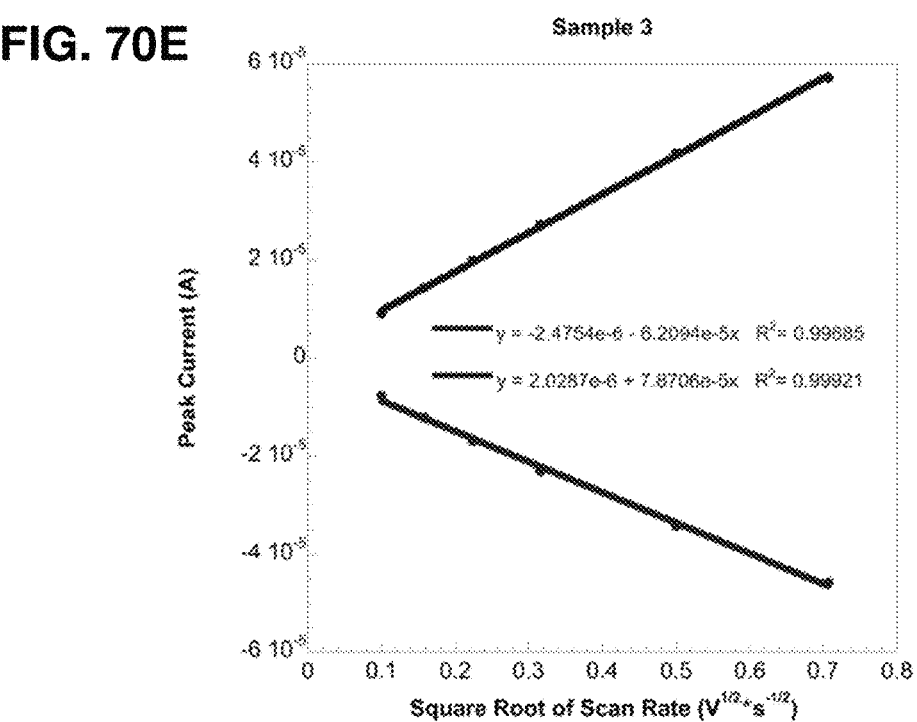

To probe redox activity and fundamental electrochemical properties of the gel electrolytes, a standard three-electrode cell with a glassy carbon working electrode, silver pseudoreference electrode, and platinum counter electrode was used. FIG. 69 displays the setup used for testing fundamental redox activity of these gels. Gels were tested in an air-free environment to prevent electrochemistry of contaminants from interfering with signal for species of interest.

The thermodynamic separation between two redox active species, ferrocene and cobaltocenium hexafluorophosphate, was consistent with aqueous and non-aqueous solvents, making the potential values cited in ionic-liquid polymer gel electrolytes trustworthy.

Figure 71:
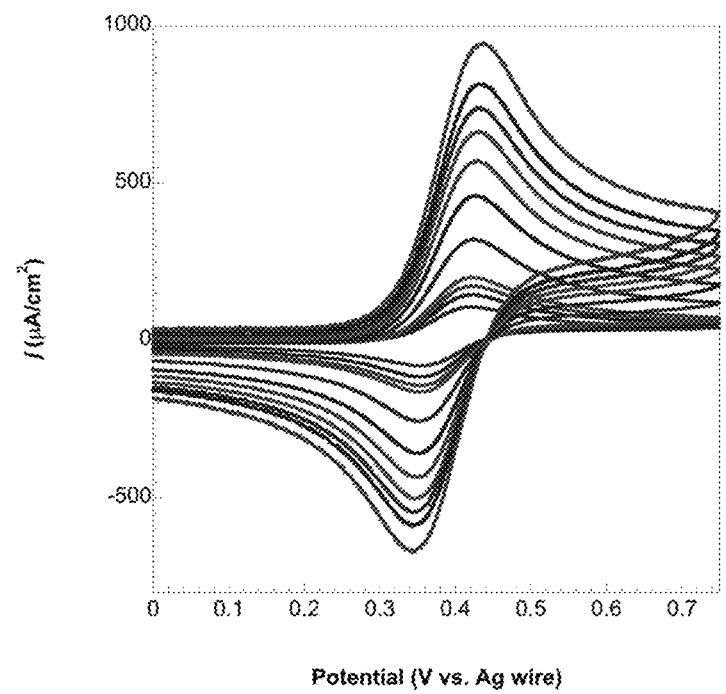
FIG. 71: Brush-block copolymer ionic liquid-polymer gel electrolytes with dissolved Re(bpy)(CO)$_3$Cl.

Dispersion of tricarbonylchlororhenium(I) (Re(bpy)$(CO)_3$ Cl), a known carbon dioxide reduction catalyst that nearly quantitatively converts $CO_2$ to CO through a two-electron pathway, in physically assembled ionic liquid-polymer gel electrolytes resulted in the gels shown in FIG. 71. The homogeneous dispersion of catalyst and solidity are apparent from this image.

Figure 72:
FIG. 72: Electrochemical response of brush-block copolymer ionic liquid-polymer gel electrolytes with dissolved Re(bpy)(CO)$_3$Cl. The two-electron peak corresponds to simultaneous electron transfer due to the activation of the complex by the imidazolium cation of the ionic liquid.
Figure 73:
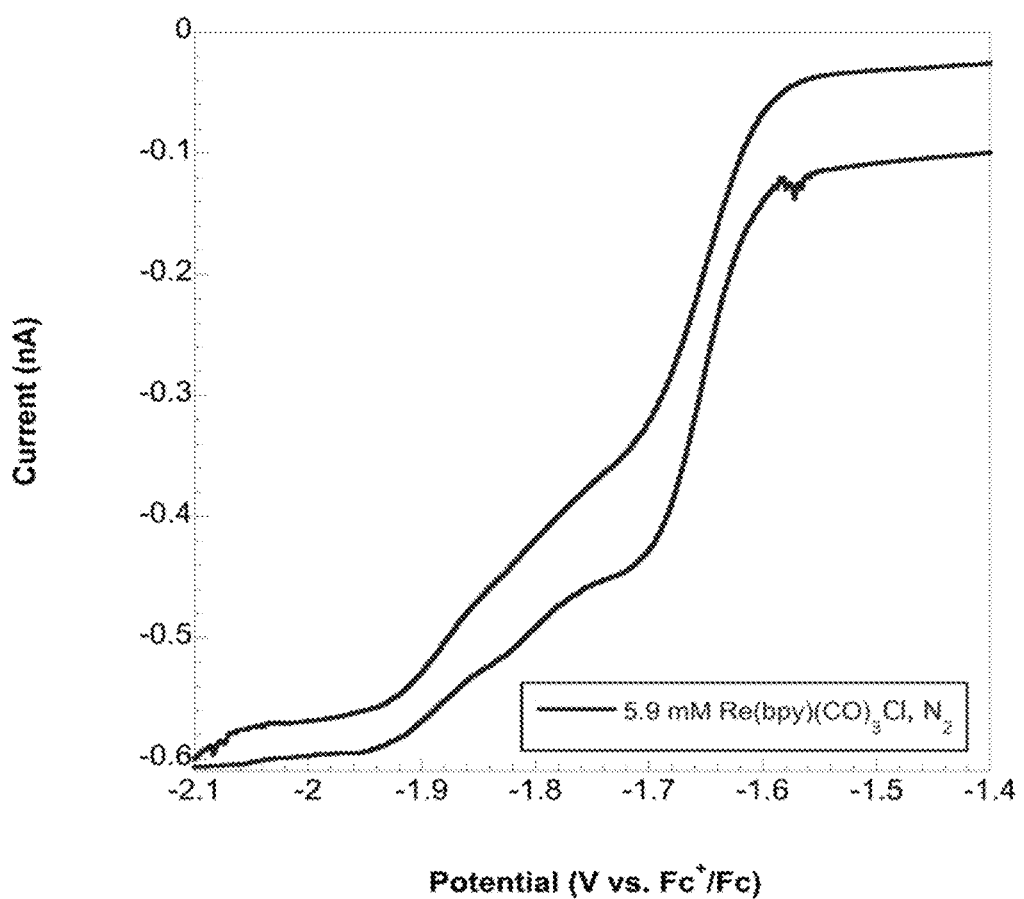
FIG. 73: Cyclic voltammetry of 5.9 mM Re(bpy)(CO)$_3$Cl in BMIm-TFSI. The working electrode was an 11 micrometer carbon fiber disk microelectrode.

The electrochemical behavior of the Re(bpy)$(CO)_3$Cl in the gel electrolyte was first tested under argon. FIG. 72 displays the voltammetry of Re(bpy)$(CO)_3$Cl in gel electrolyte. The behavior is markedly different from that in non-aqueous solvents, which is likely due to partial anion exchange of chloride with the anion of the ionic liquid, creating a greater number of unique electroactive species in the gel. Chloride is a weaker coordinating ligand for Re(I) since Re(I) is a soft acid, chloride is a hard base, and the ionic liquid anion is a soft base. This behavior is also indicated by the two re-oxidations seen. Normally one re-oxidation occurs, but the possibility of reforming the anion bond with either TFSI or chloride means re-oxidation can occur at different potentials To determine more information about the number of electrons transferred and confirm the mechanism of catalysis observed at a macrodisk electrode, UME electrochemistry of Re(bpy)$(CO)_3$Cl was performed in neat BMIm-TFSI, since the mechanism of reduction should be similar in both gel and ionic liquid, with only changes in the diffusion rate of material through the medium occurring. FIG. 73 displays the steady-state voltammetry observed, and three separate redox processes are visible. Table 18 gives corrected limiting current values and the estimated potential reached at steady state obtained from this plot.

TABLE 18

Cyclic voltammetry of 5.9 mM Re(bpy)(CO)$_3$Cl in BMIm-TFSI. The working electrode was an 11 micrometer carbon fiber disk microelectrode. Current values corrected using blank CV at 10 mVs$^{-1}$.

| Redox Process | Potential at i$_{1/2}$ | Peak Cathodic Potential at 3 mm Diameter GC | Current at Steady State |
| --- | --- | --- | --- |
| 1 | −1.66 V vs. Fc$^+$/Fc | −1.67 V vs. Fc$^+$/Fc | −243.2 pA |
| 2 | −1.82 V vs. Fc$^+$/Fc | −1.83 V vs. Fc$^+$/Fc | −44.6 pA |
| 3 | −1.91 V vs. Fc$^+$/Fc | −1.91 V vs. Fc$^+$/Fc | −35.0 pA |

The values obtained for potentials at steady state correlate well with the values obtained in macrodisk experiments. Equation 6 gives the steady state current associated with a disk UME, where C$_0$ is the bulk concentration of the electroactive species and r is the radius of the microdisk electrode.

$$i_{ss} = 4nFDC_0 r_0 \qquad \text{Eq. 6}$$

Using the Equation 6, a steady state reduction current in BMIm-TFSI for a one-electron process with a diffusion coefficient of 10$^{-7}$ cm$^2$s$^{-1}$ is −0.126 nA. Based on the currents obtained for the three redox processes, approximately two electrons are transferred for the first reduction, and the other two waves most likely correspond to two consecutive reductions of the same species present in a smaller concentration. This interpretation supports the notion of ligand exchange that is probable for the complex in ionic liquid with "soft base" coordinating anion. Previous research with an essentially non-coordinating anion gave a single wave, further supporting this notion.

Figure 74:
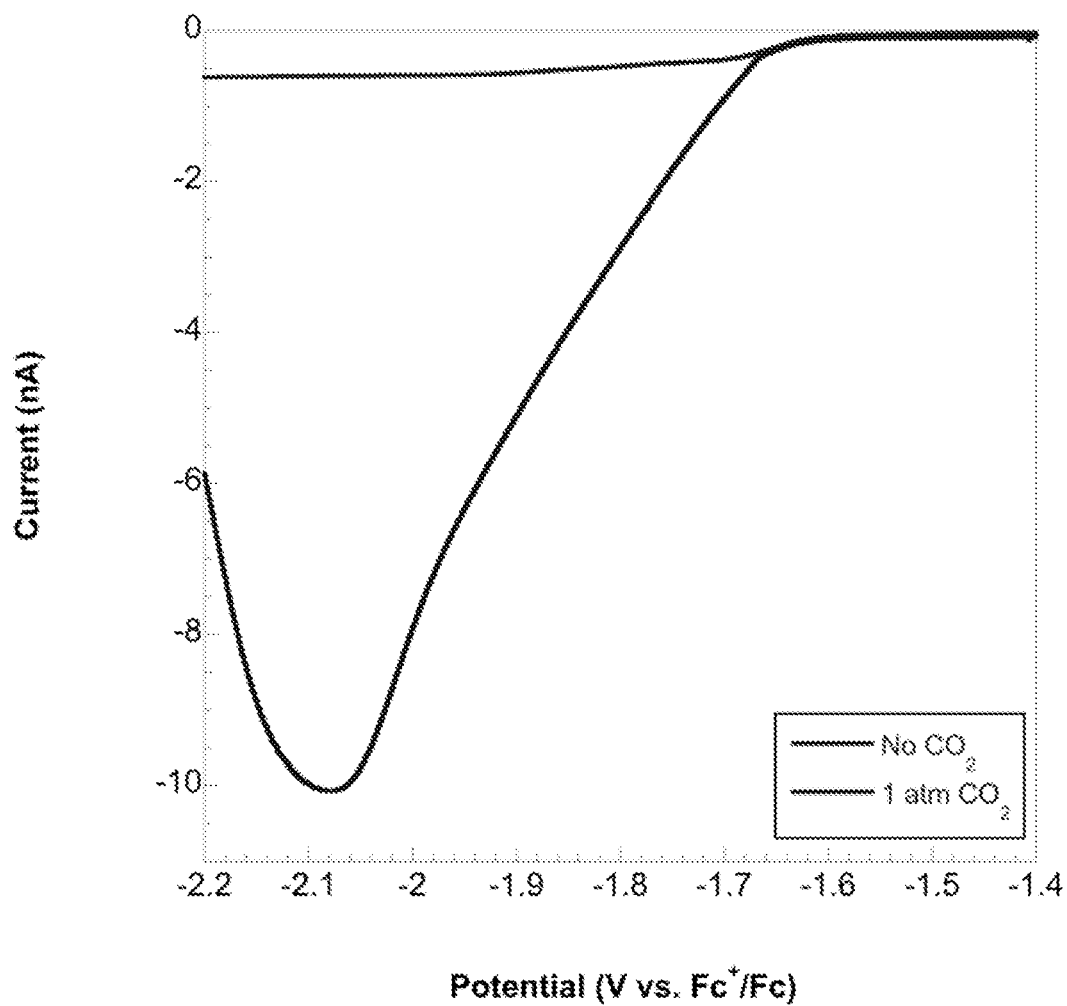
FIG. 74: Cyclic voltammetry of 5.9 mM Re(bpy)(CO)$_3$Cl in BMIm-TFSI with 1 atm $CO_2$. The working electrode was an 11 micrometer carbon fiber disk microelectrode.

FIG. 74 gives the current response of the system in the absence and in the presence of CO$_2$, with a large catalytic wave peaking at −2.08 V vs. Fc$^+$/Fc. Since a change in the slope of the current response occurs over the course of catalysis, the two analogues of the catalyst present in solution are both catalytically active. Adding together the currents of all redox processes in the absence of CO$_2$ gives a total current of −0.3138 nA. The peak current ratio, i$_{cat}$/i$_{ss}$, is equal to 30.8, which correlates well with the ratio of 29.9 obtained at 10 mVs$^{-1}$ in the macrodisk experiment.

Figure 75:
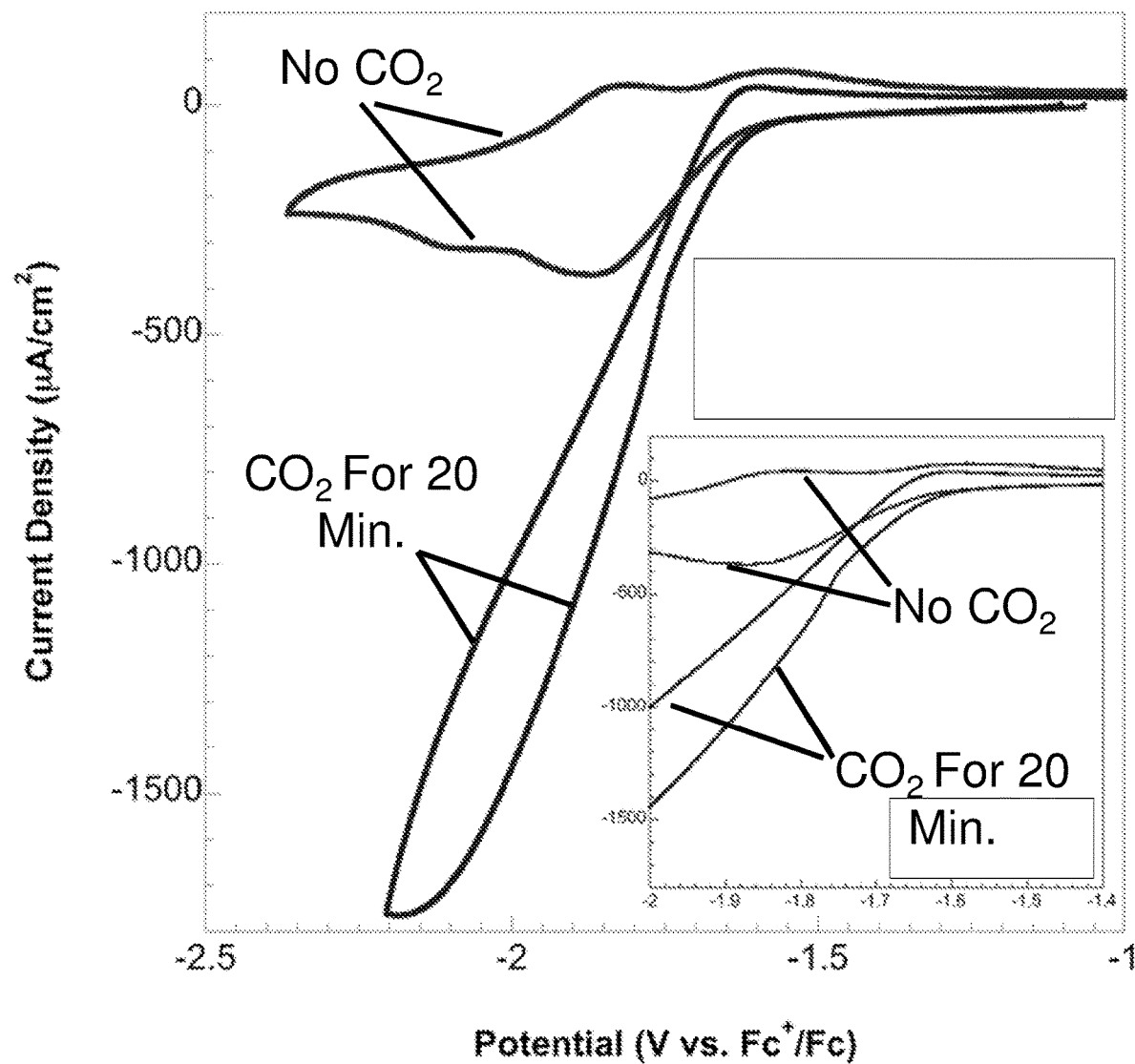
FIG. 75: Electrochemical response of brush-block copolymer ionic liquid-polymer gel electrolytes with dissolved Re(bpy)(CO)$_3$Cl under $CO_2$. The catalytic wave begins at the first reduction peak of the complex, implying that both electrons are transferred at the first wave. The additional one-electron peak seen at −2.23 V is most likely due to an additional reduction of the bipyridine ligand.
Figure 76:
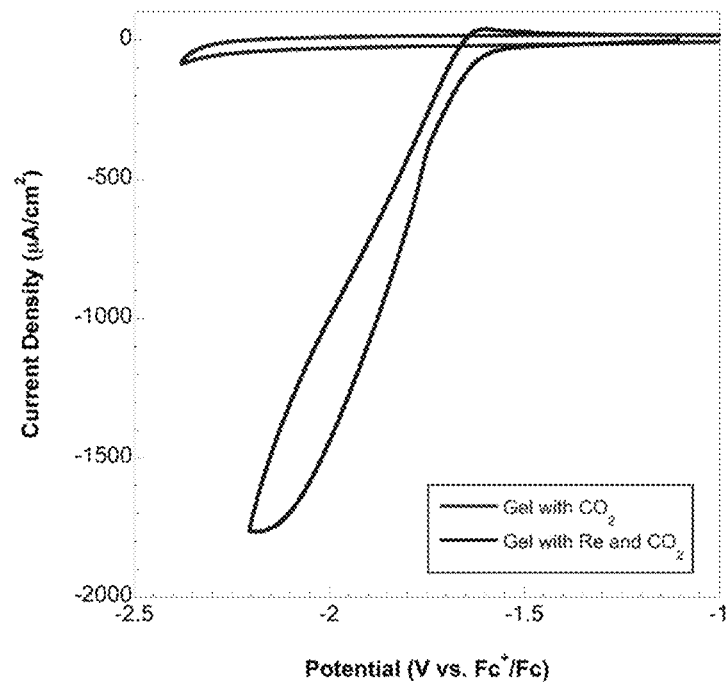
FIG. 76: Electrochemical response of brush-block copolymer ionic liquid-polymer gel electrolytes with no complex and with dissolved Re(bpy)(CO)$_3$Cl under $CO_2$. The catalytic wave only appears in the presence of Re(bpy)(CO)$_3$Cl, suggesting that $CO_2$, catalyst, and ionic liquid are all needed for the observed response.

Upon introduction of CO$_2$ into the cell, a large increase in current was observed, corresponding to CO production by Re(bpy)(CO)$_3$Cl. No current was observed for blank gel with CO$_2$. FIGS. 75 and 76 plot the observed responses, where FIG. 75 compares the electrochemistry under Ar versus that under CO$_2$ for the BMIm-TFSI/PS:PEO:PS ionic liquid-polymer gel electrolyte with Re(bpy)(CO)$_3$Cl, and FIG. 76 compares the electrochemistry of blank gel under CO$_2$ versus gel with Re(bpy)(CO)$_3$Cl.

Figure 77:
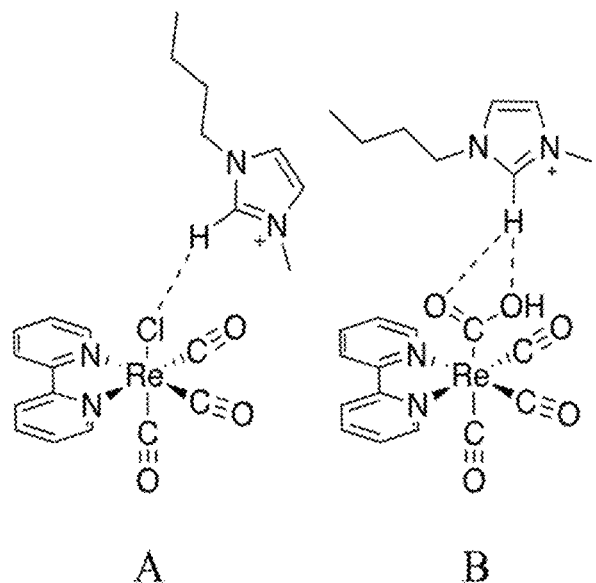
FIG. 77: Enhancement of Re(bpy)(CO)$_3$Cl in ionic liquid-polymer gel electrolytes based on literature precedent for analogous ionic liquid studies. The hydrogen bonding of the imidazolium hydrogen to the chloride ligand likely encourages the dissociation of the anion and promotes two-electron shuttling to the complex. The delocalized positive charge of the imidazolium stabilizes $CO_2$ binding to the metal center, which is supported by all imidazolium-based ionic liquids tested in our lab drastically enhancing the catalytic current and decreasing the potential needed for $CO_2$ reduction from Re(bpy)(CO)$_3$Cl.
Figure 78:
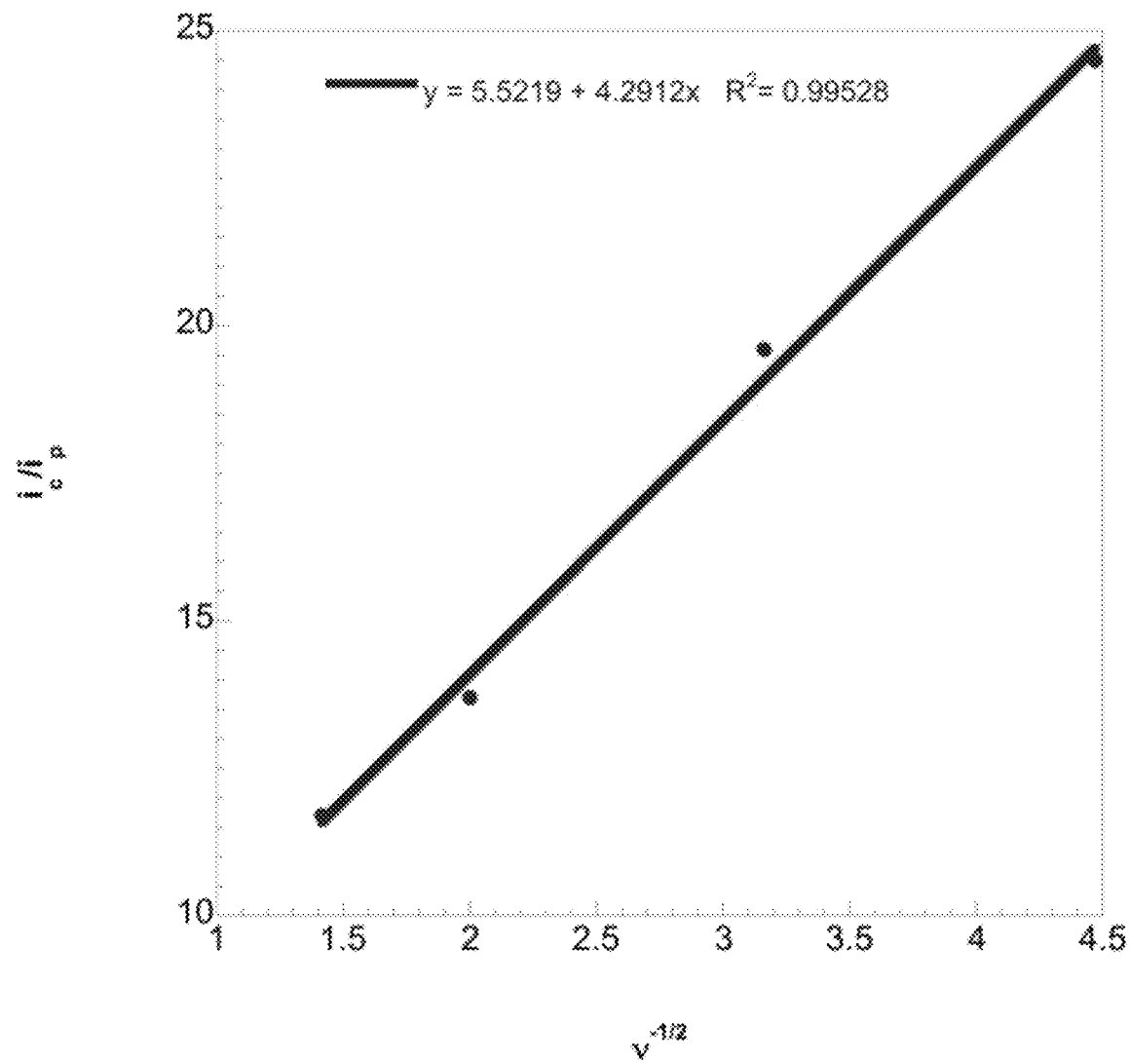
FIG. 78: Plot based on above equation, which gives information about the rate constant of the system. The value calculated from the slope for the apparent rate constant is $k=2.8\times10^4$ $M^{-1}s^{-1}$.

Based on literature precedent, the proposed enhancements in catalytic current and more facile reduction of CO$_2$ are shown in FIG. 77, where the hydrogen of the imidazolium cation is able to hydrogen bond to the chloride of Re(bpy)(CO)$_3$Cl and the imidazolium cation stabilizes the carboxylic intermediate when attached to Re(bpy)(CO)$_3$. These hypotheses for enhancement are speculative.

To determine the rate of CO$_2$ reduction in ionic liquid-polymer gel electrolytes, plots from Equation 7 were created for the rate of CO$_2$ reduction in neat ionic liquid, where the ratio of the catalytic current over the peak current is dependent on n$_{cat}$, the number of electrons for the catalytic mechanism (2 electrons), R, the ideal gas constant (8.3145 J*mol$^{-1}$*K$^{-1}$), T, the temperature (294 K), F, Faraday's Constant (96485.3 C*mol$^{-1}$), v, the voltammetric scan rate, k$_{apparent}$, the apparent catalytic rate constant, and [CO$_2$], the concentration of CO$_2$ (estimated to be 0.13 M in BMIm-TFSI).

$$\frac{i_{cat.}}{i_p} = \frac{n_{cat.}}{0.4463} \times \sqrt{\frac{RT}{Fv}} \times \sqrt{k_{apparent}[CO_2]} \qquad \text{Eq. 7}$$

Due to diffusional limitations of solids versus liquids, catalysis is slower in ionic liquid-polymer gel electrolyte than the neat ionic liquid. However, the reduction of CO$_2$ in gel resulted in a comparable rate of reduction compared to many other non-aqueous solvents and a large decrease in energy for reduction, approximately 450 mV. This means that a large decrease in energy input is coupled with similar catalytic rate, with the added benefit of a solid-state structure.

Any other catalyst for small molecule reduction, especially catalysts with halide leaving groups, could be dispersed in ionic liquid-polymer gel electrolyte media. If optimized and selective, a catalyst could be coupled with a photo-anode that could then power the catalysis through solar energy, with the ion gel electrolyte acting as a solid-state photo-cathode. This solid-state catalysis can be used for many applications, including oxygen generation on Mars, sequestration of CO$_2$ from power plants, conversion of syn-gas to more useful products, and generation of liquid fuels.

REFERENCES

1. Rogers, E. I.; Silvester, D. S.; Poole, D. L.; Aldous, L.; Hardacre, C.; Compton, R. G. *J. Phys. Chem. C.* 2008, 112, 2729-2735.
2. Grills, D. C.; Matsubara, Y.; Kuwahara, Y.; Golisz, S. R.; Kurtz, D. A.; Mello, B. A. *J. Phys. Chem. Lett.* 2014, 5, 2033-2038.
3. Grice, K. A.; Kubiak, C. P. Recent Studies of Rhenium and Manganese Bipyridine Carbonyl Catalysts for the Electrochemical Reduction of CO$_2$. In *Advances in Inorganic Chemistry, Volume 66*; Elsevier, 2014; Vol. 66.
4. Blakemore, J. D.; Gupta, A.; Warren, J. J.; Brunschwig, B. S.; Gray, H. B. *J. Am. Chem. Soc.* 2013, 135, 18288-18291.
5. Costentin, C.; Robert, M.; Savéant, J. M. *Chem. Soc. Rev.* 2013, 42, 2423-2436.
6. Benson, E. E.; Kubiak, C. P.; Sathrum, A. J.; Smieja, J. M. *Chem. Soc. Rev.* 2009, 38, 89-99.
7. Zhang, S.; Lee, K. H.; Sun, J.; Frisbie, C. D.; Lodge, T. P. *Macromolecules* 2011, 44, 8981-8989.
8. Thomas, E. L.; Kinning, D. J.; *Macromolecules* 1984, 17, 1712-1718.
9. Smieja, J. M.; Kubiak, C. P. *Inorg. Chem.* 2010, 49, 9283-9289.
10. Savéant, J. M. *Chem. Rev.* 2008, 108, 2348-2378.
11. Lei, Z.; Dai, C.; Chen, B. *Chem. Rev.* 2014, 114, 1289-1326.
12. Chen, Z.; Concepcion, J. J.; Brennaman, M. K.; Kang, P.; Norris, M. R.; Hoertz, P. G.; Meyer, T. J. *PNAS* 2012, 109, 15606-15611.
13. Hepp, A. F.; Landis, G. A.; Kubiak, C. P. In Situ Resource Utilization (ISRU) Technical Interchange Meeting 1997, 27.
14. Alvarez-Guerra, M.; Albo, J.; Alvarez-Guerra, E.; Irabien, A. *Energy Environ. Sci.* 2015, Advance Article.

15. Bard, A. J.; Faulkner, L. R. *Electrochemical Methods*, 2nd ed.; Wiley, 2000.
16. Qiao, J.; Liu, Y.; Hong, F.; Zhang, J. *Chem. Soc. Rev.* 2014, 43, 631-675.
17. Matsubara, Y.; Grills, D. C.; Kuwahara, Y. *ACS Cabal.* 2015, 5, 6440-6452.
18. Ohno, H. Electrochemical Aspects of Ionic Liquids, $2^{nd}$ ed.; Wiley, 2010.
19. Gu, Y.; Cussler, E. L.; Lodge, T. P. *J. Membrane Sci.* 2012, 423-424, 20-26.
20. Lodge, T. P. *Science* 2008, 321, 50-51.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An ion conducting polymer blend comprising:
a plurality of brush block copolymers, wherein each of said brush block copolymers independently comprises:
a first polymer block comprising at least 3 first repeating units, wherein each of said first repeating units of said first block comprises a first polymer backbone group directly or indirectly covalently linked to an ionophobic polymer side chain group; and
a second polymer block comprising at least 3 second repeating units; wherein each of said second repeating units of said second polymer block comprises a second polymer backbone group directly or indirectly covalently linked to an ionophilic polymer side chain group;
wherein said second polymer block is directly or indirectly covalently linked to first said polymer block along a backbone;
wherein the ionophilic polymer side chain groups of the second polymer block have a dispersity not greater than 1.2; and
an electrochemical additive;
wherein said ionophilic polymer side chains and said electrochemical additive form an ionically conductive region.

2. The ion conducting polymer blend of claim 1, wherein each of said brush block copolymers independently further comprises a third polymer block comprising at least 3 third repeating units, wherein each of said third repeating units of said third block independently comprise a third polymer backbone group directly or indirectly covalently linked to an third polymer side chain group, wherein said third polymer block is directly or indirectly covalently linked to said first polymer block or said second polymer block along said backbone.

3. The ion conducting polymer blend of claim 2, wherein at least a portion of said plurality of brush block copolymers form a physically cross-linked network.

4. The ion conducting polymer blend of claim 2, wherein each of said brush block copolymers independently is a triblock brush copolymer.

5. The ion conducting polymer blend of claim 4, wherein each of said third polymer side chain groups is independently an ionophobic polymer side chain group and wherein each of said brush block copolymers is independently defined by the formula A'-B-A", wherein A' is said first polymer block, B is said second polymer block and A" is said third polymer block.

6. The ion conducting polymer blend of claim 4, wherein each of said brush block copolymers is defined by the formula A-B-C, wherein A is said first polymer block, B is said second polymer block and C is said third polymer block.

7. The ion conducting polymer blend of claim 2, wherein each of said third polymer side chain groups is independently an ionophobic polymer side chain group;
wherein each of said brush block copolymers independently further comprise a fourth polymer block comprising at least 3 fourth repeating units, wherein each of said fourth repeating units of said fourth block independently comprises a fourth polymer backbone group directly or indirectly covalently linked to a fourth polymer side chain group, and a fifth polymer block comprising at least 3 fifth repeating units, wherein each of said fifth repeating units of said fifth block comprise a fifth polymer backbone group directly or indirectly covalently linked to a fifth polymer side chain group;
and wherein said each of said fourth polymer block and said fifth polymer block is independently directly or indirectly covalently linked to said first polymer block, said second polymer block or said third polymer block along said backbone; and
wherein each of said block copolymers is independently defined by the formula A'-B'-A"-B"-A''', wherein A' is said first polymer block, B' is said second polymer block, A" is said third polymer block, B" is said fourth polymer block and A''' is said fifth polymer block.

8. The ion conducting polymer blend of claim 2, wherein each of said brush block copolymers independently further comprise a fourth polymer block comprising at least 3 fourth repeating units, wherein each of said fourth repeating units of said fourth block comprise a fourth polymer backbone group directly or indirectly covalently linked to a fourth polymer side chain group and a fifth polymer block comprising at least 3 fifth repeating units, wherein each of said fifth repeating units of said fifth block comprise a fifth polymer backbone group directly or indirectly covalently linked to an fifth polymer side chain group and wherein said each of said fourth polymer block and said fifth polymer block is independently directly or indirectly covalently linked to said first polymer block, said second polymer block or said third polymer block along said backbone; and
wherein each of said block copolymers is defined by the formula A'-B'-C-B"-A", wherein A' is said first polymer block, B' is said second polymer block, C is said third polymer block, B" is said fourth polymer block and A" is said fifth polymer block.

9. The ion conducting polymer blend of claim 1, wherein each of said brush block copolymers independently comprises 3 to 1000 of said first repeating units in said first polymer block, 3 to 1000 of said second repeating units in said second polymer block.

10. The ion conducting polymer blend of claim 2, wherein each of said brush block copolymers independently comprises 3 to 1000 of said third repeating units in said third polymer block.

11. The ion conducting polymer blend of claim 1, wherein each of said brush block copolymers independently comprises said ionophobic-polymer side chain group having 3 to 100 repeating units and said ionophilic polymer side chain group having 3 to 100 repeating units.

12. The ion conducting polymer blend of claim 2, wherein each of said brush block copolymers independently comprises said third polymer side chain group having 3 to 100 repeating units.

13. The ion conducting polymer blend of claim 1, wherein said plurality of copolymers have 100% grafting density.

14. The ion conducing polymer blend of claim 1, wherein said plurality of copolymers is synthesized using a grafting through method.

15. The ion conducting polymer blend of claim 1, wherein said electrochemical additive is a lithium salt.

16. The ion conducting polymer blend of claim 1, wherein each of said brush block copolymers independently comprises an ionophilic polymer side chain having less than 100 repeating units.

17. The ion conducting polymer blend of claim 1, wherein said electrochemical additive is an ionic liquid.

18. The ion conducting polymer blend of claim 3, wherein said physically cross-linked network comprises said ionophobic polymer side chains self-assembled to form ordered or disordered spherical micelles linked by said B block containing ionophilic polymer side chains.

19. The ion conducting polymer blend of claim 1, wherein said polymer blend is an ion gel.

20. The ion conducting polymer blend of claim 1 further comprising an electrocatalyst, wherein said electrocatalyst is dispersed in said ion conducting polymer blend.

21. The ion conducting polymer blend of claim 1, wherein said copolymer blend has an ionic conductivity greater than or equal to $1\times10^{-4}$ S/cm at 105° C.

22. The ion conducting polymer blend of claim 1, wherein said copolymer blend has a storage modulus greater than or equal to 2000 Pa at 105° C. and a loss modulus greater than or equal to 1000 Pa at 105° C.

23. An electrochemical cell comprising:
a positive electrode;
a negative electrode;
an electrolyte provided between said positive electrode and said negative electrode;
said electrolyte capable of conducting ions;
wherein said electrolyte comprises a plurality of brush block copolymers and one or more electrochemical additives, wherein said brush block copolymers form an ion conducting region
wherein each of said brush block copolymer independently comprises:
a first polymer block comprising at least 3 first repeating units, wherein each of said first repeating units of said first block comprises a first polymer backbone group directly or indirectly covalently linked to a ionophobic polymer side chain group; and
a second polymer block comprising at least 3 second repeating units, wherein each of said seconds repeating units of said second polymer block comprises a second polymer backbone group directly or indirectly covalently linked to a ionophilic polymer side chain group;
wherein said second polymer block is directly or indirectly covalently linked to first said polymer block along a backbone, and
wherein the ionophilic polymer side chain groups of the second polymer, block have a dispersity not greater than 1.2.

24. The electrochemical cell of claim 23, wherein each of said brush block copolymers independently further comprises a third polymer block comprising at least 3 of said first repeating units, wherein each of said third repeating units of said third block comprise a third polymer backbone group directly or indirectly covalently linked to an third polymer side chain group; wherein said third polymer block is directly or indirectly covalently linked to said first polymer block or said second polymer block along said backbone; and
wherein said plurality of brush block copolymers and said one or more electrochemical additives form a physically cross-linked network.

25. The electrochemical cell of claim 23, wherein each of said brush block copolymer independently comprises:
a first polymer block comprising at least 3 first repeating units, wherein each of said first repeating units of said first block comprises a first polymer backbone group directly or indirectly covalently linked to a ionophobic polymer side chain group; and
a second polymer block comprising at least 3 second repeating units; wherein each of said second repeating units of said second polymer block comprises a second polymer backbone group directly or indirectly covalently linked to a ionophilic polymer side chain group;
wherein said second polymer block is directly or indirectly covalently linked to first said polymer block along a backbone.

26. The electrochemical cell of claim 23, wherein each of said brush block copolymers independently further comprises a third polymer block comprising at least 3 of said first repeating units, wherein each of said third repeating units of said third block comprise a third polymer backbone group directly or indirectly covalently linked to an third polymer side chain group; wherein said third polymer block is directly or indirectly covalently linked to said first polymer block or said second polymer block along said backbone; and wherein said plurality of brush block copolymers and said electrochemical additive form a physically cross-linked network.

27. The ion conducting polymer blend of claim 1, wherein the ionophobic polymer side chain groups of the first polymer block have a dispersity not greater than 1.2.

28. The ion conducting polymer blend of claim 1, wherein the ionophilic polymer side chain groups comprise polyethylene oxide, wherein the electrochemical additive comprises lithium ions, and wherein the ion conducting polymer blend is characterized by a crystallinity gap of $2<[EO]:[Li^+]<10$, wherein [EO] is defined as the average total number of ethylene oxide repeat units per ionophilic polymer side chain and [Li$^+$] is defined as total moles of lithium ions.

29. The ion conducting polymer blend of claim 1, wherein the ionophilic polymer side chain groups comprise polyethylene oxide, wherein the electrochemical additive comprises lithium ions, and wherein the ion conducting polymer blend is characterized by a crystallinity gap of $2\leq[EO]:[Li^+]\leq15$, wherein [EO] is defined as the average total number of ethylene oxide repeat units per ionophilic polymer side chain and [Li$^+$] is defined as total moles of lithium ions.

* * * * *